US006606589B1

(12) United States Patent
Tuma et al.

(10) Patent No.: US 6,606,589 B1
(45) Date of Patent: *Aug. 12, 2003

(54) DISK STORAGE SUBSYSTEM WITH INTERNAL PARALLEL DATA PATH AND NON-VOLATILE MEMORY

(75) Inventors: George B. Tuma, Scotts Valley, CA (US); Wade B. Tuma, Reno, NV (US); Robert E. Warne, Markleeville, CA (US)

(73) Assignee: Database Excelleration Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/261,587

(22) Filed: Mar. 2, 1999

Related U.S. Application Data

(60) Continuation of application No. 08/482,924, filed on Jun. 7, 1995, now Pat. No. 6,374,389, which is a continuation of application No. 07/985,731, filed on Dec. 1, 1992, now abandoned, which is a division of application No. 07/753,269, filed on Aug. 30, 1991, now Pat. No. 5,218,691, which is a division of application No. 07/224,530, filed on Jul. 26, 1988, now Pat. No. 5,070,474.

(51) Int. Cl.[7] .............................................. G06F 12/00
(52) U.S. Cl. ......................................... 703/24; 712/14
(58) Field of Search ...................... 703/23, 24; 711/162, 711/170; 710/7, 129; 365/226, 228; 712/14

(56) References Cited

U.S. PATENT DOCUMENTS

| 3,768,071 A | 10/1973 | Knauft | 371/13 |
|---|---|---|---|
| 3,805,040 A | 4/1974 | Boden | 371/49.4 |
| 3,863,217 A | 1/1975 | Taylor | 371/51.1 |
| 3,887,901 A | 6/1975 | Moore | 371/51.1 |
| 3,891,959 A | 6/1975 | Tsuji | 371/43 |
| 3,891,974 A | 6/1975 | Coulter | 364/200 |
| 4,117,458 A | 9/1978 | Burghard | 371/37.2 |
| 4,327,410 A | 4/1982 | Patel | 395/489 |
| 4,467,421 A | 8/1984 | White | 364/200 |
| 4,476,526 A | 10/1984 | Dodd | 364/200 |
| 4,527,234 A | 7/1985 | Bellay | 364/200 |
| 4,564,922 A | 1/1986 | Muller | 395/488 |
| 4,611,289 A | 9/1986 | Coppola | 364/492 |
| 4,617,624 A | 10/1986 | Goodman | 364/200 |
| 4,630,230 A | 12/1986 | Sundet | 364/200 |
| 4,642,759 A | 2/1987 | Foster | 364/200 |
| 4,727,512 A | 2/1988 | Birkner | 364/200 |
| 4,763,333 A | 8/1988 | Byrd | 371/66 |

(List continued on next page.)

OTHER PUBLICATIONS

Imperial Technology, Inc. Brochure: *MAXIRAM–11 Storage System*, Jan. 1, 1978, 4 pgs.

(List continued on next page.)

*Primary Examiner*—Russell Frejd
(74) *Attorney, Agent, or Firm*—Skjerven Morrill LLP; Norman R. Klivans

(57) ABSTRACT

Disclosed is a solid state disk emulator system for significantly improving access time, i.e., improving both the seek time and the rotational latency. The disk emulator complies with the SMD interface convention and thus to the central processor and the SMD disk controller, the disk emulator appears as a disk with virtually a zero access time. In one embodiment, the primary systems of the disk emulator are a 66-bit shift register, a parity circuit, a latch circuit, a 66-bit parallel bus and a dynamic random access memory (DRAM) array. Each of these systems interface with control systems of the disk emulator which provide the signals required for the read and write operations of the disk emulator. An error correction process is incorporated in the disk emulator which corrects single bit hard memory errors using only a single parity bit.

8 Claims, 75 Drawing Sheets

Microfiche Appendix Included
(3 Microfiche, 105 Pages)

U.S. PATENT DOCUMENTS

| | | | | |
|---|---|---|---|---|
| 4,780,819 A | | 10/1988 | Kashiwagi | 364/200 |
| 4,789,960 A | | 12/1988 | Willis | 364/200 |
| 4,823,347 A | | 4/1989 | Chin et al. | 371/49.1 |
| 4,849,875 A | | 7/1989 | Fairman et al. | 364/200 |
| 4,876,686 A | | 10/1989 | Sasaki et al. | 371/49.1 |
| 4,959,774 A | | 9/1990 | Davis | 364/200 |
| 5,291,584 A | * | 3/1994 | Challa et al. | 703/24 |
| 5,459,850 A | * | 10/1995 | Clay et al. | 703/24 |
| 5,465,338 A | * | 11/1995 | Clay | 710/130 |
| 5,476,526 A | | 12/1995 | Attermeyer | 55/496 |
| 5,485,422 A | * | 1/1996 | Bauer et al. | 365/185.21 |
| 5,555,402 A | * | 9/1996 | Tuma et al. | 703/24 |
| 5,668,976 A | * | 9/1997 | Zook | 703/24 |
| 5,889,721 A | * | 3/1999 | Gannage | 365/226 |
| 6,018,626 A | * | 1/2000 | Zook | 703/24 |
| 6,070,224 A | * | 5/2000 | LeCrone et al. | 703/24 |
| 6,374,389 B1 | * | 4/2002 | Tuma et al. | 714/802 |

OTHER PUBLICATIONS

Imperial Technology, Inc. Technical Paper: "MEGASTREAM: MegaRam Streaming Tape Drive Option", 6 pgs. (undated).

Imperial Technology, Inc. Brochure: *MEGARAM–SMD: Non–Rotating Disk With Solid–State Performance*, Apr. 1988, 2 pgs.

Imperial Technology, Inc. Product Description: *MegaRam–3380 Lowboy*, L4800, Rev. B, 1989, 17 pgs.

Imperial Technology, Inc. Installation Manual: *MegaRam–3380 Lowboy*, L4803, Rev. A., 1989, 101 pgs.

Imperial Technology, Inc. Installation Manual: *MegaRam–3380 Lowboy*, L4801, Rev. A., 1989, 55 pgs.

Imperial Technology, Inc. Product Manual: *Technical Specification: Megastream Streaming Tape Option*, L3051, Rev. C., Oct. 31, 1986, 50 pgs.

Imperial Technology, Inc. Brochure: *The MAXI Storage System*, 2 pgs. (undated).

Imperial Technology, Inc. Brochure: *MAXI: High speed storage system for Sperry Univac computers*, Oct. 1980, 2 pgs.

Imperial Technology, Inc. Brochure: *MAXI: High speed, SMD compatible storage system*, 1982, 2 pgs.

Imperial Technology, Inc. Brochure: *MAXI: High speed storage system for Hewlett Packard Computers*, Jul. 1982, 2 pgs.

Imperial Technology, Inc. Brochure: *MAXIRAM–V72: High speed storage system . . .* , Jun. 1981, 2 pgs.

Imperial Technology, Inc. Brochure: *MAXIRAM–V72: Economic PDP–11/70 main memory*, Jan. 1, 1978, 4 pgs.

Imperial Technology, Inc. Brochure: *MAXIRAM–S70: PDP–11/70 main memory*, Jun. 1980, 2 pgs.

Imperial Technology, Inc. Brochure: *MAXI: High speed storage for Westinghouse computers*, Jun. 1980, 2 pgs.

Imperial Technology, Inc. Brochure: *MAXIRAM–20: High speed storage system for Data General Computers*, Jun. 1980, 2 pgs.

Imperial Technology, Inc. Brochure: *MAXIRAM–11/70HS: PDP–11/70 High Speed Mass Memory*, Jan. 1, 1980, 4 pgs.

Imperial Technology, Inc. Brochure: *The MAXI Storage System*, 2 pgs. (undated).

Imperial Technology, Inc. Brochure: *MAXIRAM Storage System*, Jul. 1, 1978, 4 pgs.

Imperial Technology, Inc. Brochure: *MEGARAM: Solid–State Disk Storage System*, Jan. 1, 1989, 5 pgs.

Imperial Technology, Inc. Technical Specification: *Megastream Streaming Tape Option*, Oct. 31, 1986, 16 pgs.

Imperial Technology, Inc. Brochure: *MEGARAM–SCSI 2: 5 1/4 inch solid–stage disk using the Small Computer System Interface*, 1993, 2 pgs.

Imperial Technology, Inc. Brochure: *MEGARAM–SCSI: 5 1/4 inch solid–stage disk using the Small Computer System Interface*, 1992, 4 pgs.

Imperial Technology, Inc. Brochure: *MEGARAM–3000: Solid–State Disk With SCSI–2 Fast and Wide Interface*, Jul. 1996, 2 pgs.

Imperial Technology, Inc. Brochure: *MEGARAM–35: 3 1/2 inch solid–stage disk with a SCSI–2 Interface*, Jul. 1996, 2 pgs.

Imperial Technology, Inc. Brochure: *IMPERIAL Corporate Profile*, 1996, 4 pgs.

Imperial Technology, Inc. Installation Manual: *Configuration and Physical Planning Guide MegaRam–3380 Lowboy*, L4802, Rev. A., 1989, 16 pgs.

Imperial Technology, Inc. Manual: *DBU/EBU–MegaRam Configuration Manual*, L4871 Rev. B., Oct. 4, 1990, 7 pgs.

Imperial Technology, Inc. Users Guide: *MegaRam SCSI*, L4955, Rev. XA, Feb. 4, 1992, 90 pgs.

Imperial Technology, Inc. Technical Specification: *Technical Reference IDBU Operation: Internal Drive Backup Unit A5620*, L5673, Rev. B, Oct. 10, 1995, 31 pgs.

Imperial Technology, Inc. Technical Specification: *Technical Reference BIG IDBU Operation: Internal Drive Backup Unit A6218*, L6265, Rev. A, May 6, 1996, 30 pgs.

Imperial Technical, Inc. Installation Manual: *Installation and Operation Guide MegaRam–SCSI 2*, L5752, Rev. C., 1993, 47 pgs.

Imperial Technology, Inc. Installation Manual: *Installation and Operation Guide MegaRam–500*, L5980, Rev. C., 1995, 50 pgs.

Imperial Technology, Inc. Schematic: *MegaStream Schematics*, 44 pgs. (some dates not legible).

Imperial Technology, Inc. Schematic: *Internal Disk Backup Unit—IDBU)—C5621, Rev. F.*, Mar. 14, 1996, 4 pgs.

Imperial Technology, Inc. Schematic: *MPU CIRCUITS, (IDBU2)—C6099, Rev. E*, Aug. 5, 1996, 4 pgs.

Imperial Technology, Inc. Schematic: *Controller, DBU*, C3955, Revs. D, C and B, Sep. 19, 1988–Jun. 7, 1989, 24 pgs.

Imperial Technology, Inc. Schematic: *EDU/DBU MAIN PCBA*, C5096, Revs. C and B, Jan. 31, 1992–Jul. 23, 1992, 5 pgs.

Memorex Product Description Manual: *6880 Solid State Disc Storage Subsystem (6888, 6880, 6889)*, 1986, 33 pgs.

Imperial Technology, Inc. Brochure: *MEGARAM–SMD: High speed, SMD compatible storage system*, Jun. 1983, 2 pgs.

Douglas Eidsmore, "Solid State Disks Optimize Throughput", Digital Design, Oct. 1983, 5 pgs.

Order Re Claims Construction, Case No. C96–20894, filed Jul. 23, 1998, 9 pages.

Order On Cross–Motions For Summary Judgement . . . , Case No. C96–20894, filed Feb. 16, 1999, 9 pages.

* cited by examiner

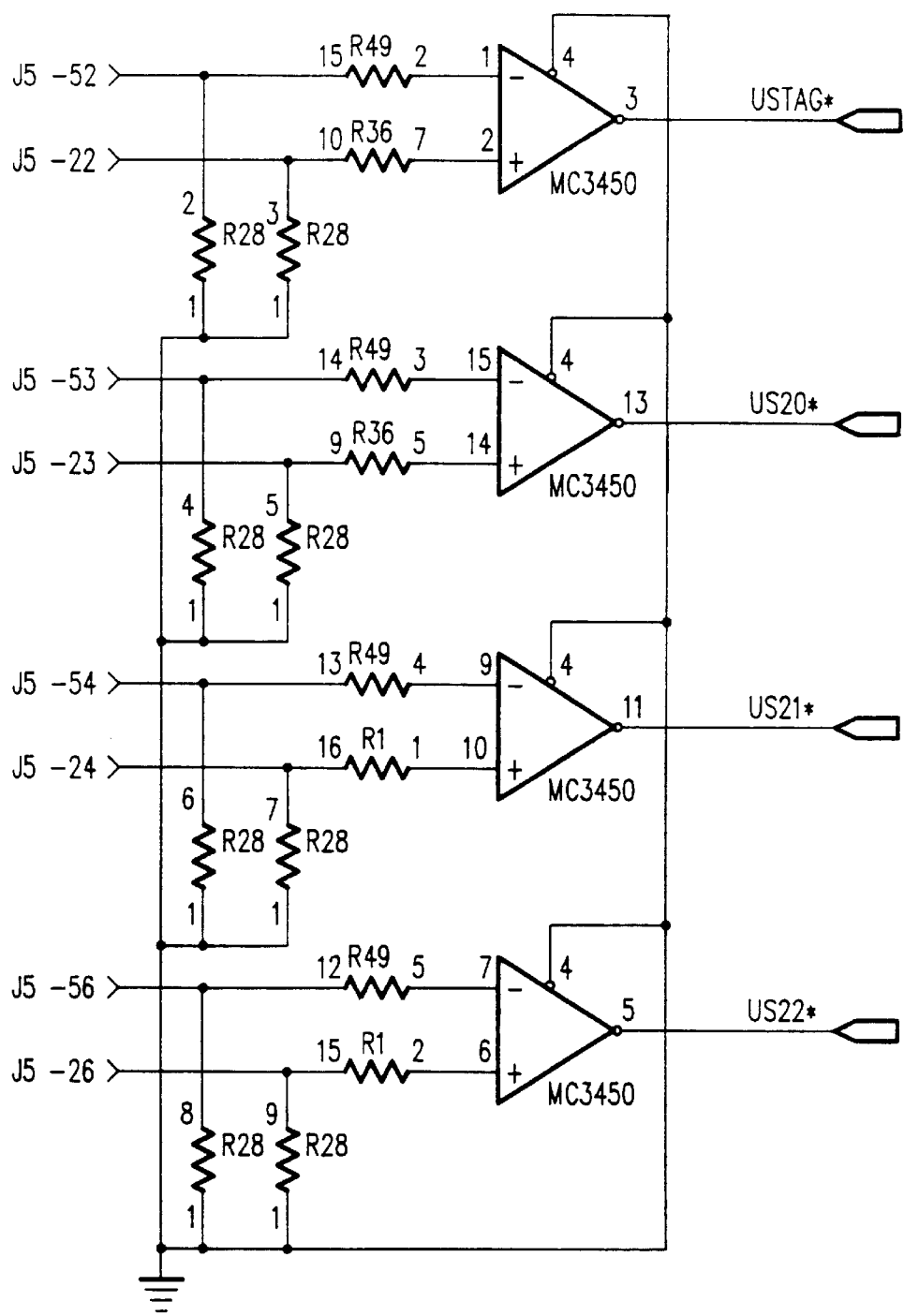
FIG. 6a
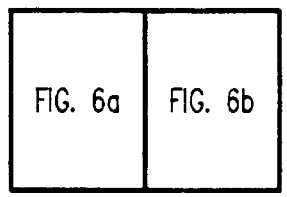
KEY TO FIG. 6

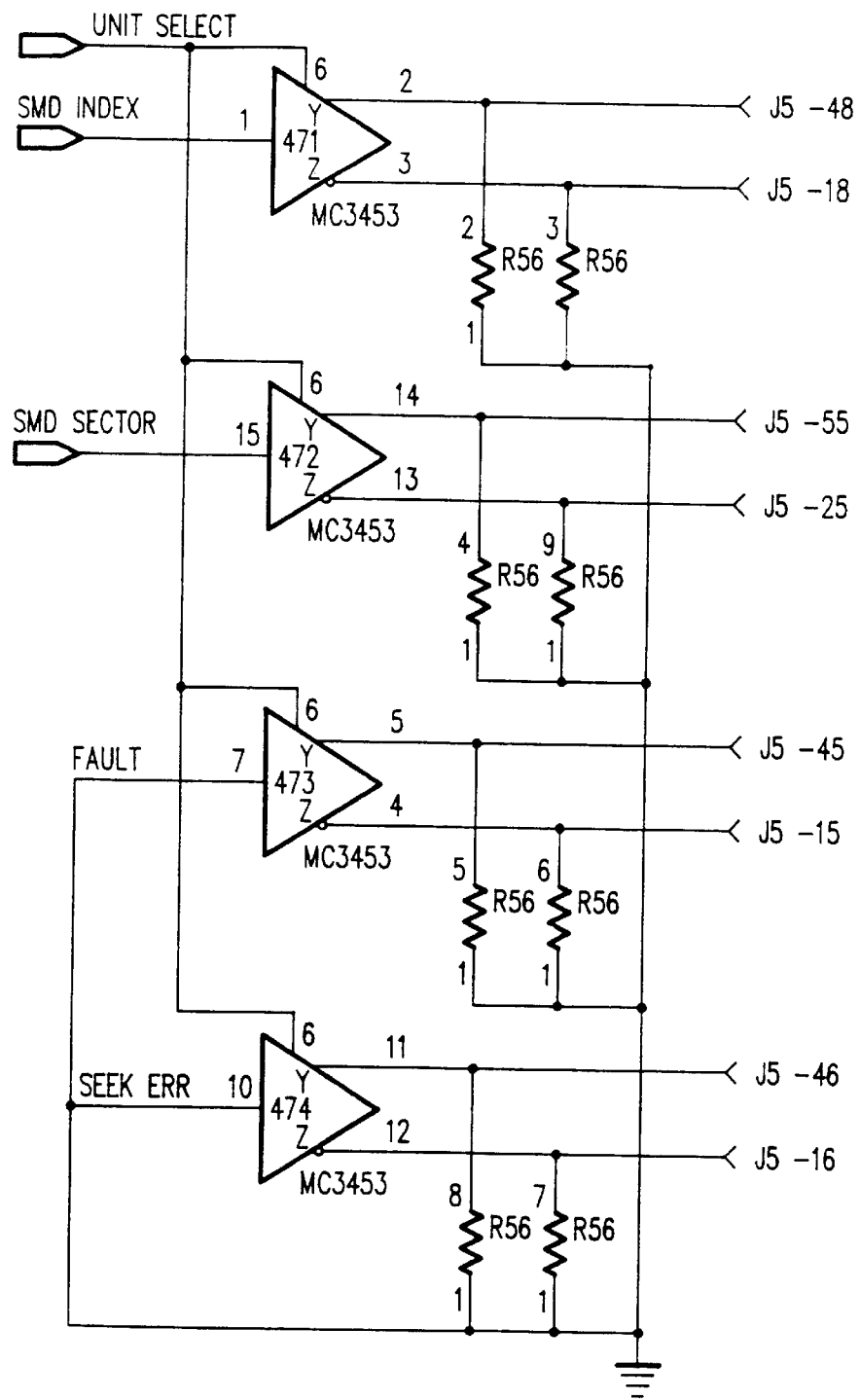
FIG. 7a
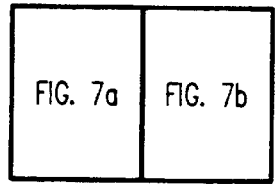
KEY TO FIG. 7

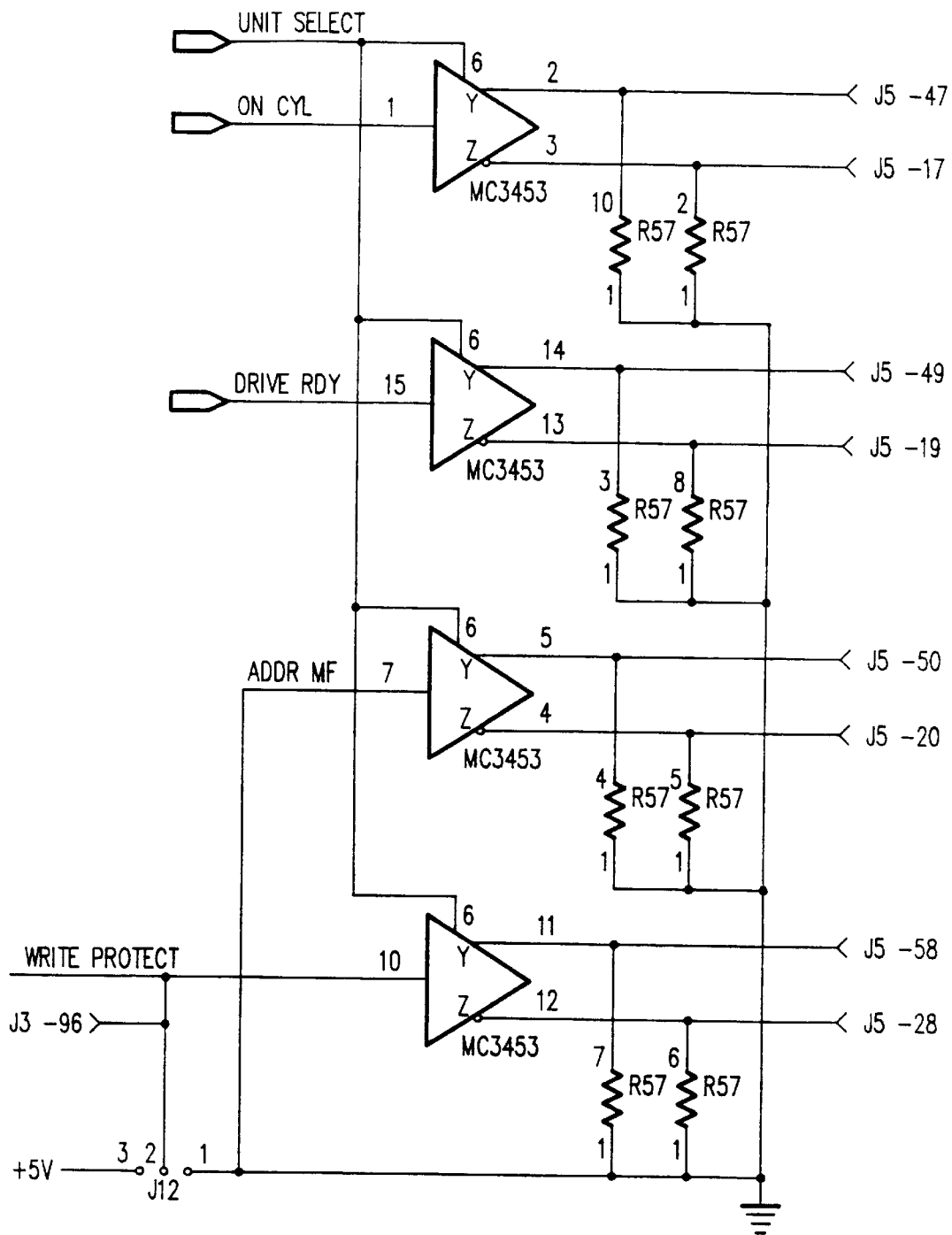
FIG. 8a
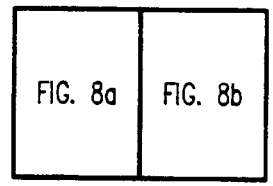
KEY TO FIG. 8

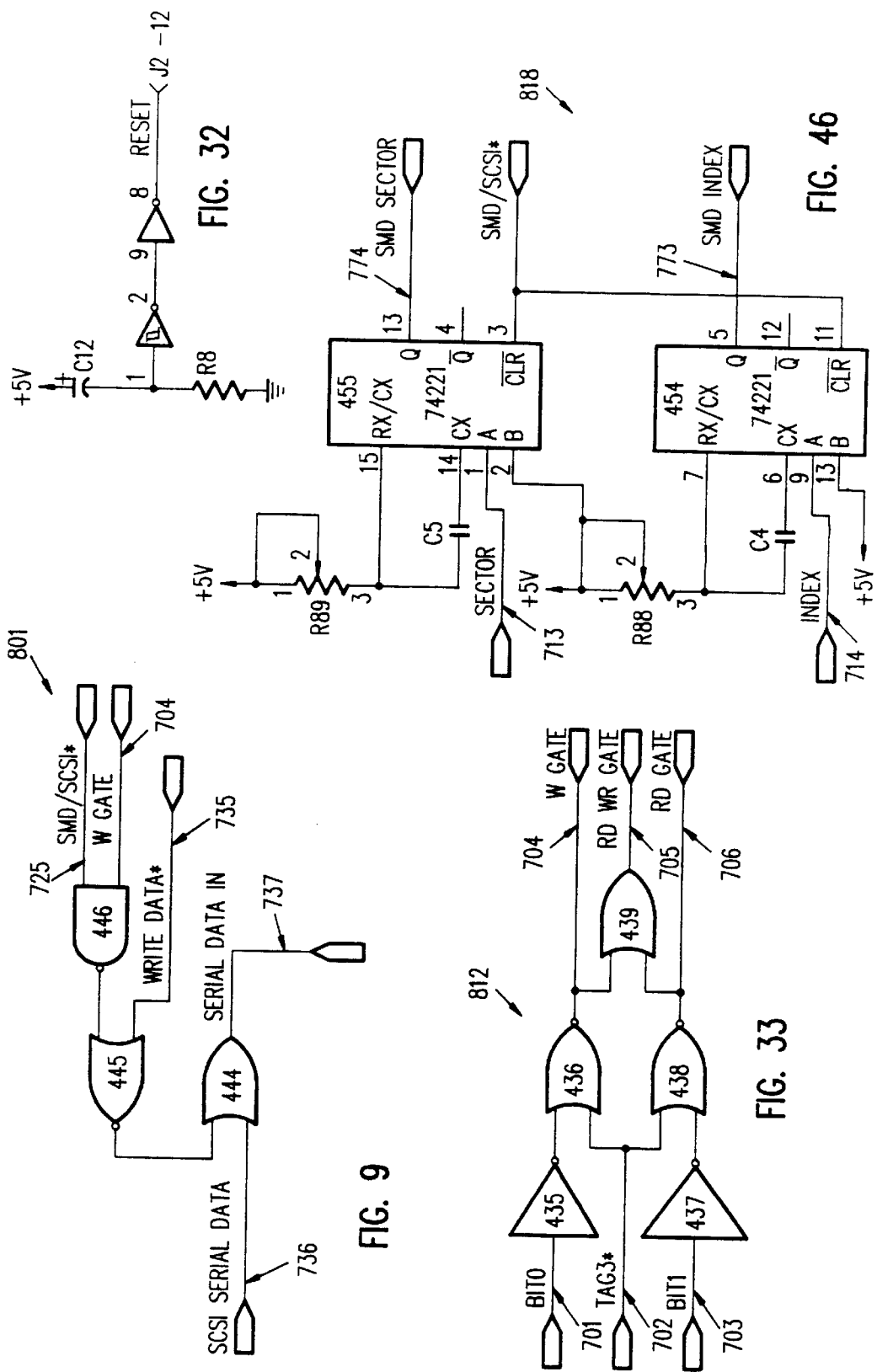

FIRST GAP COUNTER/SECOND GAP COUNTER

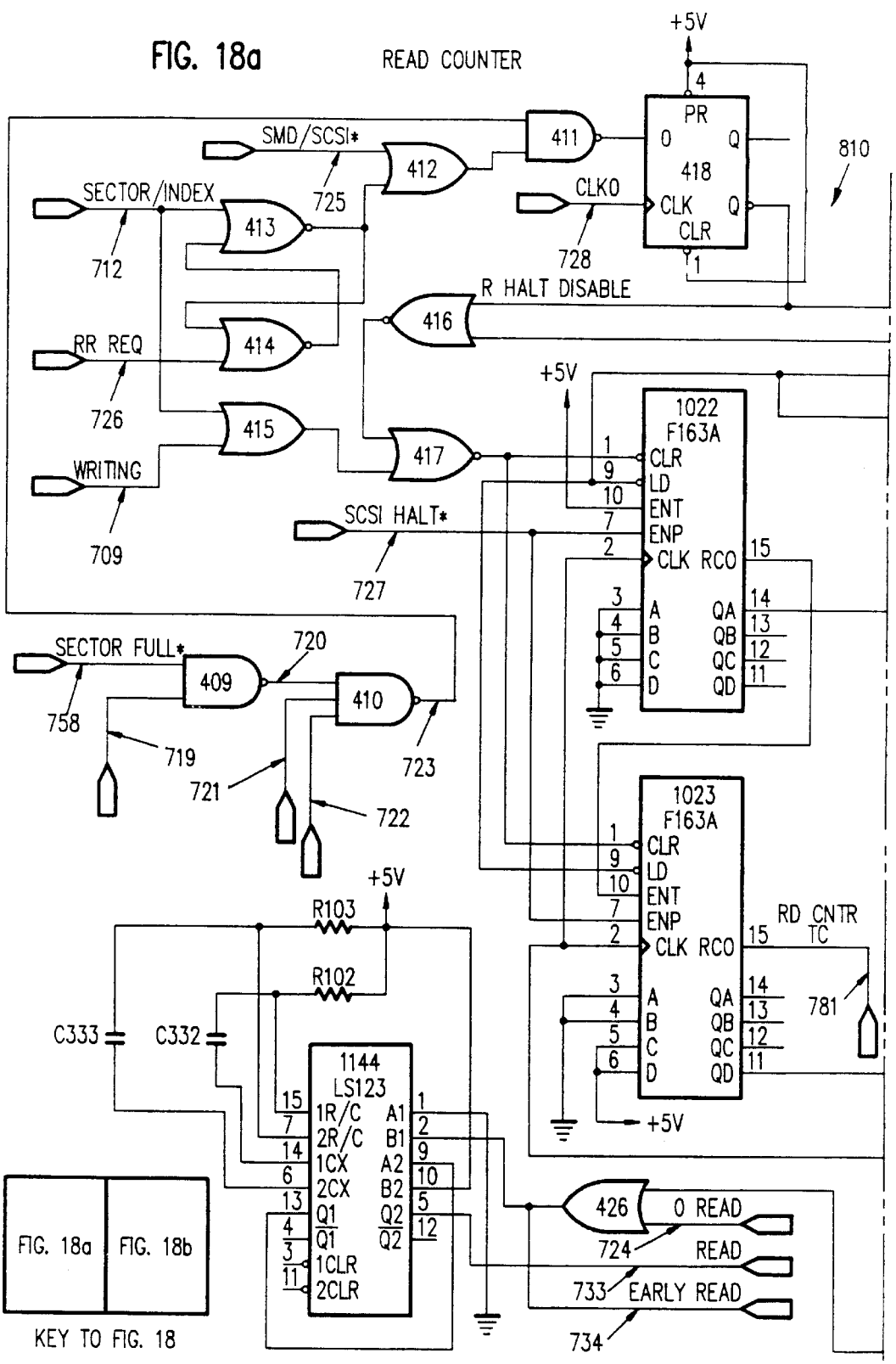

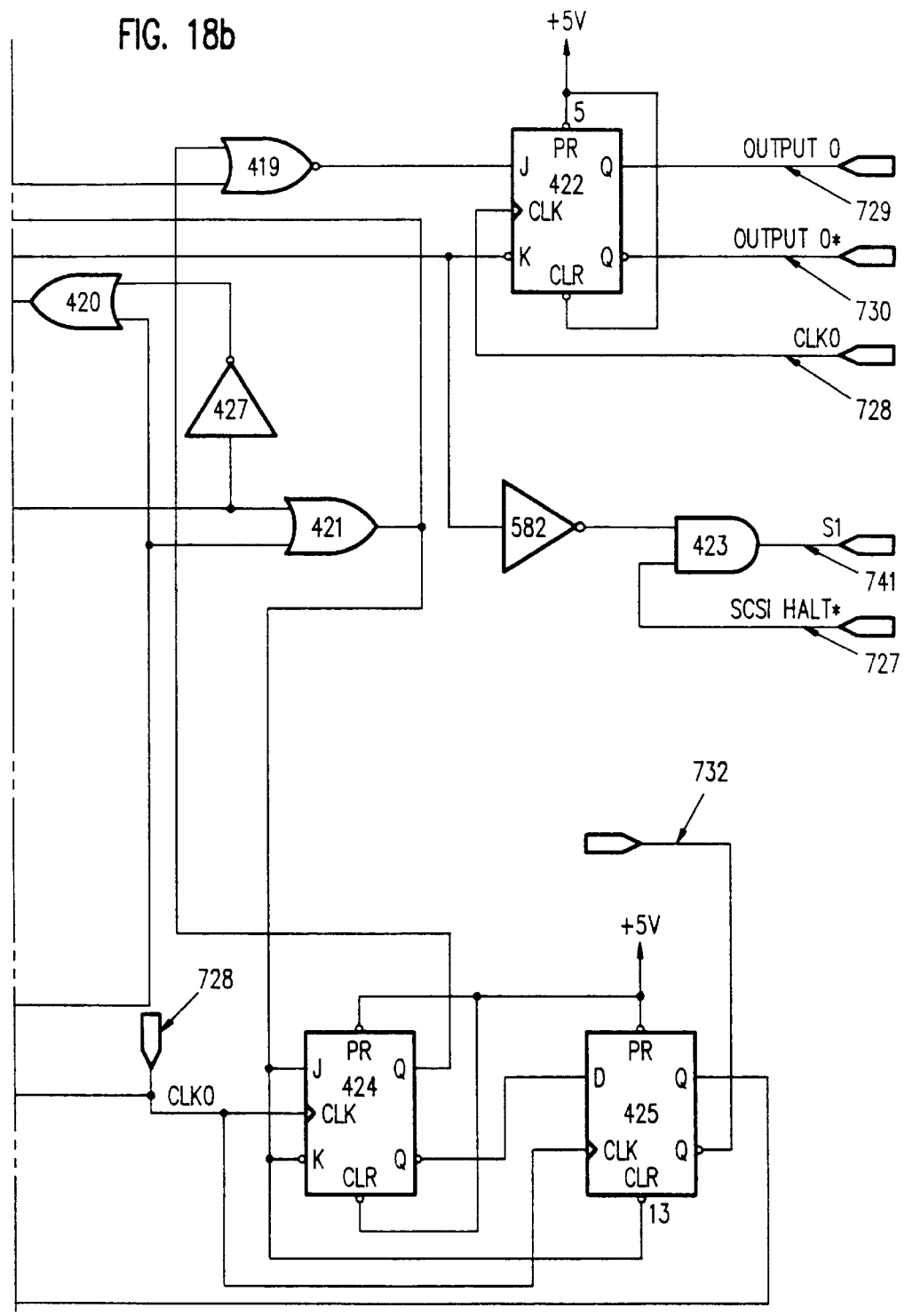
FIG. 18b  READ COUNTER

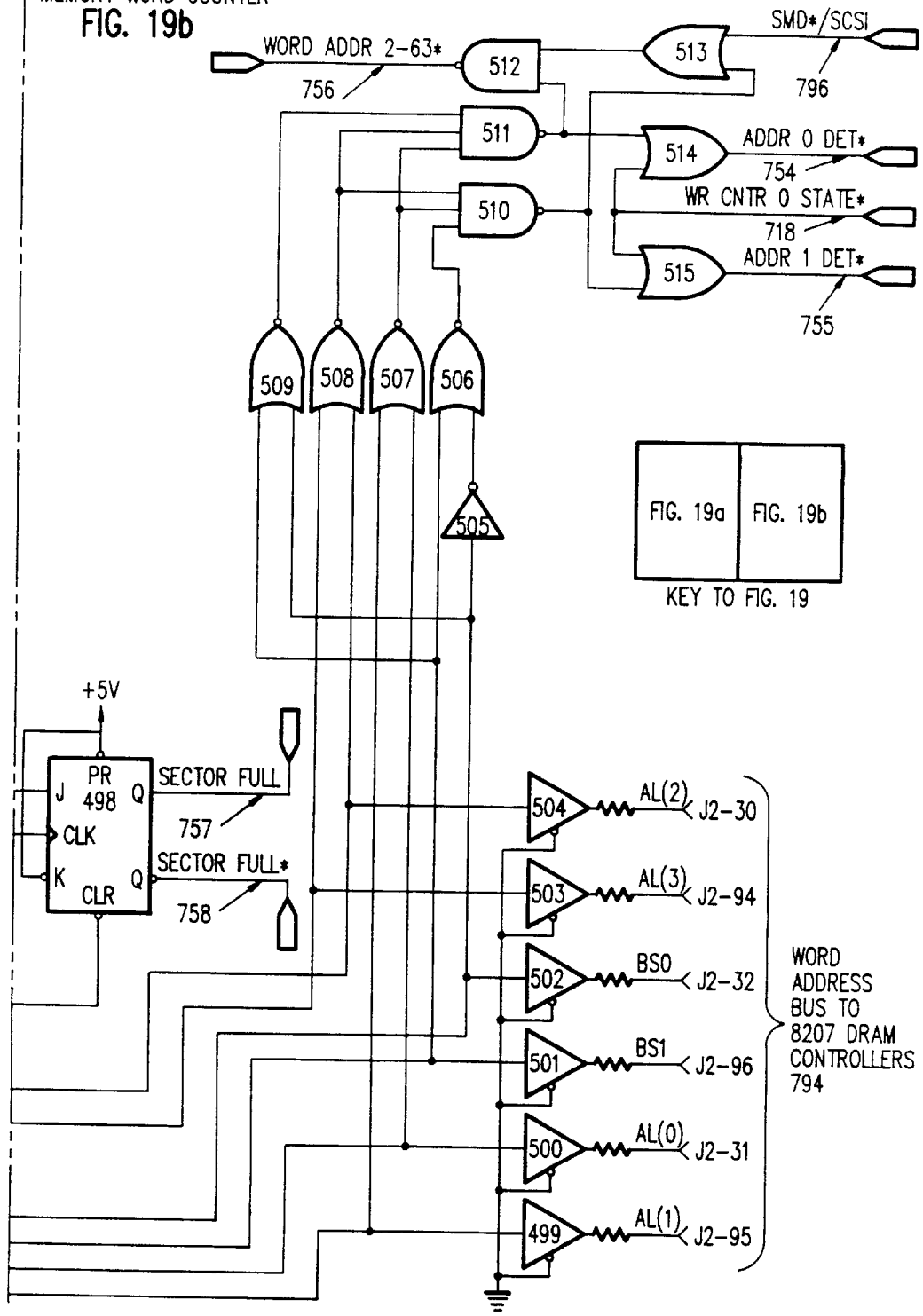

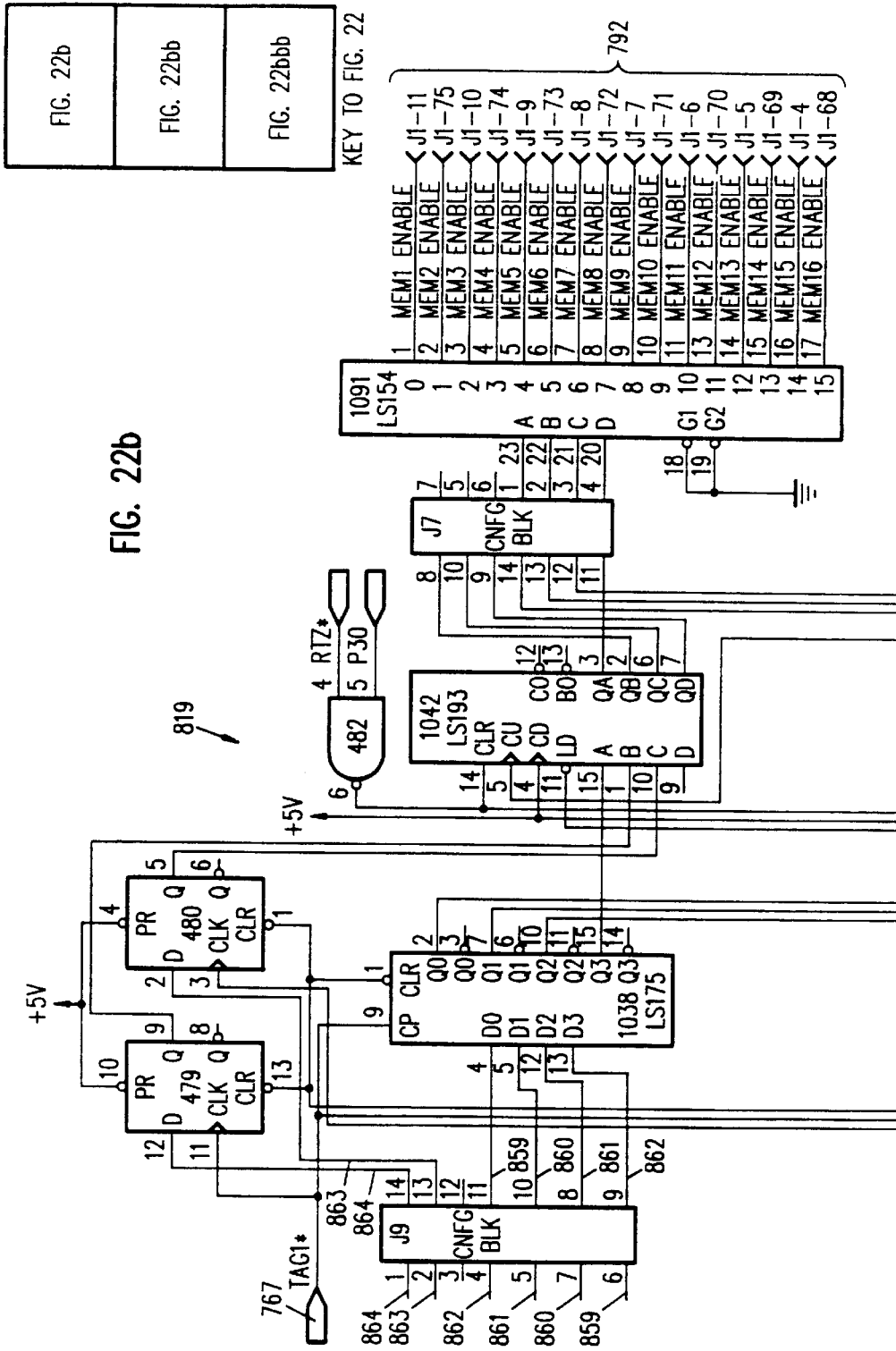

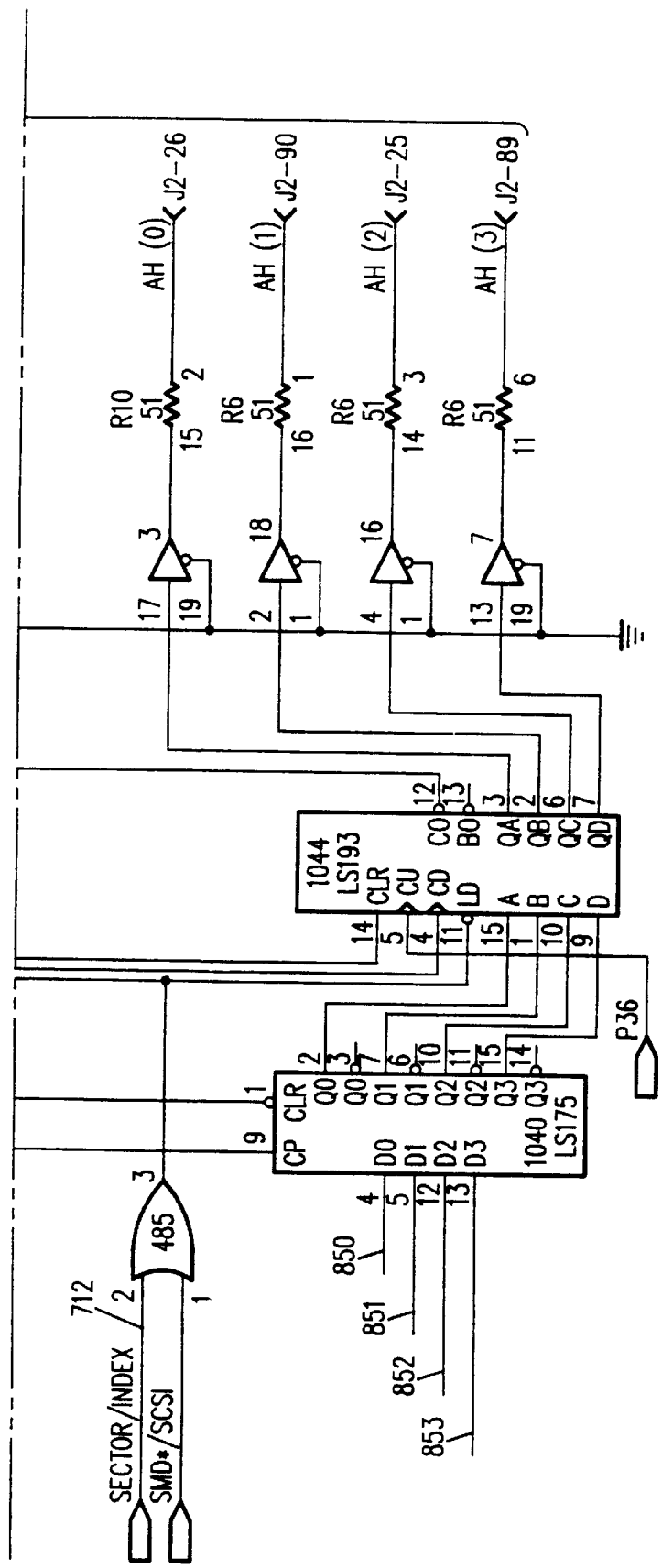
FIG. 22bbb

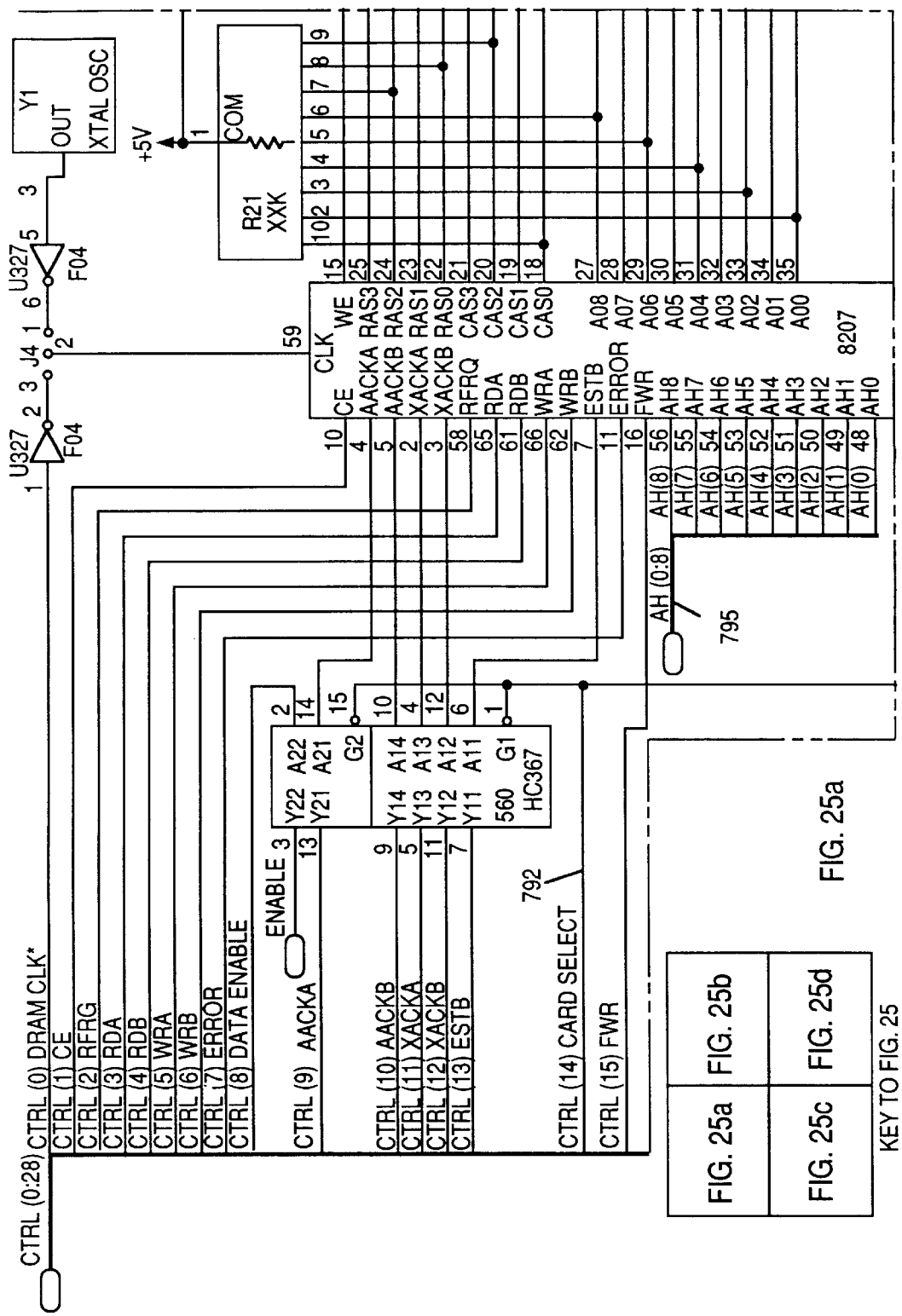

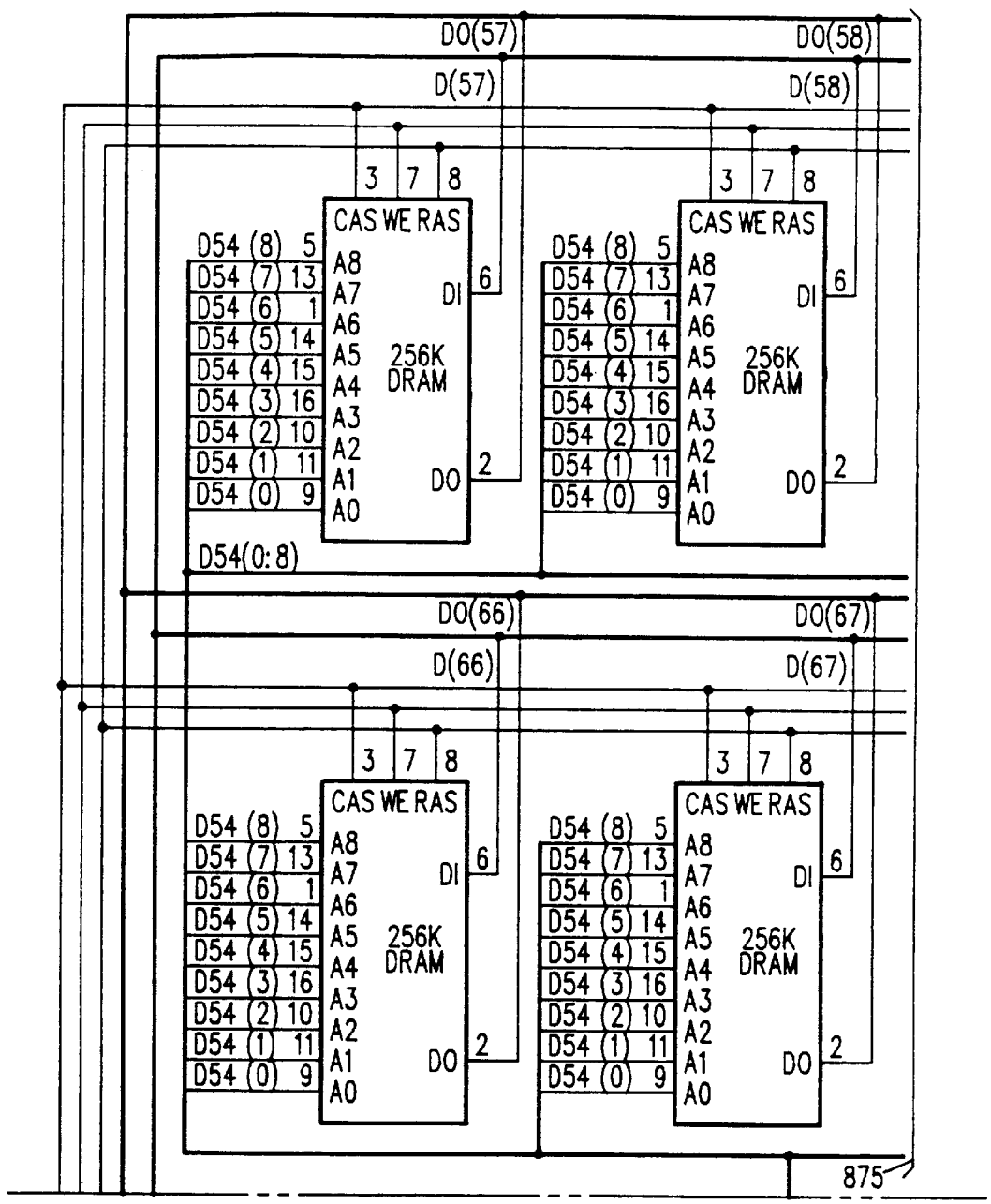
FIG. 28a
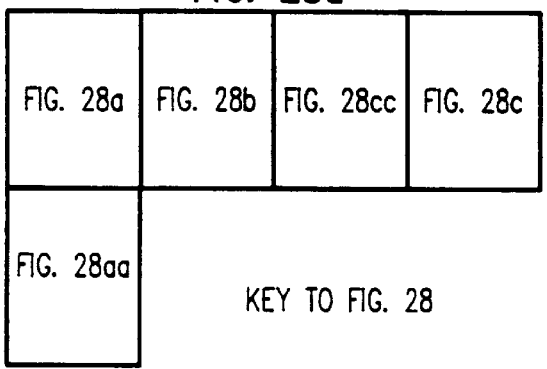
KEY TO FIG. 28

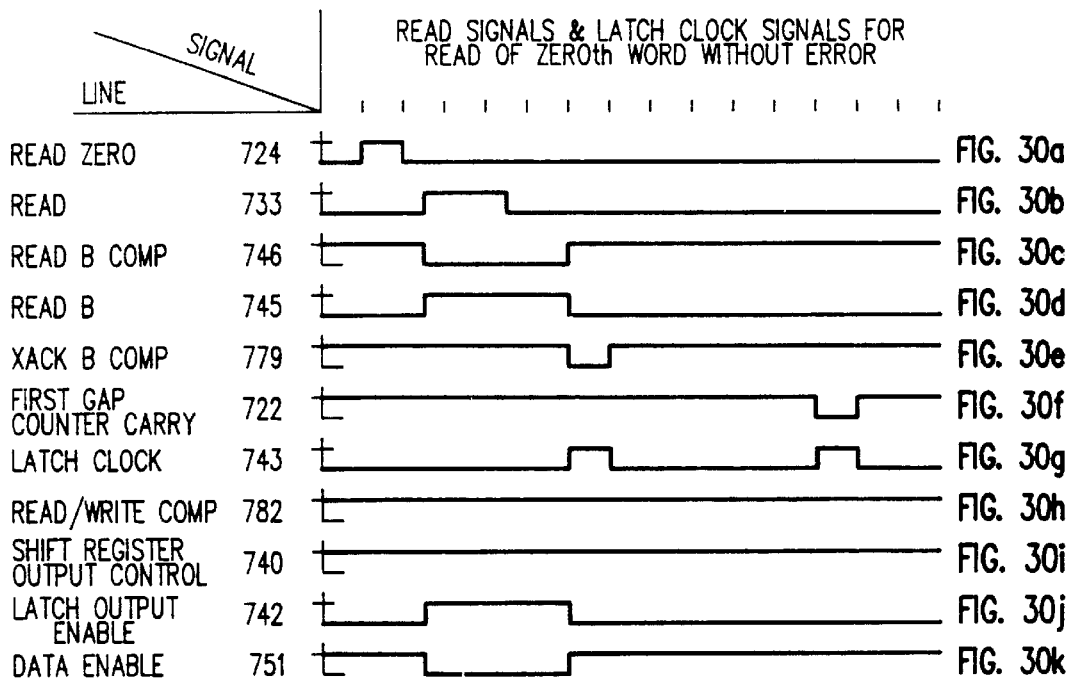
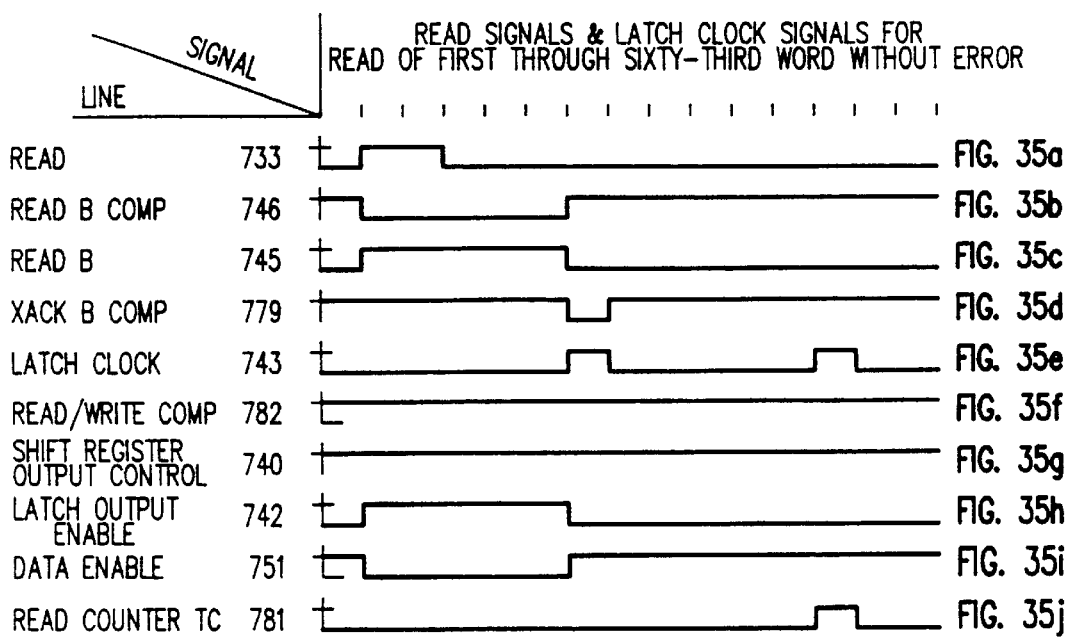

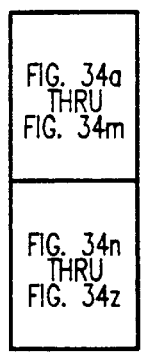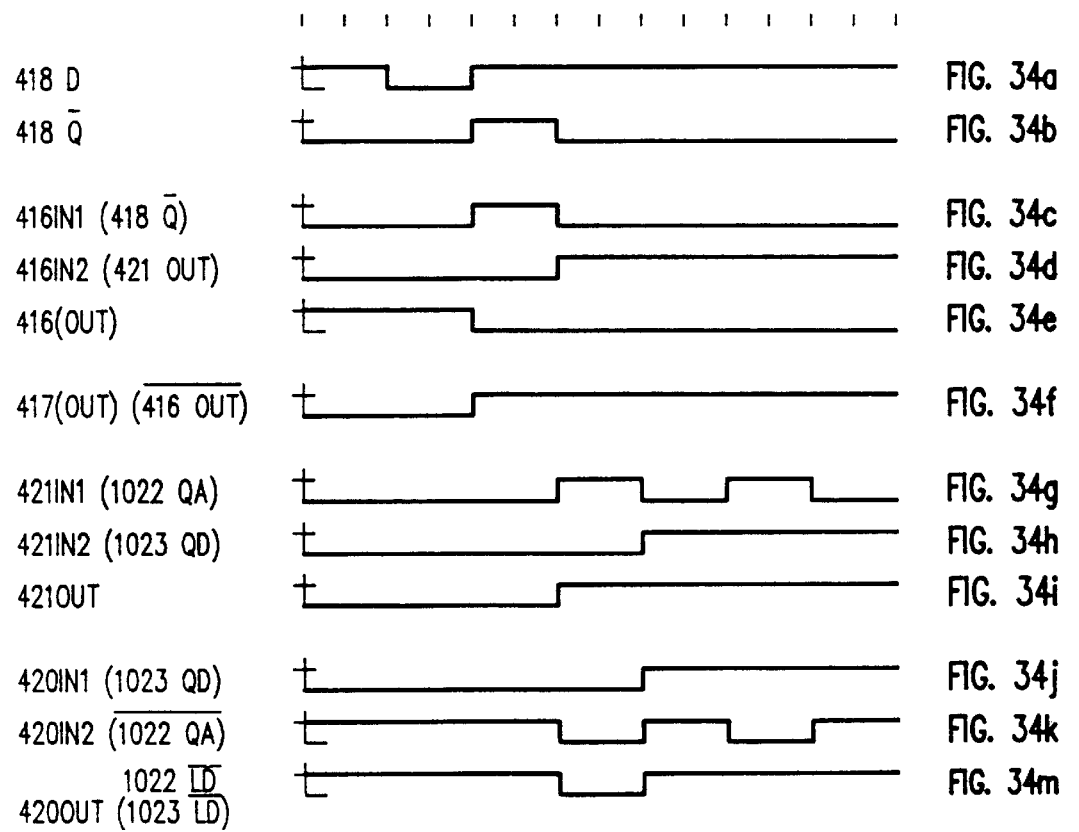

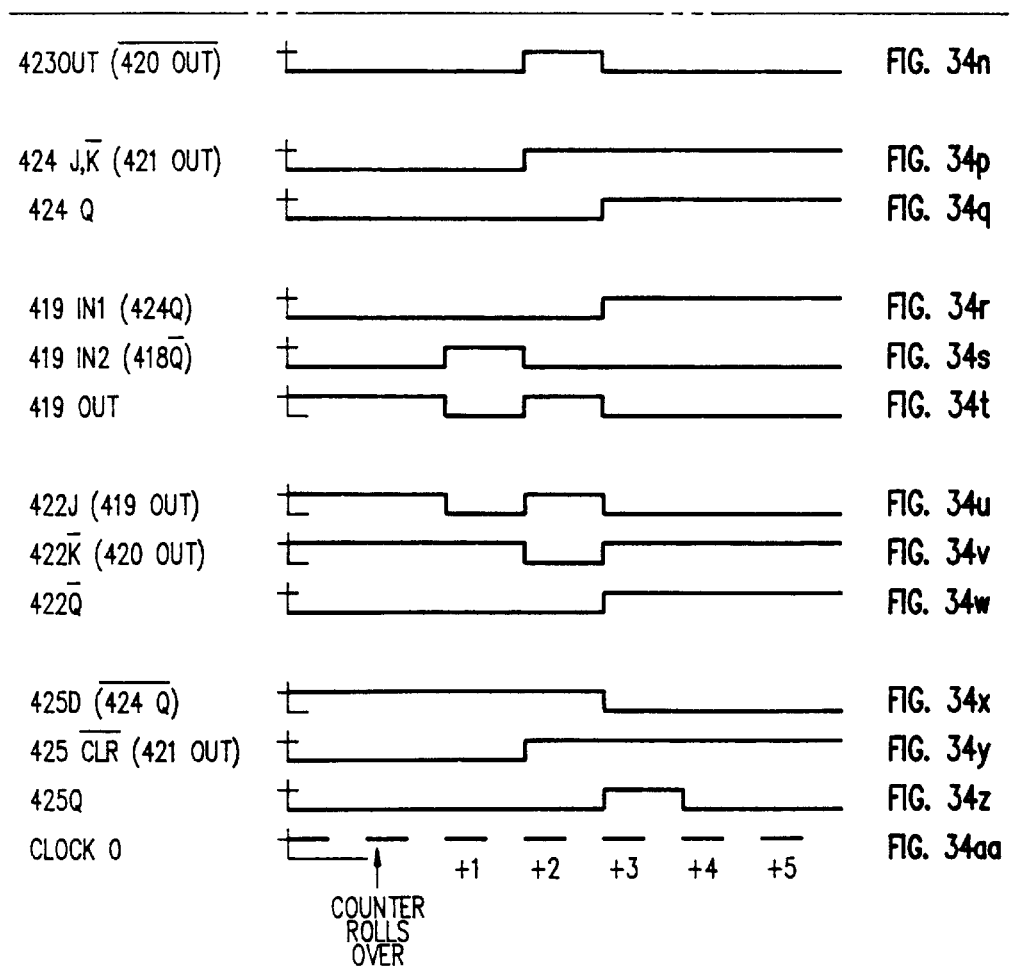

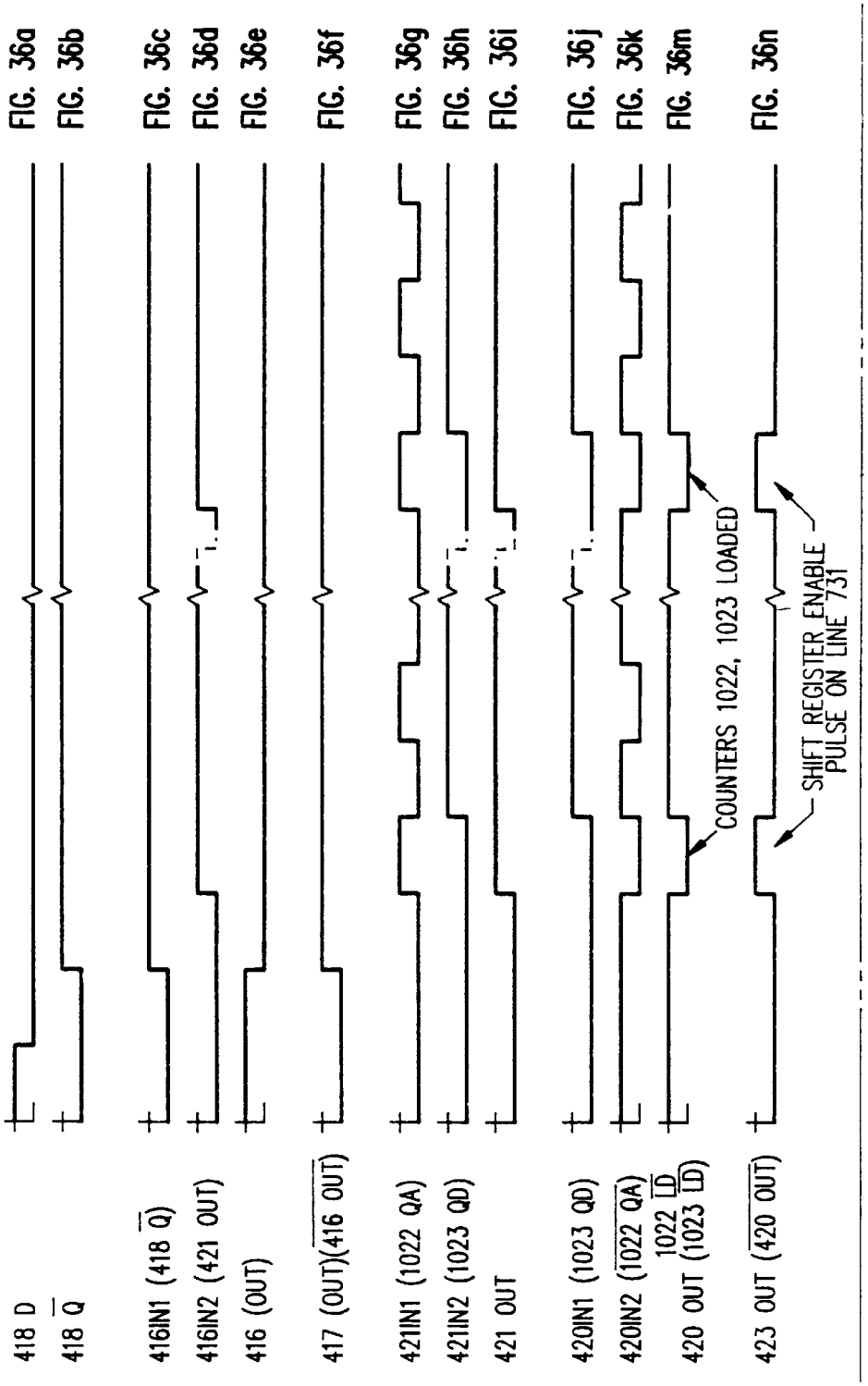

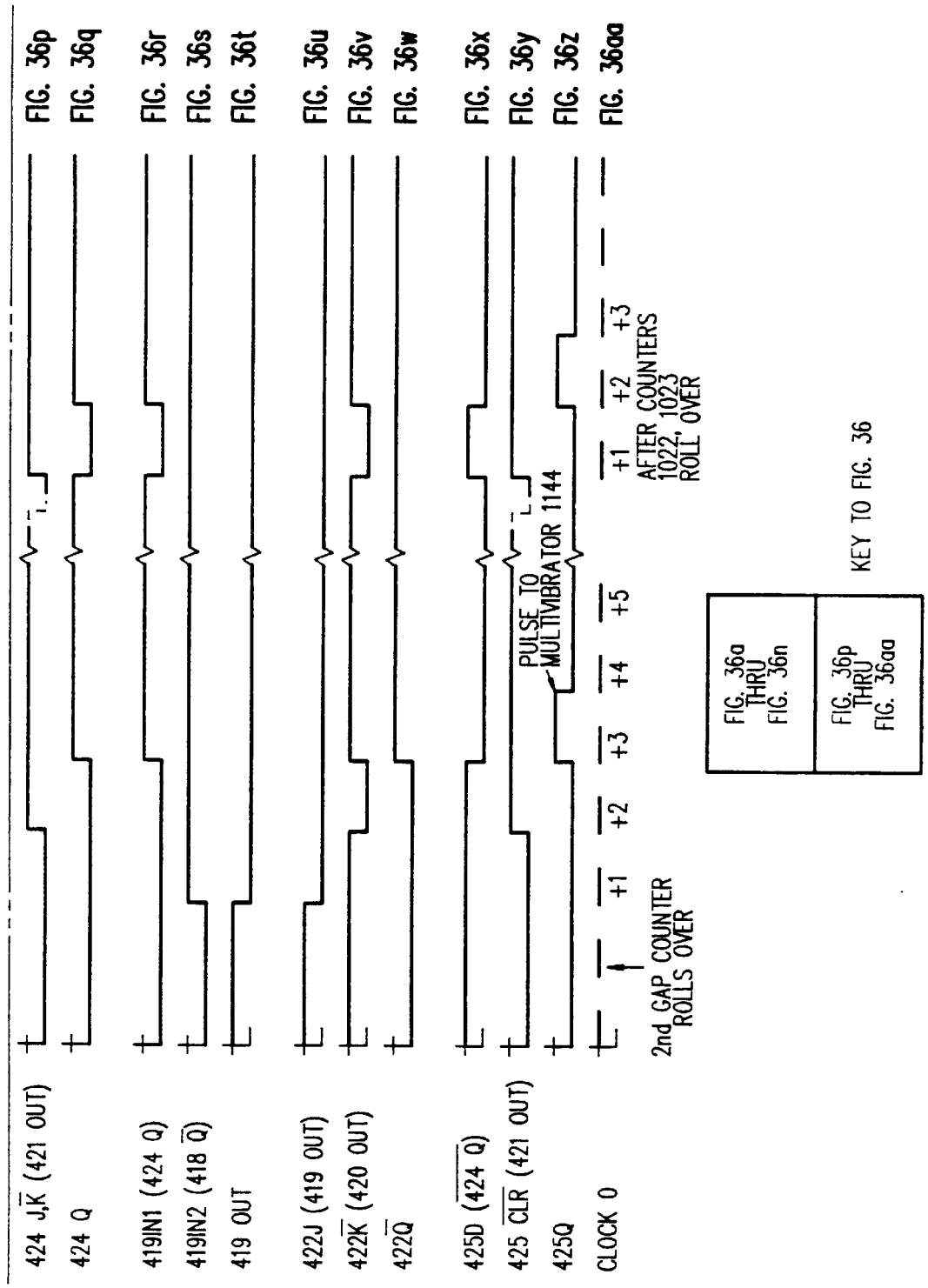

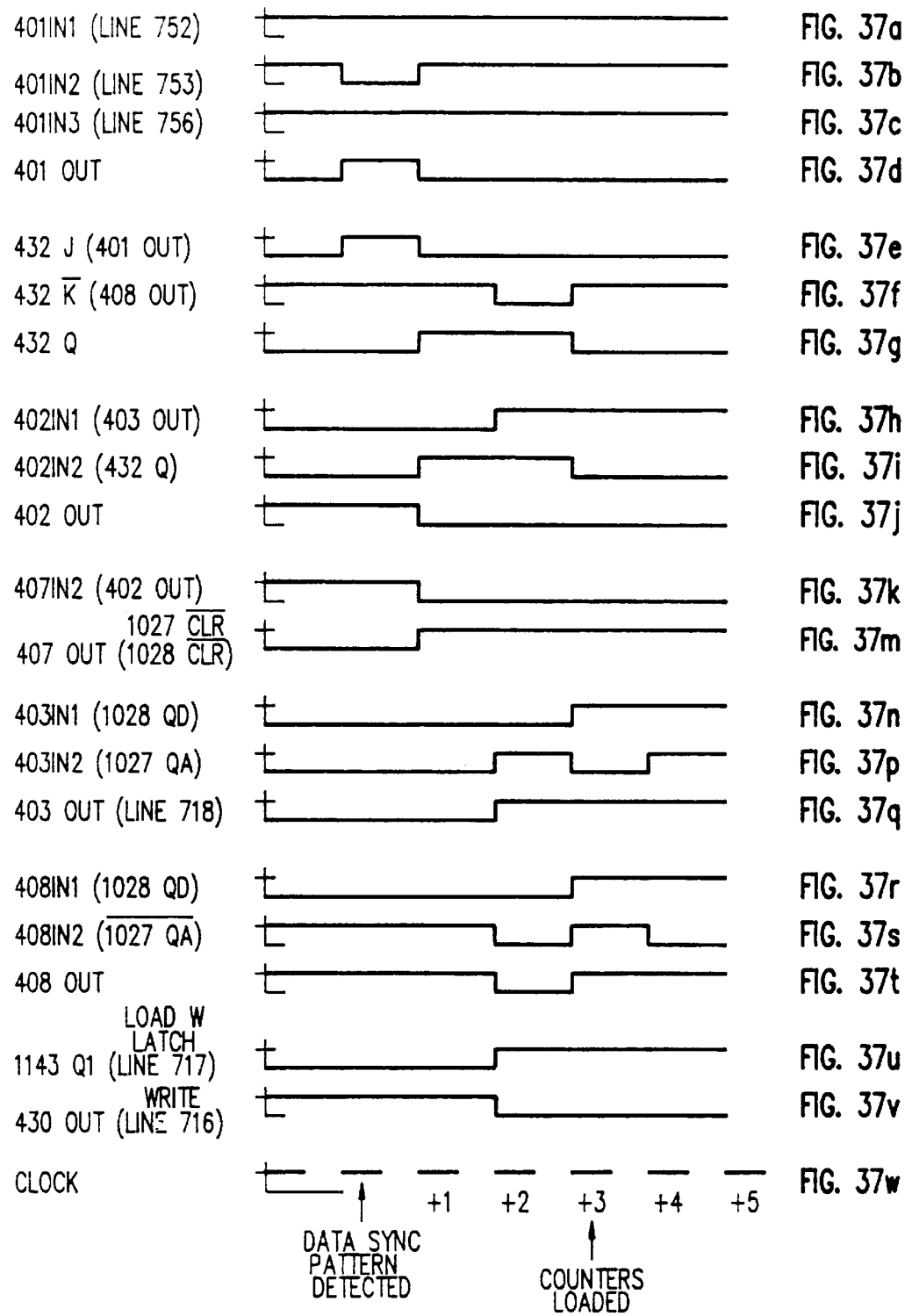

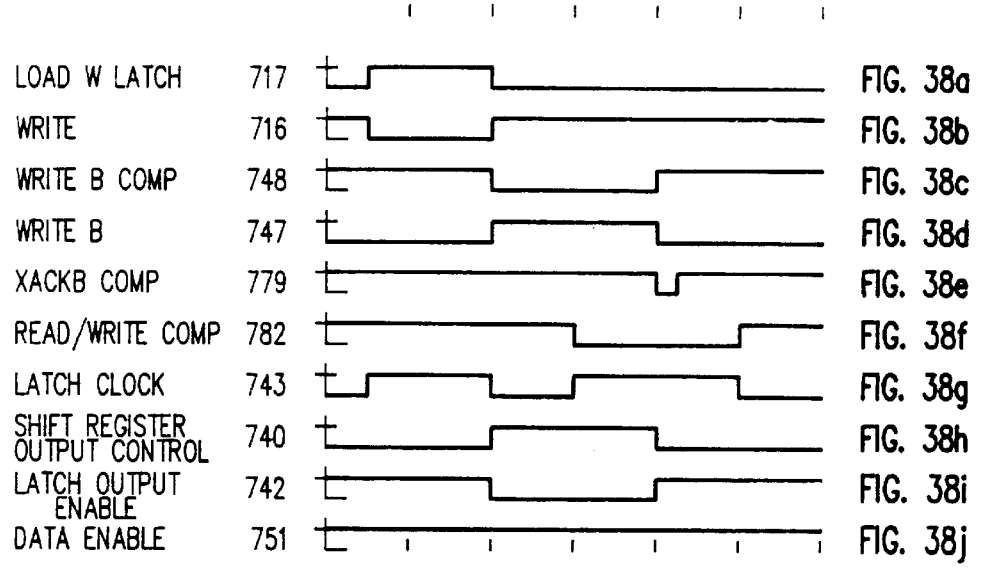
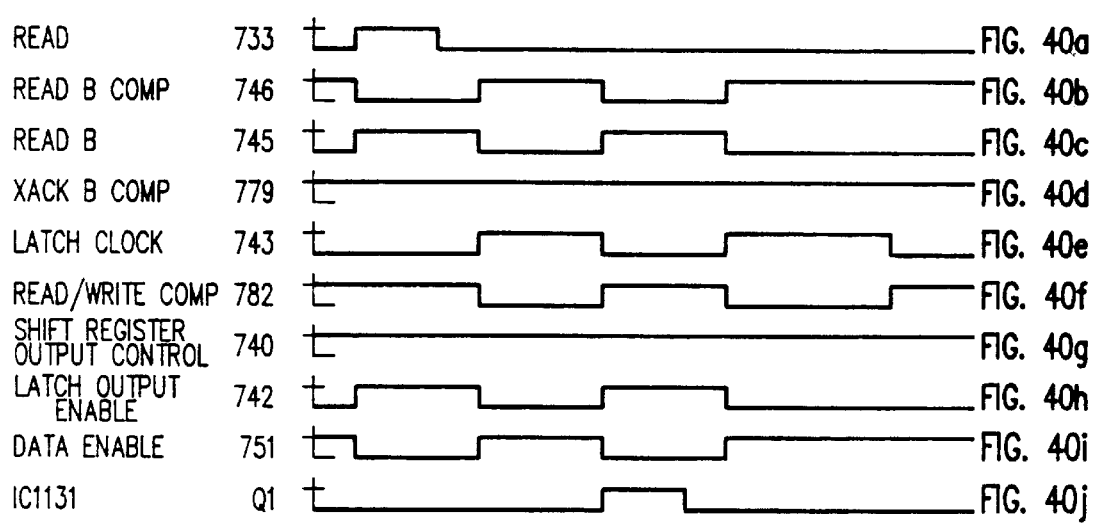

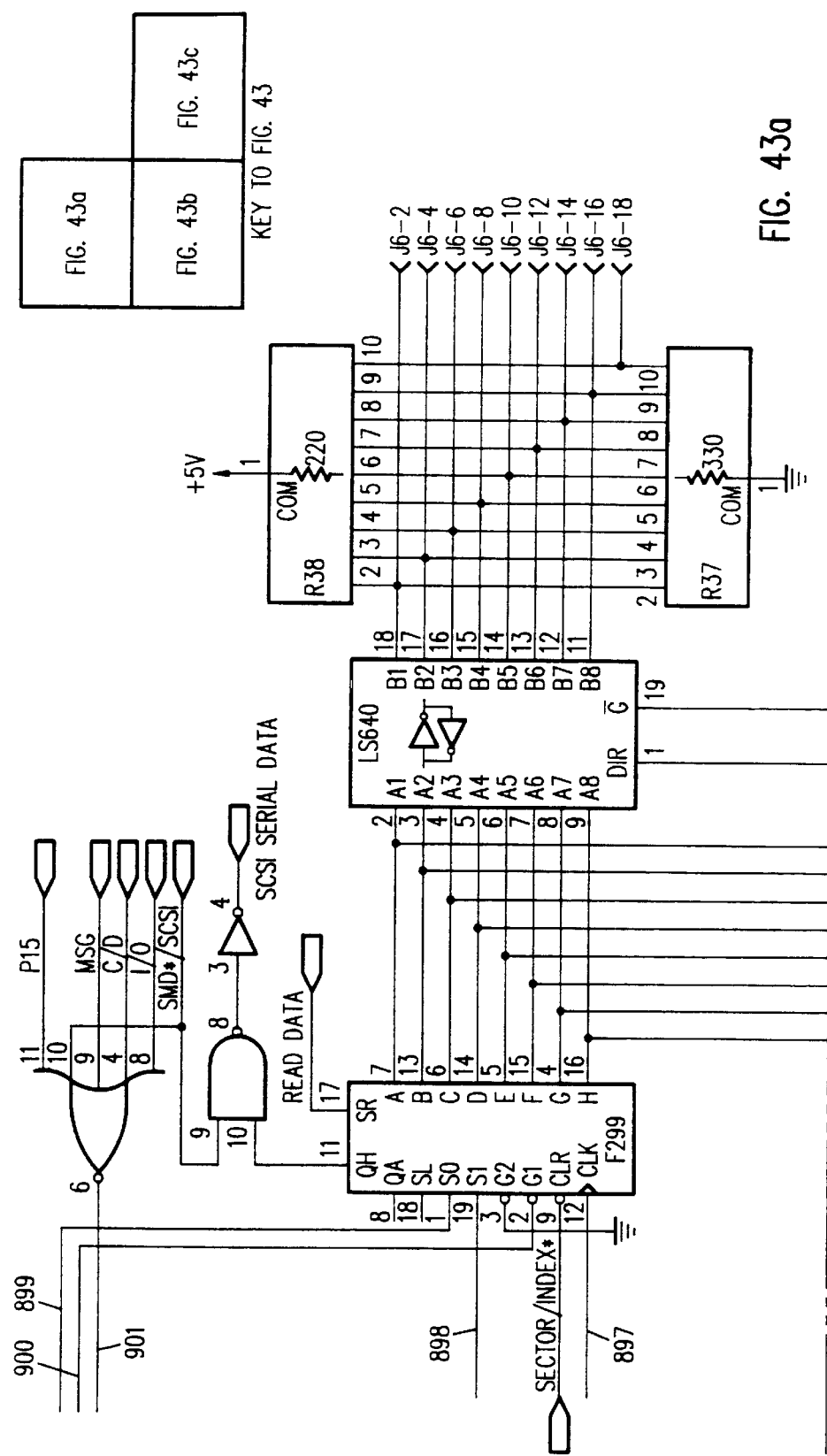

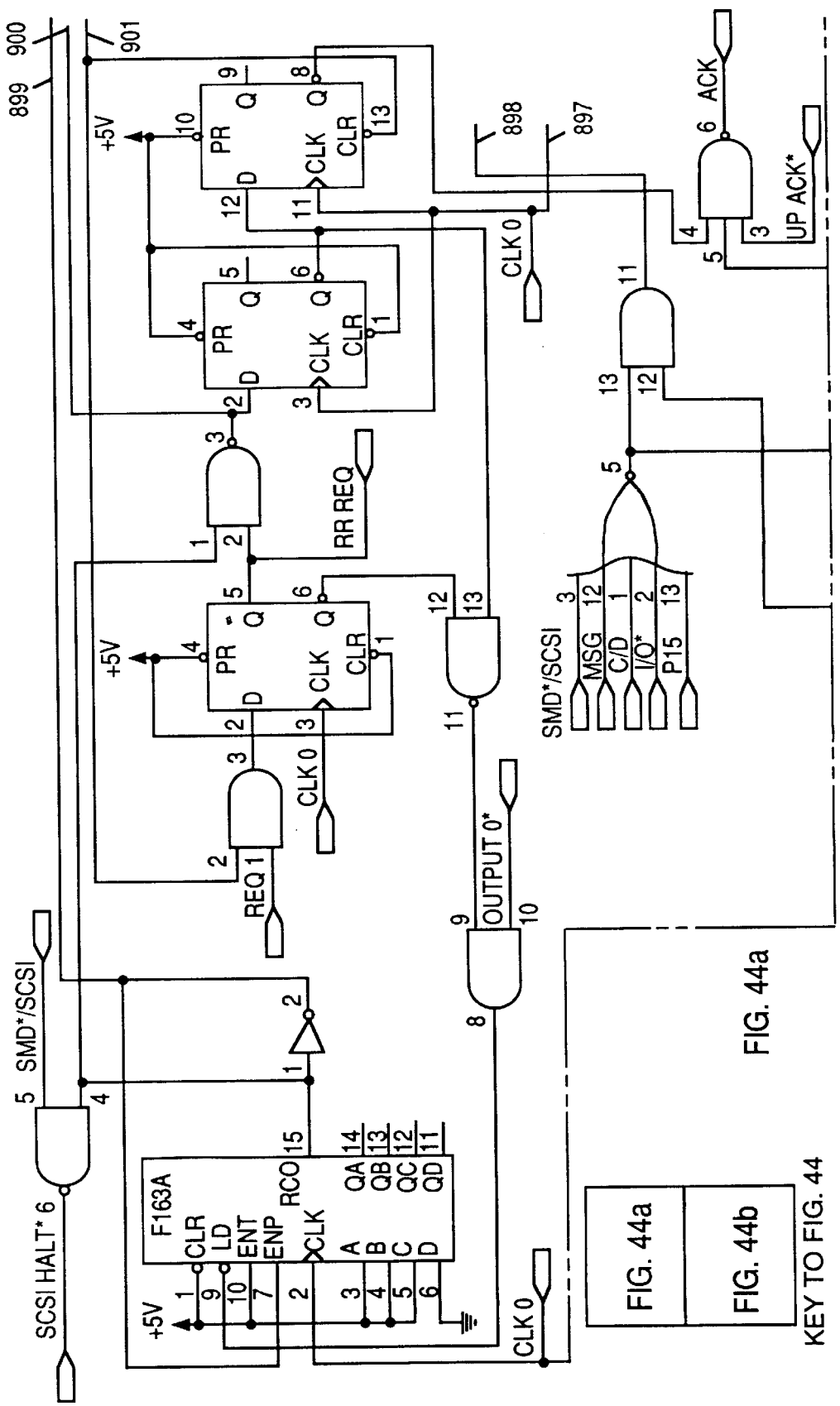

```
5    REM DECIMAL TO BINARY CONVERSION ROUTINE
7    S=HA
10   T=CA
20   IF T<2048 THEN PA=0:GOTO 50
30   PA=1
40   T=T-2048
50   IF T<1024 THEN PB=0:GOTO 80
60   PB=1
70   T=T-1024
80   IF T<512 THEN PC=0:GOTO 110
90   PC=1
100  T=T-512
110  IF T<256 THEN PD=0:GOTO 140
120  PD=1
130  T=T-256
140  IF T<128 THEN PE=0:GOTO 170
150  PE=1
160  T=T-128
170  IF T<64 THEN PF=0:GOTO 200
180  PF=1
190  T=T-64
200  IF T<32 THEN PG=0:GOTO 230
210  PG=1
220  T=T-32
230  IF T<16 THEN PH=0:GOTO 260
240  PH=1
250  T=T-16
260  IF T<8 THEN PI=0:GOTO 290
270  PI=1
280  T=T-8
290  IF T<4 THEN PJ=0:GOTO 320
300  PJ=1
```

FIG. 47a

```
310  T=T-4
320  IF T<2 THEN PK=0:GOTO 340
330  PK=1
331  T=T-2
340  IF T<1 THEN PL=0:GOTO 350
345  PL=1
350  IF S<16 THEN PM=0:GOTO 380
360  PM=1
370  S=S-16
380  IF S<8 THEN PN=0:GOTO 410
390  PN=1
400  S=S-8
410  IF S<4 THEN PO=0:GOTO 440
420  PO=1
430  S=S-4
440  IF S<2 THEN PP=0:GOTO 470
450  PP=1
460  S=S-2
470  IF S<1 THEN PQ=0:GOTO 500
480  PQ=1
```

```
500  U=R
510  DA=0
540  IF U<16384 THEN DB=0:GOTO 555
545  DB=1
550  U=U-16384
555  IF U<8192 THEN DC=0:GOTO 570
560  DC=1
565  U=U-8192
570  IF U<4096 THEN DD=0:GOTO 585
575  DD=1
580  U=U-4096
585  IF U<2048 THEN DF=0:GOTO 600
590  DE=1
595  U=U-2048
600  IF U<1024 THEN DF=0:GOTO 615
605  DF=1
610  U=U-1024
615  IF U<512 THEN DG=0:GOTO 630
620  DG=1
625  U=U-512
630  IF U<256 THEN DH=0:GOTO 645
635  DH=1
640  U=U-256
645  IF U<128 THEN DI=0:GOTO 660
650  DI=1
655  U=U-128
660  IF U<64 THEN DJ=0:GOTO 675
665  DJ=1
670  U=U-64

675  IF U<32 THEN DK=0:GOTO 690
680  DK=1
685  U=U-32
690  IF U<16 THEN DL=0:GOTO 705
695  DL=1
700  U=U-16
705  IF U<8 THEN DM=0:GOTO 720
710  DM=1
715  U=U-8
720  IF U<4 THEN DN=0:GOTO 735
725  DN=1
730  U=U-4
735  IF U<2 THEN DO=0:GOTO 750
740  DO=1
745  U=U-2
750  IF U<1 THEN DP=0:GOTO 950
755  DP=1
950  PRINT "ADDRESS" "PA;PB;PC;PD;
     PE;PF;PG;PH;PI;PJ;PK;PL;PM;PN;
     PO;PP;PQ
955  PRINT "CONTENTS" "DA;DB;DC;DD;
     DE;DF;DG;DH;" "DI;DJ;DK;DL;DM;
     DN;DO;DP
956  PRINT ""
960  RETURN
```

FIG. 47b

```
1800  REM MAIN PROGRAM LOOP ; ENTRY POINT 1900
1900  C=822 :REM NUMBER OF CYLINDERS
1950  H=5   :REM NUMBER OF HEADS
1960  R=0
2000  FOR CA=0 TO C-1
2010  FOR HA=0 TO H-1
2020  GOSUB 7
2030  R=R+1
2040  NEXT HA
2050  NEXT CA
2060  END
```

FIG. 47c

|  | 1301 | |
|---|---|---|
| 1300 { ADDRESS | 0 0 0 0 0 0 0 0 | 0 0 0 0 0 0 0 1 |
| CONTENTS | 0 0 0 0 0 0 0 0 | 0 0 0 0 0 0 0 1 |
|  | 1302 | 1303 |
| ADDRESS | 0 0 0 0 0 0 0 0 | 0 0 0 0 0 0 1 0 |
| CONTENTS | 0 0 0 0 0 0 0 0 | 0 0 0 0 0 0 1 0 |
| ADDRESS | 0 0 0 0 0 0 0 0 | 0 0 0 0 0 0 1 1 |
| CONTENTS | 0 0 0 0 0 0 0 0 | 0 0 0 0 0 0 1 1 |
| ADDRESS | 0 0 0 0 0 0 0 0 | 0 0 0 0 0 1 0 0 |
| CONTENTS | 0 0 0 0 0 0 0 0 | 0 0 0 0 0 1 0 0 |
| ADDRESS | 0 0 0 0 0 0 0 0 | 0 0 0 0 1 0 0 0 |
| CONTENTS | 0 0 0 0 0 0 0 0 | 0 0 0 0 0 1 0 1 |
| ADDRESS | 0 0 0 0 0 0 0 0 | 0 0 1 0 0 0 0 1 |
| CONTENTS | 0 0 0 0 0 0 0 0 | 0 0 0 0 0 1 1 0 |
| ADDRESS | 0 0 0 0 0 0 0 0 | 0 0 1 0 0 0 1 0 |
| CONTENTS | 0 0 0 0 0 0 0 0 | 0 0 0 0 0 1 1 1 |
| ADDRESS | 0 0 0 0 0 0 0 0 | 0 0 1 0 0 0 1 1 |
| CONTENTS | 0 0 0 0 0 0 0 0 | 0 0 0 0 1 0 0 0 |
| ADDRESS | 0 0 0 0 0 0 0 0 | 0 0 1 0 0 1 0 0 |
| CONTENTS | 0 0 0 0 0 0 0 0 | 0 0 0 0 1 0 0 1 |
| ADDRESS | 0 0 0 0 0 0 0 0 | 0 1 0 0 0 0 0 0 |
| CONTENTS | 0 0 0 0 0 0 0 0 | 0 0 0 0 1 0 1 0 |
| ADDRESS | 0 0 0 0 0 0 0 0 | 0 1 0 0 0 0 0 1 |
| CONTENTS | 0 0 0 0 0 0 0 0 | 0 0 0 1 0 1 1 |
| ADDRESS | 0 0 0 0 0 0 0 0 | 0 1 0 0 0 0 1 0 |
| CONTENTS | 0 0 0 0 0 0 0 0 | 0 0 0 0 1 1 0 0 |
| ADDRESS | 0 0 0 0 0 0 0 0 | 0 1 0 0 0 0 1 1 |
| CONTENTS | 0 0 0 0 0 0 0 0 | 0 0 0 0 1 1 0 1 |
| ADDRESS | 0 0 0 0 0 0 0 0 | 0 1 0 0 0 1 0 0 |
| CONTENTS | 0 0 0 0 0 0 0 0 | 0 0 0 0 1 1 1 0 |
| ADDRESS | 0 0 0 0 0 0 0 0 | 0 1 1 0 0 0 0 0 |
| CONTENTS | 0 0 0 0 0 0 0 0 | 0 0 0 0 1 1 1 1 |
| ADDRESS | 0 0 0 0 0 0 0 0 | 0 1 1 0 0 0 0 1 |
| CONTENTS | 0 0 0 0 0 0 0 0 | 0 0 0 1 0 0 0 0 |

FIG. 48

DISK STORAGE SUBSYSTEM WITH INTERNAL PARALLEL DATA PATH AND NON-VOLATILE MEMORY

RELATED APPLICATIONS

This application is a continuation of U.S. patent application Ser. No. 08/482,924, filed Jun. 7, 1995, now U.S. Pat. No. 6,347,389, which is a continuation of Ser. No. 07/985,731, filed Dec. 1, 1992, abandoned, which is a divisional of Ser. No. 07/753,269, filed Aug. 30, 1991 now U.S. Pat. No. 5,218,691, which is a divisional of Ser. No. 07/224,530, filed Jul. 26, 1988, now U.S. Pat. No. 5,070,474.

CROSS REFERENCE TO MICROFICHE APPENDIX

Appendix A, which is part of the present disclosure, is a microfiche appendix consisting of three sheets of microfiche with a total of 105 frames. Microfiche Appendix A is a listing of a computer program which is described more completely below.

BACKGROUND OF THE INVENTION

1. Field of the Invention

This invention relates generally to a digital computer subsystem for storing data, and more specifically, to a dynamic random-access memory unit which functions as a hard disk storage unit without the latency limitations of a normal hard disk.

2. Description of the Prior Art

All computers regardless of size are comprised of the same basic subsystems, a central processing unit, a means for displaying information, a means for entering information, and a means for storing data. Several means for storing data currently exist including floppy disk drives, tape drives, and hard or fixed disk drives. Floppy disk drives have a limited storage capacity usually one megabyte or less. Tape drives are useful for archiving and backing up data, but tape drives are not appropriate for random access applications. The device most commonly used for storage of large amounts of data is the hard disk drive. The total memory capacity of a hard disk drive can range from 5–1000 megabytes.

The hard disk drive has a rotating magnetic media, a disk, that can be magnetized in a certain pattern and a read/write head which flys above the surface of the disk. During a write operation, the head creates data patterns on the magnetic coating of the rotating disk which represent the data, while in read mode the head reads these data patterns. In most high capacity hard disk drives, several disks are mounted above one another on a common spindle. Each of the disks has at least one head/write head per surface, and commonly several read/write heads may be utilized on each surface. Data is stored in tracks which are concentric circles on the disk surface. When a plurality of disks are used on a common spindle, the tracks on the disks are written at the same relative radial position on each disk, that is track one on one disk is directly above (or below) track one on the adjacent disk. The track locations may also be looked as cylinder locations since the location of track one on the stack of disks forms what is referred to as a cylinder which extends perpendicularly to the disk surfaces.

The data stored on the hard disk is generally divided into files. Each file represents a unit of data which is processed by the digital computer. The files are stored on the rotating disk in sectors. The number of sectors which are written in one revolution of the rotating disk comprise a track. While the number of sectors per track is a function of the disk drive and the disk controller, thirty-two sectors per track are common. Since a magnetic servo can position the read/write heads over the entire surface of the disk, the disk surface contains a multiplicity of concentric data tracks. A typical disk has a track density of 1000 concentric tracks over a one inch radius.

The central processing unit, the central processor, of a digital computer must be able to read and write data on the hard disk upon command. The data must be written on the disk so that it can be found when the central processor wants to the read the same data. Controlling a disk drive is a very involved operation and if the central processor were totally involved in disk drive control, the central processor would not have adequate time for other operations such as mathematical computations or data processing. Therefore, the central processor interfaces with the hard disk drive through a disk controller. The central processor issues a request for a file to the disk controller and then goes on to other tasks. The disk controller issues commands to the disk drive, locates the sectors comprising the file on the disk, retrieves the file, and cues the central processor that the file is ready for use.

The disk controller acting as an interface between the central processor and the hard disk drive introduces another problem. Each computer has its own protocol, that is, each computer has a unique bus structure for interfacing the central processor with peripheral devices such as a hard disk drive. To interface a hard disk drive with each of the various buses for the central processing units of different computers would be a very cumbersome task. Accordingly, standard disk protocols have been developed for hard disk drives. Thus, each central processor has its own convention for communication, but the disk controller translates this convention into a standard disk protocol.

Control Data Corporation originated one of the most widely used disk interface specifications, the Storage Module Device (SMD) interface. The SMD interface uses bit serial digital data transfer, a parallel control bus, differential signals, and incorporates error recovery facilities. The SMD interface is widely applied and virtually all the major disk manufacturers build products that comply with the SMD interface. Therefore, means are available for interfacing a hard disk drive with the central processing unit of the digital computer, but hard disk drives are still plagued with two very serious problems, seek time and latency.

Access time is defined as the time span between when the central processor requests information and that information is made available by the disk controller. The major factor in the access time is the large amount of time, the seek time, required to position a head over the desired track of the hard disk. A seek time of 100 milliseconds is not uncommon for hard disk drives. The magnetic servo can only position the head near the desired track. Each sector in a track contains information about the head position, the track, and the sector number within the track. The controller reads this information and-through successive approximation between the current position of the read head and the desired position of the read head, the desired track is found.

The 100 millisecond delay time is a significant delay for modern high speed computers, but several factors can make the delay time even greater. After the track requested by the central processor is located, another delay, rotational latency, may be imposed. A typical hard disk makes one complete revolution every 16 milliseconds. If the head is positioned on a track just as the desired sector has gone past, the controller must wait another 16 milliseconds before the desired sector can be read.

A large file may include hundreds of sectors each filled with data. The disk controller can handle only several sectors at a time. Thus, the access time delay is imposed over and over again. Also if a large file is being used simultaneously by many different users of the digital computer, the disk controller is flooded with requests for sectors located throughout the disk.

While these problems are widely recognized, the high speed rotation of the disk, the ability to precisely position the read/write heads, and the geometry of the disk severely limit the choices in addressing these problems. The options available for improving access time include increasing the rotation speed of the disk, increasing the storage density of the disk, or enhancing the storage efficiency on the disk.

To better understand the limitations of the current hard disk drives, consider the information written in each sector on the hard disk by the SMD disk controller. As shown in FIG. 1a, each sector 10 is comprised of several fields in addition to the data field. The first information at the beginning of each sector is the head scatter field 11. This field 11, typically sixteen bytes long, is provided to compensate for the inability of a normal hard disk drive to go instantaneously from reading to writing. Immediately after the head scatter field 11 is the PLO sync field 12 which is typically ten bytes in length. The PLO sync 12 is a sync signal that permits the controller to compensate for variations in the disk speed from disk to disk or from time to time. Next is the address field 13 of the sector 10 which comprises eight bytes and is further broken down as shown in FIG. 1b.

The address field 13 is a unique field for each sector on the disk. It provides information on the sync pattern 13a, flag status and logical unit 13b, the upper cylinder 13c, lower cylinder 13d and the head and sector 13e plus two cyclic redundancy checking (CRC) code bytes 13f, 13g. Following the address field 13 is a write splice field 14 which is typically one byte. This is followed by another PLO sync field 15 of ten bytes and a sync pattern field 16 of one byte.

After fields 11–16 is the data field 17 in which the central processing unit may store data on the disk or read data from the disk. The data field 17 is followed by a two byte CRC field 18 and then the one byte end of record pad field 19, followed by an eight byte end of sector field 20.

On a typical hard disk, only 81% of the storage capacity is actually used for data storage. The remaining storage capacity is used to store the additional fields for each sector as shown in FIG. 1. Typically, only the 8 byte address field and the data field are unique to the sector. The data in the other fields is similar for each of the sectors in a track.

In locating a desired sector, the disk controller issues a seek command. A conventional hard disk drive then issues a pair of signals, a sector pulse and an index pulse. The sector pulse is issued to the controller at the beginning of each sector and the index pulse is issued once per revolution of the disk. The SMD disk controller issues a read gate signal immediately after receiving the sector pulse. The hard disk drive upon receipt of the seek command positions the read/write heads. Upon receipt of the read gate signal, the disk drive reads the head scatter, PLO sync, and the address fields of the sector over which the read head is currently positioned and sends the information to the SMD disk controller. The SMD disk controller always deasserts the read gate at the write splice field of the sector. Next, the controller initiates one of three actions;

1. If this is the sector to read, read gate is reasserted.
2. If this is the sector to write, write gate is asserted.
3. If this is not the sector of interest, neither gate is asserted.

If it is not the correct track, the head moves to a new location based upon the current position and the position requested by the central processor and reads again. This process continues until the correct track is found. A read gate or write gate signal is asserted by the disk controller when the desired sector and track are found.

To overcome the problems associated with hard disk drives requires eliminating or substantially reducing the access time of the disk as well as providing better means for storage of data. The prior art has considered increasing the rotational speed of the hard disk, increasing the storage density of the hard disk, and increasing the efficiency of data storage on the hard disk as means for improving the performance of a hard disk drive. Another solution would be to replace the hard disk with solid state memory. Solid state memory has the advantages of a very fast access time and very good reliability because it is not an electromechanical device, but the SMD interface was conceived to control disks and rotating medium and not to control any type of solid state memory. Therefore to replace the hard disk with solid state memory requires that the solid state memory appear as a disk to the SMD disk controller. This invention overcomes the problems of the prior art by providing a means for directly interfacing a solid state memory with a SMD disk controller.

SUMMARY

The disk emulator of this invention is a solid state system for significantly improving access time, i.e., improving both the seek time and the rotational latency. The disk emulator complies with the SMD interface convention and thus to the central processor and the SMD disk controller, the disk emulator appears as a disk with virtually a zero access time.

In one embodiment, the primary systems of the disk emulator are a 66-bit shift register, a parity circuit, a latch circuit, a 66-bit parallel bus and a dynamic random access memory (DRAM) array. Each of these systems interface with control systems of the disk emulator which provide the signals required for the-read and write operations of the disk emulator. While different circuits are required to generate the signals necessary for the write operation and for the read operation, the use of the shift register, parity circuit and latch circuit in conjunction with the 66-bit parallel bus and the DRAM array for both the read and write operations minimizes the circuitry in the disk emulator. Consequently, both the cost and the size of the disk emulator are reduced.

The 66-bit shift register receives serial data from the SMD disk controller and converts the stream of serial data into 66-bit words which are each passed over the 66-bit parallel bus to the latch circuit where they are temporarily stored. For each 66-bit word a parity bit is also generated by the parity circuit. The stored word in the latch circuit and the associated parity bit are transferred to the DRAM array over the 67 bit (that is 66 bits of data +1 parity bit) parallel bus while another word is being serially supplied to the 66-bit shift register by the SMD disk controller.

In this embodiment, each track of data in the disk emulator may be comprised of thirty-two sectors, with each sector being comprised of sixty-four 66-bit words. This word length allows the memory interface timing to be very conservative while still maintaining a very fast transfer rate to the SMD disk controller. An additional benefit of the 66-bit word is the economy of parity. For a long word, the stored parity bit is a small portion of the stored data.

To further reduce the memory requirements for the DRAM array of the disk emulator, only the sector-specific data provided by the SMD disk controller are stored in the DRAM array. In each sector on a disk, only the address field and the data field are unique. Accordingly, the disk emulator needs to store only address information and the data information and does so by making the zeroth word of the sector in the DRAM array the address field and the first through sixty-third words of the sector in DRAM array the data field. Since only the sector-specific data, the address field and the data field, are stored in the DRAM array, approximately 97% of the DRAM array is used for data storage while in a typical hard disk only 81% of the disk is available for data storage. Hence, the ability of the disk emulator to store only sector-specific data significantly enhances the utilization of the storage medium over prior art systems.

Another unique feature of the disk emulator concerns data integrity. Solid state memory errors can be divided into two basic types, hard errors and soft errors. The SMD disk controller corrects soft errors which are random, single bit errors in the data retrieved from the DRAM array. However, hard errors are the result of a catastrophic memory failure in the DRAM array and generally affect many bits within the array. Hard errors require an error correction process to correct the stored data before the data are supplied to the SMD disk controller. Prior art error correction process typically used an 8-bit ECC code and a mathematical process which operated on the ECC code to correct hard errors. However, an 8-bit per word overhead would add significant cost to a disk emulator. Accordingly, a novel error correction process is incorporated in the disk emulator which corrects single bit hard memory errors using only a single parity bit.

In the error correction process, as each word is retrieved from the DRAM array of the disk emulator, a new parity bit is generated for the stored word. The new parity bit is compared with the stored parity bit for the stored word. If the two parity bits are the same, no error has occurred and the normal read cycle for the disk emulator is followed. However, if the two parity bits are different, an error has occurred and the disk emulator uses the novel error correction process to correct the word.

In the error correction process, the retrieved word is inverted and latched in the latch circuit of the disk emulator. The inverted word is then written to the same location in the DRAM array from which the original word was retrieved. The inverted word is then again retrieved from the DRAM array, inverted and latched in the latch circuit. Then, at the appropriate time, the error corrected word is passed from the latch circuit over the 66-bit parallel bus to the 66-bit shift register from which the error corrected word is serially supplied to the SMD disk controller.

This novel READ/INVERT/WRITE/READ/INVERT/ WRITE error correction process, using only a parity bit, corrects a single bit hard memory error while the previous word is being serially supplied to the SMD disk controller. With the design of the latch circuit, i.e, the use of inverting latches, and this novel six step error correction process, the error correction process is completed in a time frame such that the disk emulator can operate at data rates as high as 50 Megahertz. Thus, the new error correction process not only conserves storage space in the DRAM over prior art processes, but also corrects errors with such speed that the disk emulator operates at the highest frequency permitted by the SMD interface convention.

When the SMD disk controller wants to read data from the disk emulator or write data to the disk emulator, the SMD controller sends a seek command to the disk emulator. The SMD disk controller simultaneously provides the cylinder and head address for the desired data over the SMD control cable. The combination of the cylinder and head address defines a unique track since each head can access predetermined cylinders on one disk surface. Differential current mode receivers in the disk emulator translate the differential signals from the SMD disk controller to logic signals.

The ROM translation circuit in the disk emulator instantaneously translates the geometric addresses from the SMD disk controller, the cylinder and head address, into higher order addresses for the DRAM array in the disk emulator. In the disk emulator, higher order addresses refer to the addresses for the DRAM array which correspond to the cylinder and head address from the SMD controller. Lower order addresses are also used in the DRAM array and that term refers to the addresses in the DRAM array which correspond to the sector and the words within a sector.

Since the translation of the geometric address information from the SMD controller to the higher order addresses is virtually instantaneous, the microprocessor in the disk emulator can, upon receiving the seek command, immediately issue an index pulse to the SMD controller indicating that the desired head has been located over the desired cylinder, i.e., indicating that the track containing the designed sector has been located. The microprocessor then enters the rapid sector cycle. In the rapid sector cycle, the microprocessor initially generates the address corresponding to the zeroth sector of the track specified by the SMD disk controller.

The index pulse sent to the SMD disk controller is also used to initialize the disk emulator. The index pulse clears programmable counters, used to generate timing signals, the shift register and other components in the disk emulator. In addition, other programmable counters, used to address the words in a sector, are initialized such that the zeroth word of the sector is addressed.

Since the SMD disk controller provided information which was translated into the higher order address and the disk emulator generated the lower order address for the zeroth word of the zero sector of the track specified by the SMD disk controller, the location in the DRAM array of the word that will initially be provided to the SMD disk controller is completely specified. Accordingly, the disk emulator fetches the zeroth 66-bit word for the zeroth sector (which is the address field for the zeroth sector) in the track specified by the SMD controller plus the one parity bit for the zeroth word and provides the word to the latch circuit and parity circuit on the 66-bit parallel bus.

At this time, the parallel terminals of the shift register, which are also connected to the 66-bit parallel bus, are tri-stated to prevent contentions on the 66-bit parallel bus between data in the shift register and the zeroth word being retrieved from the DRAM array. Thus, the zeroth word from the DRAM array on the 66-bit parallel bus is available only to the parity circuit and to the latch circuit. The parity circuit generates a new parity bit for the zeroth word on the 66-bit parallel bus and the error correction circuit compares the stored parity bit with the new parity bit and as described previously, the stored word is error corrected if the two parity bits are different.

Hence, after the seek command from the SMD disk controller and the index signal from the disk emulator, the zeroth word, the address field, for the zeroth sector of the track specified by the SMD disk controller is loaded in the latch circuit and is ready to be loaded into the shift register and serially transmitted to the SMD disk controller.

Immediately after the SMD disk controller receives the index pulse from the disk emulator, the SMD disk controller asserts the read gate signal to the disk emulator. At this time, the disk emulator starts to supply a series of zero bits to the SMD disk controller which correspond to the first gap in the sector, i.e., the region from the start of the sector to the address field of the sector.

The disk emulator counts the number of bytes supplied to the SMD controller and precisely when the number of bytes in the sector prior to the address field is reached, the disk emulator loads the address field from the latch circuit over the parallel bus into the shift register which subsequently serially shifts the address field to the SMD controller. While the address field is being serially supplied to the SMD controller, the disk emulator retrieves the first word of the zeroth sector from the DRAM array, error corrects the word, and stores the word in the latch circuit.

After the SMD disk controller receives the address field, the controller deasserts the read gate at the write splice field of the sector and initiates one of three actions: (1) if this is a sector to be read, the SMD disk controller reasserts the read gate; (2) if this is a sector to be written the SMD controller asserts the write gate; or (3) if this is not the sector of interest, neither the read gate nor the write gate is asserted by the SMD disk controller.

Accordingly, the microprocessor of the disk emulator polls the read gate signal and the write gate signal from the SMD disk controller for a predetermined time after issuing the address field (in this case for the zeroth sector) and if neither the read gate nor the write gate signal is reasserted, this indicates that this is not the sector which the SMD controller desires and a sector pulse is generated by the microprocessor and transmitted to the SMD disk controller. The microprocessor also increments the address of the DRAM array to the first sector in the track specified by the SMD disk controller.

The sector pulse initializes the disk emulator in a manner that is identical to that previously described for the index pulse. Hence, the zeroth word, the address field, for the first sector of the track specified by the SMD disk controller is retrieved, error corrected, and stored in the latch circuit.

In response to the sector pulse, the SMD disk controller asserts the read gate and the disk emulator again provides the zero bits for the first gap prior to the address field and after the first gap is finished the zeroth word, the address field, of the first sector of the track requested by the SMD disk controller is loaded into the shift register and serially provided to the SMD disk controller. While the address field for the first sector is being provided to the SMD disk controller, the disk emulator retrieves, error corrects and stores the first word of the data field of the first sector in the latch circuit.

The read gate signal and the write gate signal from the SMD disk controller are again polled for the predetermined time after the initiation of the sector pulse and address field and if neither the read gate nor the write gate is reasserted, another sector pulse is generated by the microprocessor and the zeroth word for the second sector is provided to the SMD disk controller in the same matter as described for the zeroth sector and the first sector. The microprocessor continues in this rapid sector cycle mode to initiate a series of read cycles on the zeroth word of consecutive sectors in the track until the read gate or the write gate is asserted by the SMD disk controller.

Thus, the address fields are read by the SMD disk controller at rapid intervals, typically about 10 microseconds, until the desired sector is found. If the desired sector is the last one on the.track, i.e., the thirty-second sector, 320 microseconds are required to locate the sector. A conventional hard disk drive can require sixteen milliseconds to locate the correct sector after the track is located. Hence, the disk emulator of this invention reduces the average rotational latency by a factor of 500. This represents a significant increase in the performance over a conventional hard disk-drive and the rotational latency of the disk emulator is no longer the limiting factor in the response of the disk system. Now, the performance of the SMD disk controller and the disk emulator is bounded by the response time of the SMD disk controller. Accordingly, to further improve the rotational latency requires a change in the SMD interface convention.

When the address field provided to the SMD controller corresponds to the sector sought by the SMD controller, the SMD controller reasserts the read gate if the central processing unit driving the SMD disk controller has requested the data stored in that sector. When the read gate is reasserted, the microprocessor leaves the rapid sector cycle and the disk emulator provides a string of zeros, corresponding to the second gap in the sector which is the space between the address field (field 13) and the first word in the data field, to the SMD disk controller.

At the precise time the number of bytes in the second gap is completed, the error corrected first word of the data field is loaded into the shift register and serially supplied to the SMD disk controller. While the first word of the data field is being supplied to the SMD disk controller, the second word of the data field is retrieved from the DRAM array, error corrected and stored in the latch circuit, and when the last bit of the first word leaves the shift register the second word is loaded into the shift register and serially provided to the SMD disk controller. This process continues until the sixty-third word of the sector, which is the sixty-fourth and final word of the sector because the first word was the zeroth word, is provided to the SMD disk controller. After the sixty-third word leaves the shift register, the disk-emulator is disabled and provides a series of zero bits to the SMD controller until another sector or index pulse is generated.

When the central processor, which drives the SMD controller, wants to write data to the disk emulator, the initial sequence of actions is identical to those in the read operation. The SMD disk controller issues a seek command and provides the cylinder address and head address to initiate a write to the disk emulator. The microprocessor upon receipt of the seek command and cylinder and head address immediately issues an index pulse and enters the rapid sector cycle. The initialization of the disk emulator and the retrieval of the zeroth word for the zero sector of the track requested by the SMD disk controller are identical to that previously described. Accordingly the SMD controller again reads the zeroth word and deasserts the read gate at the write splice portion of the sector. Next the controller initiates one of two actions; (1) if this is the sector to write, the write gate is asserted; or (2) if this is not the sector of interest, the write gate is not asserted.

If the write gate is not asserted, the microprocessor continues to rapidly supply the zeroth word for the next sector (sector one) in the track and then polls the write gate and the read gate to determine whether either gate is asserted as previously described. When the correct sector is located and the write gate is asserted by the SMD disk controller, serial data is clocked into the shift register and the microprocessor leaves the rapid sector cycle mode. A comparator circuit in the disk emulator, which is programmed to detect the data sync pattern prior to the address field, monitors the data in the shift register. When the data sync pattern is detected, after two additional clock pulses to the shift register, a signal is generated which captures the first 66-bit word of the data field which includes the data sync pattern in the latch circuit. The locations in the shift register, which are monitored by the comparator circuit, are selected such that when the data sync pattern is detected, two additional clock pulses to the shift register are required to load the first full 66-bit word of the data field completely into the shift register. While the next word is entering the shift register the 66-bit word stored in the latch circuit and the associated parity bit are written to the DRAM array over the 67-bit parallel bus which consists of the 66-bit data bus and the parity bit line, respectively. Also, the address for the DRAM array is incremented to the next data word of the sector.

This sequence of operations is repeated for the second data word through the sixty-third data word of the sector. Thus, sixty-four words are written to the DRAM array for each sector. In addition to the 66 bits of data information, a parity bit is generated by the circuitry in the disk emulator and is stored in the DRAM array as a 67th bit. After the sixty-fourth word is written to the DRAM array, the disk emulator is disabled until the SMD disk controller issues another sector or index pulse.

Since the DRAM array of the disk emulator is a volatile memory storage element, the disk emulator contains back-up systems which protect the integrity of the data in the DRAM array in the event that the power supply voltage is disrupted.

The disk emulator of this invention significantly improves both the seek time and the sector rotational latency. Also, the data storage medium in the disk emulator is used more efficiently than the data storage medium in a conventional hard disk. Finally, since the disk emulator has no mechanical or moving parts and since the novel error correction process corrects hard memory failures, the reliability of the disk emulator should be significantly better than the reliability of prior art hard disk drives.

BRIEF DESCRIPTION OF THE DRAWINGS

FIG. 9 is a schematic diagram of input control circuit 801 of the disk emulator.

FIG. 18 is a schematic diagram of read counter circuit 810 in the disk emulator.

FIGS. 30a through 30k illustrate the read signals and latch clock signals for reading the zeroth word of a sector without error.

FIG. 32 is a schematic diagram of the reset circuit in the disk emulator.

FIG. 33 is a schematic diagram of read/write gate circuit 812 in the disk emulator.

FIGS. 34a through 34aa illustrate the signal response of read counter circuit 810 to the rollover of first gap counter 808.

FIGS. 35a through 35j illustrate the sequence of signals for reading of the first through sixty-third words of the sector without error.

FIGS. 36a through 36aa illustrate the response of read counter circuit 810 to the rollover of second gap counter 809 and to read counter 810.

FIGS. 37a through 37w illustrate the signal response of write control circuit 806 after the data sync pattern is detected.

FIGS. 38a through 38j illustrate the sequence of signals for writing data to the disk emulator.

FIGS. 40a through 40j illustrate the sequences of signals for a read with error.

FIG. 46 is a schematic diagram of SMD sector/index circuit 818 in the disk emulator.

FIGS. 47a through 47c are a listing of a BASIC computer program used to generate the ROM translation table used in one embodiment of this invention.

FIG. 48 is a partial output listing of the computer program of FIGS. 47a through 47c.

DETAILED DESCRIPTION OF THE INVENTION

The disk emulation system of this invention is a solid state system for eliminating latency. The disk emulator complies with the SMD interface convention and thus to the central processor and the SMD disk controller the disk emulator appears as a disk drive with virtually a zero access time. A conceptual block diagram of the disk emulator is shown in FIG. 2.

Figure 2:
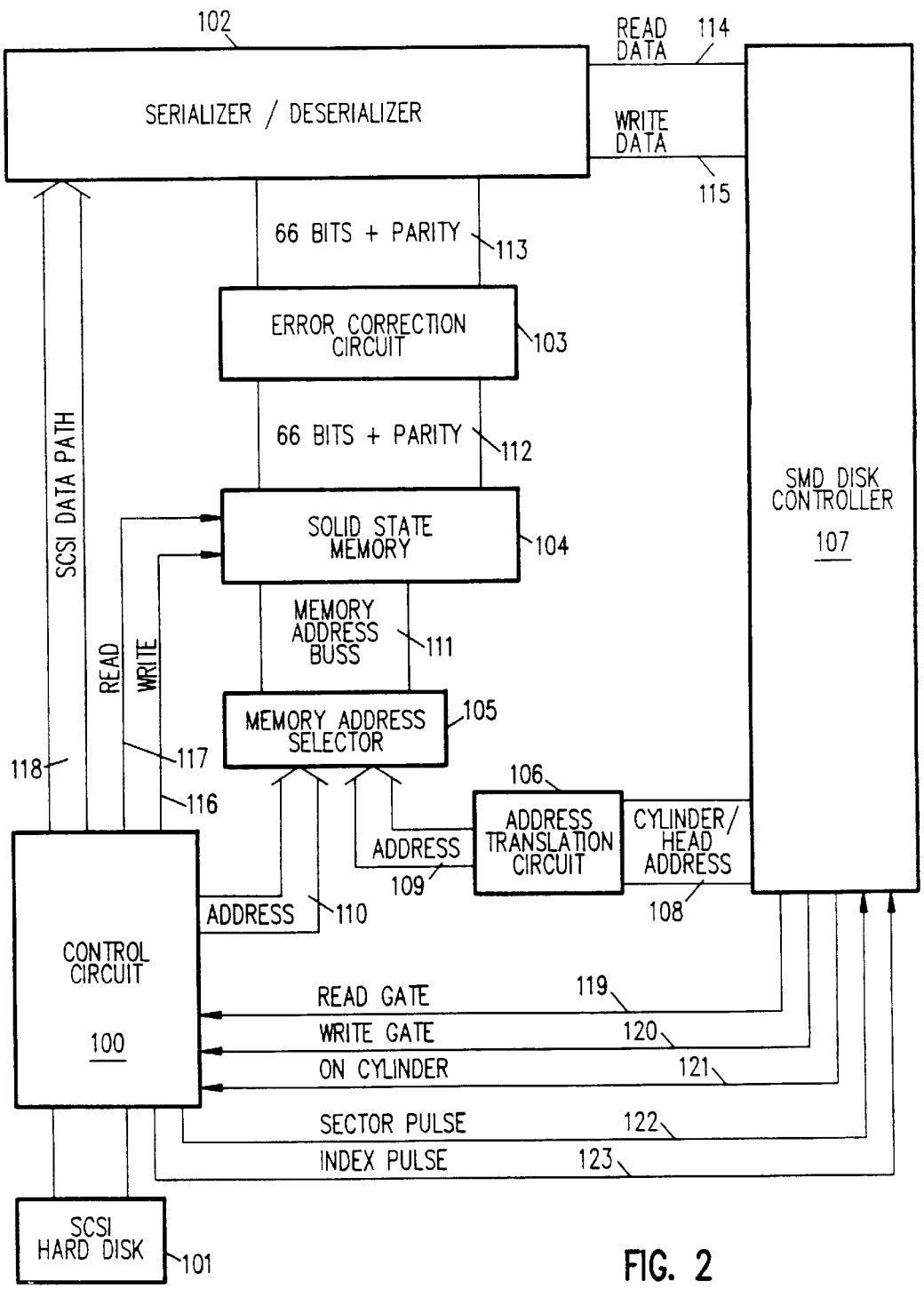
FIG. 2 illustrates a conceptual block diagram of the architecture of the disk emulator of this invention.

Conceptually, a serializer/deserializer 102, in FIG. 2, interfaces the solid state memory 104, a dynamic random access memory (DRAM) array, of the disk emulator with the SMD disk controller 107. The serializer/deserializer 102 functions in the deserializer mode and converts the serial data stream on a write data line 115 from the SMD disk controller into 66-bit parallel words that may be efficiently written into the DRAM array 104 over the parallel bus 112, 113. Conversely, when SMD disk controller 107 reads data from the disk emulator, serializer/deserializer 102 functions in the serializer mode, converting the 66-bit parallel word, retrieved from solid state memory 104 over parallel bus 112, 113, into a serial data stream that is passed to the SMD disk controller over a read data line 114. Also, serializer/deserializer 102 generates a parity bit for each 66-bit parallel word. As is described later, the parity bit is also stored in solid state memory 104 and is used for error correction.

In this embodiment, each track of data in the disk emulator is comprised of thirty-two sectors which are designated sector zero through sector thirty-one. Each sector is comprised of sixty-four 66-bit words (designated within the sectors as word zero through word sixty-three). The zeroth word in each sector is used to identify the sector and is the address for its respective sector. This word length allows the memory fetch timing to be very conservative while still maintaining a very fast transfer rate to the SMD disk controller. An additional benefit of the 66-bit word is the economy of parity. For a long word, the stored parity bit is a small portion of the stored data. However, in view of the description of the present invention, the design of a disk emulator which utilizes a different word length and/or sector length will be apparent to those skilled in the art.

When SMD disk controller 107 wants to read data from the disk emulator or write data to the disk emulator, SMD disk controller 107 sends a seek command to control circuit 100 over an on-cylinder line 121. SMD disk controller 107 simultaneously provides the cylinder and head address for the desired data over cylinder/head address bus 108 to address translation circuit 106. Address translation circuit 106 converts the signals provided by SMD disk controller 107 into the higher order memory addresses for the data the SMD disk controller wishes to read or write. These addresses are provided to memory address selector 105 over higher order address bus 109. Unlike a typical hard disk which must hunt for the specified track, the disk emulator determines the address of the desired track instantaneously using address translation circuit 106. Accordingly, address translation circuit 106 eliminates the head seek time associated with locating the specified track in a conventional hard disk drive.

The control circuit 100, upon receiving the seek command, immediately issues an index pulse to SMD disk controller 107 indicating that the desired track has been located and control circuit 100 enters the rapid sector cycle. In the rapid sector cycle, control circuit 100 begins by generating the address in solid state memory 104 of the location of the zeroth word in the zero sector (which is the address of sector zero) of the track specified by SMD disk controller 107 and that address is transmitted over address bus 110 to memory address selector 105.

Since the SMD controller 107 provided the cylinder and head address information, which was translated by address translation circuit 106 into the higher order addresses, and control circuit 100 generated the lower order addresses, the location of the word that will initially be provided to SMD disk controller 107 is completely specified. Accordingly, the disk emulator fetches the specified 66-bit word plus 1 parity bit and provides that word to error correction circuit 103 over parallel bus 112. Error correction circuit 103, using the parity bit, analyzes the zeroth word (which is the address of sector zero) as described below, and if a bit of the 66-bit word changed while the word was stored, after storage or during a read in the solid state memory, error correction circuit 103 corrects the hard error. If the error is not a hard error, error correction circuit 103, as described below, does not correct the error and so the error is passed to disk controller 107 which does correct the error.

Immediately after SMD disk controller 107 receives the index pulse from control circuit 100, SMD disk controller 107 asserts the read gate signal on read gate line 119 to control circuit 100. Control circuit 100 then loads the error corrected zeroth word, which is stored in error correction circuit 103, into serializer/deserializer 102 over parallel bus 113. The SMD disk controller 107 reads the zeroth word which is provided serially on read data line 114 by serializer/deserializer 102.

While the zeroth word of sector zero is being read by SMD disk controller 107, the disk emulator retrieves the first word of the zeroth sector (which is a data word) from DRAM array 104 and provides the first word and the stored parity bit to error correction circuit 103 on parallel bus 112. By loading the first word of sector zero into error correction circuit 103 at this time, if sector zero is the desired sector, the first word will be available as soon as it is requested by SMD controller 107.

The SMD disk controller 107 deasserts the read gate at the write splice field of the sector as shown in FIG. 1a, and initiates one of three actions; (1) if this is the sector to be read, the SMD disk controller reasserts the read gate; (2) if this is the sector to be written in, the SMD disk controller asserts the write gate; or (3) if this is not the sector of interest, neither the read gate nor the write gate is asserted.

Control circuit 100 polls read gate line 119 and write gate line 120 for a predetermined time after issuing a sector address and if neither the read gate signal nor the write gate signal is detected, a sector pulse is supplied by control circuit 100 to SMD disk controller 107 over a sector pulse line 122. After the sector pulse, the zeroth word of the first sector (the address of sector one) of the track requested by SMD disk controller 107 is loaded into serializer/deserializer 102 in a manner identical to that described for the zeroth sector and SMD controller 107 reads this address word. The read gate line 119 and write gate line 120 are polled again by control circuit 100 for a predetermined time after issuing the sector address and if the read gate or write gate is not detected, another sector pulse is supplied to SMD disk controller 107 by control circuit 100 and the zeroth word for the second sector is sent to SMD disk controller 107. Control circuit 100 continues in this rapid sector cycle mode to initiate a series of read cycles on the zeroth word of consecutive sectors in the track until the read gate or write gate is reasserted after the reading of the zeroth word.

When the read gate is reasserted by SMD disk controller 107 over read gate line 119, control circuit 100 loads the first word of the sector, which is stored in error correction circuit 103, into serializer/deserializer 102 and then sequentially retrieves the second through sixty-third word of the sector from DRAM array 104. It will-be recalled from above that words one through sixty-three in each sector comprise the data words. As each word is retrieved, the word and the related parity bit are passed over parallel bus 112 to the error correction circuit 103. Using the parity bit, error correction circuit 103 corrects any hard error which occurred and then the word is passed over the 66-bit parallel bus 113 to serializer/deserializer 102. Serializer/deserializer 102 provides the first through sixty-third word of the sector serially to SMD disk controller 107 over read data line 114 so that all sixty-four words in the sector, the address field plus the sixty-three words of data, are passed to the disk controller.

When the central processor, which drives SMD controller 107, wants to write data to the disk emulator, the initial sequence of actions is identical to those in the read operation. SMD disk controller 107 issues a seek command to initiate a write to the disk emulator. Control circuit 100 upon receipt of the seek command immediately issues an index pulse and enters the rapid sector cycle. Control circuit 100 supplies the zeroth word for the zero sector (the address of sector zero) of the track requested by SMD disk controller 107. SMD controller 107 again reads the zeroth word from serializer/deserializer 102 and deasserts the read gate at the write splice portion of the sector. Next the controller initiates one of two actions; (1) if this is the sector to write, the write gate is asserted; or (2) if this is not the sector of interest, the write gate is not asserted.

If the write gate is not asserted, control circuit 100 continues to supply the zeroth word for the next sector in the track at a predetermined time, ten microseconds in one embodiment, and then polls write gate line 120 to determine whether the write gate is asserted. Control circuit 100 continues to issue successive sector address information and poll write gate line 120. When SMD controller 107 receives the address of the desired sector, the write gate is asserted by SMD disk controller 107, and serial data is clocked into serializer/deserializer 102 over write data line 115. This is the first data word to be stored in solid state memory 104. When an entire 66-bit word is in serializer/deserializer 102, the word is passed over 66-bit parallel bus 113 to error correction circuit 103 where the word is temporarily stored. While the next word is entering serializer/deserializer 102 from SMD controller 107, a parity bit is generated for the 66-bit word stored in error correction circuit 103 and then this stored 66-bit word and the parity bit for that word are written to solid state memory 104 over 67-bit parallel bus 113. This sequence is continued until a sector's worth of data, consisting of a 66-bit address word and sixty-three 66-bit data words, plus one parity bit for each word, is stored in the solid state memory 104.

In the read/write operation, the disk emulator converts the geometric address data provided by SMD disk controller 107 into contiguous binary addresses and reads/writes the data at these addresses in solid state memory 104. This operation eliminates the seek time of a hard disk because a data structure is generated that is easily and rapidly addressed when SMD disk controller 107 wants to retrieve or write data.

The solid state memory 104 of the disk emulator is a volatile memory storage element. If the power to the disk emulator were to fail, all the data stored in solid state memory 104 would be lost. Therefore, the disk emulator has several backup systems to ensure that this does not happen.

A battery backup module is a part of the solid state memory 104. Should the line voltage fail, the battery backup module can support the memory structure for a time related to the battery capacity. The backup system also includes a SCSI hard disk 101. If control circuit 100 senses that the battery power is failing, then the data stored in the solid state memory 104 are accessed by control circuit 100 through serializer/deserializer 102 and the data are removed through the parallel path 118 and stored on SCSI hard disk 101. Since SCSI hard disk 101 is a nonvolatile media, the data can effectively be warehoused on the disk until the power is restored at which time control circuit 100 restores the data in solid state memory 104 via an algorithm in software, given in Microfiche Appendix A and incorporated herein by reference, which reprograms solid state memory 104 to the condition that existed when the disk emulator lost battery power.

Figure 3A:
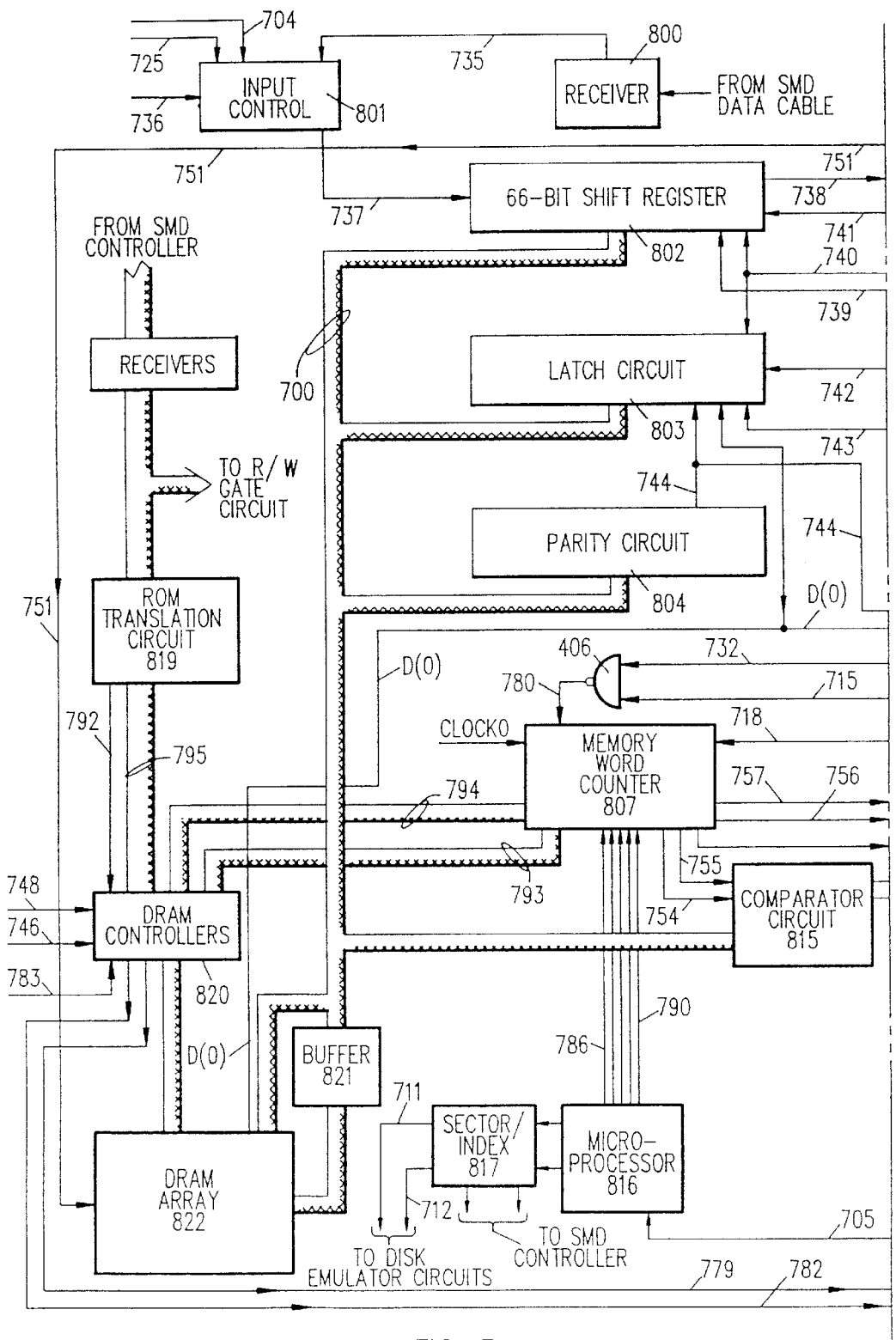
FIG. 3 is a block diagram of the major circuits of the disk emulator of the present invention.
Figure 3B:
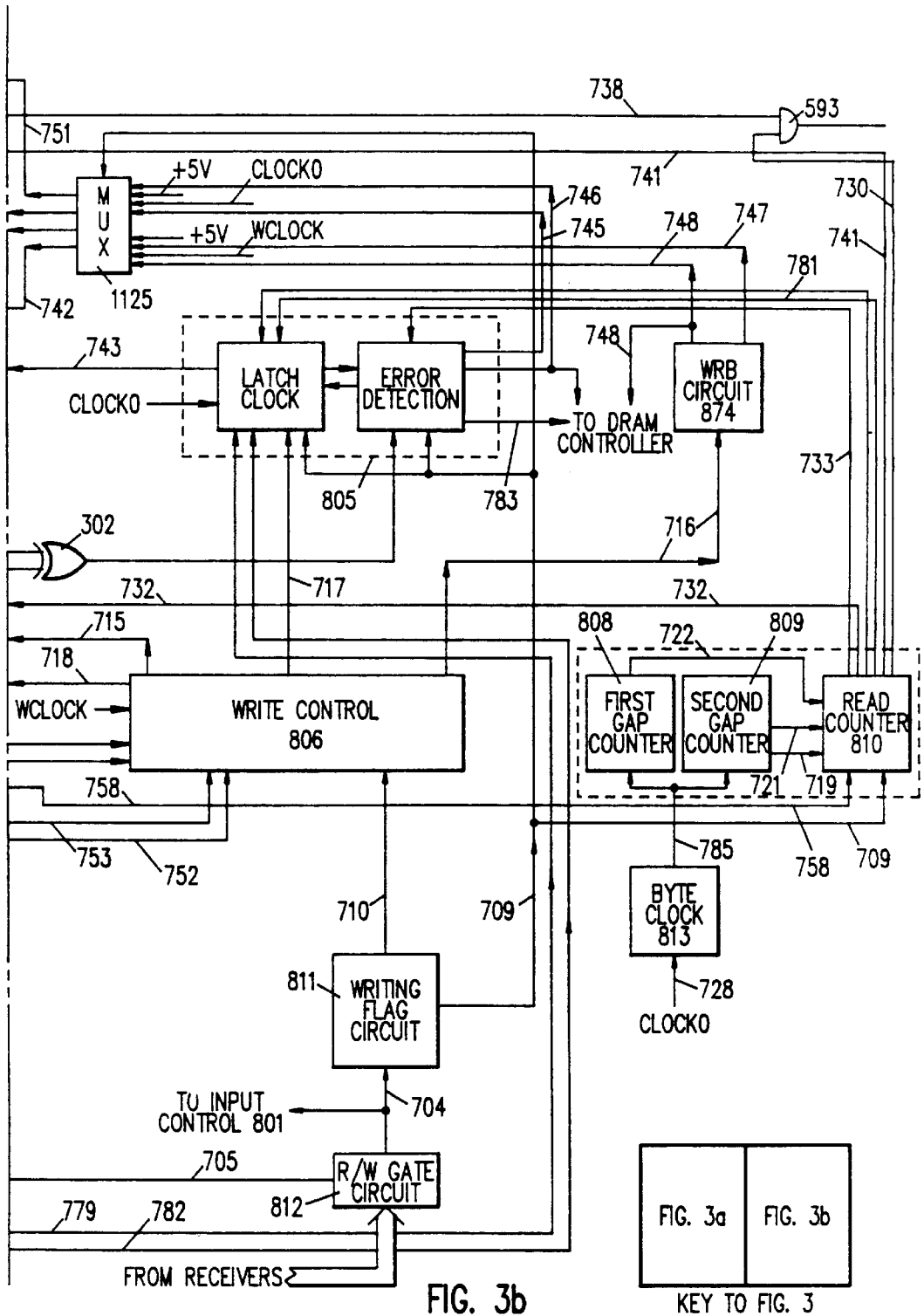
Figure 20:
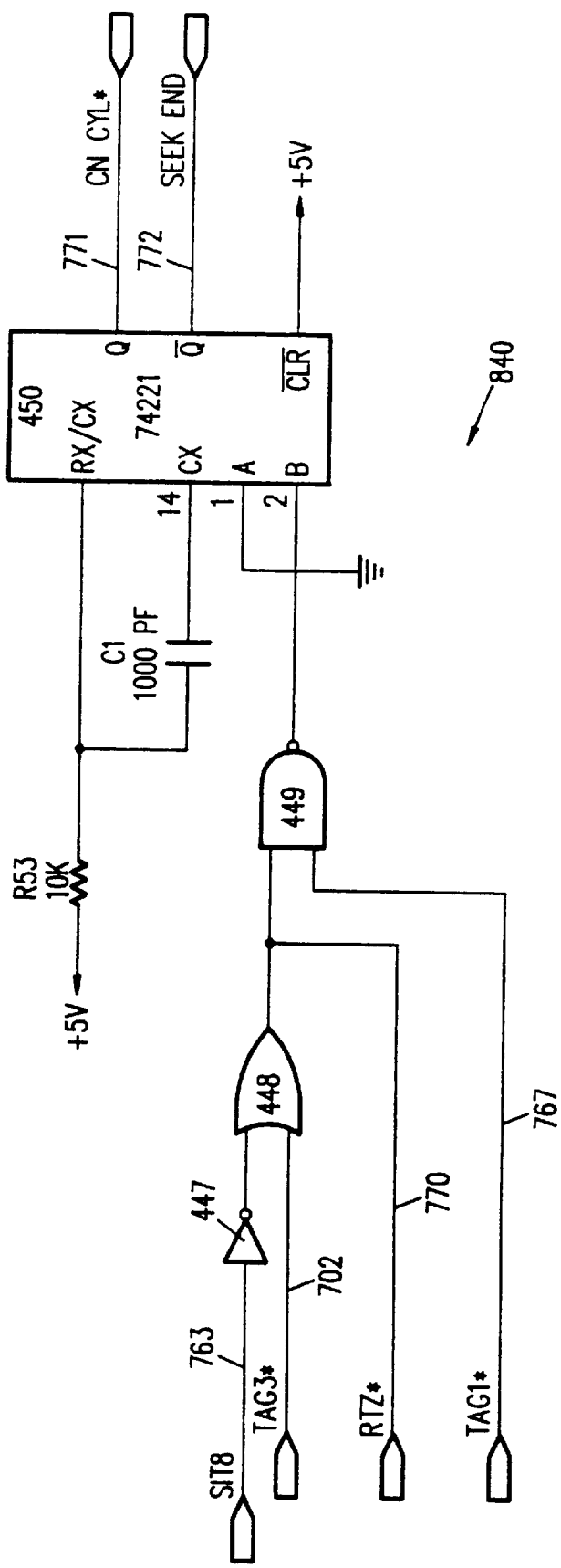
FIG. 20 is a schematic diagram of on-cylinder circuit 840 in the disk emulator.
Figure 21A:
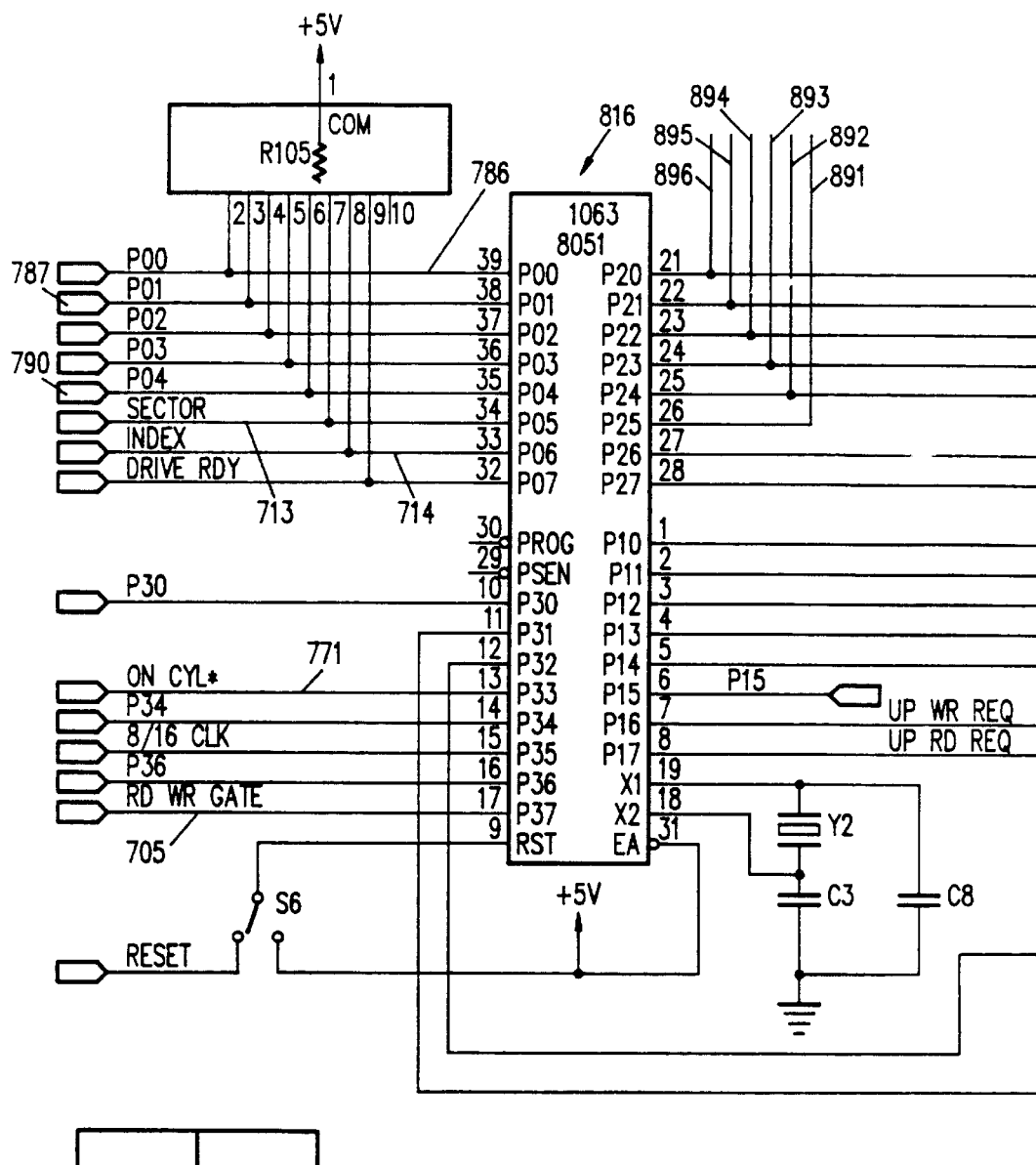
FIG. 21 is a schematic diagram of microprocessor 816 in the disk emulator.
Figure 21B:
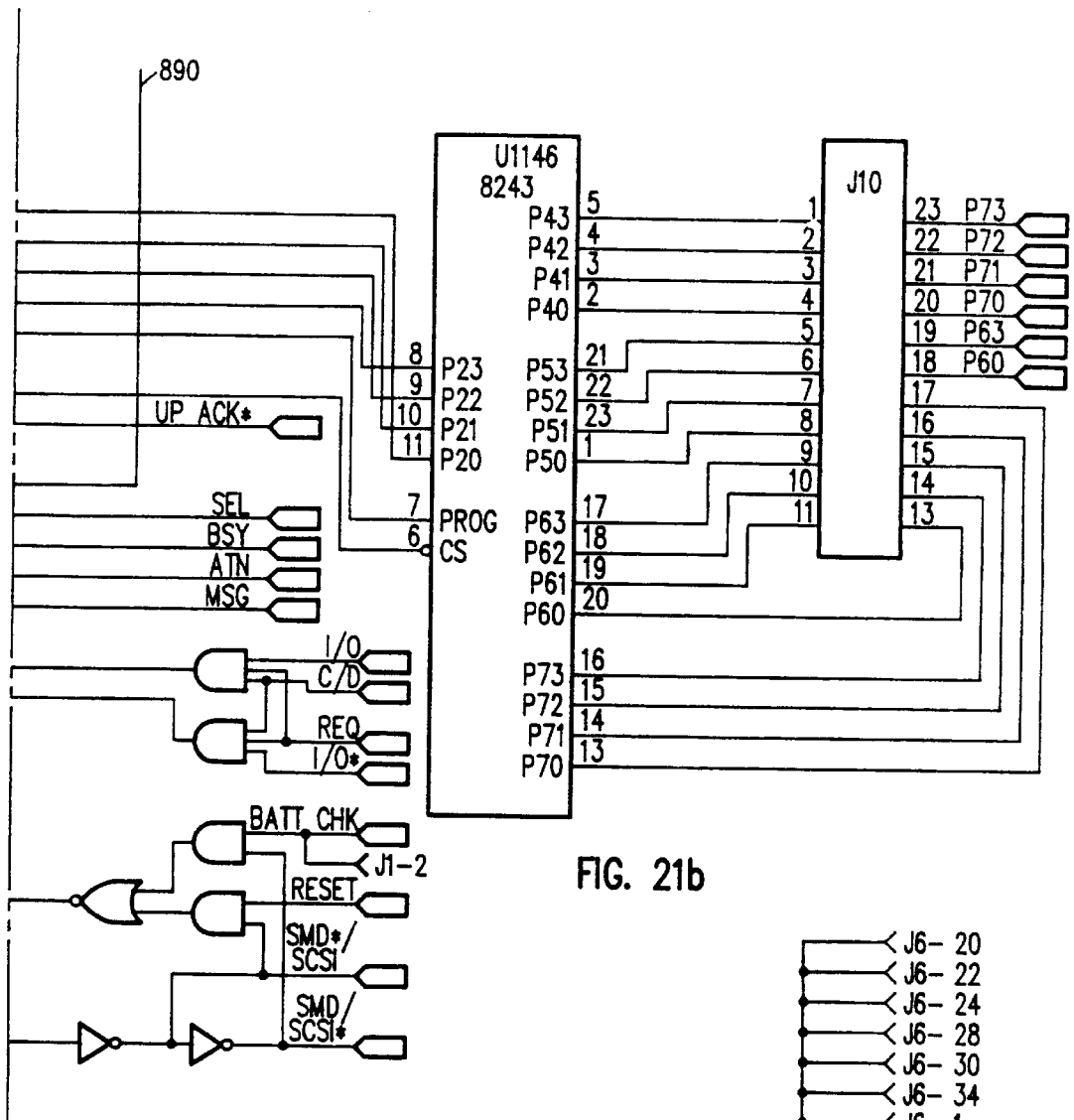
Figure 21A:
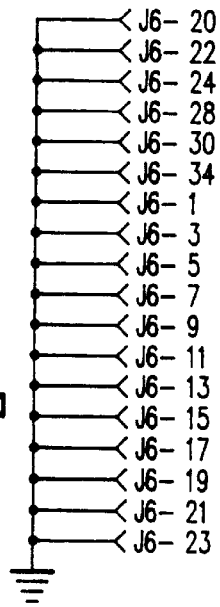

While FIG. 2 illustrates the basic structure of the disk emulator and is useful in conceptually visualizing the function of the disk emulator, FIGS. 4–29, 31–33, 39, and 41–46 provide a circuit diagram of one embodiment of the disk emulator of this invention. In FIGS. 4–29, 31–33, 39, and 41–46 are several integrated circuits. Several of the integrated circuits are marked with a reference character as well as a second number. The reference character has four numerical digits or less, while the second number has either alphanumeric characters or five numerical digits. The second number is generally the industry standard identification number for integrated circuits. For example, IC indicated by reference character 1122 in FIG. 14 has a second number of F521 which is the identification number for a Series 74 standard TTL integrated circuit. Similarly, in the specification Series 74, standard TTL integrated circuit identification is given for those integrated circuits not identified in the drawings. For a detailed description of the specific integrated circuits, see for example, *The TTL Data Book, Vol. 2*, Texas Instruments, 1985. Two exceptions for the second identification numbers are in FIG. 21 and FIG. 25. In FIG. 21, integrated circuit indicated by reference character 1063 is an Intel 8051 microprocessor and in FIG. 25 integrated circuit indicated by reference character 8207 is an Intel 8207 DRAM controller. Since the circuit diagram, as shown in these figures, is complex, FIG. 3 illustrates the major circuits in the disk emulator as block diagrams and shows the interconnections between the major circuits. The general operation and interaction of the various circuits in FIG. 3 is considered first and then the integration of these circuits to perform read and write functions is described in more detail.

Differential Current Mode Receivers

Figure 4:
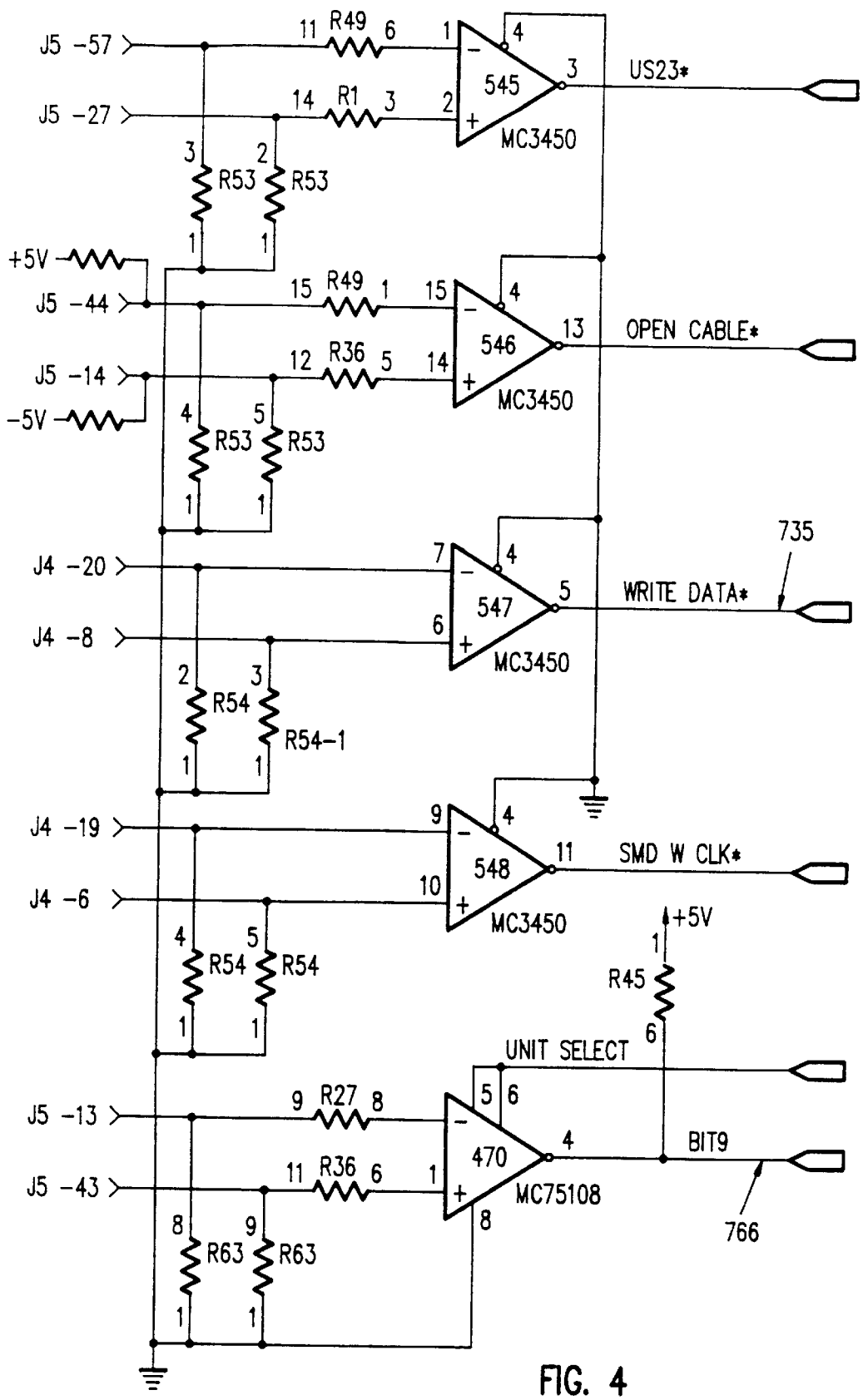
FIG. 4, FIG. 5, and FIG. 6 are schematic diagrams of the interface between the SMD control cable, the SMD data cable and the disk emulator.
Figure 5A:
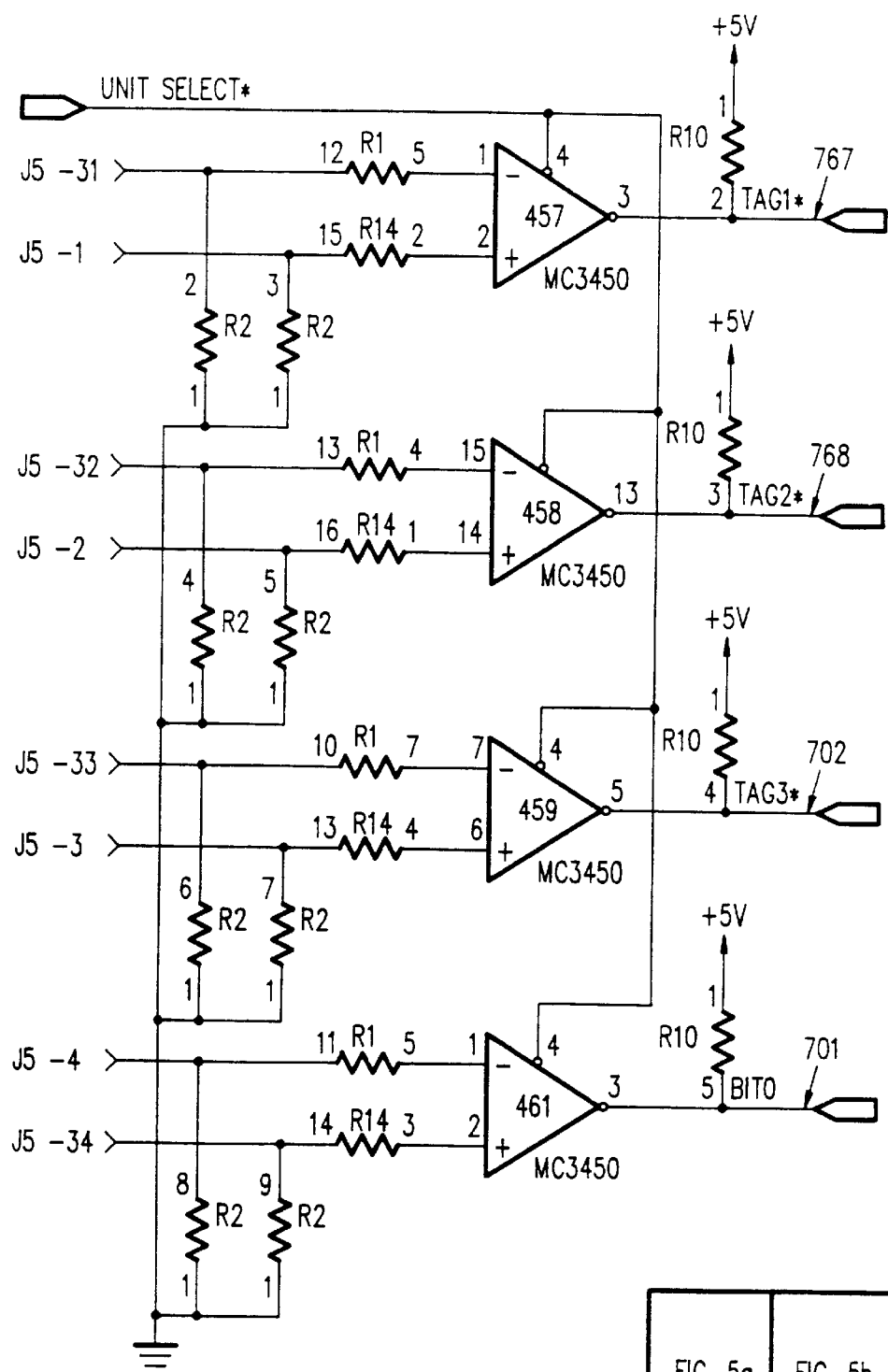
Figure 5B:
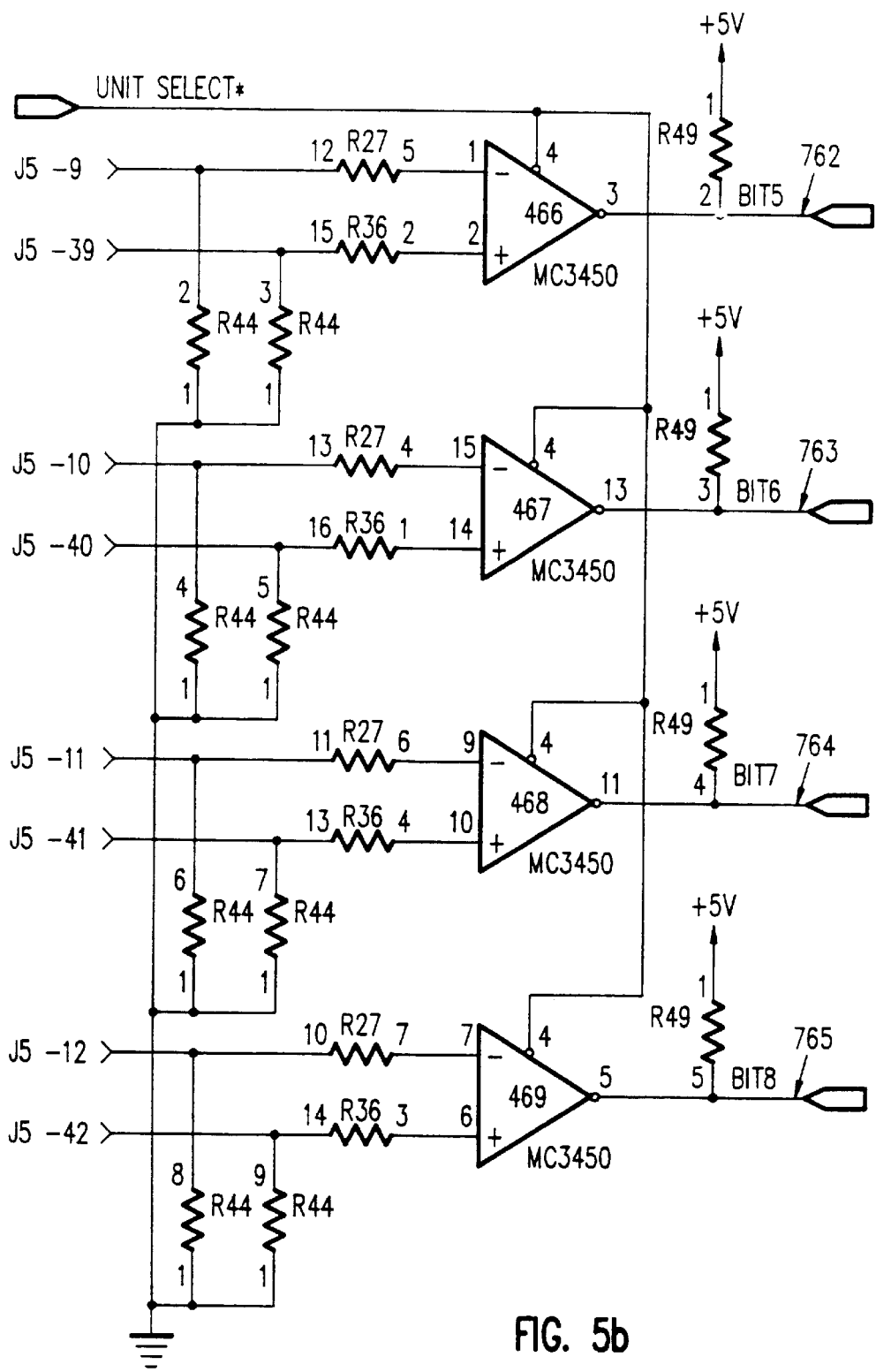
Figure 6B:
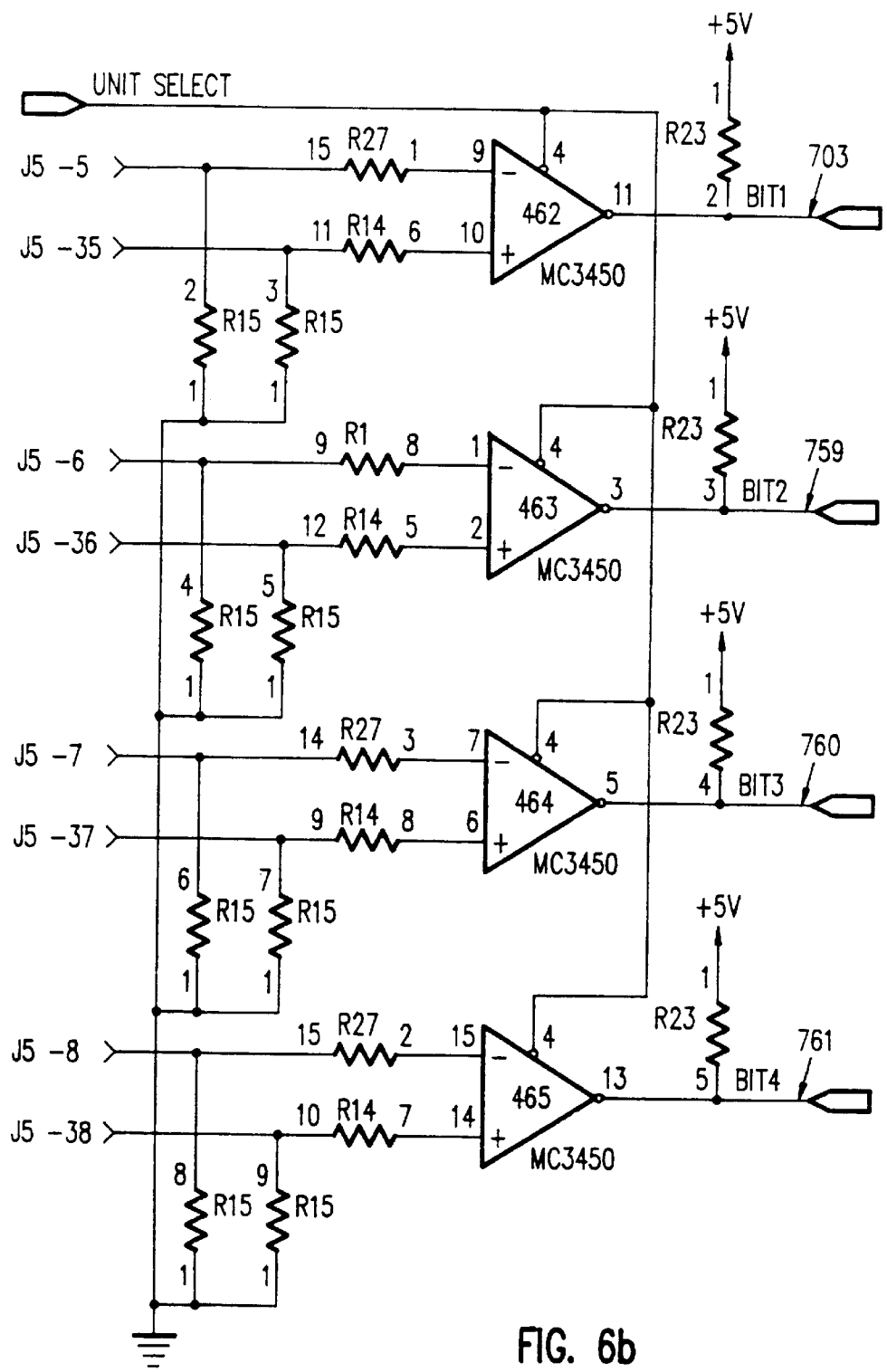

As shown in FIG. 3, the SMD disk controller sends data to the disk emulator over the SMD data cable. Since the SMD disk controller provides differential signals, each pair of lines in the data cable is connected to a differential current mode receiver 800, only one of which is shown in FIG. 3. FIG. 4, FIG. 5, and FIG. 6 are schematic diagrams of the interface between the lines in the SMD data cable and the SMD control cable and the lines in the disk emulator system. The schematic for the interface between the lines J4-20, J4-8, which provide data from the SMD disk controller, and the write data complement line 735 of the disk emulator is shown in FIG. 4. In this interface, which is also typical of the other interfaces shown in FIG. 4, FIG. 5, and FIG. 6, the differential signal on the lines J4-20, J4-8, which represents the data to be stored in the disk emulator, is coupled to a differential current mode receiver 547 in a MC3450 integrated circuit (which is a generally available integrated circuit-which may be purchased by ordering by that part number) through a line terminating resistor network R54, R54-1 and the signal generated on the output terminal of receiver 547 drives the write data complement line 735. In FIG. 4, FIG. 5, and FIG. 6 the size of the resistors in ohms is shown under the identification label.

Input Control Circuit

Figure 10A:
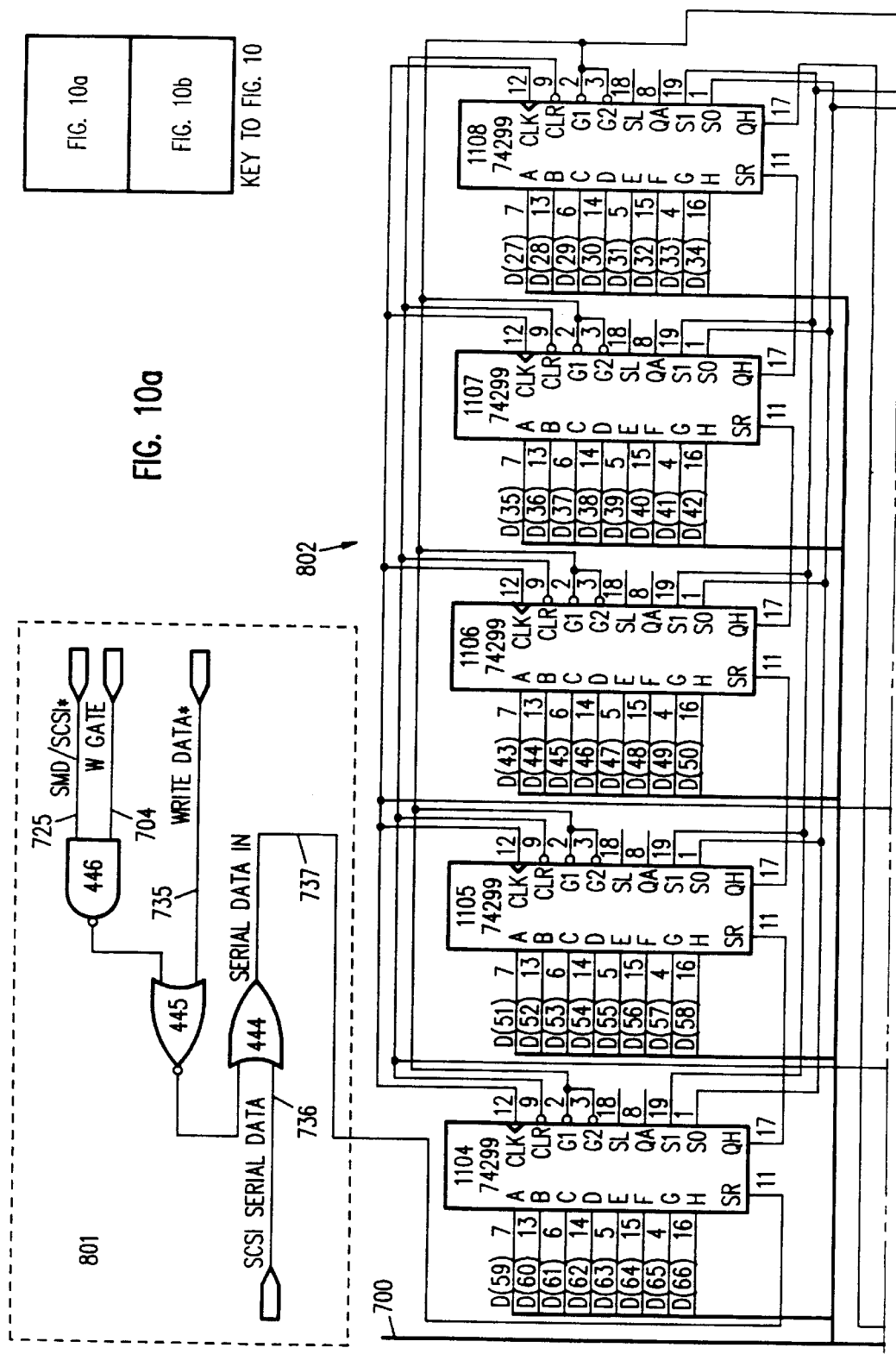
FIG. 10 is a schematic diagram of 66-bit shift register 802 in the disk emulator, and illustrates the interconnections to input control circuit 801, 66-bit parallel bus 700, and AND gate 593 which are also shown.
Figure 10B:
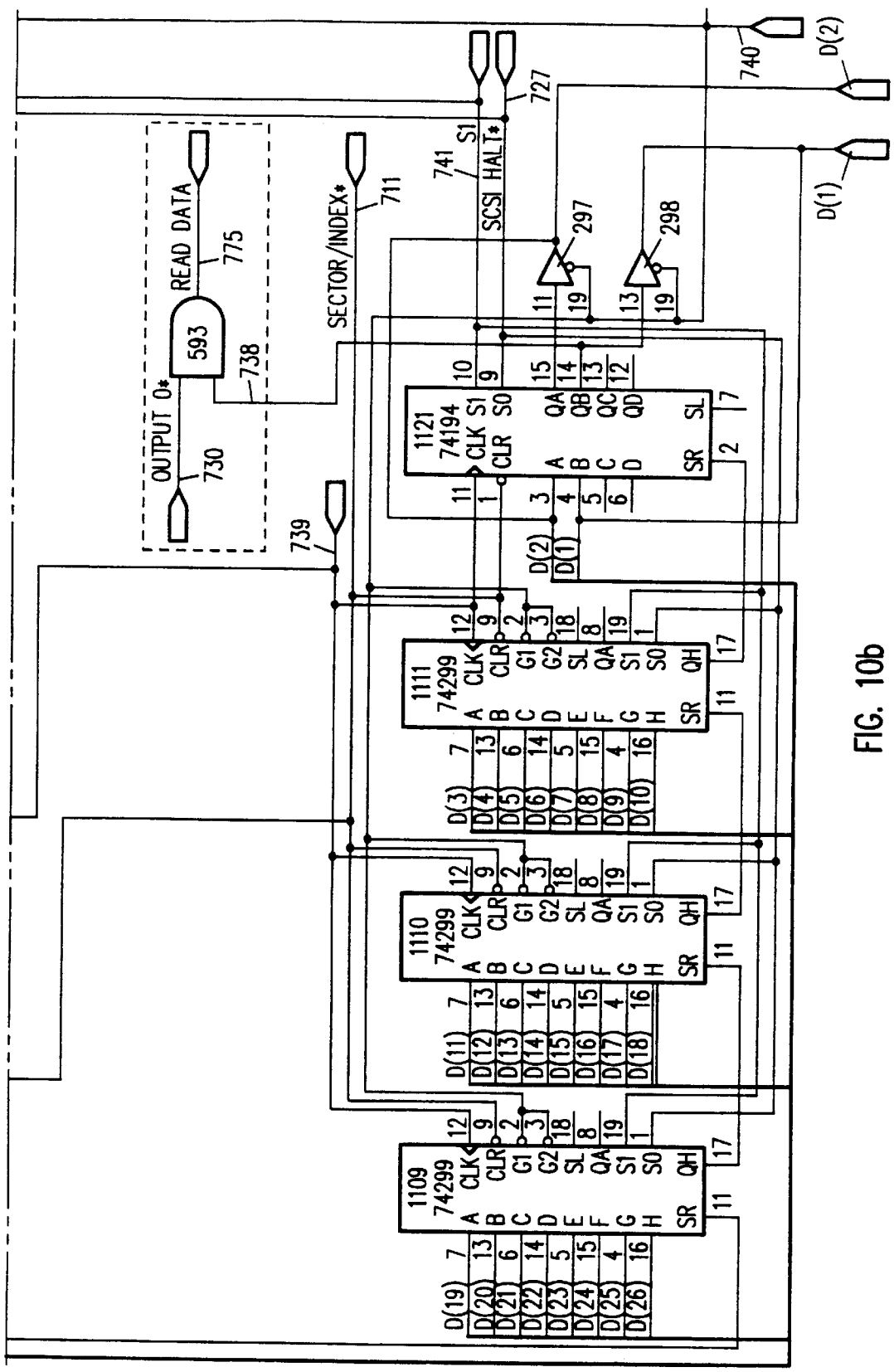

The write data complement line 735 is one of the input lines to input control circuit 801 in FIG. 3. The schematic for input control circuit 801 is illustrated in FIG. 9. During normal operation, input control circuit 801 determines the output signals on the serial data in line 737 to shift register 802 (FIG. 10).

If the signal on write gate line 704 is high, the input control circuit inverts the signals on write data complement line 735 and provides the resulting signals to the serial data-in line 737. The SMD/SCSI complement line 725 and the SCSI serial data line 735 to the input control circuit 801 are used in the back-up operation of the disk emulator and so during normal operation of the disk emulator, the signal on line 736 is low, and the signal on line 725 is high. If the signal on write gate line 704 is low, the input control circuit generates a low signal on serial data-in line 737 irrespective of the signal level on write data complement line 735.

Shift Register

Shift register 802 in FIG. 3 is a 66-bit shift register which performs the serializer/deserializer functions described previously. Shift register 802 is comprised of eight 74299 integrated circuits 1104–1111 and a 74194 integrated circuit 1121, as shown in FIG. 10. The 74299 integrated circuit (IC) is an eight-bit register having multiplexed parallel input/output terminals. Signals on the two function-select input terminals S0, S1 and two output-control input terminals G0, G1 of the 74299 IC determine the mode of operation of each register in the integrated circuit. The 74194 integrated circuit 1121 is a 4 bit bidirectional shift register. Since integrated circuit 1121 does not have controlled parallel input/output terminals, the three state buffers 297, 298 in FIG. 10 are connected to the output terminals QA and QB, respectively, of integrated circuit 1121.

In the write mode, when the shift register 802 functions as a deserializer, data are supplied to shift register 802 over serial data-in line 737 and the.,data are shifted through shift register 802 by clock pulses on shift register clock line 739 which is connected to each of the terminals CLK of integrated circuits 1104–1111, 1121 and to the output terminal Y3 of multiplexer 1125. With the exception described below, as the data move through shift register 802, the data are simultaneously available on parallel bus 700. Accordingly, when a full 66-bit word is in shift register 802, the 66-bit word is available to the other circuits in FIG. 3 which are on 66-bit parallel bus 700. However, during the time interval when data are being written into DRAM array 822, a high signal on the shift register output control line 740 from multiplexer 1125 to the terminals $\overline{G1}$, $\overline{G2}$ of the integrated circuits 1104–1111 and the inverters on the control terminal of the three-state buffers 297, 298 tri-states the parallel output terminals in the integrated circuits, and so during this time the signals in the registers of shift register 802 are not on 66-bit parallel bus 700. While the parallel output terminals of shift register 802 are tri-state, data are still being shifted through shift register 802 on a serial data path.

In the read mode, when shift register 802 functions as a serializer a high signal on S1 line 741 from read counter circuit 810 (shown in FIGS. 3 and 18) is applied to terminals S1 of integrated circuits 1104–1111, 1121. This high signal enables the parallel input terminals of shift register 802 and consequently signals on parallel bus 700 are simultaneously parallel loaded into shift register 802. The 66-bit word is then shifted through the shift register onto serial data output line 738 by the clock pulses on shift register clock line 739. The sequence and generation of the control signals to shift register 802 are described in more detail below.

The shift register 802 is cleared when the signal on sector/index complement line 711, which is connected to each terminal CLR of the IC's 1104–1111, 1121, goes low.

Latch Circuit

Figure 11A:
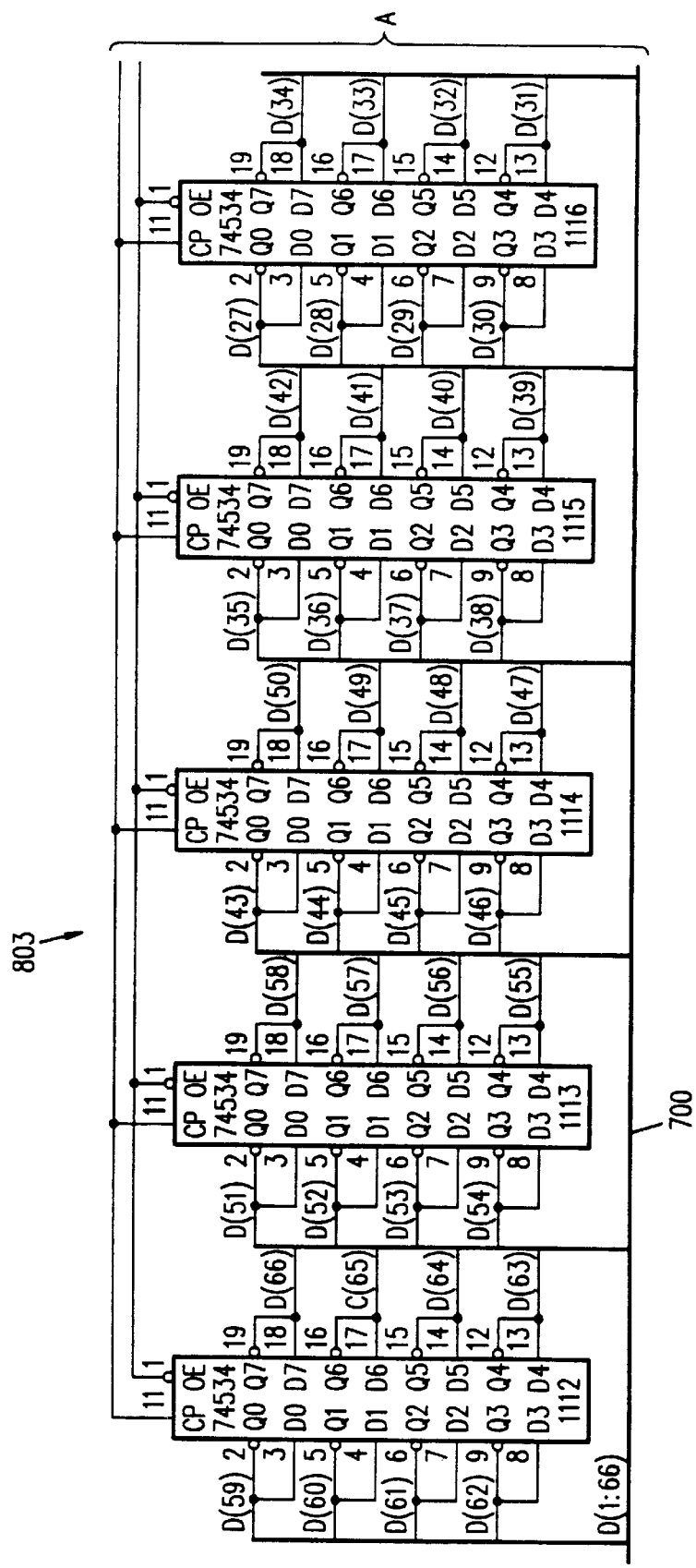
FIG. 11 is a schematic diagram of latch circuit 803 of the disk emulator and illustrates the connections of latch circuit 803 to 66-bit parallel bus 700.
Figure 11B:
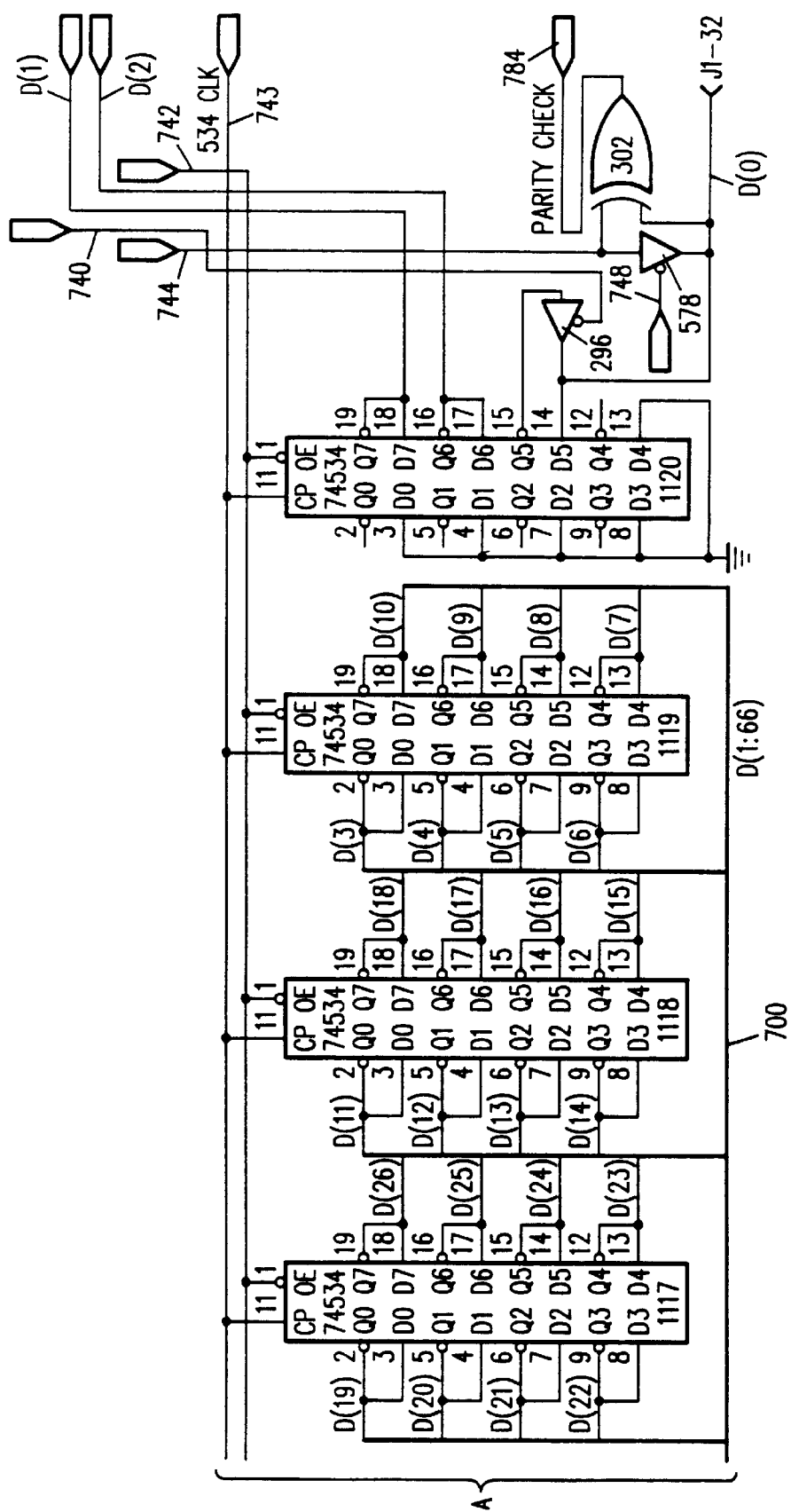

In writing to the disk emulator, the SMD disk controller provides data to shift register 802 at extremely high speeds since the disk emulator is designed to operate at a clock frequency of up to 50 Megahertz. If the disk emulator operates at a speed of 25 Megahertz, a 66-bit word exists on shift register 802 for only forty nanoseconds, and it is extremely difficult to write a 66-bit word from shift register 802 into DRAM array 822 in this time frame. Thus, at the precise moment a 66-bit word exists in shift register 802, latch clock/error detection circuit 805 (FIG. 3 and FIG. 31) generates a clock pulse on latch clock line 743 which is connected to the terminal CP of each of integrated circuits 1112–1120 comprising latch circuit 803, shown in FIG. 11. This clock pulse captures in latch circuit 803 the 66-bit word from shift register 802 on parallel bus 700. The latched 66-bit word is available to be written to DRAM array 822, while the next word is filling shift register 802. Hence, rather than requiring a write operation to the DRAM array 822 in 40 nanoseconds, the write simply must be performed within 2.6 microseconds. After the data are latched in circuit 803, a signal on shift register output control line 740, described above, from multiplexer 1125 tristates buffer 296 in FIG. 11 and the parallel output terminals of shift register 802 which are connected to parallel bus 700. Simultaneously, a low signal is provided on latch output enable line 742, which is connected to terminal $\overline{OE}$ of each integrated circuit 1112–1120 and to the output terminal Y4 of multiplexer 1125. Thus, the low signal on line 742 enables the output terminals of integrated circuits 1112–1120 and consequently provides the 66-bit word stored in the latches of latch circuit 802 to 66-bit parallel bus 700, because each line D(1)–D(66) of parallel bus 700 is connected to an output terminal of one of the latches in integrated circuits 1112–1120, as shown in FIG. 11. At this time, the 66-bit word is also provided to parity circuit 804 (FIG. 3 and FIG. 12) and consequently parity circuit 804 generates a parity bit for the 66-bit word stored in circuit 803 on parity bit line 744.

In the read mode, the word on 66-bit parallel bus 700 and the parity bit on line D(0), both from the DRAM array 822, are latched in latch circuit 803 by a clock pulse on latch clock line 743 from latch clock/error detection circuit 805. When shift register 802 is ready to receive a new word, the signal on latch output enable line 722 to latch circuit 803 is low and the signal on S1 line 741, which connects each input terminal S1 of each of the integrated circuits 1104–1111, 1121 in shift register 802 to the read counter circuit 810, goes high. Since the signal on input terminal S0 of each of the ICs 1104–1111, 1121 is high during normal operation of the disk emulator, the parallel input terminals of the shift register which are connected to 66-bit parallel bus 700 are enabled. Thus, the 66-bit word stored in latch circuit 803 is loaded into shift register 802 over 66-bit parallel bus 700. Prior to the parallel transfer of the 66-bit word from latch circuit 803 to shift register 802, the 66-bit word is error corrected, as described below. The generation and sequence of the control signals to latch circuit 803 are also explained more fully below.

Since latch circuit 803 latches inverted data, the input terminal of each register in latch circuit 803 is tied to the output terminal of the register. Then, after a word is latched in latch circuit 803, a second clock pulse is applied to latch circuit 803 on latch clock line 743 while latch circuit 803 is in the enabled state. The second clock pulse causes latch circuit 803 to latch on the inverted data. The result is that latch circuit 803 now contains the original word rather than the inverted word. This is true in both the read and write modes.

As shown in FIG. 11, the latch circuit is comprised of nine 75534 integrated circuits 1112–1120. A 74534 integrated circuit is an eight bit edge triggered inverting register having the output line of each register coupled to a three-state output buffer. Accordingly, each of the latches referred to previously is a register in one of the integrated circuits 1112–1120.

Parity Circuit

Figure 12A:
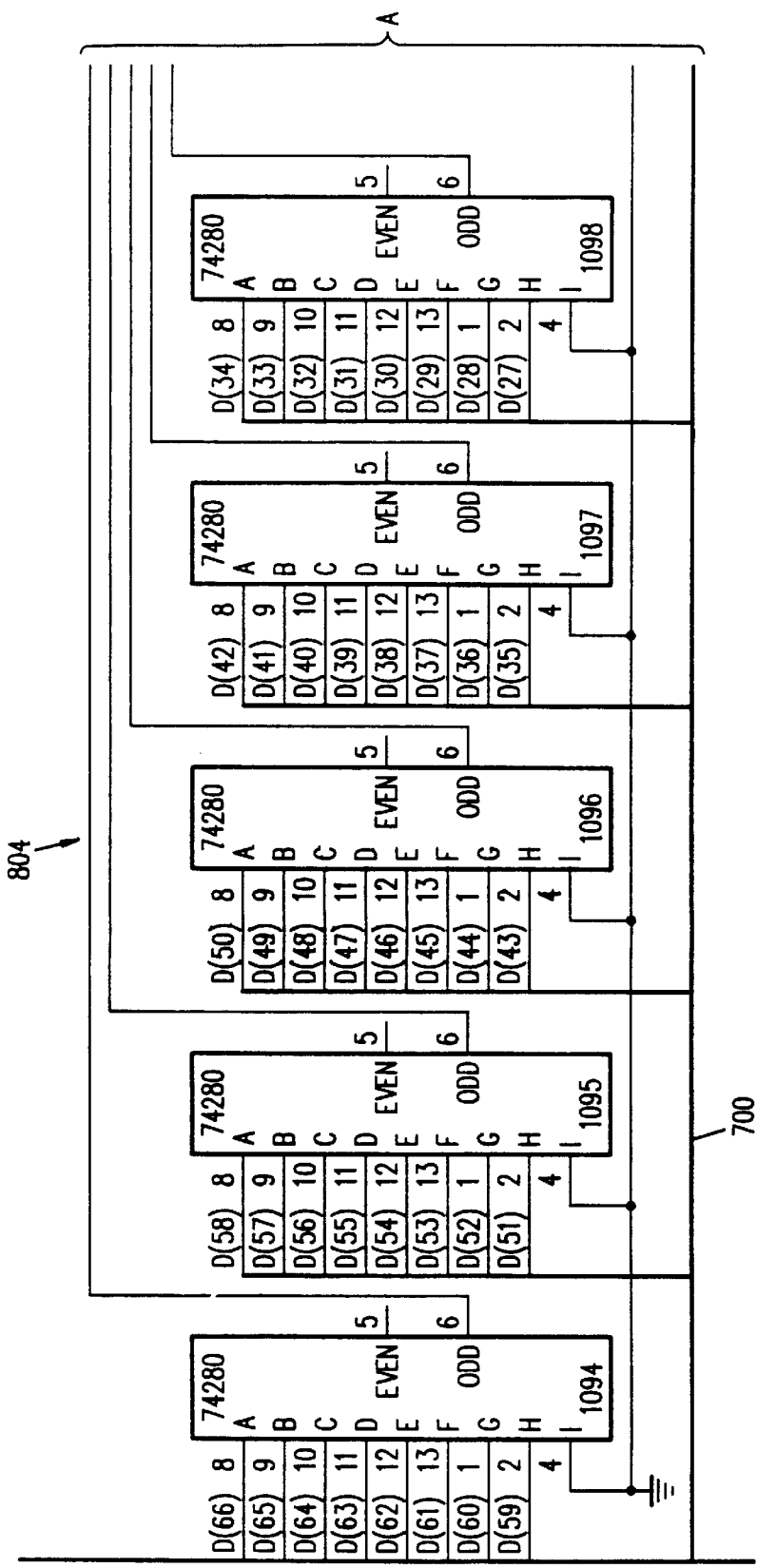
FIG. 12 is a schematic diagram of parity circuit 804 of the disk emulator and illustrates the connections of parity circuit 804 to 66-bit parallel bus 700.
Figure 12B:
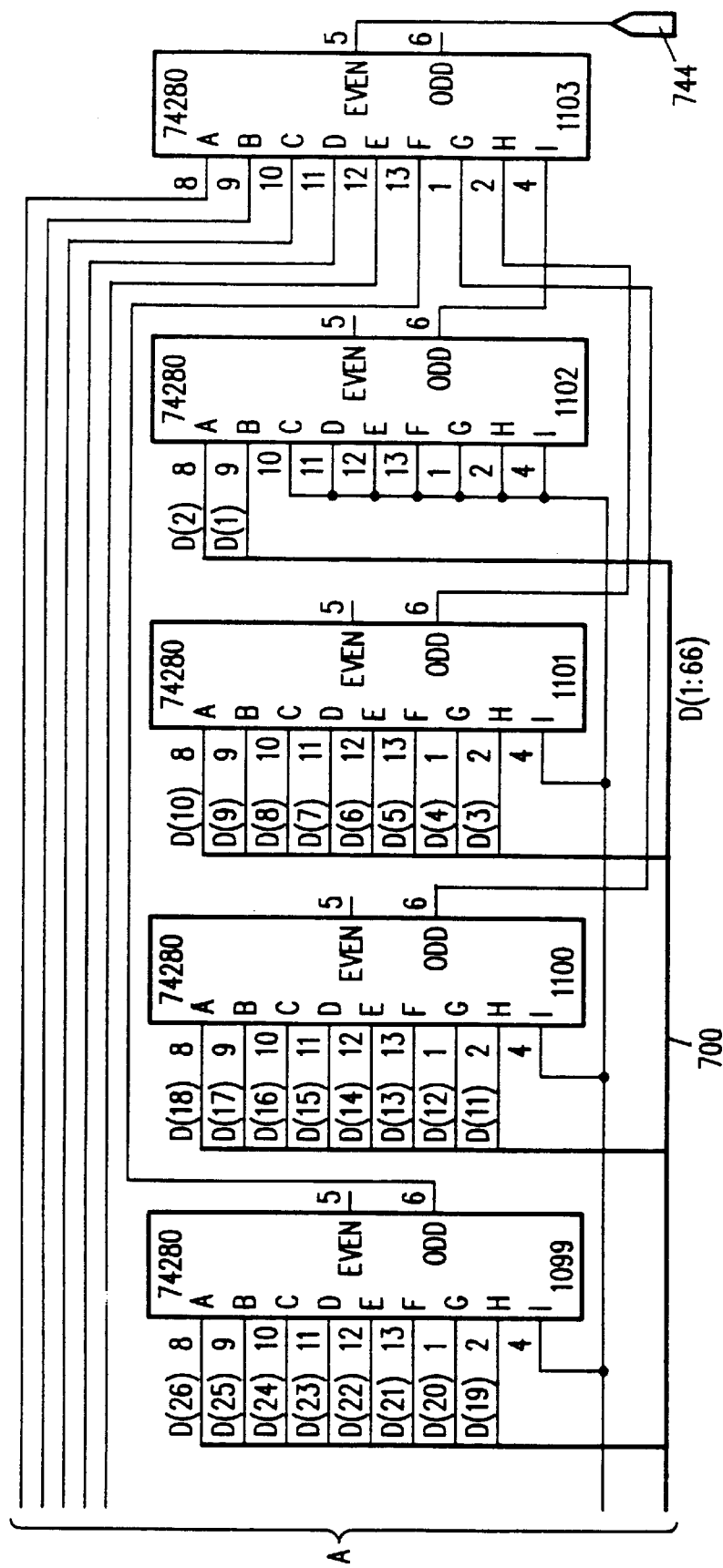

The parity circuit 804 in FIG. 3 and FIG. 12 is also on 66-bit parallel bus 700. In the write mode, as previously described, after a 66-bit word is latched and inverted in latch circuit 803, the parallel-output terminals of shift register 802 are tristated and the output terminals of latch circuit 803 are enabled. The inverted word is again inverted so as to obtain the original word in latch circuit 803. Consequently, the original 66-bit word stored in latch circuit 803 is on parallel bus line 700 and therefore the 66-bit word is input to the parity generation circuit 804. The parity generation circuit provides an even parity signal on parity bit line 744 to latch circuit 803 which in turn passes the parity bit to DRAM array 822 over line D(0). The generation of the parity bit using the word in latch circuit 803 is one of the features of the disk emulator which enables the disk emulator to work at clock frequencies as high as 50 MHz.

In the read mode, the output function of the parallel input/output terminals in shift register 802 are tri-state. Thus, the 66-bit word on parallel bus 700 from DRAM array 822 is only available to latch circuit 803 and parity circuit 804. When latch circuit 803 captures the 66-bit word and the stored parity bit from DRAM array 822, parity circuit 804 provides a new parity bit on parity bit line 744, which corresponds to the parity of the word retrieved from DRAM array 822. The new parity bit is provided only to the first input terminal of Exclusive OR gate 302.

The stored parity bit from the DRAM array is provided to the second terminal of Exclusive OR gate 302 on line D(0). Thus, if the output signal from Exclusive OR gate 302 is high, an error occurred while the word was stored, after storage, or during read in DRAM array 822 of the disk emulator and the error correction method, described below, corrects the error.

The parity circuit 804 in FIG. 3 is comprised of ten 74280 integrated circuits 1094–1103 which are interconnected with each other and the parallel bus 700 as shown in FIG. 12.

Multiplexer

Figure 13:
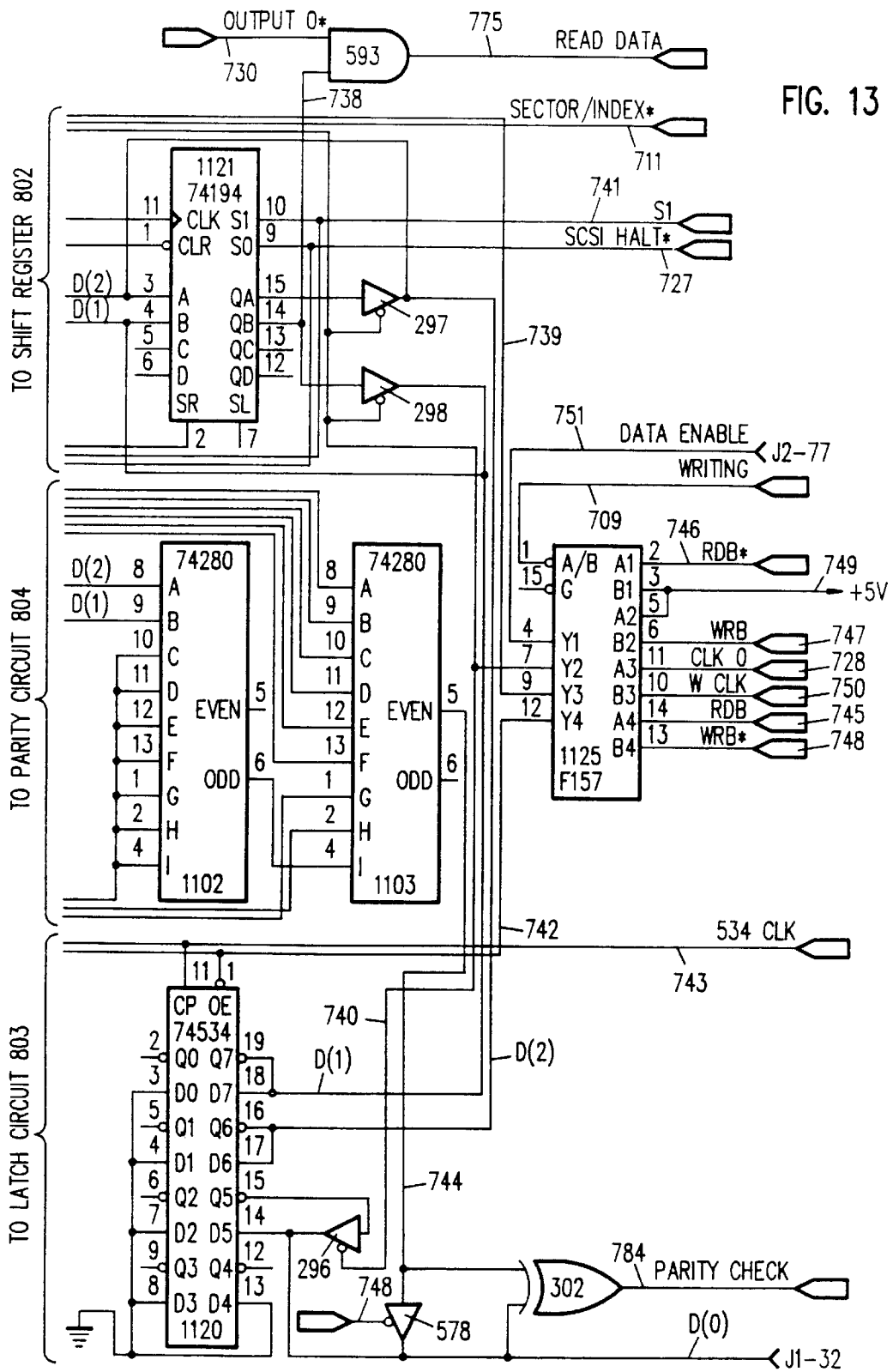
FIG. 13 illustrates the connections to multiplexer 1125 used to provide read control signals and write control signals to shift register 802 and latch circuit 803 in the disk emulator.

The multiplexer 1125 in FIG. 3 and FIG. 13 selects control signals which are applied to shift register 802 and latch circuit 803. Multiplexer 1125 has two sets of input lines. The first set of input lines, described below, provides read control signals to shift register 802 and latch circuit 803 while the second set of input lines, also described below, provides write control signals.

When the signal on writing line 709, which connects writing flag circuit 811 (FIG. 3 and FIG. 24) to the input terminal A/B of multiplexer 1125 (FIG. 3 and FIG. 13) is low, the first set of input lines is coupled to the output terminals of multiplexer 1125. The signal on read B complement line 746 from latch clock/error detection circuit 805 (FIG. 3 and FIG. 31) is applied to the first output terminal of multiplexer 1125; the positive supply voltage on line 749 is applied to the second output terminal of multiplexer 1125; the signal on clock zero line 728 is applied to the third output terminal of multiplexer 1125 and the signal on read B line 745 from latch clock/error detection circuit 805 is applied to the fourth output terminal of multiplexer 1125.

If the signal on writing line 709 is high, the second set of input lines is coupled to the output terminals. That is, the positive supply voltage on line 749, the signal on write B line 747 from write B circuit 814 (FIG. 3 and FIG. 39), the signal on write clock line 750, and the signal on write B complement line 748 from write B circuit 814 are applied to output terminals Y1 to Y4 of multiplexer 1125, respectively.

The multiplexer 1125, as shown in FIG. 13, is a 74157 integrated circuit. The 74157 integrated circuit is a quad two input multiplexer which selects four bits of data from two sources under the control of the signal on the input terminal A/B.

The shift register 802, parity circuit 804, and latch circuit 803 are utilized both in reading data from DRAM array 822 and in writing data to DRAM array 822. Thus, these circuits perform a dual function and their mode of operation is determined by the additional circuitry shown in FIG. 3. Utilizing shift register 802, parity circuit 804 and latch circuit 803 for both read and write operations minimizes the number of components in the disk emulator which reduces both the cost and the size of the circuitry.

Comparator Circuit

Figure 1:
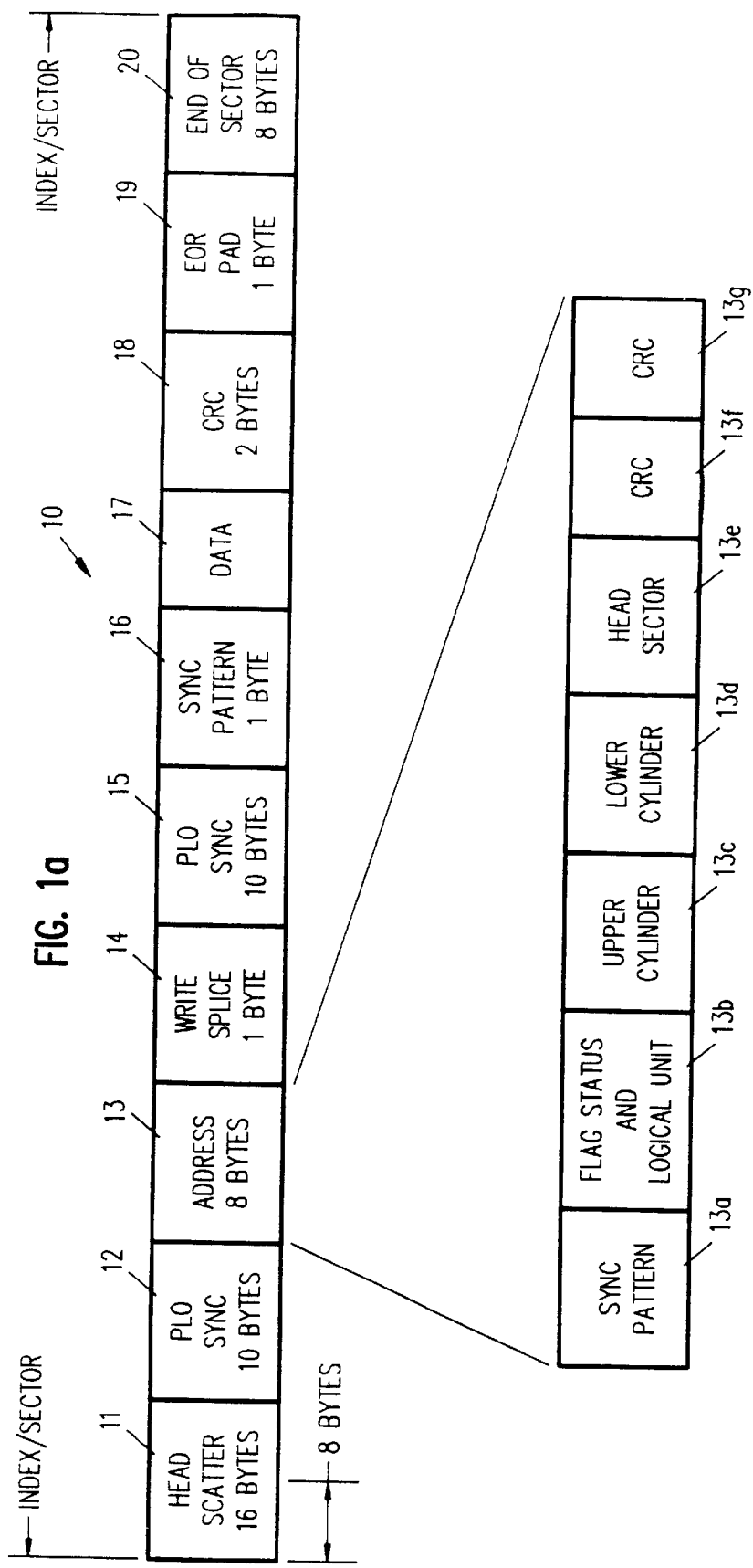
FIG. 1a and FIG. 1b illustrate the contents of a typical sector as defined by the SMD interface convention.

In the write operation, all the data which comes from the SMD disk controller is not stored in DRAM array 822. Only the address field and the data field of each sector, as shown in FIG. 1, are unique. Therefore, the disk emulator of this invention is designed to strip away the nonsector-specific data from the data provided by the SMD disk controller and to store in the disk emulator's DRAM array 822 only the data which are sector specific. This approach also reduces the cost and size of the disk emulator, because the size of DRAM array 822 is reduced. However, more importantly, as explained later, this approach significantly enhances the utilization of the storage medium in comparison to the utilization of the storage medium of a conventional hard disk drive.

The 64 sixty-six bit words stored by the disk emulator as a sector comprise a zeroth word which is the address field for the sector and the first word through the sixty-third word which comprise the data field of the sector. Accordingly, to capture only sector specific data in the write mode, a means is needed to ascertain when the address field is in shift register 802 and when each of the first word through sixty-third words, comprising the data field, are in shift register 802, or, in terms of the previous description, the first clock signal to the latch circuit 803 on latch clock line 743 must be generated when the address field is in the shift register and another clock signal on latch clock line 743 must be generated as each word of the data field fills shift register 802.

After the first word of the data field is detected, the SMD disk controller provides a continuous stream of data so that a counter circuit which accumulated the number of clock pulses to shift register 802 and generated a clock signal to latch circuit 803 for each 66-bit word would capture the remaining words in the sector. Also, by counting the number of clock pulses to latch circuit 803, the end of the sector can be determined. Comparator circuit 815, write control circuit 806, and memory word counter circuit 807 in FIG. 3 implement this conceptual approach.

The detection of the address field, the zeroth word of the sector, and the first word of the data field is facilitated by the SMD interface convention. As shown in FIG. 1, the address field 13 and the data field 17 are each proceeded by a one byte sync pattern 13a, 16. The sync patterns 13a, 16 are usually the same, but in some embodiments of the SMD interface convention they are different. Therefore, comparator circuit 815 has two comparators. The first comparator is programmed to detect the sync pattern in the address field on the 66-bit parallel bus 700 and the second comparator is programmed to detect the sync pattern in front of the data field 17.

Figure 14:
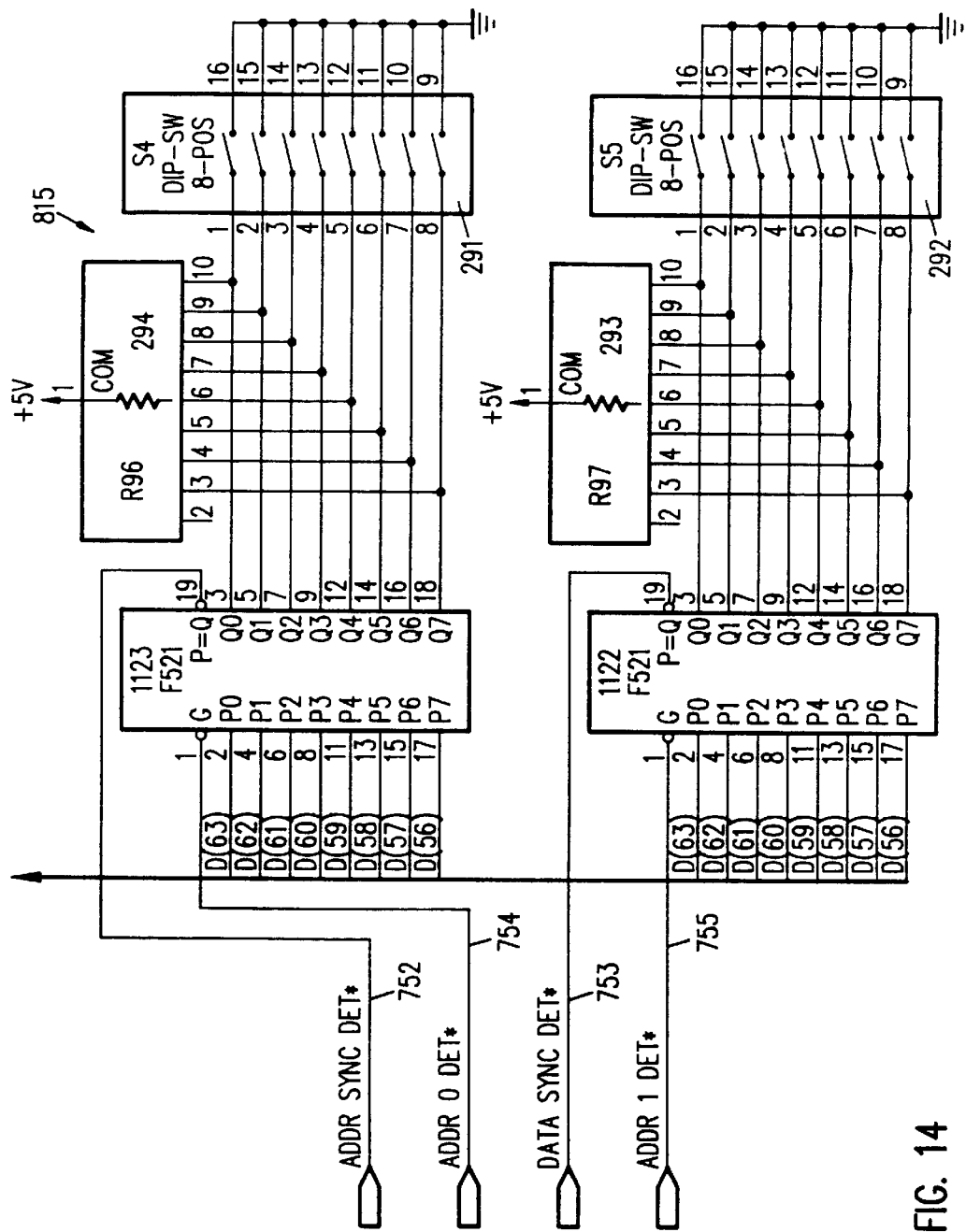
FIG. 14 is a schematic diagram of comparator circuit 815 in the disk emulator.

The comparator circuit 815 is comprised of two 74F521 integrated circuits 1122, 1123 and two eight position DIP switches 291, 292, as shown in FIG. 14. The 74F521 integrated circuit is an eight bit identity comparator. To program the comparators, the lines D(10)–D(3) of 66-bit parallel bus 700 are connected to the input terminals P0–P7 respectively of comparator integrated circuit 1123 and to the input terminals P0–P7 respectively of comparator integrated circuit 1122. Notice that for lines D(3)–D(10), the number of the line does correspond to the bit of the word and in fact, line D(3) carries the signal corresponding to the tenth bit of the word while line D(10) carries the signal corresponding to the third bit of the word.

Each of the input terminals Q0–Q7 of the comparator integrated circuit 1123 is connected to the positive supply voltage through a resistor in resistor package 294 and to ground through one of the switches in the eighth position dip switch 291. Similarly, the terminals Q0–Q7 of integrated circuit 1122 are connected to the positive supply voltage through a resistor in resistor package 293 and to ground through one of the switches in the eight position dip switch 292. By opening and closing the appropriate switches in the eight position dip switches prior to using the disk emulator, the signals on the terminals Q0–Q7 of comparators 1122, 1123 may be set so that the comparators will detect any 8 bit sync pattern used in implementation of the SMD interface convention.

Figure 15:
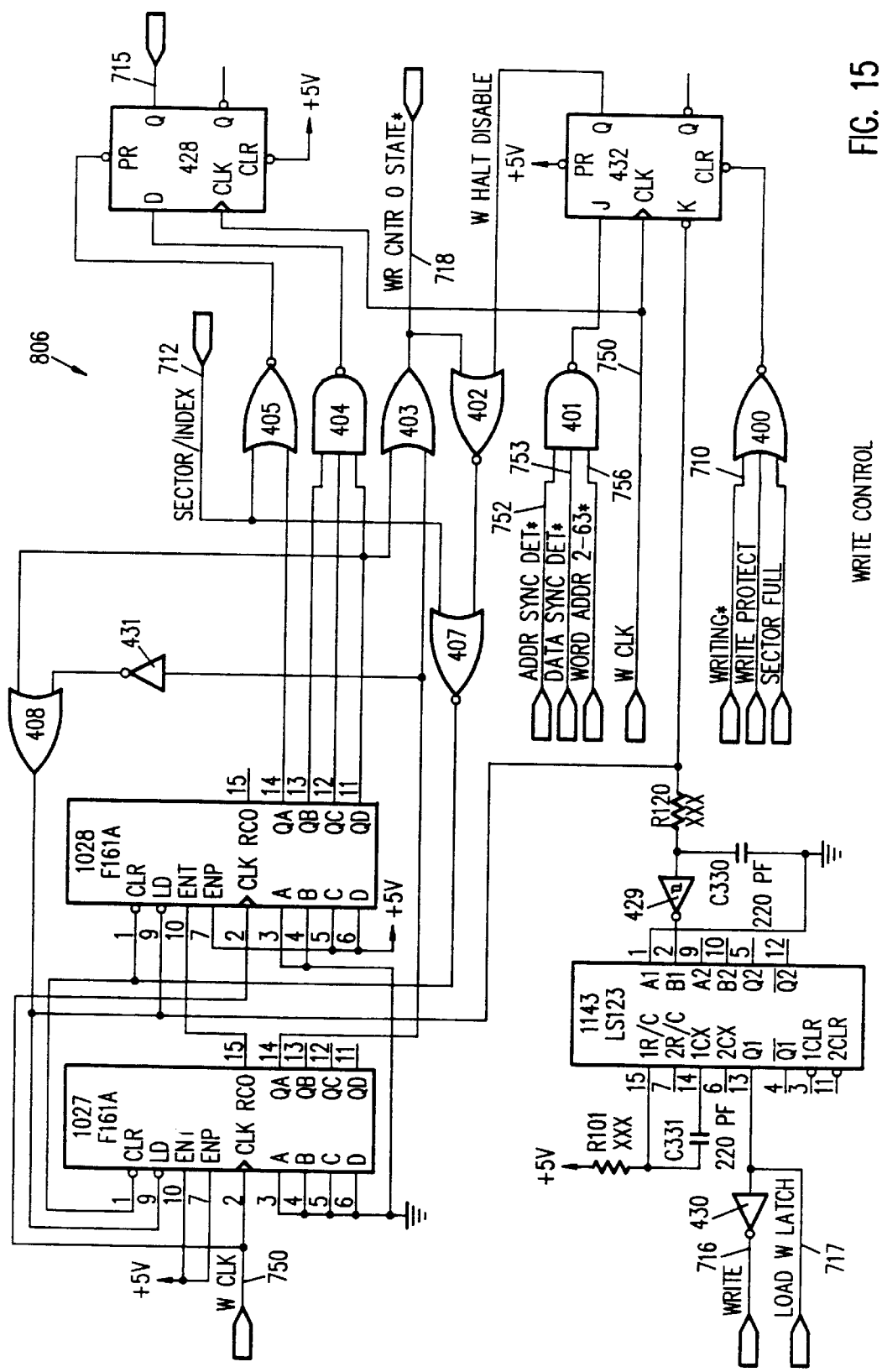
FIG. 15 is a schematic diagram of write control circuit 806 in the disk emulator.

When the comparator circuit 815 detects the programmed address sync pattern (block 13a in FIG. 1), a low signal is generated on the address sync detection complement line 752 to write control circuit 806. Similarly, when the data sync pattern (16) is detected, a low signal is generated on the data sync detection complement line 753 to write control circuit 806 (FIG. 3 and FIG. 15).

To prevent spurious signals on lines 752, 753 due to data patterns that look like sync patterns, memory word counter circuit 807 (FIG. 3 and FIG. 19) generates a signal on address zero detection complement line 754 which disables the address sync comparator except when the comparator is needed to detect the address sync pattern. Memory word counter 807 also generates a signal on address one detection complement line 755 which disables the data sync comparator except when the comparator is needed to detect the data sync pattern. The generation and timing of these signals are discussed more completely below.

Write Control Circuit

The next clock pulse on the write clock line 750 after detection of the programmed address sync pattern by comparator circuit 815 shifts the one additional bit through shift register 802 and in combination with the low signal on address sync detection complement line 752 enables write control circuit 806. The second clock pulse on write clock line 750 after detection of the programmed address sync pattern shifts the data a second additional bit through shift register 802 and write control circuit 806 generates a signal on load write latch line 717 to latch clock/error detection circuit 805. As will be described later, latch clock/error detection circuit 805 generates a clock pulse on latch clock line 743 when the signal on load write latch line 717 is received. Hence, two clock pulses after the detection of the address sync pattern the 66-bit word in shift register 802 is loaded into latch circuit 803. The timing sequence between the detection of the sync pattern by comparator circuit 815 and the generation of the latch clock pulse dictates the location of the comparator circuit 815 on 66-bit parallel bus 700. If the number of clock pulses between the detection of the sync pattern and the generation of a clock pulse on latch clock line 743 is n, then the comparators must be located at positions n+1 through n+8 on the 66-bit parallel bus 700 where the first position on the 66-bit parallel bus 700 is the most significant bit of the word and n=1.

Figure 39:
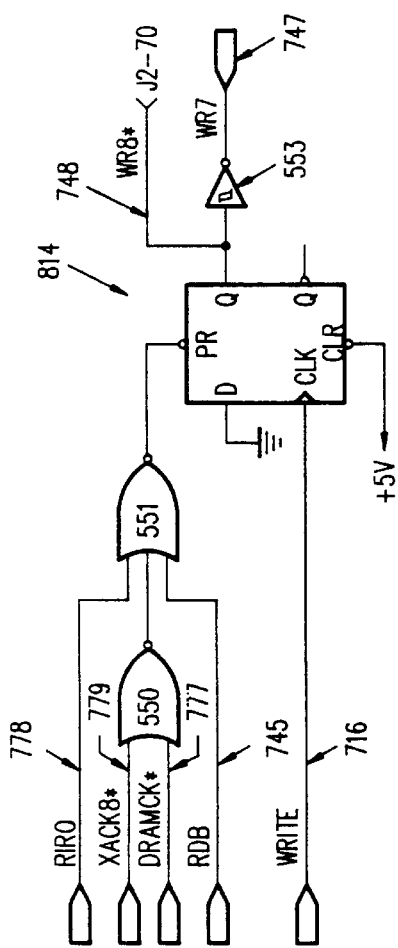
FIG. 39 is a schematic diagram of write B circuit 814 in the disk emulator.
Figure 41:
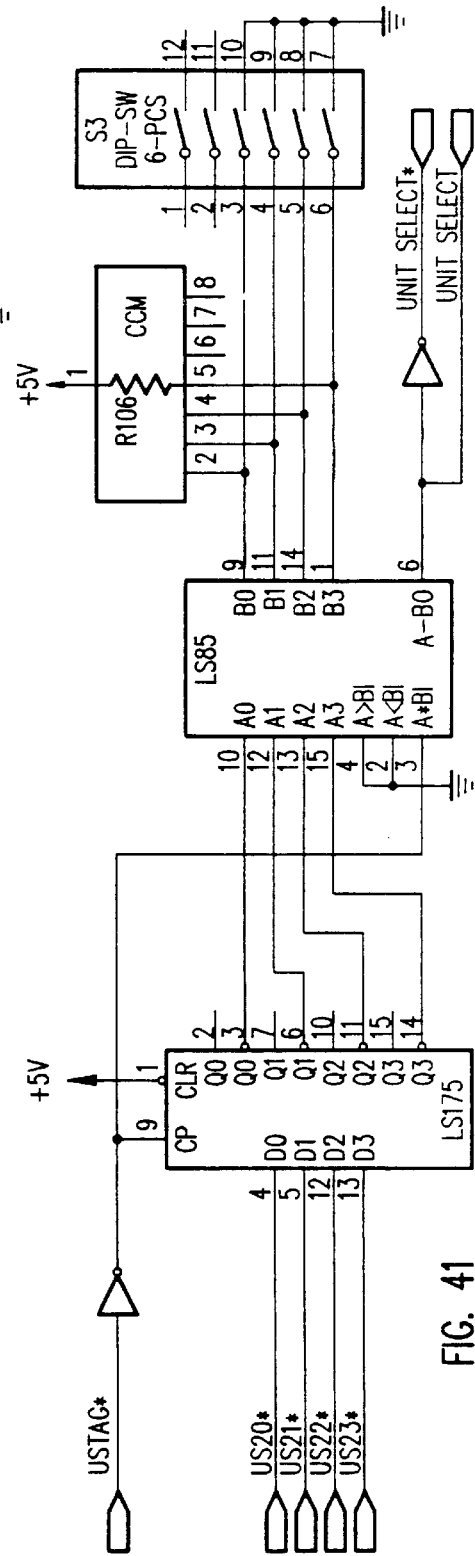
FIG. 41 is a schematic diagram of the unit select circuit in the disk emulator.
Figure 43B:
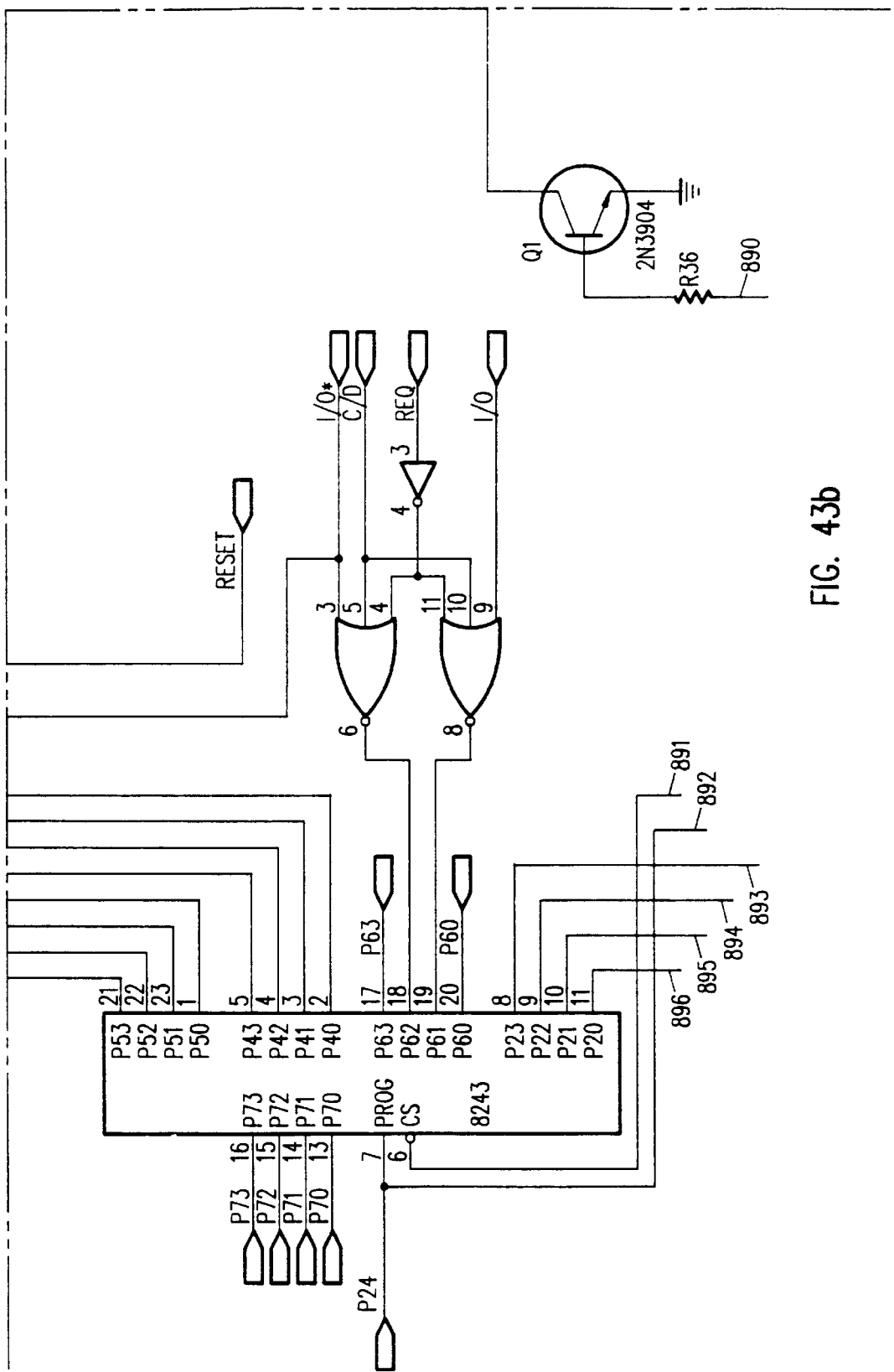
FIG. 43 is a schematic diagram of a first portion of SCSI back-up system 101 in the disk emulator.
Figure 43C:
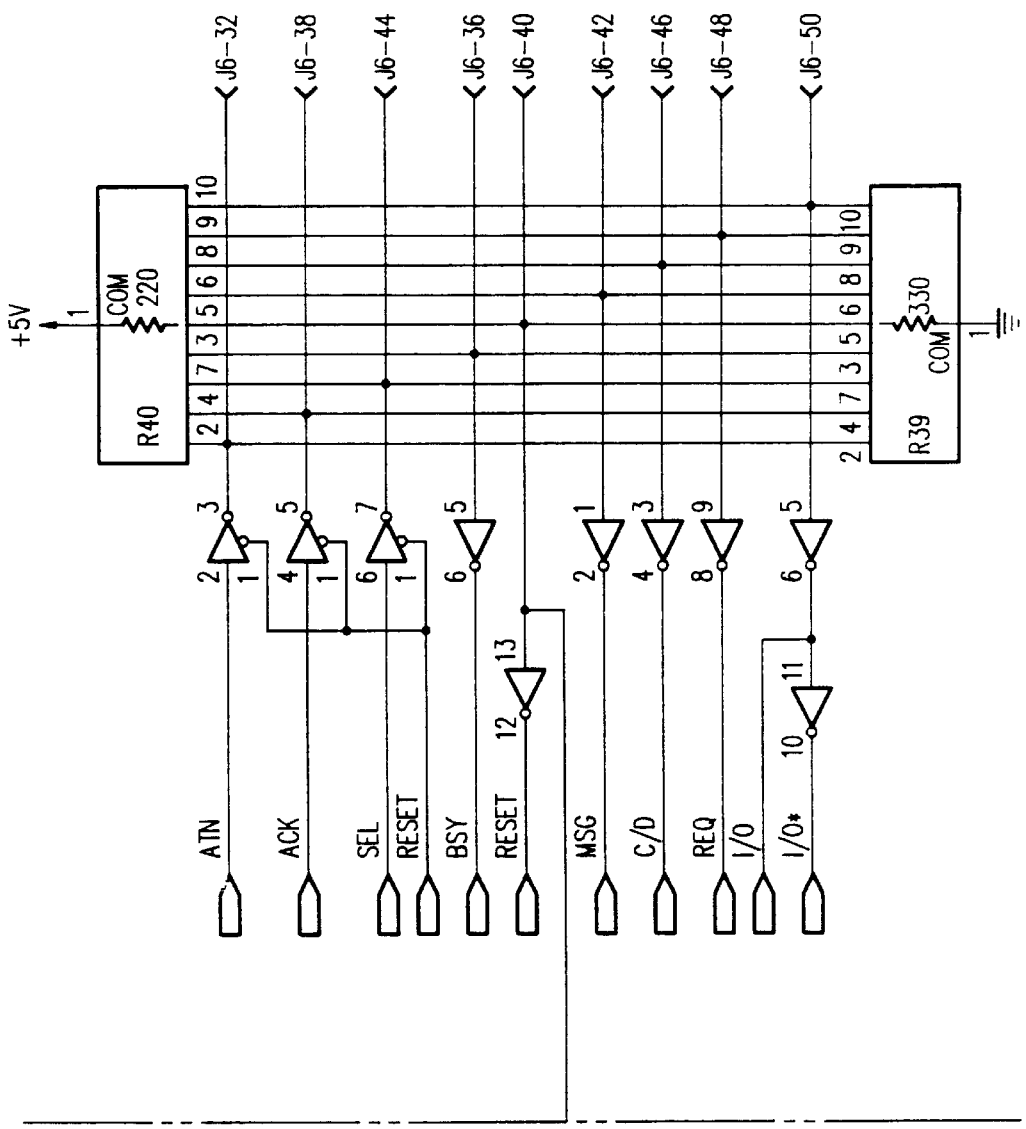
Figure 44B:
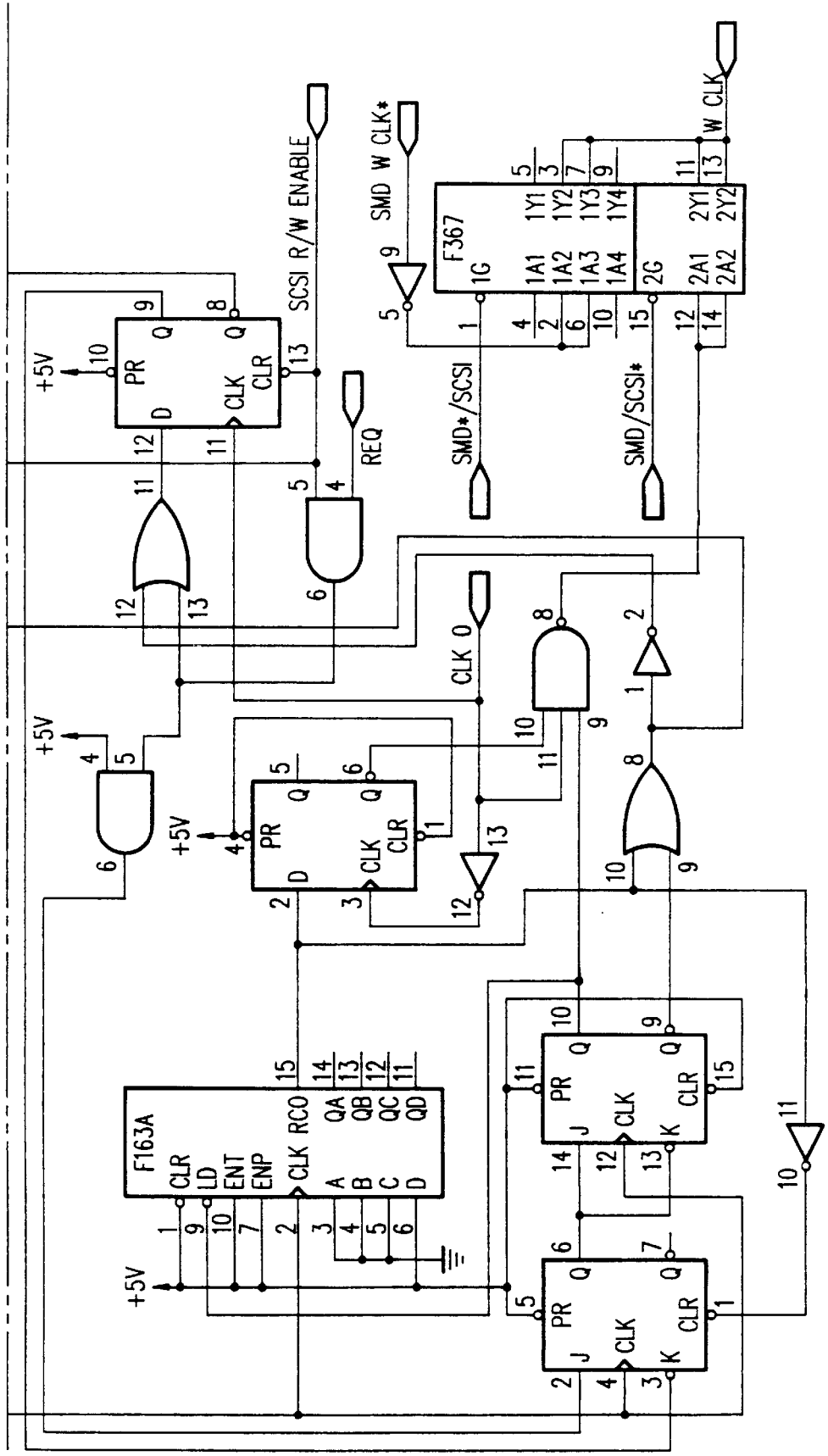
FIG. 44 is a schematic diagram of the second and remaining portion of SCSI back-up system 101 in the disk emulator.
Figure 45A:
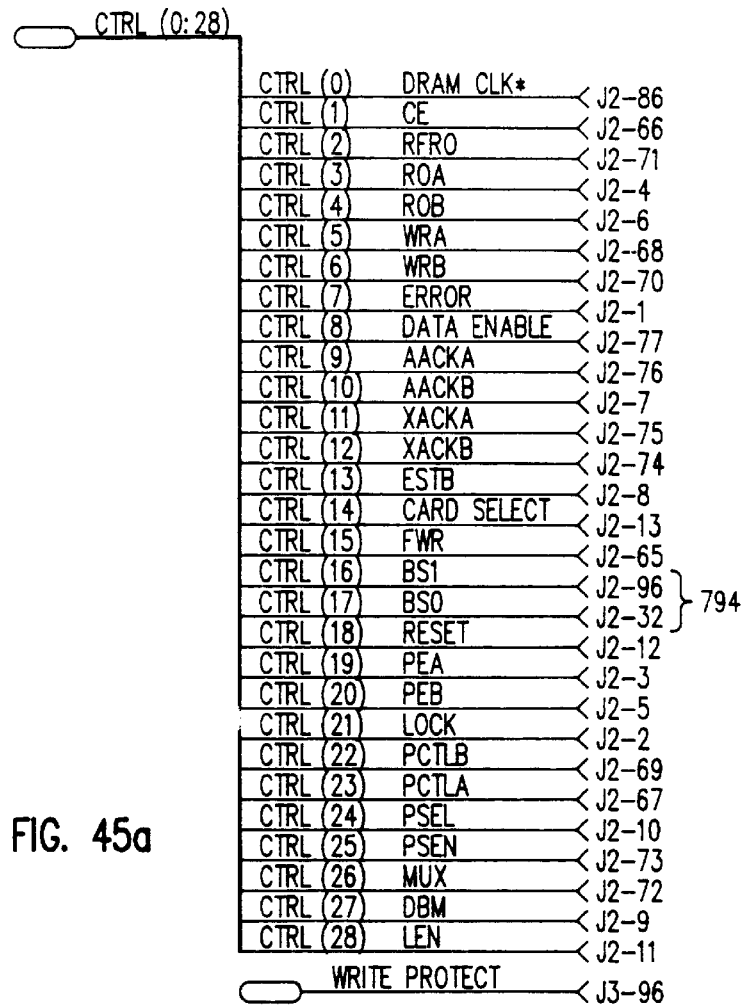
FIGS. 45a through 45d identify the individual lines included in the cables used in the disk emulator.
Figure 45B:
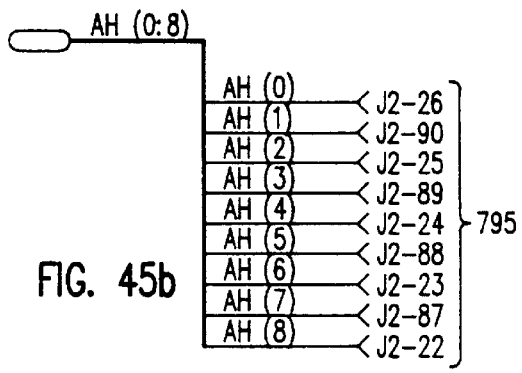
Figure 45C:
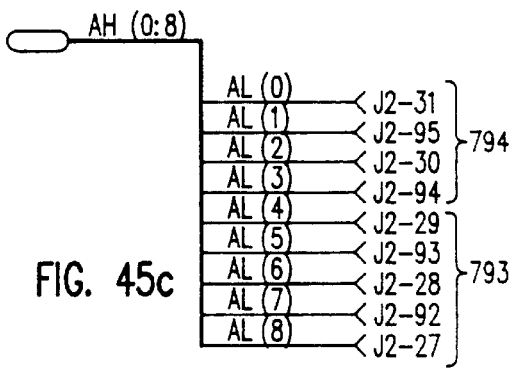
Figure 45D:
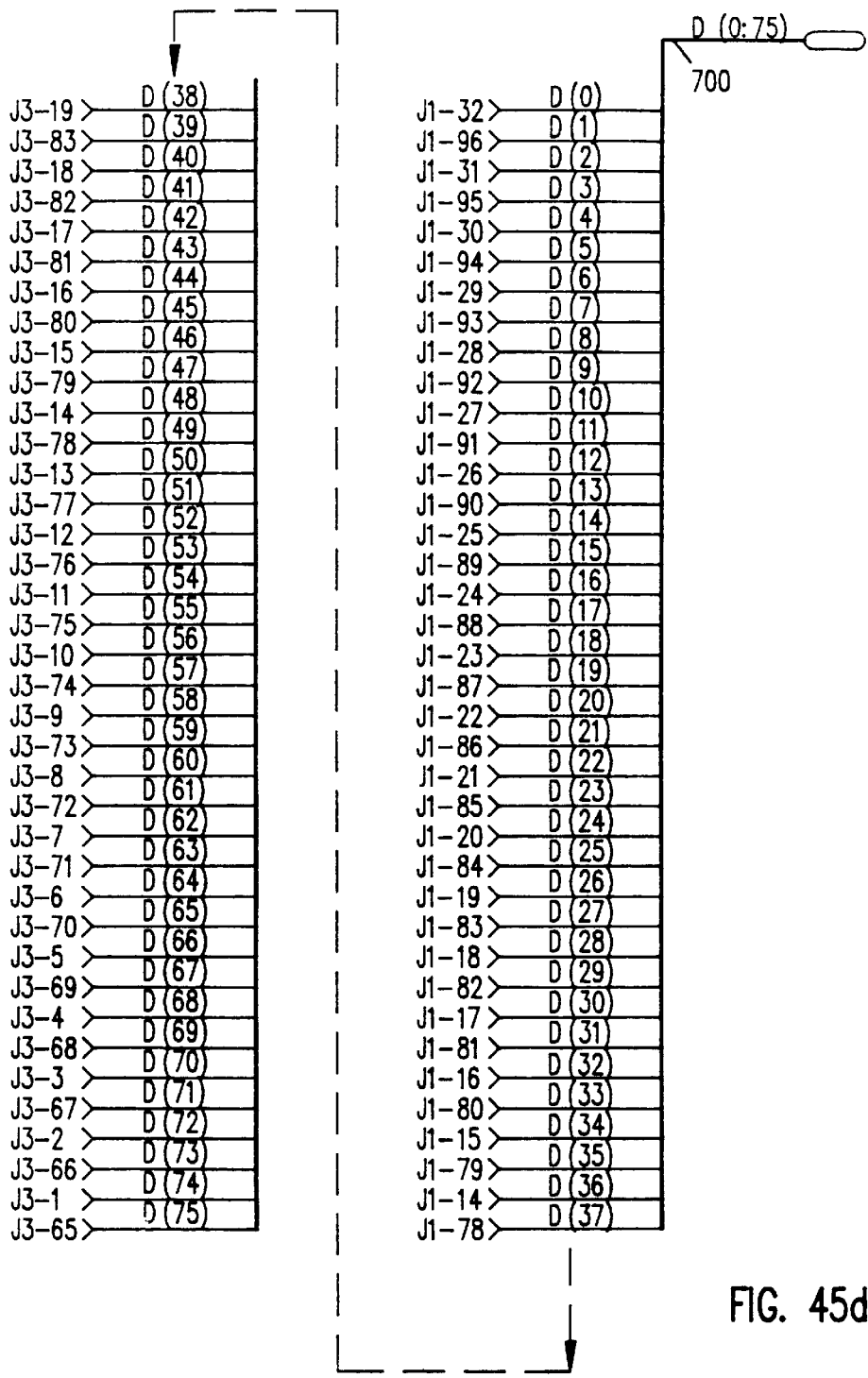

After the write control circuit 806 (FIG. 3 and FIG. 15) generates a signal on load write latch line 717, write control circuit 806 subsequently generates a high signal on the write line 716 to write B circuit 814 (FIG. 3 and FIG. 39). The write B circuit 814 then generates signals on the write B line 747 and write B complement line 748 to multiplexer 1125 (FIG. 3 and FIG. 13), described previously. The low signal on write B complement line 748 is also applied to input terminal $\overline{\text{WRB}}$ of the 8207 DRAM controllers 820 (FIG. 3 and FIG. 25) which in turn enables the area in the DRAM array 822 where the word from latch circuit 803 and the associated parity bit on parallel bus 700 are to be written.

Figure 19A:
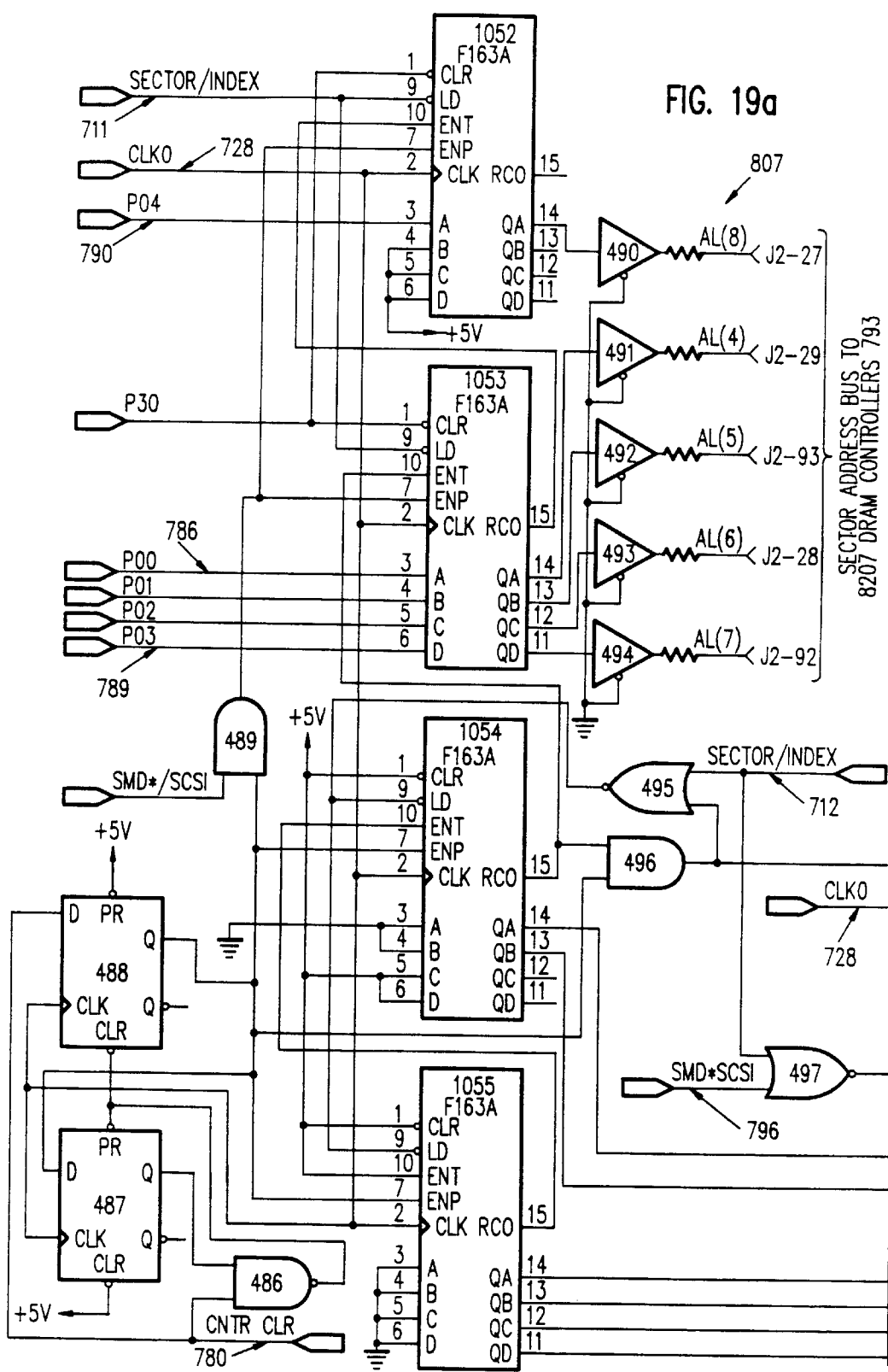
FIG. 19 is a schematic diagram of the circuit of memory word counter 807 in the disk emulator.

After write control circuit 806 generates the signals which latch and write the first word in the data field to the DRAM array 822, write control circuit 806 generates a signal on write counter clock line 715 to the first input terminal of NAND gate 406 (FIG. 3). NAND gate 406 generates a signal which increments the counter in memory word counter circuit 807 (FIG. 3 and FIG. 19). Write control circuit 806 (FIG. 3 and FIG. 15) continues to generate a signal on load write latch line 717, write line 716, and write counter line 715 for each 66-bit word of the data field.

Memory word counter circuit 807 supplies a signal on word address 2–63 complement line 756 to write control circuit 806 which enables write control circuit 806 to count the second through sixty-third words of the data field. When the signal corresponding to the sixty-third and last word of the data field is generated by write control circuit 806 on write counter clock line 715, memory word counter circuit 807 generates a sector full signal which is applied to write control circuit 806 on sector full line 757. The signal on sector full line 757 disables write control circuit 806.

The counter in write control circuit 806 is a sixty-six bit counter comprised of 74F161A integrated circuits 1027, 1028 as shown in FIG. 15. The 74F161A integrated circuit is a synchronous four bit binary counter. The clear function for four bit binary counters 1027, 1028 is a synchronous and clears all four of the flip-flops in the counter to a low signal irrespective of the clock, load or enable input signals.

The counters 1027, 1028 are programmed to count sixty-six clock pulses on write clock line 750 and then roll over. The input terminals A, B, C, D of integrated circuit 1027 and input terminals A, B of integrated circuit 1028 are connected to ground. The input terminals C, D of integrated circuit 1028 are connected to the positive supply voltage. The counters 1027, 1028 are cascaded so that when the ripple carry output terminal of counter 1027 is high, counter 1023 is enabled. A low signal on terminal $\overline{LD}$ of counters 1027, 1028 disables the counters and on the next clock pulse on the write clock line 750 to terminal CLK of counters 1027, 1028 the counters are loaded with the signals on their input terminals, irrespective of the signals on the terminals ENT, ENP. Thus, counters 1027, 1028 comprise a counter that is programmed to count sixty-six clock pulses on write clock line 750.

Writing Flag Circuit

Figure 24:
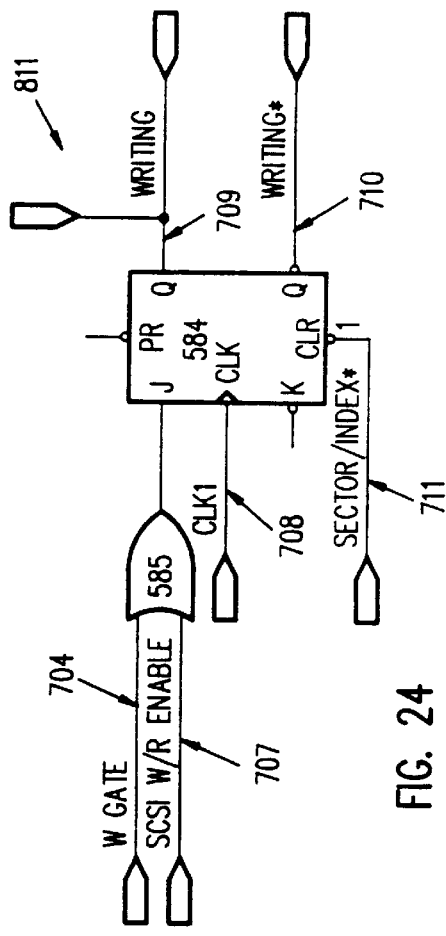
FIG. 24 is a schematic diagram of writing flag circuit 811 in the disk emulator.

The writing flag circuit 811, illustrated in FIG. 3 and FIG. 24, provides a high signal to the write control circuit 806 on writing complement line 710 which inhibits the operation of write control circuit 806 when the signal on write gate line 704 from R/W gate circuit 812 (FIG. 3 and FIG. 33) is low. Conversely, when the signal on write gate line 704 is high, writing flag circuit 811 generates a low signal on writing complement line 710. The writing flag circuit also generates signals on writing line 709, which control multiplexer 1125, as previously described, and which inhibit operation of read counter 810 (FIG. 3 and FIG. 18) when data are written to the disk emulator. The signal on writing line 709 from writing flag circuit 811 also is used in latch clock/error detection circuit 805 (FIG. 3 and FIG. 31), as will be described more completely below, to generate the read control signals.

R/W Gate Circuit

R/W gate circuit 812, illustrated in FIG. 3 and FIG. 33, is coupled to writing flag circuit 811 by write gate line 704 and also to input control circuit 801 (FIG. 3 and FIG. 9) by write gate line 704. Read/write gate line 705 couples R/W gate circuit 815 and microprocessor 816. The tag-3 complement line, bit-0 line and bit-1 line from receivers connected to the SMD control cable are input lines to R/W gate circuit 812.

When the SMD disk controller wants to write to the disk emulator, the bit-0 line and the tag-3 line are used to assert the write gate, while for reading the bit-1 line and the tag-3 line are used to assert the read gate. R/W gate circuit 812 generates the read gate, write gate and read/write gate signals based upon the signals received from the SMD disk controller on the bit-0, bit-1 and tag-3 lines.

Read Control Circuit

The read operation of the disk emulator is implemented using the read control circuit (comprised of the first gap counter 808, the second gap counter 809, and the read counter 810), latch clock/error detection circuit 805, and memory word counter circuit 807 in conjunction with microprocessor 816, DRAM array 822, shift register 802, latch circuit 803 and parity circuit 804 (FIG. 3). To read from the disk emulator, the word is retrieved from DRAM array 822, placed in latch circuit 803, error corrected, and then loaded into shift register 802 where the word is shifted out onto serial data output line 738.

However, as described above, the entire sector is not stored in DRAM array 822 but rather, only the address field is stored as the zeroth word of the sector and the data field is stored as the words one through sixty-three of the sector. Accordingly, since the SMD controller expects to see the entire sector, as shown in FIG. 1, the disk emulator must recreate the information which was stripped away in the write operation, i.e., the first gap between the start of the sector and the address field and the second gap between the address field and the data field. This is the first function of the read control circuit. Read counter circuit 810 (FIG. 3) clocks a series of zero bits to AND gate 593 (FIG. 3) over output zero complement line 730. The precise number of zeros to be clocked is determined by first gap counter 808 and second gap counter 809.

First and Second Gap Counter Circuit

Figure 16A:
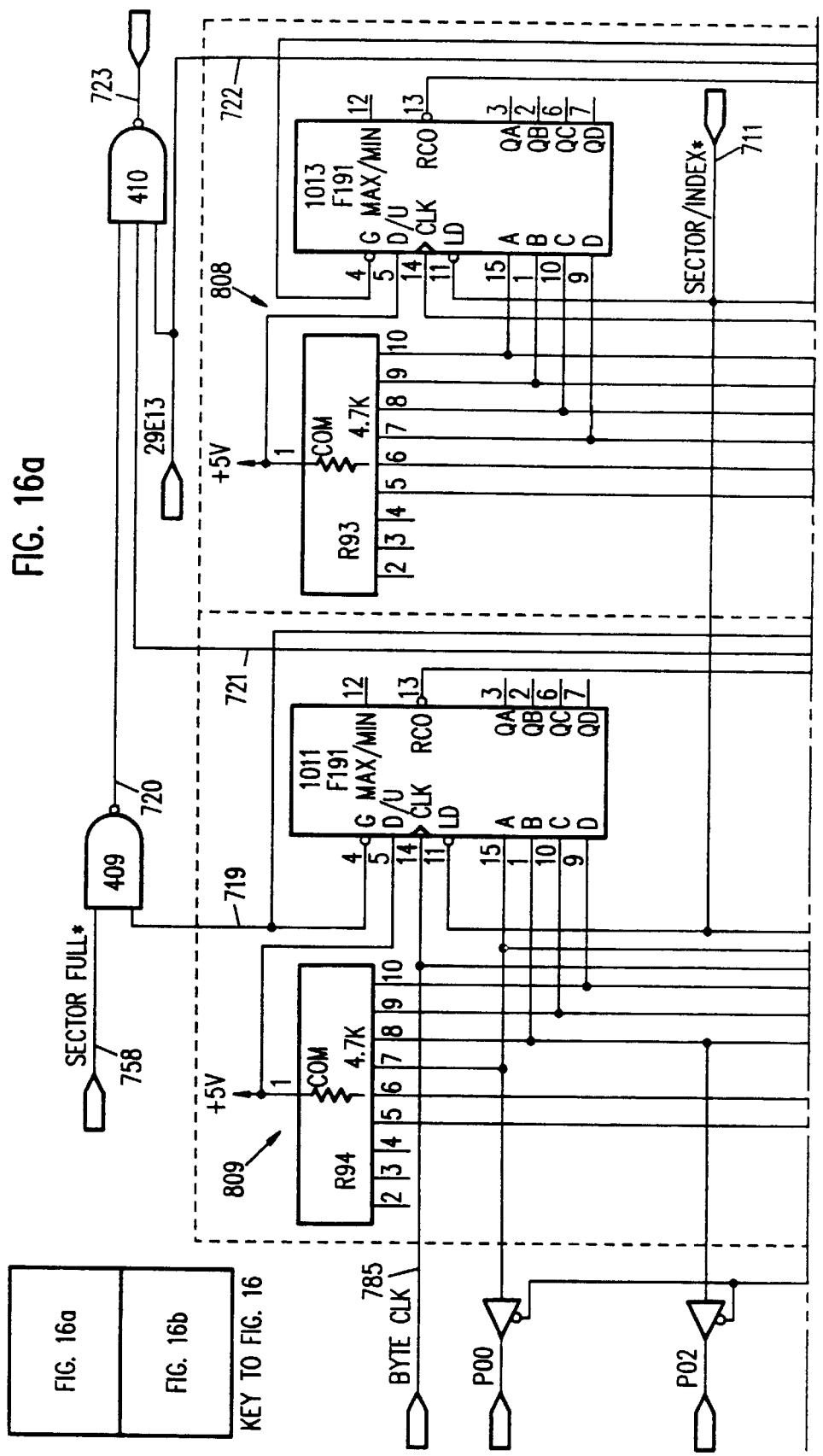
FIG. 16 is a schematic diagram of first gap counter circuit 808 and second gap counter circuit 809 in the disk emulator.
Figure 16B:
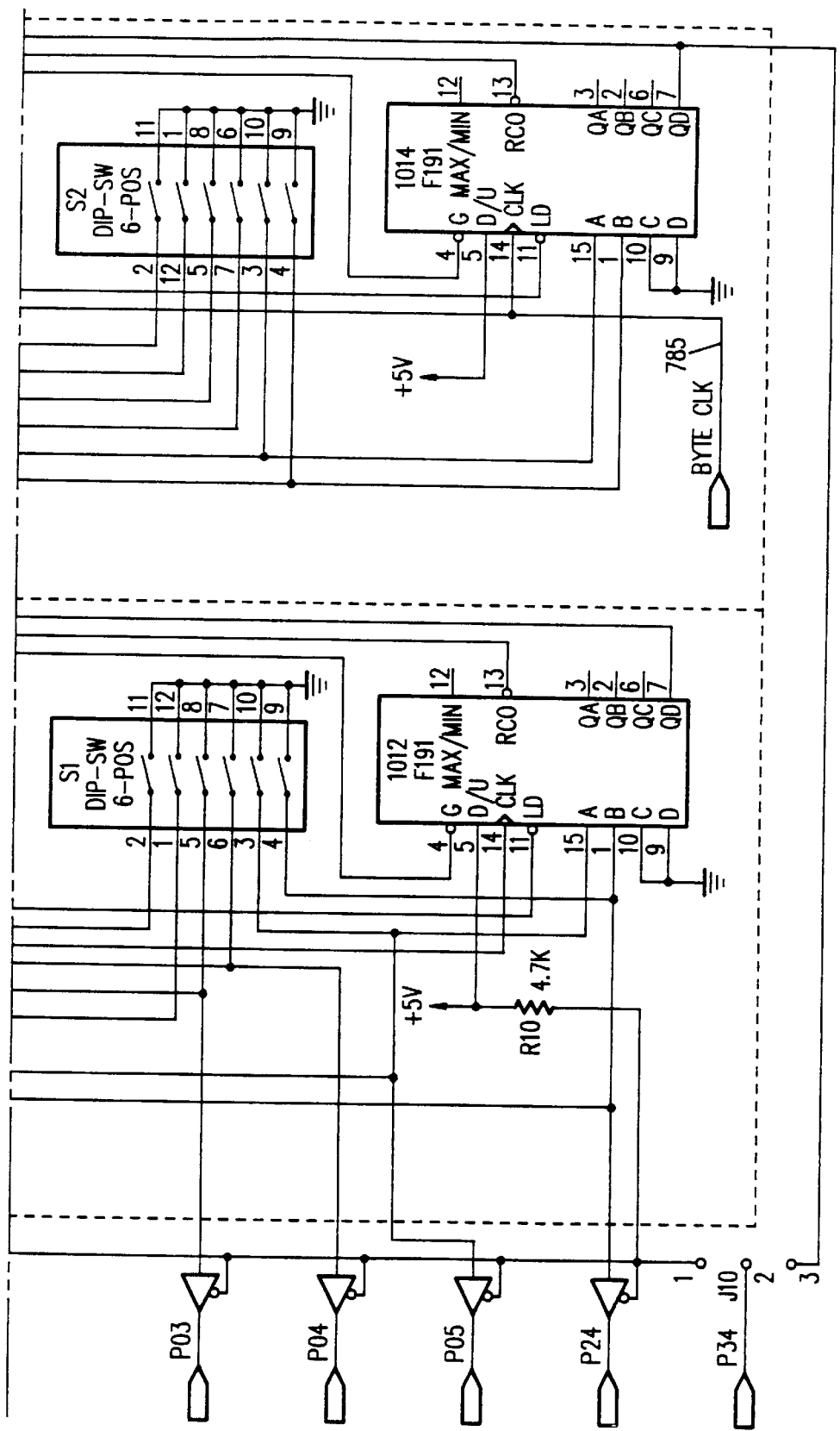

First gap counter 808 (FIG. 3 and FIG. 16) is comprised of counters 1013, 1014, which are 74F191 integrated circuits, and the six-position dip switch 92 as shown in FIG. 16. The 74F191 integrated circuit is a synchronous reversible up/down counter having four master-slave flip-flops that are triggered on a low-to-high transition of the clock signal on the clock input terminal CLK if the enable input terminal $\overline{G}$ is held low. A high signal at the enable input terminal $\overline{G}$ inhibits counting. The counters are programmed by placing a low signal on the load input terminal $\overline{LD}$ and entering the desired data on the counter's input terminals. As shown in FIG. 16, the counters 1013, 1014 are cascaded, i.e., the output terminal $\overline{RCO}$ of counter 1013 is tied to the enable terminal $\overline{G}$ of counter 1014 to permit a greater count capability.

To utilize the programmable capability of counters 1013, 1014, the input terminals A, B, C, D of counter 1013 and the input terminals A, B of counter 1014 are connected to the positive power supply voltage through a resistor and also to ground through a switch in the six-position dip switch S2. The input terminals C, D of counter 1014 are connected to ground. The switches in the six-position dip switch are open and closed to program the signals on the input terminals of the counters so that after the counters are loaded, the counters count the number of bytes prior to the address field in the sector. Hence, the gap size is programmable.

The counter terminal D/U of counters 1013, 1014 is connected to the positive power supply voltage so that the gap counters count down and roll over when the programmed number of bytes is reached. The second gap counter 809 (FIG. 3 and FIG. 16) is comprised of counters 1011, 1012 which are also 74F191 integrated circuits, and the input terminals of the counters are connected to ground and to the positive power supply voltage in a manner identical to that described for first gap counter 808.

Byte Clock Circuit

Figure 17:
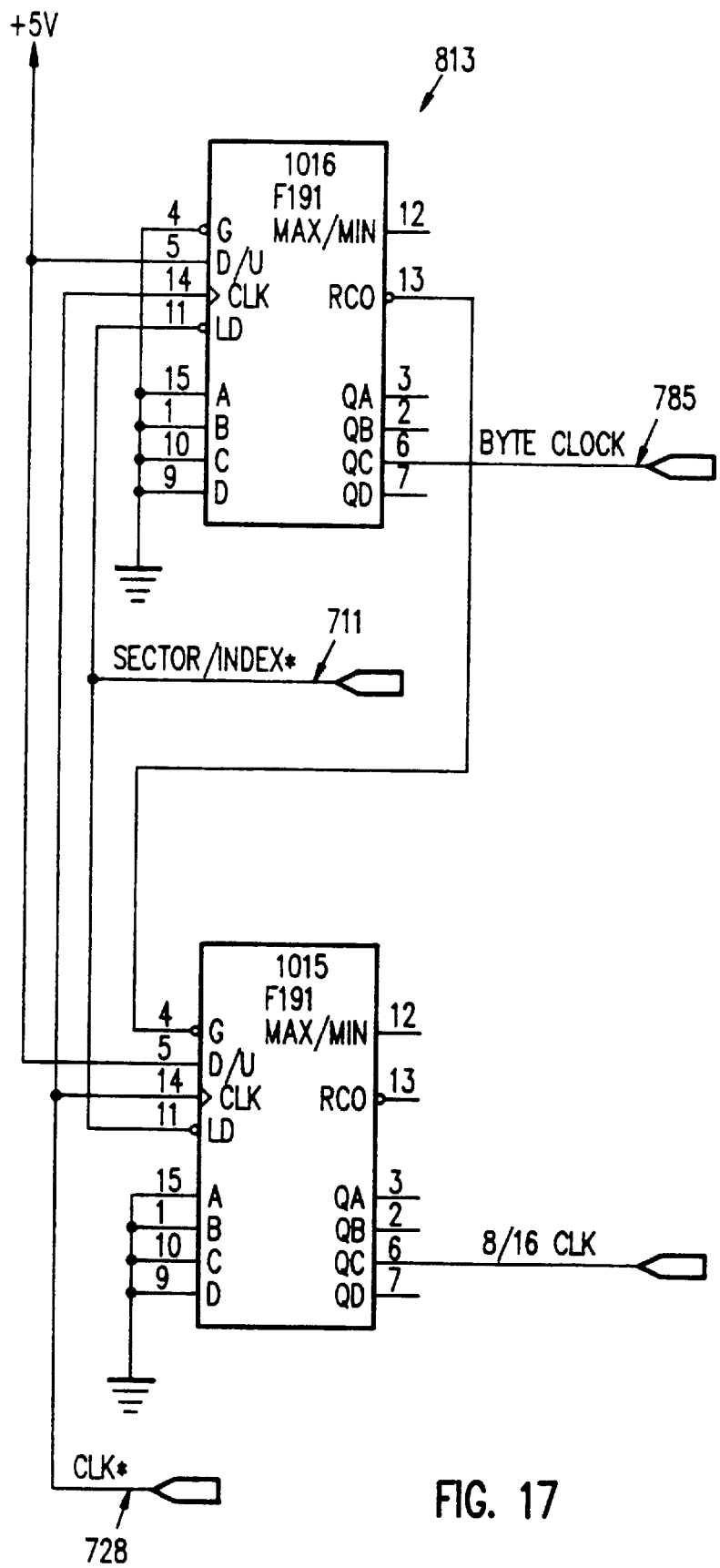
FIG. 17 is a schematic diagram of byte clock circuit 813 in the disk emulator.

Both first gap counter 808 and second gap counter 809 are clocked by byte clock circuit 813 (FIG. 3 and FIG. 17). The byte clock circuit is comprised of a 74F191 integrated circuit which has a byte clock output line 785 tied to its output terminal QC and is clocked by the clock pulses on clock zero line 728, as shown in FIG. 17. Thus, the first clock pulse on byte clock line 785 occurs after eight clock pulses on clock zero line 728 and subsequent clock pulses on byte clock line 785 occur after every additional eight clock pulses on clock zero line 728.

The use of the byte clock and the programmable cascaded counters in the first gap counter 808 and the second gap counter 809 provides the maximum degree of flexibility in setting the gap size with a minimum number of components. Since the number of bytes in the first and second gaps may be different for different implementations of the SMD interface convention, these circuits allow the user to easily modify the size of the gaps so that the disk emulator is compatible with the version of the SMD interface on the user's computer.

Read Counter Circuit

When first gap counter 808 counts down to zero from the number of preset bytes, the counter generates a signal on line 722 to read counter 810 (FIG. 3 and FIG. 18). This signal from first gap counter 808 causes the read counter 810 to cease the generation of zero signals on output zero complement line 730 to AND gate 593 and to simultaneously generate a signal on S1 line, i.e., line 741, to shift register 802 which loads the word stored in latch circuit 803 into shift register 802. Also, a counter is started in read counter circuit 810 (FIG. 3) which is used to determine when the 66-bit word is shifted out of shift register 802.

While the word is being shifted out, read counter 810 generates a read signal on read line 733 to latch clock/error detection circuit 805 (FIG. 3 and FIG. 31) which causes circuit 805 to provide a high signal on read B line 745 to multiplexer 1125 and a low signal on read B complement line 746 to multiplexer 1125 (FIG. 3 and FIG. 13). The low signal on read B complement 746 is also transmitted to 8207 DRAM controller 820 and the DRAM controller 820 provides the next 66-bit word and the associated parity bit to a 67-bit parallel bus, i.e., 66-bit parallel bus 700 and line D(0) (FIG. 3). The 8207 DRAM controller 820 also provides a signal to latch clock/error detection circuit 805 which captures the word on the 66-bit parallel bus 700 in latch circuit 803. After this, the counter in read counter circuit 810 generates another signal to the latch clock/error detection circuit 805 over read counter TC line 781 which inverts the word captured in latch circuit 803, so that the word is in a normal mode. Read counter circuit 810 also generates a signal on read counter line 732 to NAND gate 406 (FIG. 3). The resulting output signal from NAND gate 406 increments memory word counter circuit 807.

After the zeroth word is shifted out of shift register 802, read counter circuit 810 again generates a series of zero bits on the output zero complement line 730 until the second gap counter 809 (FIG. 3) rolls over and generates a signal on second gap counter carry line 721 to read counter 810. The response of read counter 810 to the signal on line 721 is similar to the response described when the first gap counter 808 rolled over.

In fact, the read counter circuit 810 generates the same sequence of signals until memory word counter 807 determines that the 64 words (address word plus sixty-three data words) comprising the sector have been read and generates a sector full signal on line 758 to read counter circuit 810 which disables read counter 810. During a write operation, when the read counter control circuit is not needed, the low signal on writing line 709 from writing flag circuit 811 is used to inhibit read counter circuit 810.

The counter in read counter 810 is comprised of two 74F163A integrated circuits 1022, 1023 as shown in FIG. 18 and the counter in memory word counter 807 is similarly comprised of two 74F163A integrated circuits 1054, 1055 as shown in FIG. 19. The 74F163A integrated circuit is identical to the 74F161A integrated circuit of write control circuit 806 described previously, except the clear function of the 74F163A integrated circuit is synchronous. Hence, counters 1022, 1023 and counters 1054, 1055 are both coupled and programmed in the same manner as previously described for counters 1027, 1028 in write control circuit 806.

Addressing the Dram Array

The previous description of the disk emulator explained in general terms how a word is passed between latch circuit 803, shift register 802 and the SMD disk controller. However, the disk emulator must locate and address the sector of the track requested by the SMD disk controller. This is accomplished through ROM translation circuit 819, memory word counter circuit 807 and microprocessor 816 in conjunction with 8207 DRAM controller 820 and DRAM array 822 (FIG. 3).

The SMD disk controller is designed to interface with rotating data storage systems. The SMD disk controller addresses data only in terms of head, sector, track, and cylinder. Disk drives, unlike solid state memory, address data memory with this geometric structure. Solid state memory, i.e., the DRAM array of this invention, requires contiguous binary addresses.

When the SMD controller accesses a disk, the desired head and track data are usually provided as digital data. Disk controllers rarely provide contiguous binary addresses. Therefore, to interface the disk emulator with the SMD disk controller, the disk address information, the head and track data, provided by the SMD controller must be translated into a binary structure suitable for addressing a solid state memory.

Two different means are available for translating the geometrical form of the address information to the binary structure suitable for addressing solid state memory. In the first method the portion of the computer operating system which interfaces with the disk emulator, i.e., the SMD disk controller, is modified. The modifications are made in the software disk driver that controls the disk emulator. In this method, the software disk driver is configured so that the driven disk has a binary number of heads, sectors, and cylinders. Thus, the information presented by the disk controller to the disk emulator describes contiguous binary addresses. Accordingly, in this method since the disk controller has been modified to generate a contiguous binary addresses, these addresses are simply used by the disk emulator to address the solid state memory. Hence, in this embodiment, ROM translator circuit 819 (not shown) is comprised of latches which capture the addresses provided by the SMD disk controller.

In a second method, ROM translation circuit 819 (FIG. 3 and FIGS. 22a and 22b) converts the disk related track and head information from the SMD disk controller into higher order address bits for DRAM array 822. A computer algorithm, shown in FIGS. 47a to 47c, was used to develop the translation table which resides in a 256K×8 ROM. The ROM translates the consecutive geometric addresses from the SMD disk controller to contiguous binary addresses which are used to address the DRAM array 822.

Hence, unlike an ordinary hard disk, where the head iteratively crosses the disk to the desired track and waits for the desired sector, the disk emulator, using either the modified disk controller or the translation table, instantaneously creates the effect of the head tracking across the disk. When the SMD disk controller issues a seek command, the positioning within the disk emulator occurs virtually instantaneously.

The elimination of the seek time, associated with locating the track specified by the SMD controller is a significant advantage of the disk emulator. On a conventional disk, the data sought by the SMD disk controller may be located on several tracks in different areas of the disk. Hence, the track location delay, the seek time, is imposed multiple times in locating the data, but with the disk emulator there is no delay time and hence the disk emulator is significantly faster than a conventional hard disk drive.

Rom Translation Circuit

The head and track information is provided by the SMD controller over the SMD control cable. The disk emulator uses a receiver for each pair of lines in the SMD control cable, as shown in FIG. 4, FIG. 5 and FIG. 6, which converts the differential signal on each pair of lines to a logic signal which is processed by the disk emulator. The signals from the receivers are translated in ROM translation circuit 819 and the addresses generated are latched in ROM translation circuit 819. As used herein, higher order addresses mean the addresses for DRAM array 822 which correspond to the head and track address in a conventional hard disk and lower order addresses mean the addresses of DRAM array 822 which correspond to the sector of the track and the location within the sector.

Dram Controllers and Dram Array

Figure 26A:
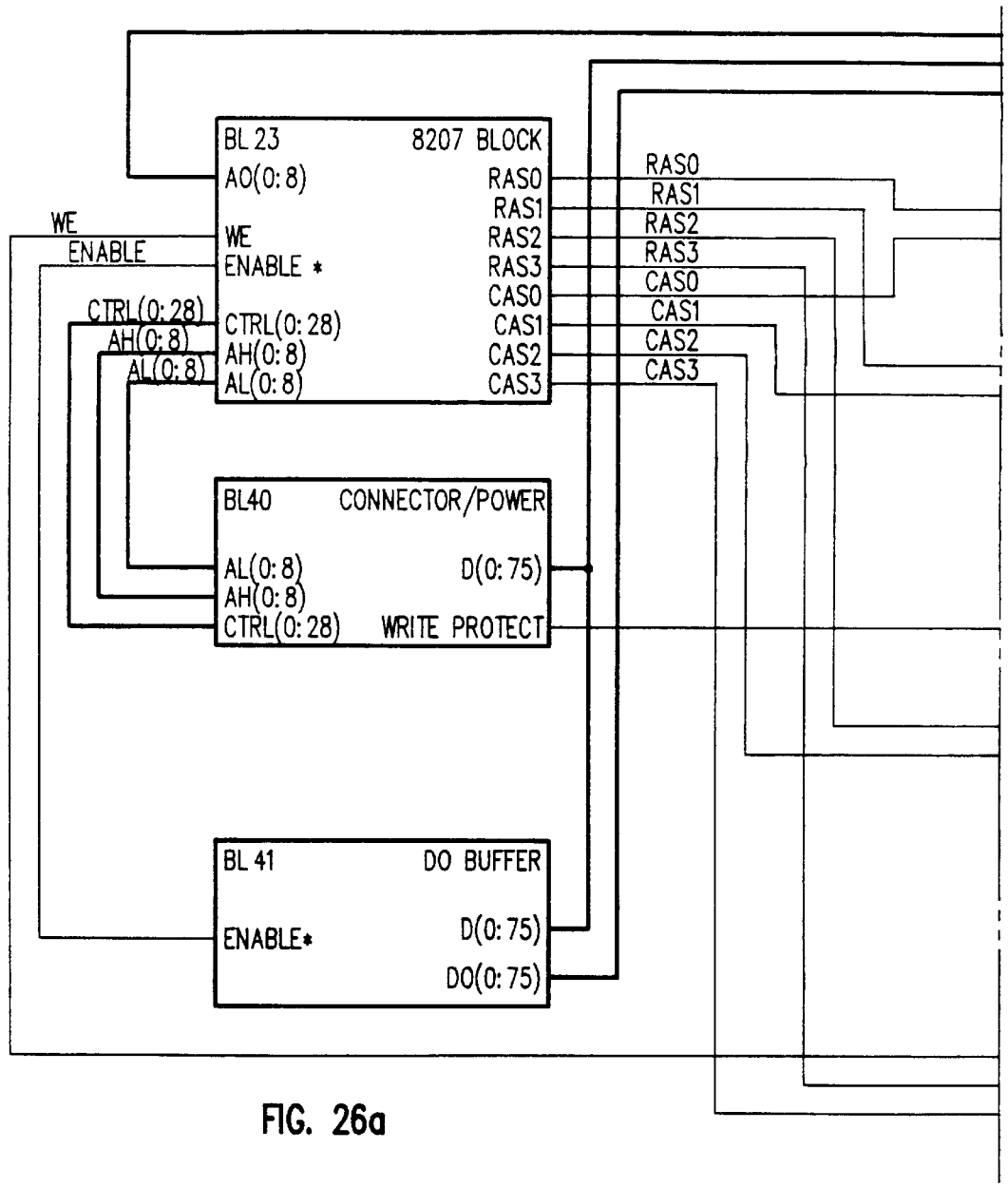
FIGS. 26a and 26b are a block diagram illustrating one of the sixteen DRAM cards in the disk emulator.
Figure 26A:
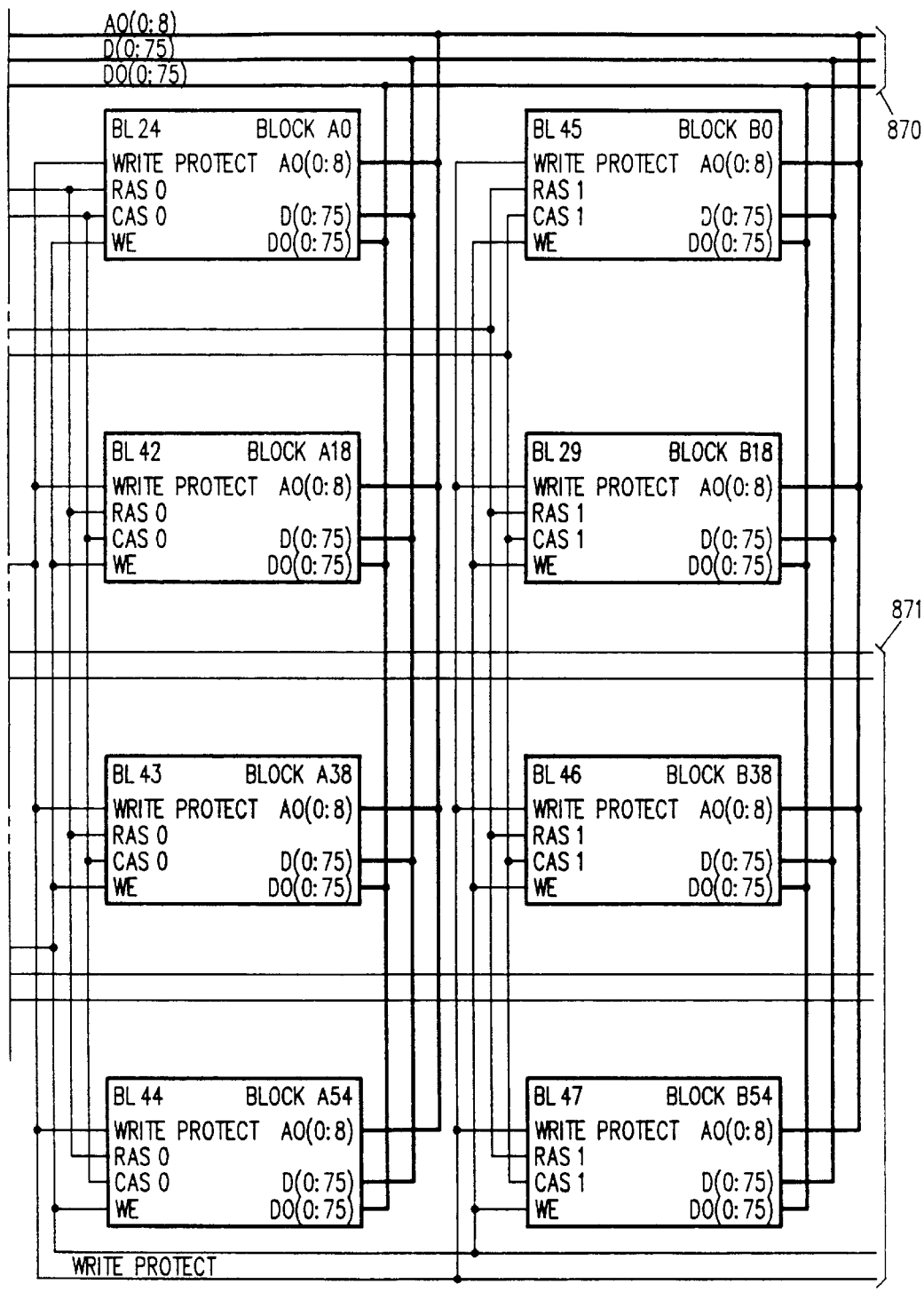
Figure 26B:
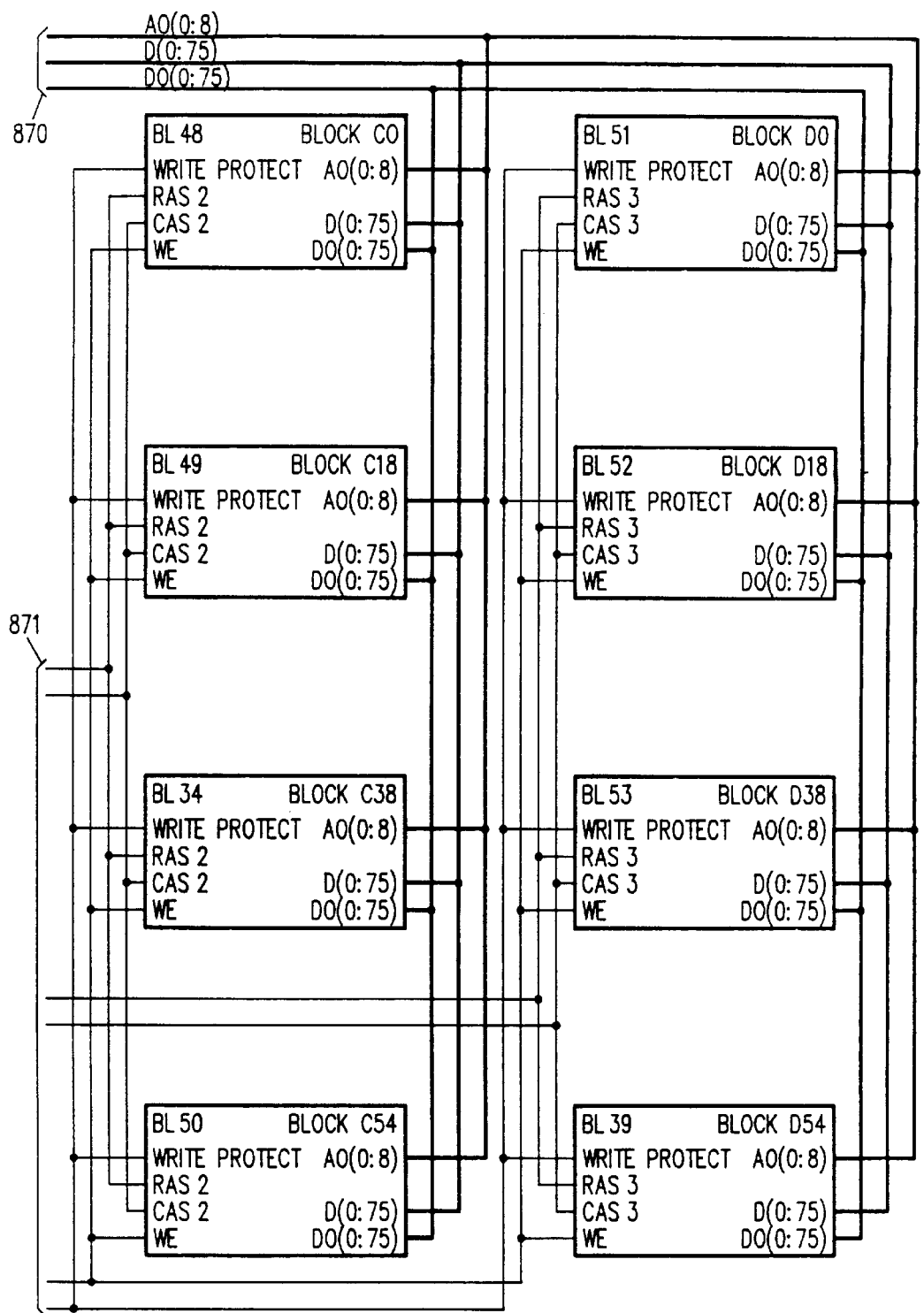
Figure 27A:
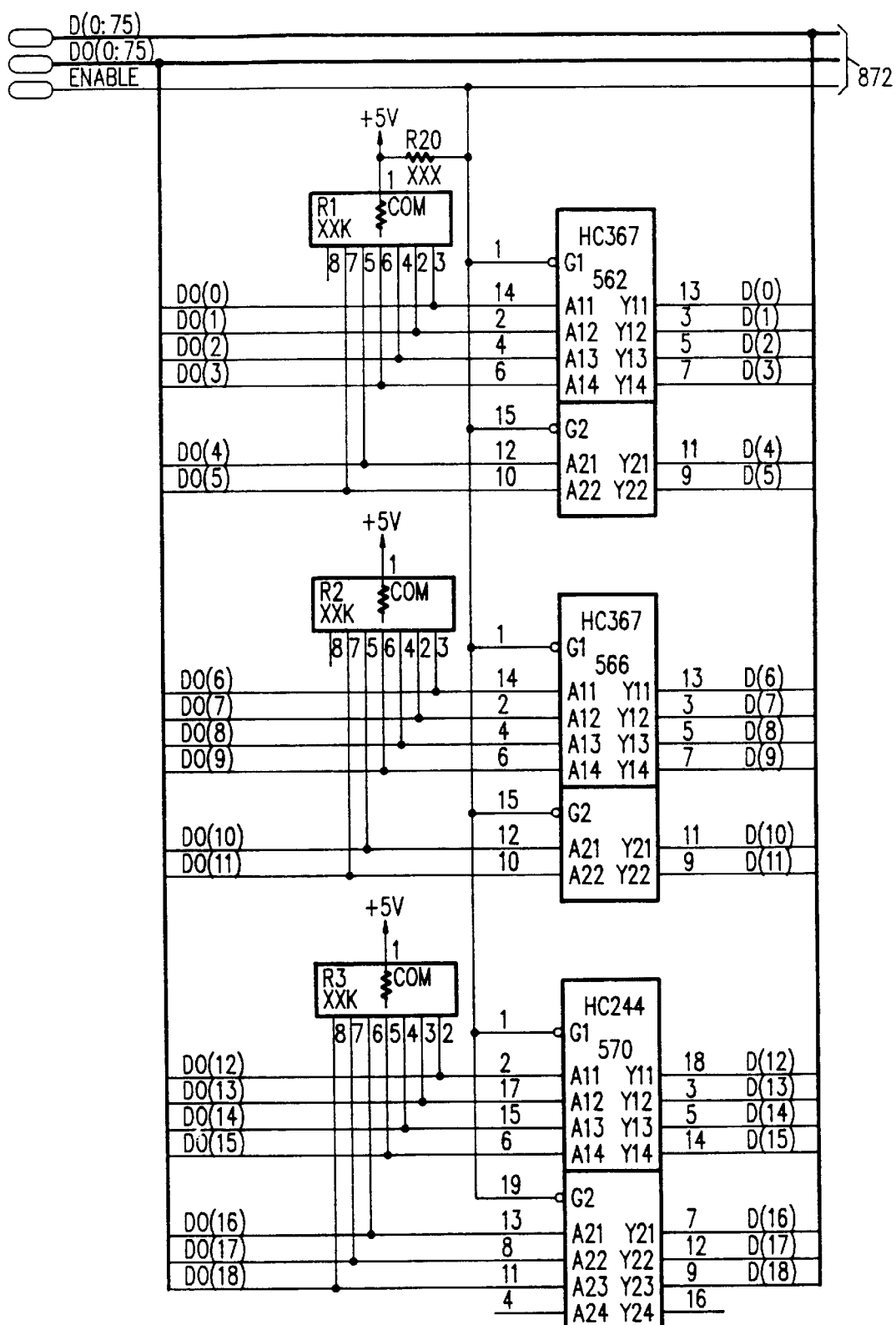
FIGS. 27a through 27d are a schematic diagram of buffer circuit 845 for the typical DRAM card in FIGS. 26a and 26b.
Figure 27B:
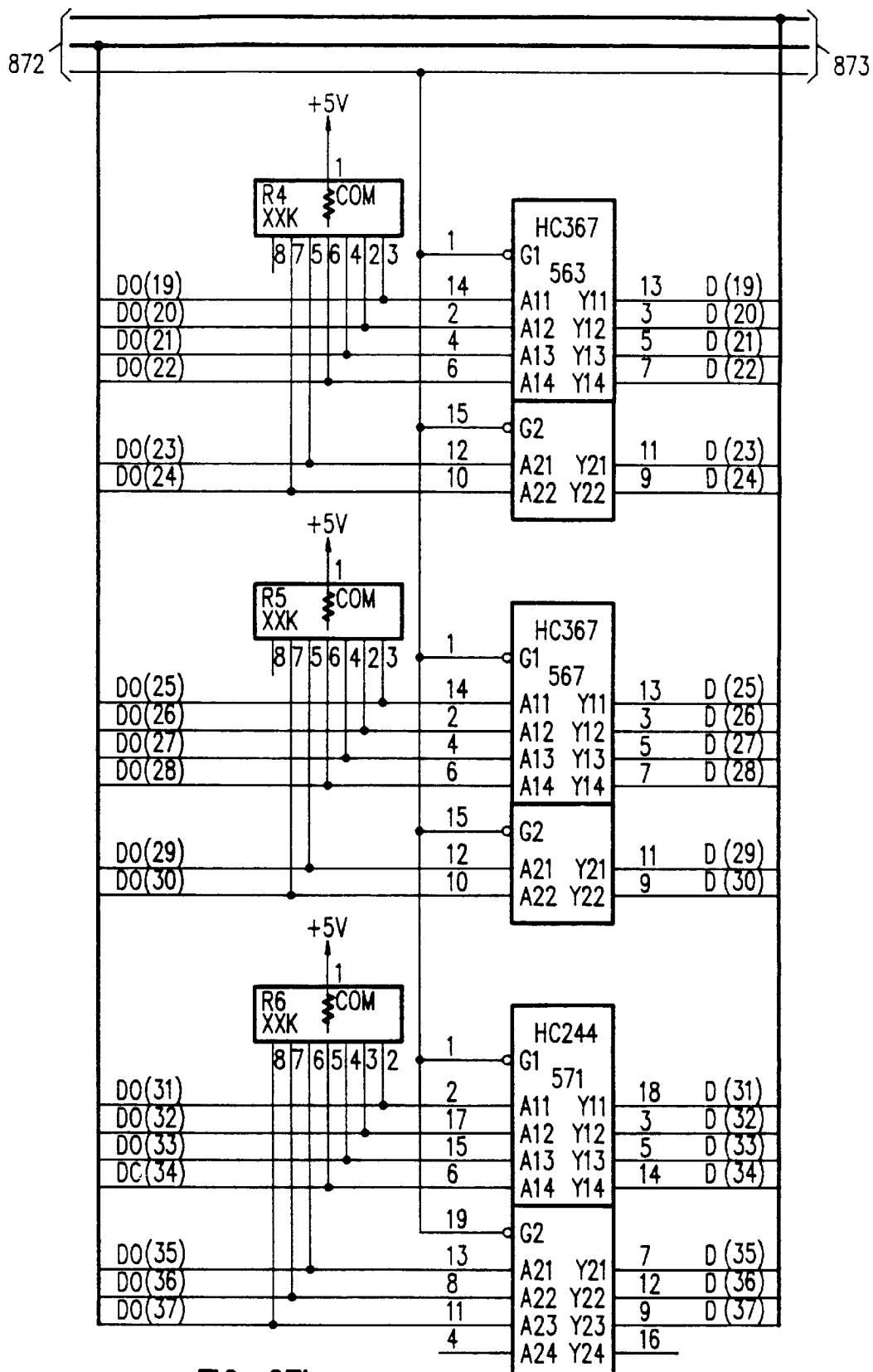
Figure 27C:
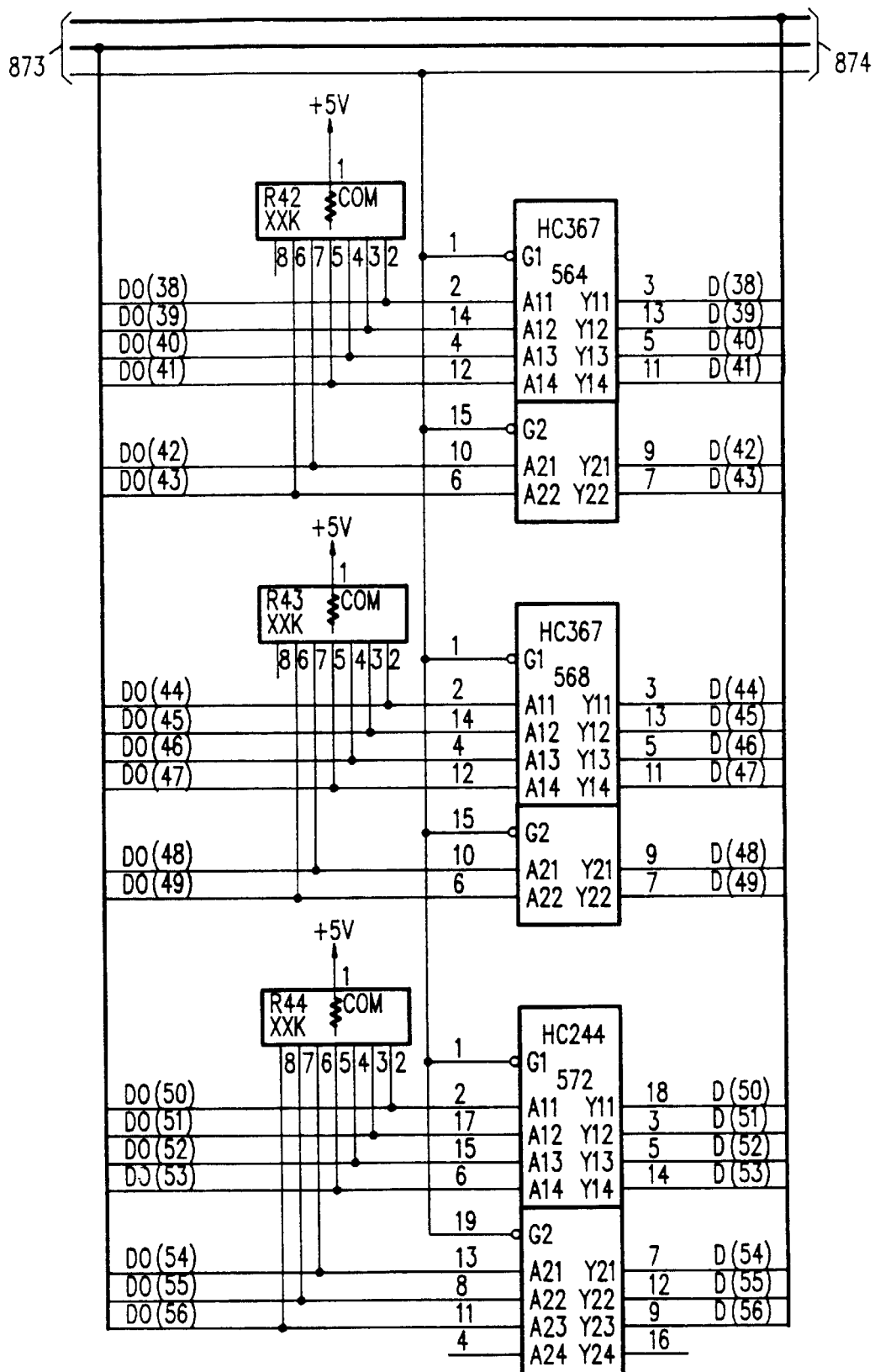
Figure 27D:
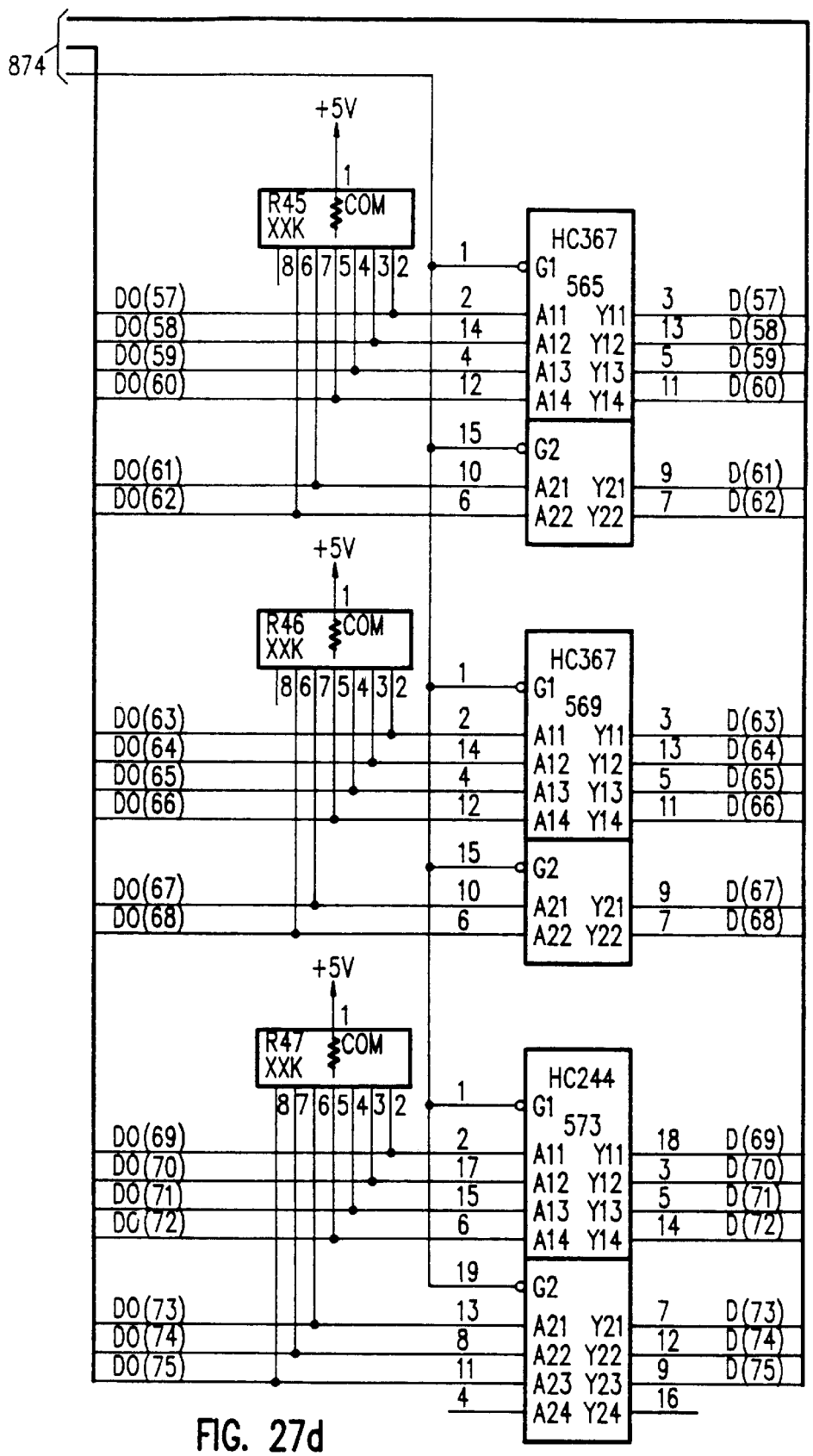

The output signal, corresponding to the highest order address from ROM translation circuit 819, on the card select line 792 enables one of the sixteen DRAM cards comprising the DRAM array 822 (FIG. 3). One DRAM card is illustrated in FIGS. 26a and 26b and will be described fully hereinafter. Each of the sixteen DRAM cards in DRAM array 822 interfaces with one of the sixteen 8207 DRAM controllers in DRAM controller circuit 820 and each card contains four banks of 256K DRAM integrated circuits. In one embodiment, the 8207 DRAM controller is physically located on the DRAM card so that DRAM controller circuit 820 and DRAM array 822 in FIG. 3 are integrated together and comprise sixteen DRAM cards, with each card having a 8207 DRAM controller and four banks of DRAM.

Since each bank on a DRAM card stores a 66-bit word and the related parity bit and each bit of the 66-bit word and the related parity bit are stored in a separate DRAM integrated circuit, each bank contains at least sixty-seven 256K DRAM integrated circuits. This configuration on the DRAM cards limits the probability of a DRAM integrated circuit failure, for example, two bits of the same word are wrong and also provides a DRAM array-configuration which functions at high speed.

Normally, the pre-charge effect of DRAM limits the speed with which data may be written to or retrieved from DRAM. However, in the disk emulator, the words are written consecutively to the banks on a DRAM card, i.e. the data is interleaved on a DRAM card. Therefore, the pre-charge effect does not limit the performance of DRAM array 822.

While the highest order address from ROM translation circuit 819 selects one DRAM card, the remaining higher order addresses from the ROM translation circuit 819 are applied to the higher order address terminals of the 8207 DRAM controller on each of the sixteen cards. However, since only one of the sixteen cards is enabled, only the 8207 DRAM controller on the enabled card actually addresses a location within DRAM array 822. Accordingly, as used herein, a reference to 8207 DRAM controller means the 8207 DRAM controller on the DRAM card which is enabled by the highest order address from ROM translation circuit 819.

Even though ROM translation circuit 819 (FIG. 3) identifies the addresses in DRAM array 822 which corresponds to the head and track position specified by the SMD disk controller, the sector information is not provided by the SMD disk controller because normally the disk simply positions the head over the track and waits for the right sector to move under the head. Hence, the disk emulator must also generate a lower order address that corresponds to the desired sector within the track.

While the disk emulator is described as having 16 DRAM cards and 256K DRAM integrated circuits, these characteristics are illustrative and are not intended to limit the scope of the invention. The memory capacity of the disk emulator is determined by the storage capacity of the hard disk drive which the disk emulator is replacing. In view of this disclosure, one skilled in the art, using the principles of this invention, can vary both the size and number of DRAM integrated circuits on a card and the number of DRAM cards to achieve the necessary storage capacity.

Microprocessor and Memory Word Counter

The lowest order addresses, corresponding to a sector and each of the 67 bit words within a sector, are generated by memory word counter circuit 807 and microprocessor 816 (FIG. 3). When the SMD disk controller indicates that a new sector of data is required by asserting the seek command, the seek command is applied to one of the external interrupt input terminals of microprocessor circuit 816. The interrupt service routing of the microprocessor immediately initiates the rapid sector cycle. In the rapid sector cycle, the microprocessor sets the sector address to zero on the P00 line through P04, lines 786–790 (FIG. 3), and issues an index pulse.

The index pulse initializes the word address for the sector to zero in memory word counter 807 and latches the signals on P00 through P04 lines in memory word counter circuit 807 (FIG. 3). Memory word counter circuit 807 generates signals on sector address bus 793 and the word address bus 794 which are connected to the lower order address terminals of 8207 DRAM controller 820. The 8207 DRAM controller 820 addresses the specified area in DRAM array 822 over DRAM address bus 795 and the zeroth word of the zeroth sector and the associated parity bit are supplied to 66-bit parallel bus 700 and the line D(0) respectively. The line D(0) and the 66-bit parallel bus are a 67-bit parallel bus.

If this location corresponds to the track and sector requested by the SMD disk controller, the SMD disk controller asserts either the read gate or write gate and the remaining words of the sector are addressed by memory word counter circuit 807 over word address bus 794. Accordingly, microprocessor circuit 816 polls the signal on read/write gate line 705 to determine if either gate is asserted within a predetermined time, for example, 10 microseconds, after issuing the sector address. The actual length of the predetermined time is explained more completely below. If either gate is asserted within the predetermined time, microprocessor 816 immediately leaves the rapid sector cycle.

If the read gate or write gate was not asserted, microprocessor 816 continues, incrementing the sector address by one on P00 through P04 lines 786–790, and issues a sector pulse. The sector pulse initializes memory word counter 807 in the same manner as the index pulse. Again, the microprocessor waits a predetermined time and checks the gates.

Each sector pulse resets word counter circuit 807, so that the addresses of the zeroth word of each new sector are supplied to 8207 DRAM controller circuit 820 over word address bus 794. Thus, the zeroth word of each sector is read by the SMD disk controller at predetermined intervals until the desired sector is found. If the desired sector is the last one on the track, i.e. the thirty-second one, assuming the predetermined time is 10 psec, 320 microseconds (10 $\mu$sec× 32) are required to locate the sector. Compared to the 16 milliseconds of uncertainty with a conventional hard disk drive, the disk emulator is 500 times faster than the conventional hard disk drive. Accordingly, the latency related to locating the track and sector has been reduced such that compared to conventional hard disk drives, the disk emulator's latency is effectively zero, i.e., the response is instantaneous. This represents a significant advance in the performance of disk storage devices.

Error Correction

The final problem uniquely solved within the disk emulator concerns data integrity. When the SMD disk controller is writing to the disk emulator, serial data from the controller is converted to parallel data, and before the data is written to memory, a parity bit is generated and stored as the 67th bit, as previously described.

When the SMD controller is reading, the process is reversed. Data is retrieved from memory and a new parity bit generated. The new parity bit is compared with the stored parity bit. If they are not the same, then a bit has changed either during storage, after storage or during the read indicating an error has occurred.

Solid state memory errors can be divided into two basic types, hard errors and soft errors. Soft errors are random single bit errors. These errors are not the result of memory chip failure, and are corrected by the SMD disk controller. Hard errors generally affect many bits within a memory component. They are the result of catastrophic memory failure.

Error correction systems have long been in existence. Using a typical prior art error correction system in the disk emulator requires storage of an 8 bit ECC code along with the 66 bit word. A hard or soft error could be corrected through a mathematical process operating on the ECC code. However, an 8 bit per word overhead adds significant cost to the disk emulator. Accordingly, a new error detection process is implemented in the disk emulator which corrects hard memory errors using only a parity bit. The error correction is done during the read operation using a Read/Invert/Write/ Read/Invert/Write sequence with the 8207 DRAM controller, latch circuit 803 and latch clock/error detection circuit 805 (FIG. 3). An example of the new error detection process is illustrated in Table I.

TABLE I

| ROW | WORD STORED | PARITY STORED | PARITY GENERATED |
|---|---|---|---|
| 1. | 1111 | 1 | |
| 2. | 1011 | 1 | |
| 3. | 1011 | 1 | 0 |
| 4. | 0100 | 0 | |
| 5. | 0000 | 0 | |
| 6. | 0000 | 0 | |
| 7. | 1111 | 1 | 1 |

For simplicity of illustration and understanding, in Table I, a four bit word is used as an example rather than the 66-bit word utilized in the disk-emulator. However, the error detection and correction process is independent of the word length and so a four bit example is sufficient to demonstrate the process. In addition, the error detection and correction process of our invention is not limited to any particular method of generating the parity bit. For illustrative purposes, since the disk emulator word length is an even number of bits, an even parity was chosen. The word, shown in Row 1 of Table I, has even parity because the number of bits that are one is even and so the stored parity bit is a 1.

To illustrate the operation of our error detection and correction process, we will assume the word in Row 1 is stored and that the second bit in the memory permanently fails. Therefore, the stored word is retrieved as 1011 and the stored parity is retrieved as 1, as shown in the second row of Table I. When the word 1011 is retrieved, a new parity bit is generated. The number of 1's in the word is now odd so that the new parity bit is a 0. A comparison of the stored parity bit, a 1, and the new parity bit, a 0, indicates an error. When an error is detected the retrieved word is inverted, as shown in Row 4 of Table I.

The inverted word and the new parity bit are written to memory and retrieved again. Since the second bit location has failed permanently, when the number is read again, i.e., retrieved from memory, the word is '0000' and the parity bit is 0 as shown in Row 6 of Table I. This word and the parity bit are inverted to restore the original word '1111'. Hence, using only the parity information, the Read/Invert/Write/ Read/Invert/Write sequence corrects errors caused by failure of a single bit location in memory.

This error correction process only works for a single bit failure and a memory that fails such that the failed bit, upon subsequent writes to the failed bit location, always remains in the state, either high or low, to which the bit originally failed. This is, in fact, simply the definition of a hard error and so the novel correction process will correct any single bit hard error.

The single bit failure per word is assured by the unique configuration of the DRAM array, as described previously. The DRAM array is designed such that each bit of a word is stored in a different DRAM integrated circuit and only a bit of every fourth word is stored in the same DRAM integrated circuit. Thus, to obtain two bit failures in the same word requires the simultaneous independent failure of a bit location in two of the DRAM integrated circuits. This configuration of the DRAM array statistically improves the probability of a misread by many thousand. In fact, without the error correction process a memory failure, a single bit hard error, is predicted to occur within 100 hours of operation, but with the error correction process, two independent bit failures in the same word are not predicted until 50,000 hours of operation. Hence, the novel error correction process significantly improves the reliability of the disk emulator.

Formatting the Disk Emulator Dram Array

To initially prepare the disk emulator for operation with a computer, a format write operation is utilized. In the format write operation, the address field for each sector is stored as the zeroth word of each 64-word sector in DRAM array 822 of the disk emulator system. The format write operation configures DRAM array 822 of the disk emulator so that DRAM array 822 is functionally equivalent to a formatted hard disk.

However, as previously explained, the data storage capability of a typical hard disk is reduced by up to 19% by data that must be stored on the hard disk to interface the disk with the SMD disk controller. In the disk emulator, the 8 byte address field is stored as one word for each sector, the 1 byte data sync pattern is stored and the parity bit is stored for each word in the sector, or a total of 138 bits are used to store data required to interface the disk emulator with the SMD disk controller. Since each sector contains sixty-four 66-bit words and 64 parity bits, only 138/4288 or about 3% of DRAM array 822 is not available for data storage. Hence, the disk emulator uses the storage medium significantly more efficiently than the typical hard disk. Since the format write operation of the disk emulator is similar to the normal read and write operations of the disk emulator, only the normal read and write operation of the disk emulator in response to the SMD disk controller are considered in detail.

Seek Command

During normal operation, in either a read or a write operation the SMD disk controller first issues a seek command to the disk emulator. Typically, in a hard disk drive whenever a seek command is issued, the cylinder must be changed and so the read/write heads must be mechanically moved to a new location on the disk and then iteratively centered. Since this mechanical operation is slow compared to the operating speed of the computer, the computer performs other activities during the time the hard disk drive is seeking the proper cylinder. For this reason, the hard disk drive typically sends a seek end signal to the hard disk controller when the proper track is found so that the disk controller can notify the computer. However, in the disk emulator the time to change cylinders is virtually instantaneous and the on-cylinder command and/or the seek end command could be supplied to the disk controller virtually instantaneously. However, the SMD convention requires a minimum time between the time a seek command is issued and the seek is ended. Accordingly, this is one of the functions of on-cylinder circuit 840 (FIG. 20). The functions of on-cylinder circuit 840 are all related to moving the disk drive head off a given track.

During normal operation, the signal on a tag-1 complement line 767 is the means for simulating the movement of the disk head off a given track within the disk emulator. The signal on tag-1 complement line 767 is driven low by the SMD controller when the lower order cylinder addresses are about to change, i.e., the SMD controller is issuing a seek command. The signal on a tag-2 complement line 768 is used by the SMD controller to change the bead or higher order cylinder addresses, but a signal on tag-2 complement line 768 is always followed by a signal on tag-1 complement line 767 from the SMD controller. Therefore, the signal on tag-1 complement line 767 effectively indicates that the SMD disk controller has issued a seek command under normal operation. The SMD controller asserts the tag-1 signal by providing a differential signal on lines J5-31, J5-1 in the SMD control cable to a differential current mode receiver 457 (FIG. 5) through a terminating resistor network. Differential current mode receiver 467 in response to the differential signal on lines J5-31 and J5-1 generates a low signal on tag-1 complement line 767.

The low signal on tag-1 complement line 767 is applied to a first input terminal of NAND gate 449 (FIG. 20) in on-cylinder circuit 840. The second input terminal of NAND gate 499 is driven by the output signal from OR gate 448 which sums the signals on tag-3 complement line 702 (FIG. 5) with the inverse of the signal on bit-6 line 763 (FIG. 5). In all but special circumstances, which are described below, the output signal from OR gate 448 is high and so NAND gate 449 has a high input signal and a low input signal when the SMD disk controller drives the signal on tag-1 complement line 767 low. In response to these input signals, NAND gate 449 generates a pulse with a rising edge which is applied to an input terminal B of a one shot multivibrator 450 (FIG. 20). Since the signal on terminal $\overline{\text{CLR}}$ of multivibrator 450 is tied to the positive power supply voltage and multivibrator 450 has an input terminal A grounded, multivibrator 450 generates a high signal on an output terminal Q and a low output signal on a terminal $\overline{\text{Q}}$ for a time period determined by a resistor and a capacitor connected to multivibrator 450. The resistor and capacitor are selected so that the time required by the SMD convention between the time the seek command is issued, i.e., the time when the signal on tag-1 complement line 767 goes low, and the time the seek is ended, i.e., the signal on seek end line 772 goes high, are separated by the time required by the SMD convention.

When the high output signal from NAND gate 499 causes multivibrator 450 to fire and generate a low signal on on-cylinder complement line 771, the low signal on line 771 is applied to a terminal P33 of a 8051 microprocessor 1063 (FIG. 21). Terminal P33 of 8051 microprocessor 1063 is the interrupt 1 input terminal so that the low signal on on-cylinder complement line 771 resets microprocessor 1063 and microprocessor 1063 enters the rapid section cycle mode, described below.

The signals on seek end line 772 and on-cylinder complement line 771 are both generated by multivibrator 450 and so the seek end signal and the on-cylinder signal are derived from the same source. While it is possible for a seek to end and a disk not to be on the proper cylinder, this would be a fault condition so that the derivation of the two signals from the same source is appropriate. The other signal generated by on-cylinder circuit 840 (FIG. 20) is the return-to-zero (RTZ) signal which is used by the disk controller to bring a disk drive back to the zero cylinder on the disk. This signal is implemented by making the signal on a bit-6 line 763 high and strobing the signal on a tag-3 complement line 702. Thus, the input signals to OR gate 448 are both low and OR gate 448 generates a low output signal on return-to-zero complement line 770 and to the second input terminal of NAND gate 449. The low input signal to NAND gate 449 generates a sequence of signals identical to those discussed above when the signal on tag-1 complement line 767 went low.

Hence, in response to the RTZ command, the microprocessor 1063 is initialized. In addition, in ROM translation circuit 819, shown in FIGS. 22a and 22b, the low signal on RTZ complement line 770 clears flip-flops 479, 480, 483 and integrated circuits 1038, 1039, 1040, which each contain four edge triggered D-type flip-flops with individual D input terminals and both Q and Q-complement output-terminals. Also, the low signal on RTZ complement line 770 drives the output signal from NAND gate 482 high, which in turn clears counters 1042, 1043, 1044, 1045 in FIGS. 22a and 22b. The return-to-zero command, thus, operates similarly to the seek command in that microprocessor 1063 is initialized and in addition, ROM translation circuit 819 is cleared.

High Order Address Generation

The SMD disk controller also provides the desired head and track information over bit-0 through bit-9 lines and tag-2 and tag-3 lines in the SMD control cable after the seek command. In a conventional hard disk, the head and track information specified by the SMD disk controller is compared with the current track position, which is typically read by a servo head of the hard disk drive, and a new position for the head is determined which is closer to the specified track. By repeating the process of reading a track, comparing the specified track with the current position and moving to a new position, the hard disk drive iteratively locates the track specified by the SMD controller. Obviously, if the data file is interleaved over several tracks on the hard disk, the hard disk drive must repeat the search operation for each segment of the data. Thus, in reading a data file comprised of multiple sectors on several tracks, the seek time is cumulative for a hard disk drive. The disk emulator, as described below, locates the track specified by the SMD disk controller virtually instantaneously, and consequently eliminates the seek time of the conventional hard disk drive. This feature alone substantially improves the performance of the disk emulator over the performance of hard disk drives designed to operate under the SMD interface convention.

As previously described, the SMD disk controller provides differential signals which specify the desired location for reading or writing to the disk emulator over the bit-0 through bit-9 lines in the SMD control cable and these signals are enabled with signals on tag-1 line and tag-2 line in the SMD control cable (in the Figures, the bit line and tag lines shown are those of the disk emulator and the lines from the SMD control cable or SMD data cable with the same name are indicated by the prefixes JA, J5).

As shown in FIGS. 4, 5, and 6, each pair of lines from the SMD disk controller, which carries one of the bit or tag signals, is coupled through a terminating resistor network to the input terminals of a differential current mode receiver which in response to the signals from the SMD disk controller drives the corresponding line in the disk emulator. Accordingly, bit-0 through bit-9 lines 701, 703, 759–766 carry the geometric address signals from receivers 461–470.

As previously described, there are two methods for converting the geometric address information for the disk to contiguous binary addresses for the DRAM array of the disk emulator. The first method requires patching the computer operating system so that the disk controller addresses the disk emulator-with a binary format for the number of heads, sectors and cylinders. In this method, the information presented across the bit-0 through bit-9 lines which are enabled by signals on tag-1 line and tag-2 line describe contiguous binary addresses. Accordingly, the geometric address signals from receivers 461 to 470 in this method are used directly to address the DRAM array as described in more detail below.

In the second method, a ROM based lookup table is used to convert the geometrical addresses to contiguous binary addresses. This method allows precise emulation of any existing hard disk drive. In the SMD convention, cylinders are specified with 12 bits of information which allows addressing a maximum of 4,096 cylinders. Similarly, the head addresses are specified with 5 bits for a maximum of 32 heads. Thus, to fully implement the SMD convention, 17 bits of address information must be processed in the disk emulator. However, either the number of heads or the number of cylinders can vary. For example, the DEC model RMO3 disk drive has 32 sectors, 823 cylinders, and 5 heads for a formatted capacity of 67.42 megabytes. To emulate the DEC RM03 requires nine DRAM cards, as previously described, in the disk emulator. Further, only 10 bits are required to specify the 823 cylinders and three bits are required to specify the five heads. Thus, for this particular hard disk drive, the input address signal to ROM translation circuit 819 consists of 13 bits rather than the full 17 bits available in the SMD convention. The geometric address provided by the SMD disk controller is nonbinary as 823 cylinders are addressed for each of the five heads. To emulate the DEC RM03, 4,115 (5×823) high order addresses are necessary. Therefore, 13 bits of output are necessary from ROM translation circuit 819.

Figure 22A:
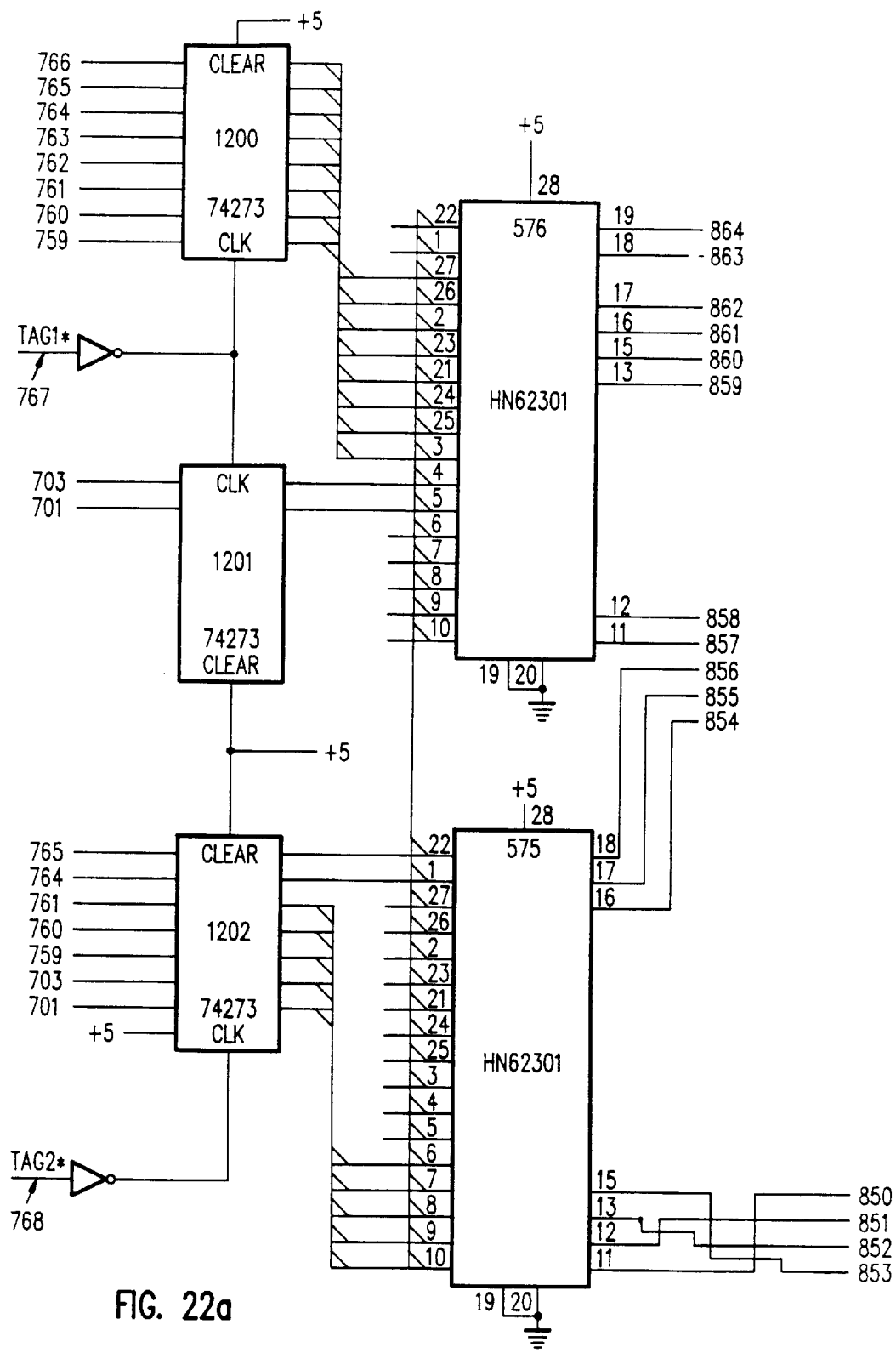
FIGS. 22a and 22b are a schematic diagram of ROM translation circuit 819.

ROM translation circuit 819 (FIGS. 22*a* and 22*b*) of the disk emulator is implemented with a pair ROMs 575,576, for example an Hitachi HN62301P or equivalent, which have 131,072 eight bit addressable locations. Each ROM has 17 address input terminals so that the entire SMD cylinder/head bus is accommodated, and 8 output terminals as shown in FIG. 22*a*.

The SMD controller provides the lowest order-bits of the 12 bits of cylinder address information on bit-0 through bit-9 lines 701, 703, 759–766 (FIG. 22*a*) and enables the lower order cylinder address bits with a low signal on tag-1 complement line 767. In the disk emulator, the cylinder address signals on bit-0 through bit-9 lines 701, 703, 759–766 are stored in registers of integrated circuits 1200, 1201 by the enabling low, signal on tag-1 complement line 767.

The SMD controller provides the head address information on bit-0 through bit-4 lines 701, 703, 759–761 and the two highest order bits of the cylinder address information on bit-7 and bit-8 lines 764, 765, all of which are enabled by a low signal on tag-2 complement line 768. These signals are stored in other registers of integrated circuit 1202. Thus, the registers in integrated circuits 1200, 1201, 1202 latch the entire 17 bits of geometric address information provided by the SMD controller. The output terminals of integrated circuits 1200, 1201, 1202 are connected to the input terminals of ROMs 575, 576 so that each ROM simultaneously receives the entire 17 bits of cylinder and head address information.

ROM 575 contains a lookup table which is used to convert the 17 bits of SMD geometric address information to the seven least significant bits of the binary.high order address for DRAM array 822 and ROM 576 contains a lookup table which is used to convert the 17 bits SMD geometric address information to the eight most significant bits of the binary high order address for DRAM array 822. The lookup tables, which are stored in ROMs 575, 576, can be generated manually, but in a preferred embodiment a computer program, written in the BASIC computer language, (FIGS. 47*a*, 47*b*, 47*c*) was used to generate data that was programmed into ROMs 575, 576. The program (FIGS. 47*a*, 47*b*, 47*c*) was executed using an IBM PC with an MS-DOS version 3.2 operating system. More specifically, the interpretive BASIC package of MS-DOS version 3.2 was used in the IBM PC to execute the BASIC computer program. In FIGS. 47*a*, 47*b*, 47*c*, the numbers at the left hand side of each line are the line numbers for the program and the remainder of each line comprises a BASIC computer program instruction. To use the BASIC computer program, the number of cylinders in the hard disk drive being replaced with the disk emulator of this invention and the number of heads in that disk drive must be supplied. In FIG. 47*b*, the number of cylinders has been entered on line 1900 as 822 and the number of heads has been entered on line 1950 as 5. To change the program, the user must enter the number of cylinders after "C=" on line 1900 and the number of heads after "H=" on line 1950. To run the program, the command "RUN 1900" is given to the computer. The command "RUN 1900" begins program execution. The program then generates the necessary ROM output signals for the various address input signals to ROMs 575, 576 from the SMD disk controller.

A portion of the output listing generated by the BASIC computer program illustrated in FIGS. 47*a*, 47*b*, 47*c* is given in FIG. 48. The program generates pairs of output lines 1300 where the first line in each pair is labeled "ADDRESS" and the second line is labeled "CONTENTS." The ADDRESS line 1301 corresponds to the geometric address signals on the input terminals of ROMs 575, 576 from the SMD disk controller. Since the address signals are derived from SMD disk controller, they are not binary in nature. Thus, every address for ROMs 575, 576 is not used. The CONTENTS line represents the binary address for DRAM array 822 corresponding to the geometric address given in the ADDRESS line. The first 8 bits 1302 on the left hand side of the CONTENTS line are the output signals for ROM 576 and the second 8 bits 1303 on the right hand side are the output signals for ROM 575. Note that the ROM output signals, as shown in successive ADDRESS lines, increment in perfect binary. The data generated by using the BASIC computer program must be programmed into ROMs 575, 576. Means for programming the data from the BASIC computer program into ROMs 575, 576 are known to those skilled in the art.

The lookup tables programmed into ROMs 575, 576 translate the signals from the SMD disk controller on the input terminals of ROMs 575, 576, which correspond to geometric addresses for a hard disk, into signals on the output terminals of ROMs 575, 576 which correspond to contiguous higher order addresses in DRAM array 822 of the disk emulator. The output signals from ROM 576, which define the higher order bits of the high order addresses, are provided on the output terminals from ROM 576 to the DRAM bit-7 through DRAM bit-14 lines 857–864. The signals on DRAM bit-9 line 858 through DRAM bit-14 line 864 from translation ROM 576 are passed through a configuration block J9 (FIG. 22b) to input terminals D0, D1, D2, D3 of integrated circuit 1038, the input terminal of D-type flip-flop 480, and the input terminal of the D-type flip-flop 479, respectively. Similarly, configuration block J8 passes the signals on DRAM bit-5 line through DRAM bit-8 line 855–858 from ROMs 575, 576 to input terminals D0, D1, D2, D3 of integrated circuit 1039 respectively and the signal on DRAM bit-4 line 854 to the input terminal of flip-flop 483. The signals on DRAM bit-0 line 850 through DRAM bit-3 line 853 from ROM 575 are applied to input terminals D0, D1, D2, D3 of integrated circuit 1040, respectively (FIGS. 22a and 22b).

Configuration blocks J7, J8, J9 (FIG. 22b) permit easy modification of the coupling of the DRAM bit lines in the disk emulator to the addressing circuitry of the disk emulator, and consequently provide means for adapting the disk emulator to an alternative implementation of the SMD interface convention. One embodiment is shown in FIGS. 22a and 22b for the output signals from ROMs 575, 576 where the least significant bit is on DRAM bit-0 line 850 and the most significant bit is on DRAM bit-14 line 864. However, ROMs 575, 576 may be programmed so that the contiguous binary address appears in a different order on the output pins of ROMs 575, 576. In such an embodiment, configuration blocks J7, J8, J9 are used to configure the binary address on the input terminals of flip-flops 483, 479 and 480 and integrated circuits 1038, 1039.

Figure 22B:
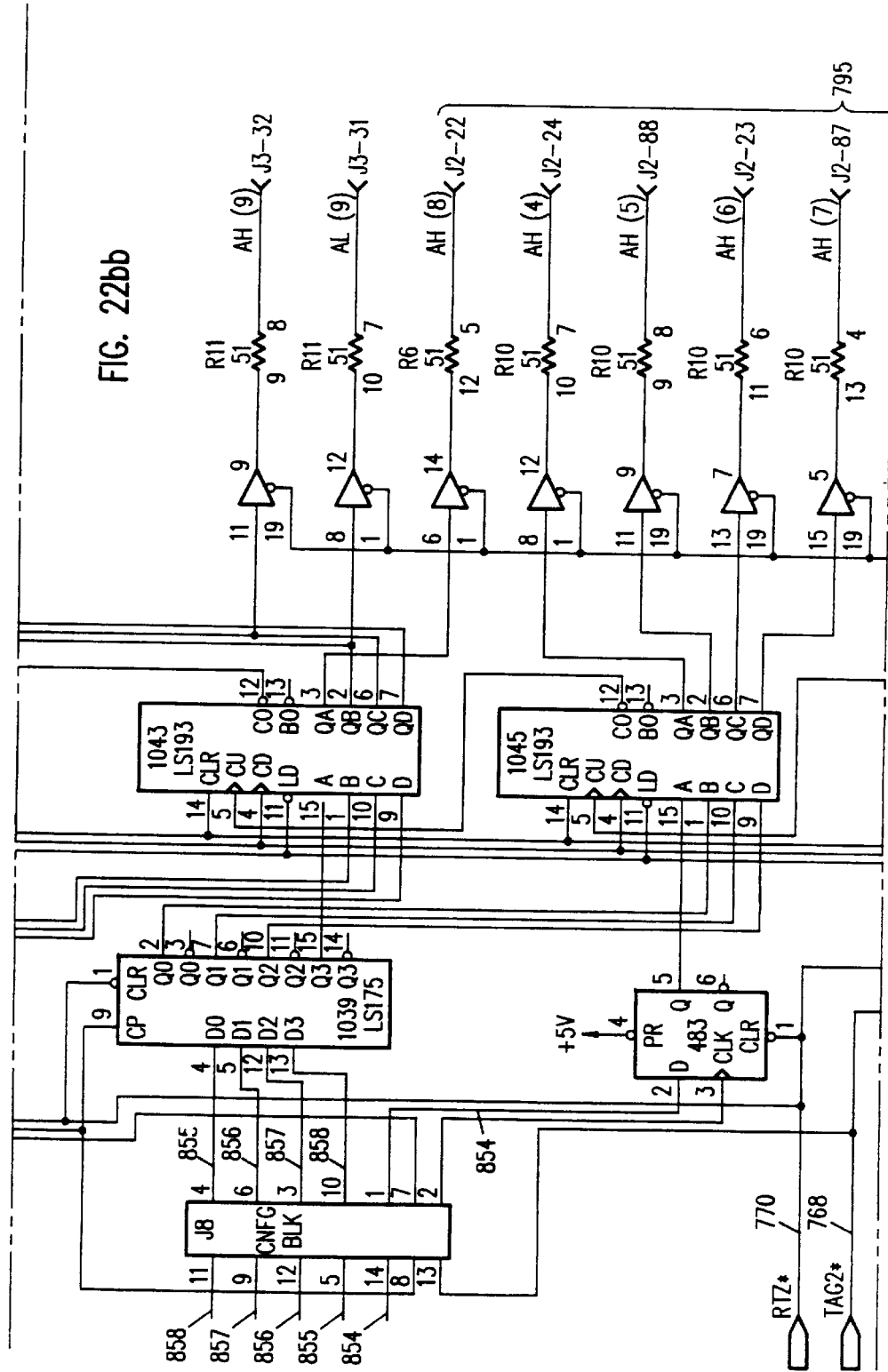
Figure 23:
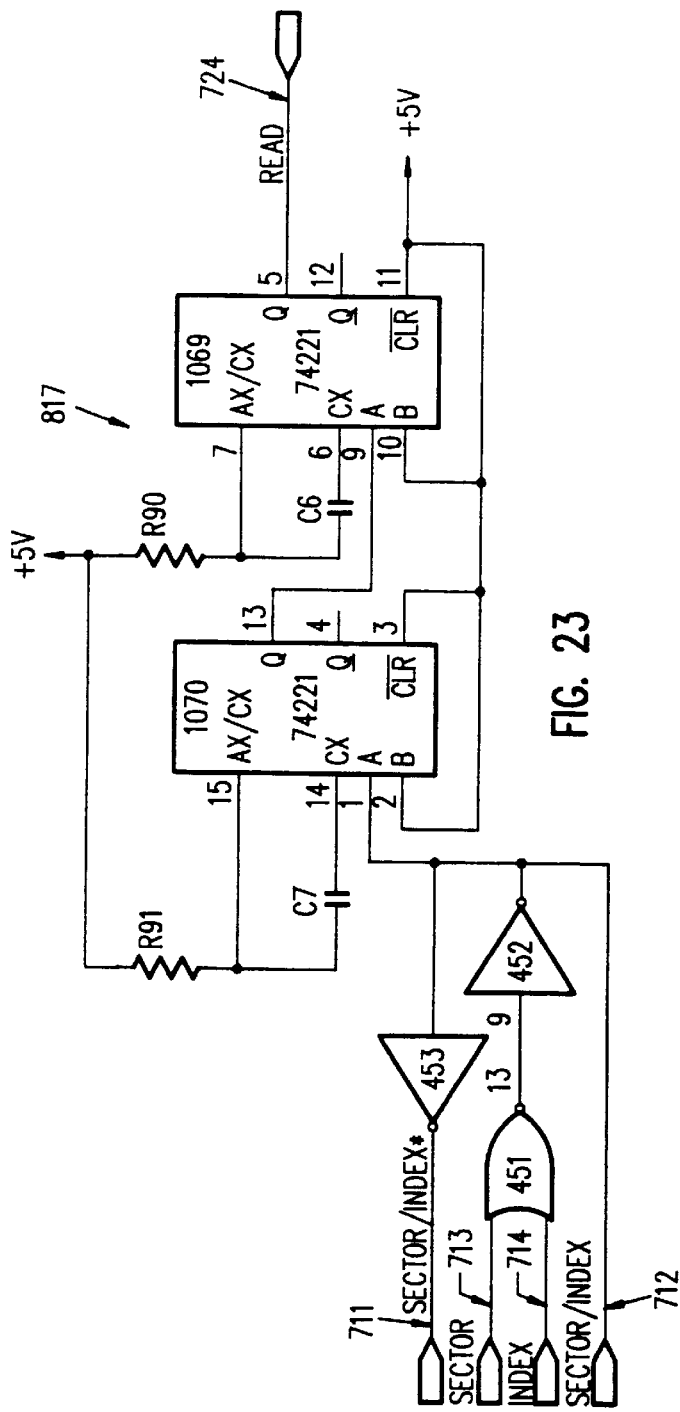
FIG. 23 is a schematic diagram of sector/index circuit 817 of the disk emulator.

The enabling signal, a low signal, on tag-1 complement line 767 (FIG. 22b) from receiver 457 (FIG. 5) returns to a high level and this low to high transition in the signal clocks flip-flops 479, 480 and flip-flops in integrated circuits 1038, 1039 (FIG. 22b). Thus, the signal on tag-1 complement line 767 not only latches the lower order geometric cylinder addresses in integrated circuits 1200, 1201, but also latches the ten most significant bits of the contiguous binary address generated by ROMs 575, 576 in flip-flops 479, 480 and in flip-flops of integrated circuits 1038, 1039. Similarly, the signals on DRAM bit-0 line through DRAM bit-4 line 850–854 are each latched in a flip-flop when the signal on tag-2 complement line 768 goes high after latching the SMD head address and the SMD higher order cylinder bits in integrated circuit 1202. Hence, the signals on the tag-1 complement line 767 and the tag-2 complement line 768 effectively enable the translated signals by latching the signals in D-type flip-flops (FIG. 22b).

The signals stored in the D-type flip-flops from ROMs 575, 576 effectively replace the drive mechanism of the hard disk. The latched signals are equivalent to placing the read/write head of a hard disk over the desired track. Consequently, the mechanical drive mechanism, the means for determining the position of the mechanical drive mechanism, and the iterative procedure used to locate the desired track in a conventional hard disk are replaced with the ROM translation circuit which instantaneously defines the contiguous higher order addresses which correspond to the geometric address information for a typical hard disk drive. The elimination of the drive mechanism should enhance reliability, in addition to enhancing the response time, over a conventional hard disk.

In the embodiment which modifies the disk controller so that the controller generates binary addresses, ROMs 575, 576 and integrated circuits 1200, 1201, 1202 are eliminated from ROM translation circuit 819 (FIGS. 22a and 22b), inverters are inserted in tag-1 complement line 767 and tag-2 complement line 768 (FIG. 22b), and the signals on the bit-0 through bit-9 lines are provided directly to the DRAM-bit lines according to the SMD convention. The other elements of the ROM translation circuit 819 in the embodiment is identical to those shown in FIGS. 22a and 22b.

Hence, when the 8051 microprocessor 1063, in FIG. 21, receives the signal on on-cylinder complement line 771 which initiates the rapid sector cycle mode, the head and track information supplied by the SMD control cable have been converted to contiguous higher order binary addresses and latched for further use by the disk emulator.

Lower Order Address Generation—Sector Address

Since the disk emulator has virtually no delay time for positioning the head over the track specified by the SMD disk controller, when the seek command is received from the SMD disk controller, the 8051 microprocessor 1063, in FIG. 21, enters the rapid cycle sector mode and immediately issues an index pulse on an index line 714, connected to terminal P06 of microprocessor 1063. Microprocessor 1063 simultaneously provides on P00, P01, P02, P03, P04, lines 786–790, which are connected to terminals P00 to P04 respectively of microprocessor 1063, the address corresponding to the zero sector of the track specified by the SMD disk controller. Since the normal convention is that 32 sectors define any given track, the signals provided on output terminals P00 through P04 of 8051 microprocessor 1063 uniquely define each sector in a track.

Index Pulse

Figure 7B:
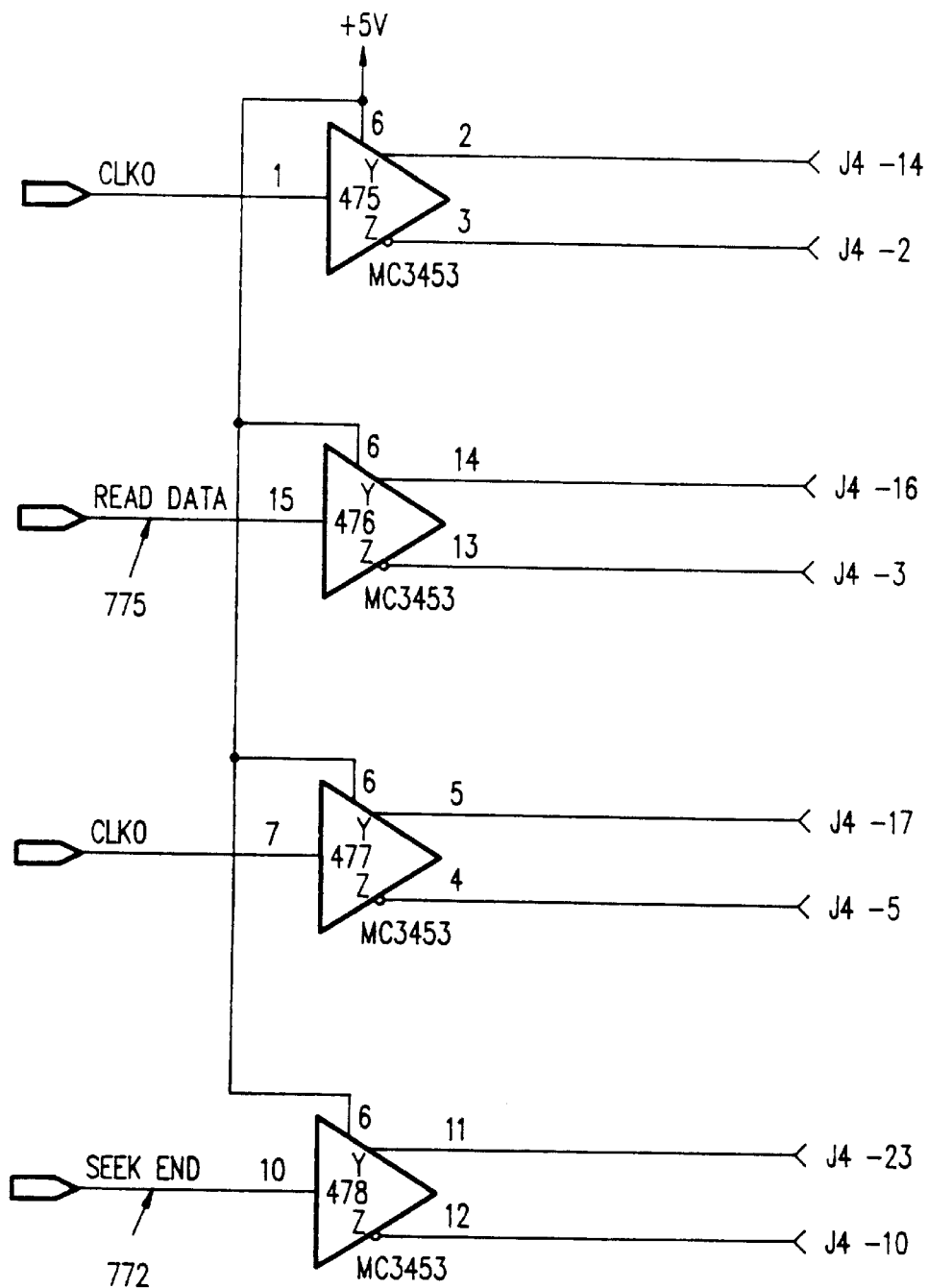
FIG. 7 and FIG. 8 are schematic diagrams of the differential current mode drivers which interface the selected lines in the disk emulator with the SMD data cable and the SMD control cable.
Figure 8B:
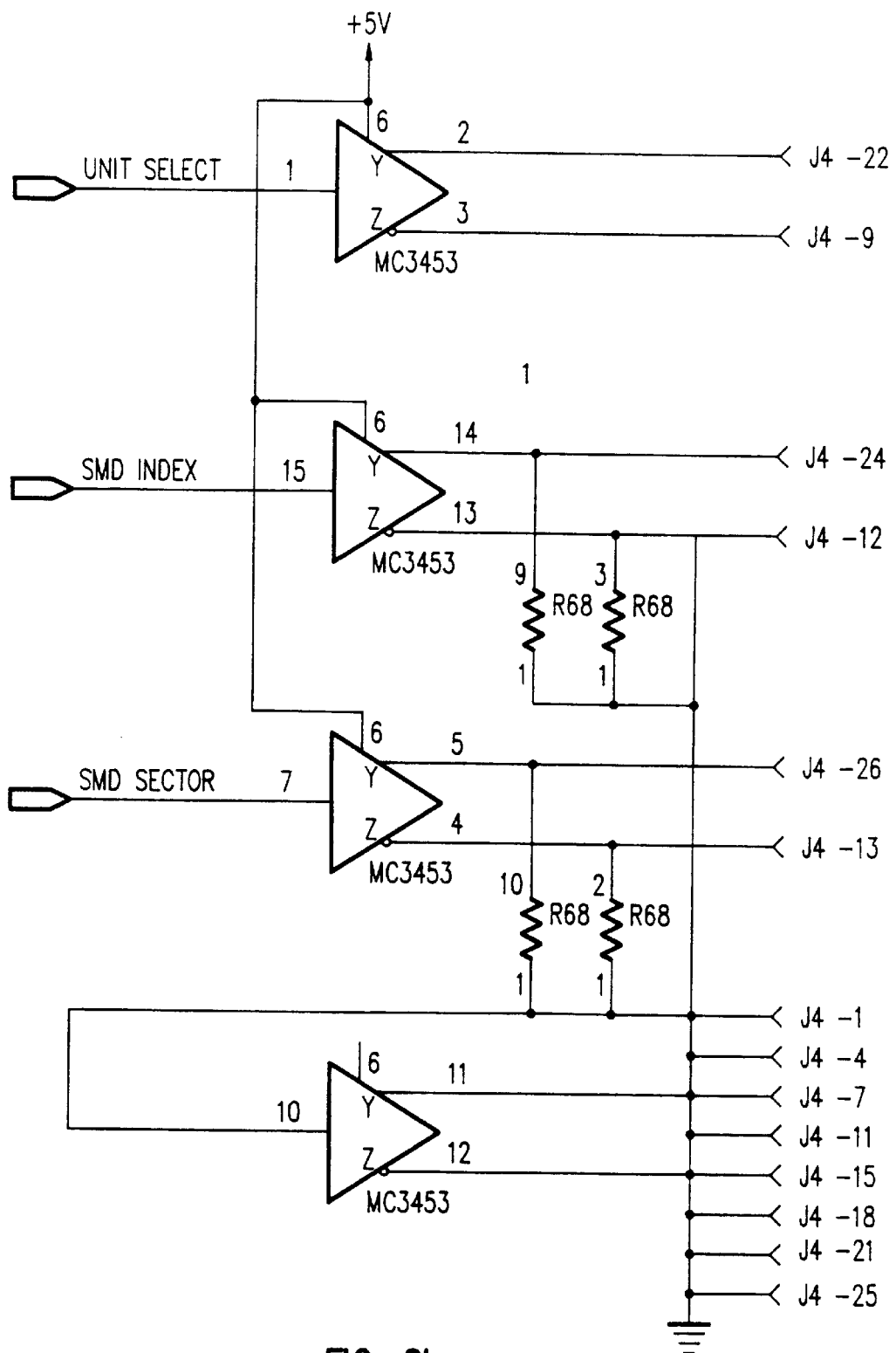

The index pulse on the index line 714 from terminal P06 of microprocessor 1063 (FIG. 21) is passed to sector/index circuit 817 (FIG. 23) and SMD sector/index circuit 818 (FIG. 46). The falling edge of the index signal, which is applied to an input terminal A of monostable multivibrator 454 (FIG. 46), fires monostable multivibrator 454 because an input terminal B of multivibrator 454 is connected to the positive power supply voltage. Hence, multivibrator 454 generates a signal on a SMD index line 773 which is connected to an output terminal Q of multivibrator 454. The high signal on SMD index line 773 is converted to a differential signal on SMD control cable lines J5-48, J5-18 by differential current mode driver 471 (FIG. 7).

In sector/index circuit 817 (FIG. 23), the high signal on index line 714 is inverted by NOR gate 451 and the low output signal from NOR gate 451 is inverted by inverter 452. Inverter 452 drives sector/index line 712 with a high output signal and also drives inverter 453 which in turn generates a low signal on the sector/index complement line 711. The high signal from inverter 452 is also applied to an input terminal A of monostable multivibrator 1070. The input terminal B of multivibrator 1070 is connected to the positive power supply voltage. Hence, on the falling edge of the high signal from inverter 452 monostable multivibrator 1070 generates a signal which is applied to an input terminal A of a monostable multivibrator 1069 which also has an input terminal B tied to he positive power supply voltage. On the falling edge of the signal from multivibrator 1070, which occurs approximately 1.5 microseconds after initiation of the pulse by multivibrator 1070, monostable multivibrator 1069 generates a high signal with a pulse width of about 0.5–0.7 microseconds on a read zero line 724, which is connected to output terminal Q of monostable multivibrator 1069.

The high signal on read zero line 724 initiates the initial read cycle of the disk emulator for each sector, as described below. However, monostable multivibrators 1069, 1070, which both trip on a falling edge of the signal on input terminal A, delay the initiation of the read cycle so that the signals on sector/index line 712 and sector/index complement line 711 initialize the disk emulator prior to initiation of the initial read cycle.

The high signal on sector/index line 712 is inverted by NOR gate 405 (FIG. 15) and by NOR gate 407 in write control circuit 806 (FIG. 15). The resulting low signal from NOR gate 407 clears counters 1027, 1028, and the low signal from NOR gate 405 sets D-type flip-flop 428.

Similarly, in memory word counter circuit 807 in FIG. 19, the high signal on line 712 is applied to a first input terminal of NOR gate 497 and the resulting low output signal from NOR gate 497 clears J-K flip-flop 498 and so the signal on sector full line 757 from output terminal Q of flip-flop 498 is low and the signal on sector full complement line 758 from output terminal 0 of flip-flop 498 is high.

In read counter circuit 810 illustrated in FIG. 18, the high signal on sector/index line 712 drives the output signal from OR gate 415 high which in turn drives the output signal from NOR gate 417 low. The low output signal from NOR gate 417 clears counters 1022 and 1023.

The low signal on sector/index complement line 711 is also used to clear components in the disk emulator. In shift register circuit 802, shown in FIG. 10, the signal on sector/index complement line 711 clears each of the registers in integrated circuits 1104-1111, 1121. Also, the low signal on sector/index complement line 711 clears flip-flop 584 in writing flag circuit 811 (FIG. 24) and as a result the signal on writing line 709 is low and the signal on writing complement line 710 is high.

In ROM translation circuit 819 (FIGS. 22a and 22b), after the high signal on sector/index line 712 returns to a low level the output signal from OR gate 485 goes low. This low signal loads counters 1042, 1043, 1044, 1045. Counters 1042, 1043, 1044, 1045 are used in the disk emulator backup system to generate the addresses necessary to access the entire DRAM array 822 when saving the contents of DRAM array 822 on the SCSI disk. However, in normal operation of the disk emulator, counters 1042, 1043, 1044, 1045 simply pass the signal on each input terminal of the counter to the line attached to the associated output terminal. Thus, after the sector/index pulse on line 712 loads counters 1042, 1043, 1044, 1045, the signals on DRAM bit-0 line through DRAM bit-14 lines 850–864 are passed to the output terminals of counters 1042–1045.

Specifically, counter 1042 (FIG. 22b) passes the signal from bit-12 line 862 to input terminal D of four-line to sixteen-line decoder 1091 and counter 1043 passes the signals from DRAM bit-9 line 859 through bit-11 line 861 to input terminals A, B, C respectively of four-line to sixteen-line decoder 1091. The signals on DRAM bit-9 line 859 through DRAM bit-12 line 862 go through configuration block J7 before reaching decoder 1091. Counter 1044 (FIG. 22b) passes the signals on DRAM bit-0 through DRAM bit-3 lines 850-853 to lines J2-26, J2-90, J2-25 and J2-89 respectively, which in turn provide the signals to input terminals AH0, AH1, AH2, AH3 respectively of the 8207 DRAM controllers in the disk emulator. Input terminals AH4 through AH7 respectively of the 8207 DRAM controller are driven by the signals on DRAM bit-4 line 854, DRAM bit-5 line 855, DRAM bit-6 line 856 and DRAM bit-8 line 858 respectively, which are passed through counter 1045. Similarly, the signal on DRAM bit-8 line 858 is passed through counter 1043 to terminal AH8 of the DRAM controllers.

Thus, the index pulse generated by microprocessor 1063 in response to the seek command from the SMD disk controller effectively passes the higher order addresses from the latches in ROM translation circuit 819 to the 8207 DRAM controller on each of the sixteen DRAM cards comprising the DRAM array 822. The four-line to sixteen-line decoder 1091 (FIG. 22b) processes the signals from DRAM bit-9 through cylinder bit-12 lines 859–862, and uniquely enables one of the sixteen DRAM cards by generating a low signal on card select line 792 for that card.

Initial Dram Card Selection

FIGS. 26a and 26b illustrate a typical DRAM card used in the disk emulator. With the embodiment illustrated, there are a maximum of sixteen of these cards in the disk emulator. It will, of course, be appreciated that the present invention is not limited to using any particular number of DRAM cards. Each card has a 8207 DRAM controller, shown in detail in FIG. 25, a D0 buffer circuit 845, shown in detail in FIGS. 27a through 27d, a connector (not shown), which interfaces the card with the remaining circuitry in the disk emulator, and four banks of DRAM integrated circuits wherein each bank is further subdivided into four blocks.

Figure 25B:
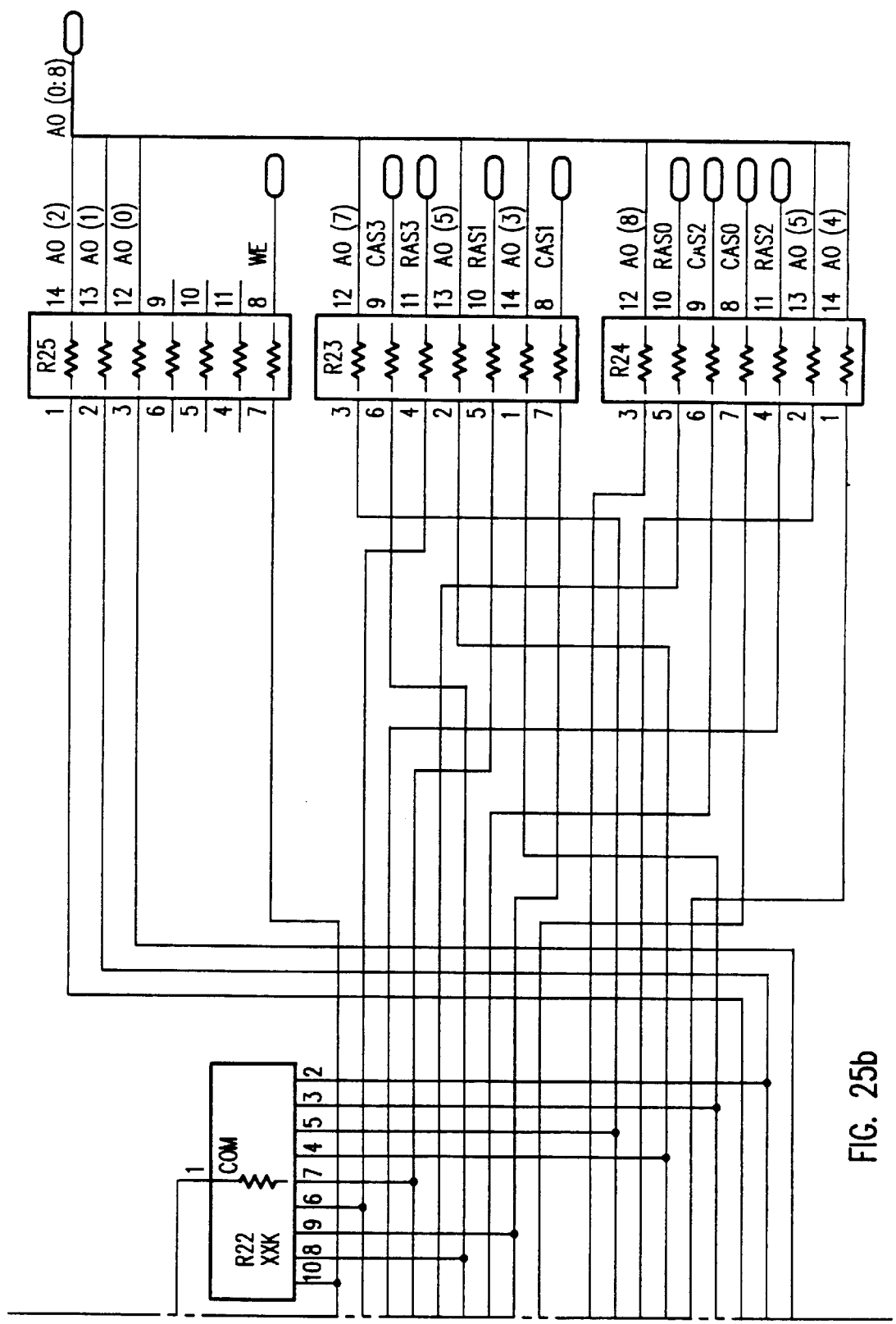
FIG. 25 is a schematic diagram of one of the sixteen DRAM controllers used in the disk emulator.
Figure 25C:
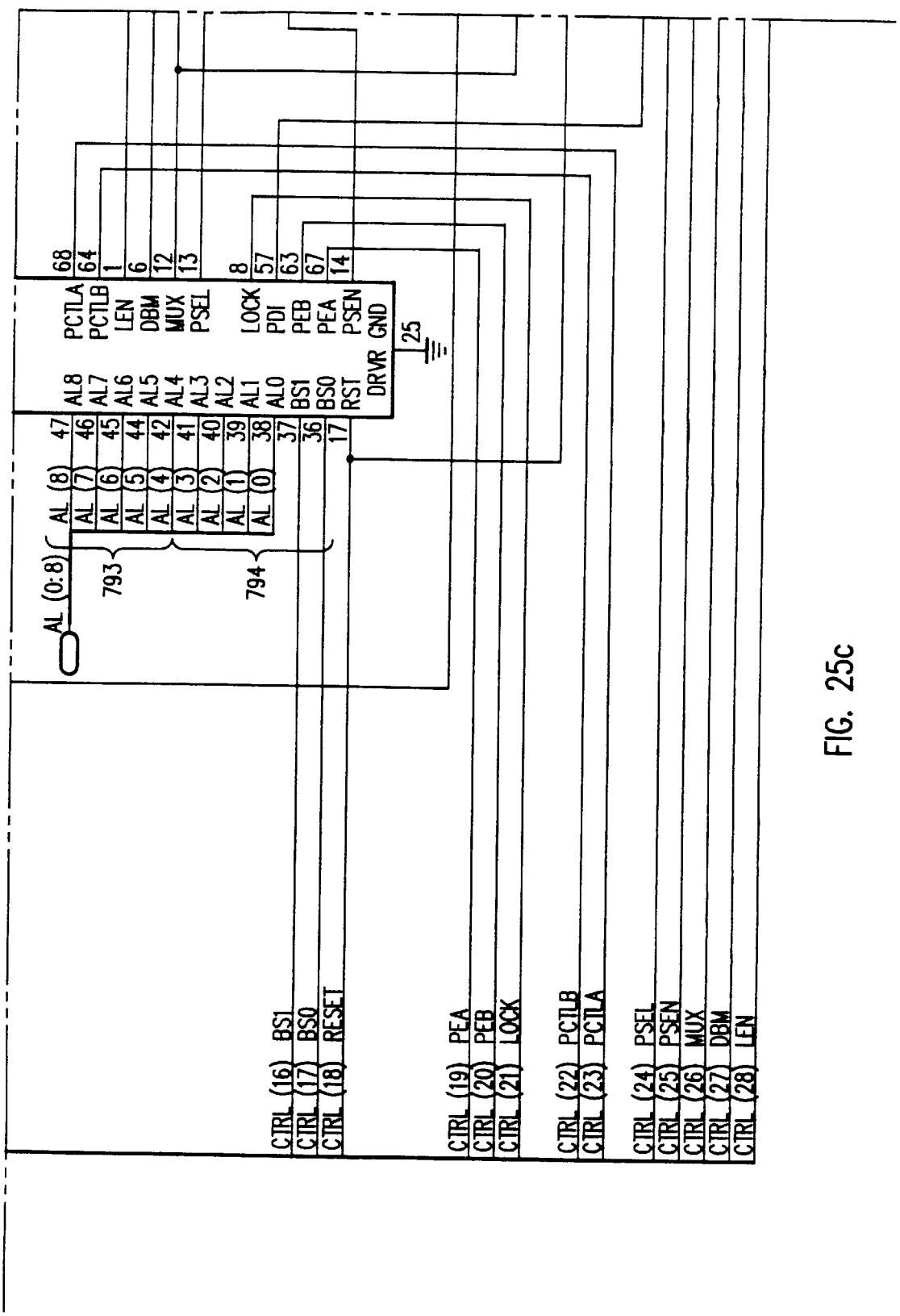
Figure 25D:
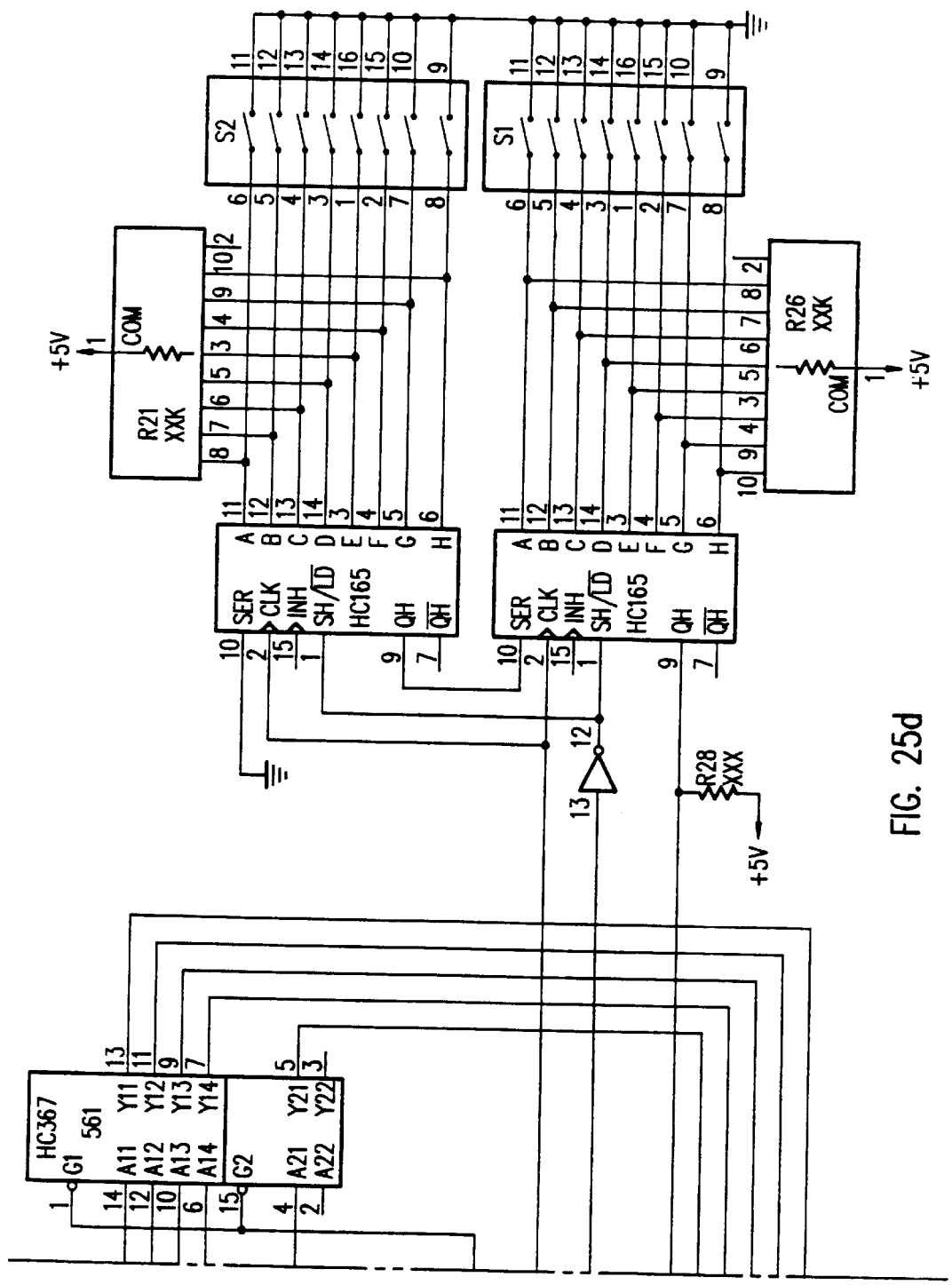
Figure 28A:
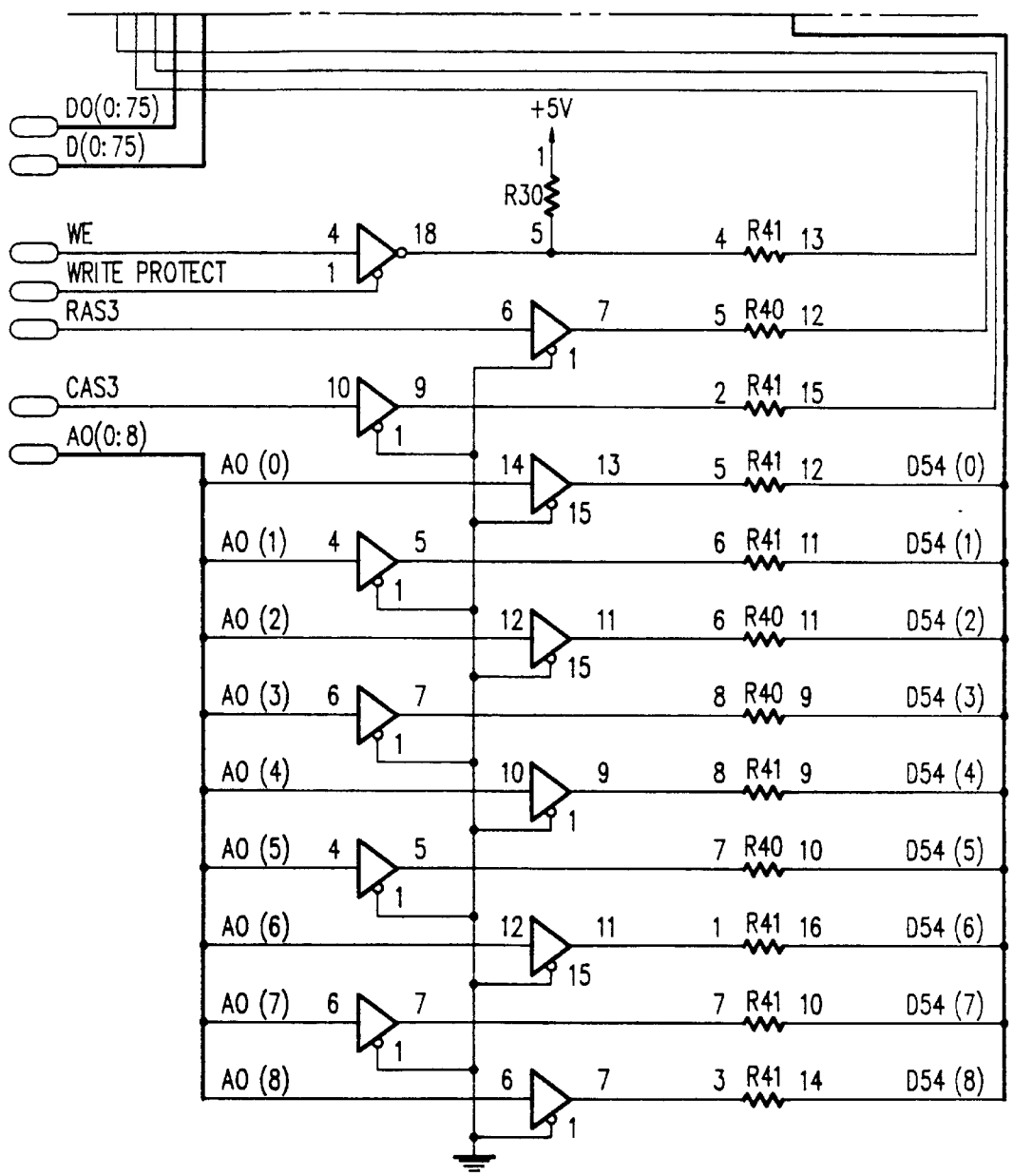
FIGS. 28a through 28c illustrate one storage block of the four storage blocks used in each bank of a DRAM card in the disk emulator.
Figure 28B:
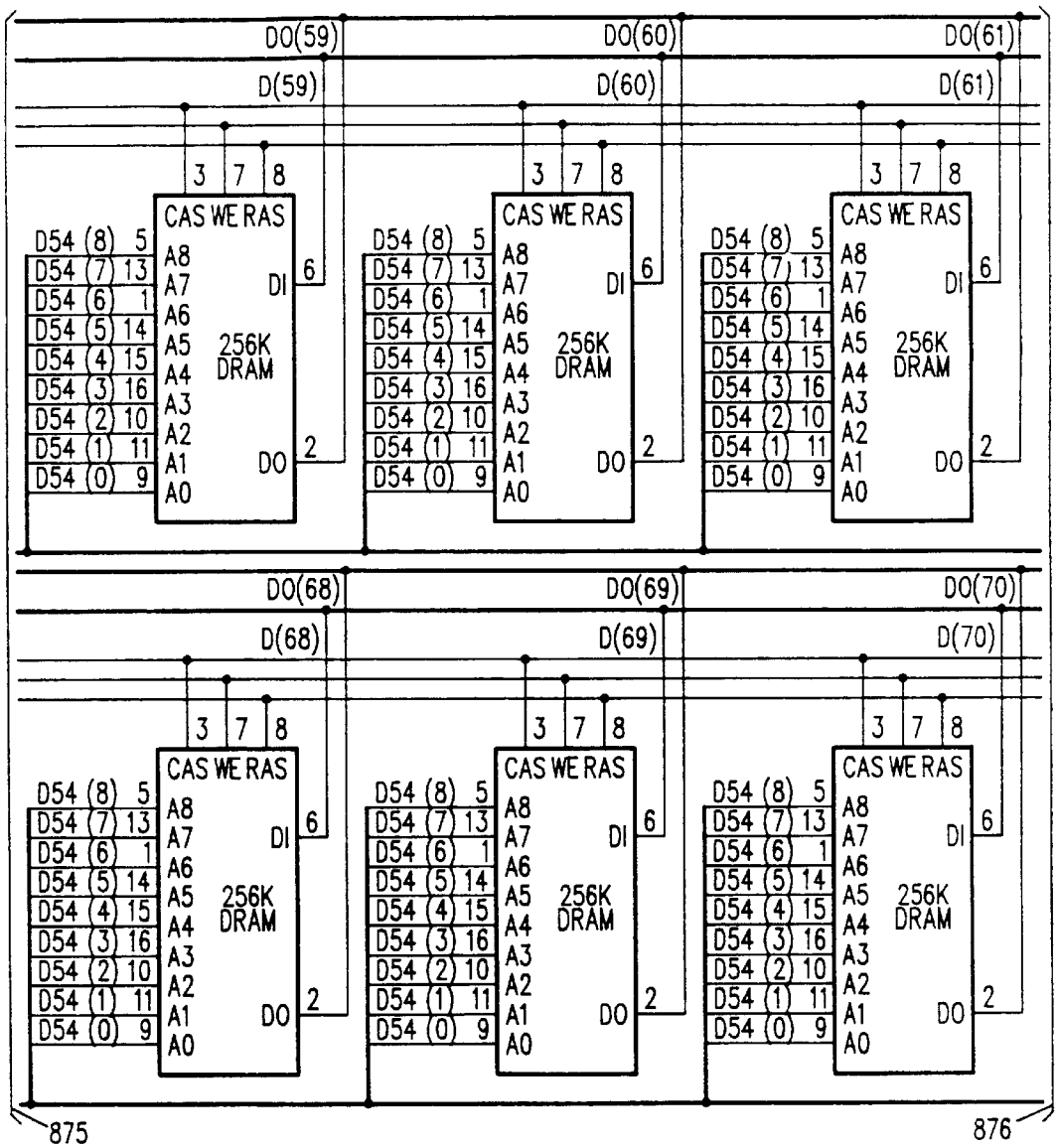
Figure 28C:
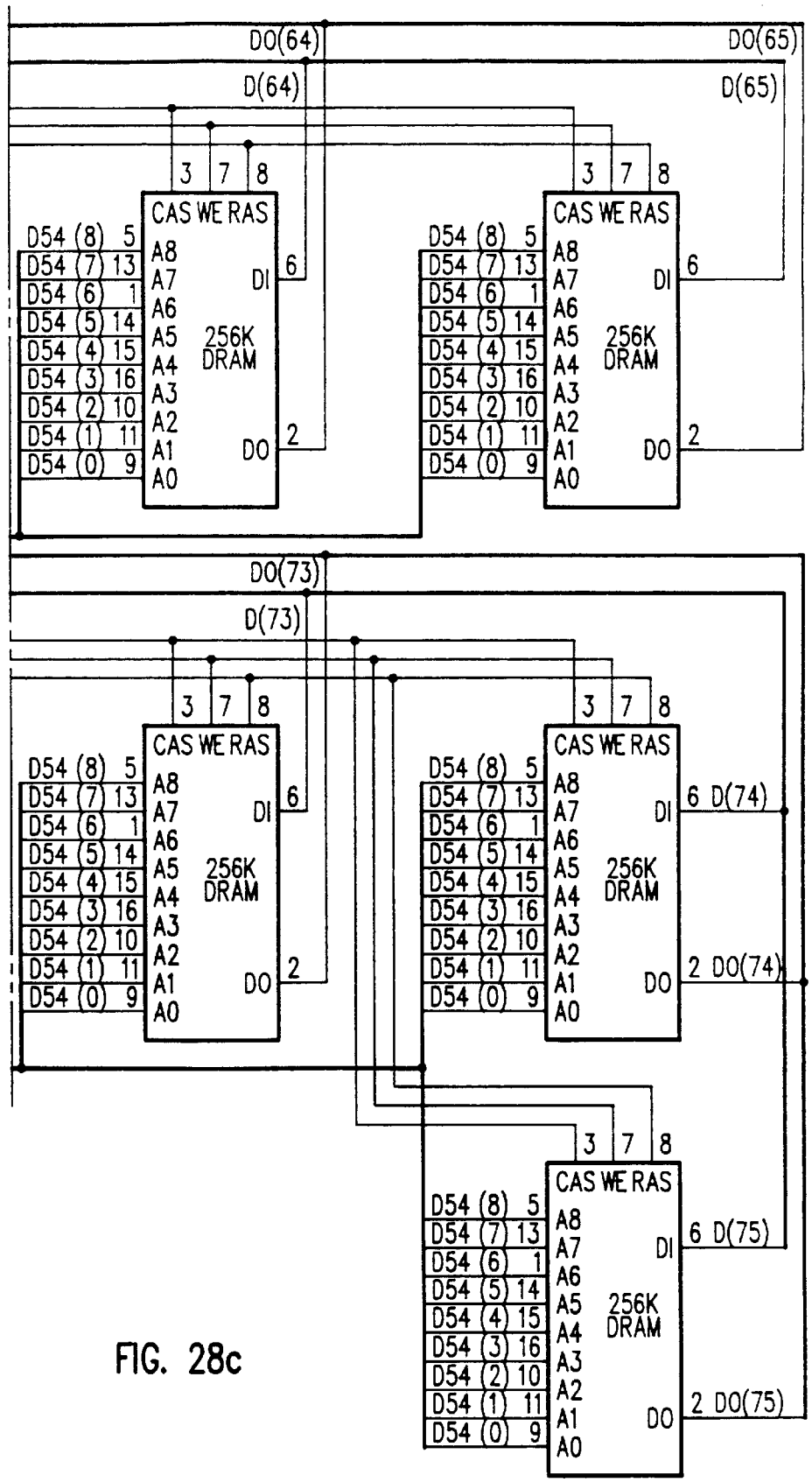
Figure 28C:
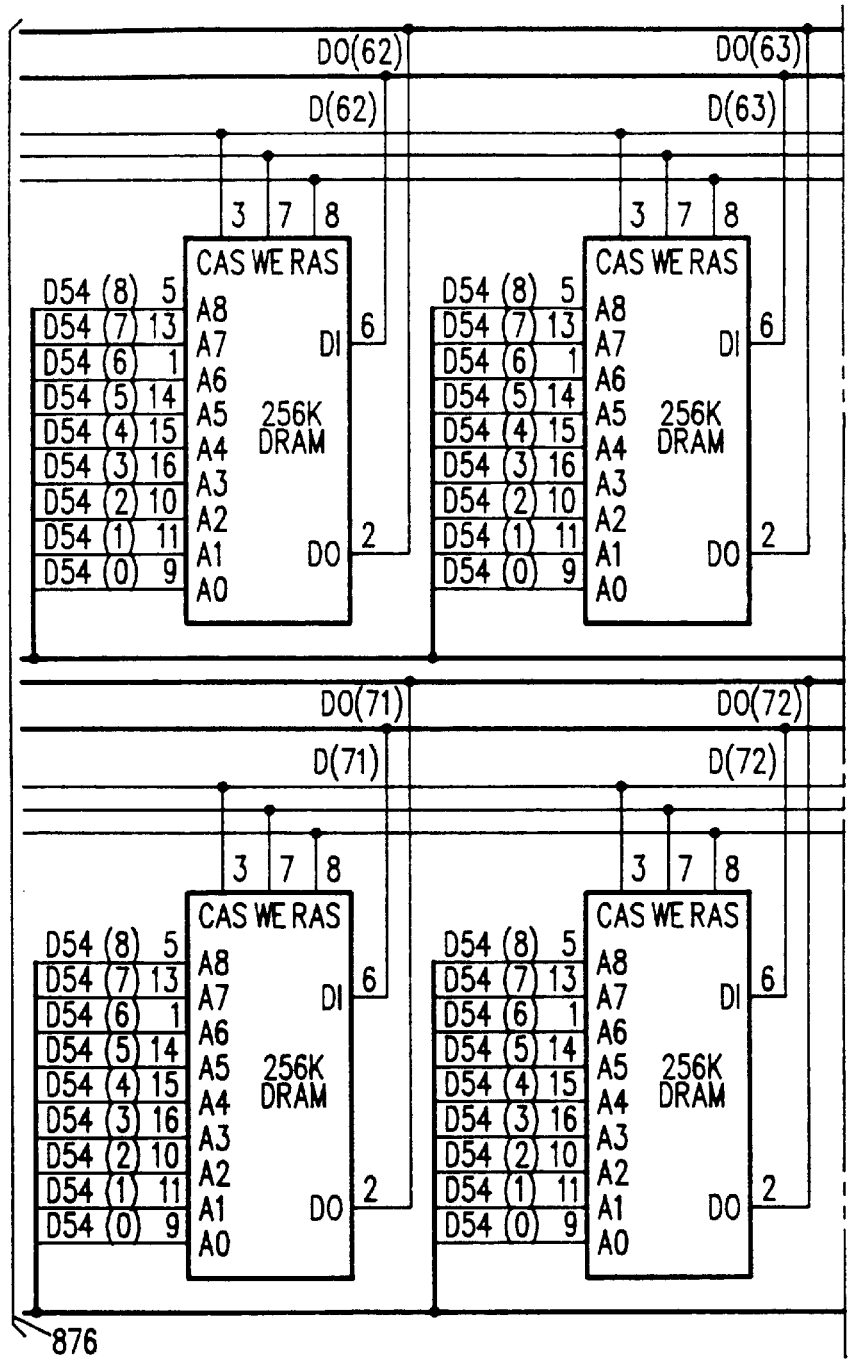

A typical block of a bank is illustrated in FIGS. 28a through 28c. Accordingly, each of the output lines from decoder 1091 (FIG. 22b) interfaces with a card select line 792 to the DRAM controller circuit on one of the sixteen DRAM cards and enable line 801 (FIGS. 26a and 26b). For the fifteen DRAM cards which receive a high signal on card select line 792 from one of the output lines of decoder 1091, drivers 560, 561 in the DRAM controller circuit, FIG. 25, are inhibited. Hence, on these fifteen DRAM cards the signals from each of the 8207 DRAM controllers to drivers 560, 561 are not passed to the other circuits in the disk emulator. Further, the high signal on enable line 801 (FIGS. 27a through 27d) to D0 buffer circuit 845 inhibits drivers 562–573 in D0 buffer circuit 845 which effectively removes the DRAM banks on the card from parallel bus 700.

Conversely, the low signal on card select line 792 to the DRAM controller circuit on the sixteenth DRAM card from decoder 1091 (FIG. 22b) eatables drivers 560, 561 (FIG. 25) so that this 8207 DRAM controller communicates with the other circuits in the disk emulator. Similarly, the low signal on enable line 801 (FIGS. 27a through 27d) to D0 buffer circuit 845 interfaces the DRAM banks on the sixteenth DRAM card with parallel bus 700. It should be noted that the sixteenth card, as used here, does not mean the sixteenth DRAM card physically in the disk emulator, but rather the DRAM card which is selected by the higher order address to decoder 1091 and therefore is the DRAM card referred to in the following description.

The 8207 DRAM controller, as illustrated in FIG. 25, on the card enabled by decoder 1091 (FIG. 22b) addresses the region in the DRAMs corresponding to the signals on terminals AH0 through AH8 and also AL0 through AL8 of the controller. The 8207 DRAM controller generates the appropriate signals on the multiplexed address output terminals A00 through A08 of the controller. Each of the signals from output terminals A00 through A08 pass through a driver in each block (FIGS. 28a through 28c) of the DRAM bank and a resistor to one of the address input terminals A0–A8 of each DRAM integrated circuit in the block. The addresses are latched by the column address strobe signals and the row address strobe signals from the 8207 DRAM controller.

Sector and Word Address Initialization

While the location of the track requested by the SMD controller is now completely identified in the DRAM array, the counters in the disk emulator that are used to identify the sector and the words within the sector must be initialized. In memory word counter circuit 807 (FIG. 19), the low signal generated by NOR gate 495 in response to the high signal on sector/index line 712 loads counters 1054 and 1055 such that they count 64 clock pulses and then reset. In addition, the low signals loaded on output terminals QA, QB of counter 1055 drive buffers 502, 501, respectively, which in turn drive the bank select input terminals, BS0, BS1 respectively, of the 8207 DRAM controller (FIG. 25) so that the zeroth bank of 256K DRAMs is accessed on the DRAM card selected by decoder 1091 (FIG. 22b).

The low signal from output terminal QA of counter 1055 (FIG. 19) is also applied to a first input terminal of NOR gate 509, to the input terminal of inverter 505 which in turn generates a high signal on the first input terminal of NOR gate 506. Thus, NOR gate 506, which also receives a low signal from terminal QB of counter 1055, generates a low signal which is applied to a first input terminal of NAND gate 510. The low signal from terminal QB of counter 1055 is also applied to the second input terminal of NOR gate 509 and the high signal generated by NOR gate 509 is applied to the third input terminal of NAND gate 511.

Similarly, the low signals from output terminals QA, QB of counter 1054 are supplied to the first and second input terminals of NOR gate 508, respectively. The resulting high signal generated by NOR gate 508 is provided to the second input terminal of NAND gate 511 and to the third input terminal of NAND gate 510. The first input terminal of NAND gate 511 and the second input terminal of NAND gate 510 each receive the high output signal from NOR gate 507 that is generated in response to the low signals from terminals QC, QD of counter 1055, which are applied to the first and second input terminals of NOR gate 507 respectively.

Therefore, NAND gate 510, which receives the high output signals from NOR gate 507 and NOR gate 508, and the low output signal from NOR gate 506, provides a high output signal to a first input terminal of OR gate 515 and to an input terminal of OR gate 513 which in turn passes the high signal to the first input terminal of NAND gate 512. In response to the high input signal, OR gate 515 generates a high output signal which is applied to address-1 detection complement line 755. The high signal on address-1 detection complement line 755 disables data sync comparator 1122 in comparator circuit 815, shown in FIG. 14.

The low output signal from NAND gate 511 (FIG. 19), which is generated by the high input signals from NOR gates 507, 508, 509, is passed to a first input terminal of OR gate 514 which in turn generates a low signal on address zero detection complement line 754, because the signal from write counter zero state complement line 718 to the second input terminal of OR gate 514 and to the second input terminal of OR gate 515 is also low. The low signal on address zero detection complement line 754 enables the address sync comparator 1123 in comparator circuit 815 (FIG. 14). Consequently, the loading of counters 1054, 1055 of memory word counter circuit 807 (FIG. 19) by the index pulse from the microprocessor 1063 (FIG. 21) also initializes comparator circuit 815 (FIG. 14).

The low output signal from NAND gate 511 (FIG. 19) is also applied to the second input terminal of NAND gate 512 which generates a high signal on word address 2–63 complement line 756 because both of the input signals are low.

The low signals, which are loaded onto output terminals QC and QD of counter 1055 (FIG. 19) and output terminals QA and QB of counter 1054 by the low signal from NOR gate 495 in response to the index pulse on sector/index line 712, are also applied to the input terminals of buffers 500, 499, 504 and 503 respectively. Buffers 500, 499, 504, 503 generate low output signals that drive input terminals AL0, AL1, AL2 and AL3 respectively of the 8207 DRAM controller (FIG. 25). Hence, loading counters 1054, 1055 also initializes the lower order bits, which correspond to the words in the sector, of the lower order address generated by the 8207 DRAM controller to the zeroth word in the sector.

While the high signal on sector/index line 712 initialized word counters 1054, 1055 (FIG. 19) to the zero word position, the signal on sector/index complement line 711 loads counters 1052, 1053 (FIG. 19) with the signals on their input terminals. The signals from microprocessor 1063, (FIG. 21) corresponding to the sector address, are passed over P00 through P03 lines 786–789 to input terminals A, B, C, D of counter 1053 respectively and the signal on P04 line 790 is applied to input terminal A of counter 1052. Since counters 1052, 1053 are part of the back-up system, they are not enabled as counters during normal operation. Accordingly, the signal on sector/index complement line 711 loads the signals on P00–P04 lines 786–790 to the input terminals of buffers 491–494 and 490 respectively, and the resulting output signals from buffers 491, 492, 493, 494, and 490 drive the input terminals AL4–AL8 respectively of 8207 DRAM controller (FIG. 25). The signals on the terminals AL4–AL8 define the higher order bits-of the lower order addresses which correspond to the sectors in the track specified by the SMD controller. Since all the signals on terminals AL4–AL8 are initialized to a low level, the zeroth sector of the track is addressed.

Thus, the index signal from microprocessor 1063 (FIG. 21) with the sector address generated by microprocessor 1063 and the initialization of the counters in memory word counter circuit 807 (FIG. 19) has completed the definition of the address of the first word in DRAM array 822 that will be supplied to the SMD disk controller. This further demonstrates the access time advantage of the disk emulator. The initial track was located virtually instantaneously by the ROM translation circuit, and the zeroth word of the zeroth sector, which is the address field of the zeroth sector, is immediately identified as the first word which will be provided to the SMD controller. As is shown below, even if this is not the sector requested by the SMD controller, the disk emulator provides the correct sector to the SMD controller up to 500 times faster than a conventional hard disk.

The low signal on sector/index complement line 711 loads counters 1013, 1014 in first gap counter circuit 808 in FIG. 16 and counters 1011, 1012 in second gap counter circuit 809 (FIG. 16). As described previously, first gap counter 808 is loaded with the number of bytes prior to the address field and second gap counter 809 is loaded with the number of bytes prior to the data field.

Initialization of Memory Refresh Request

Figure 29:
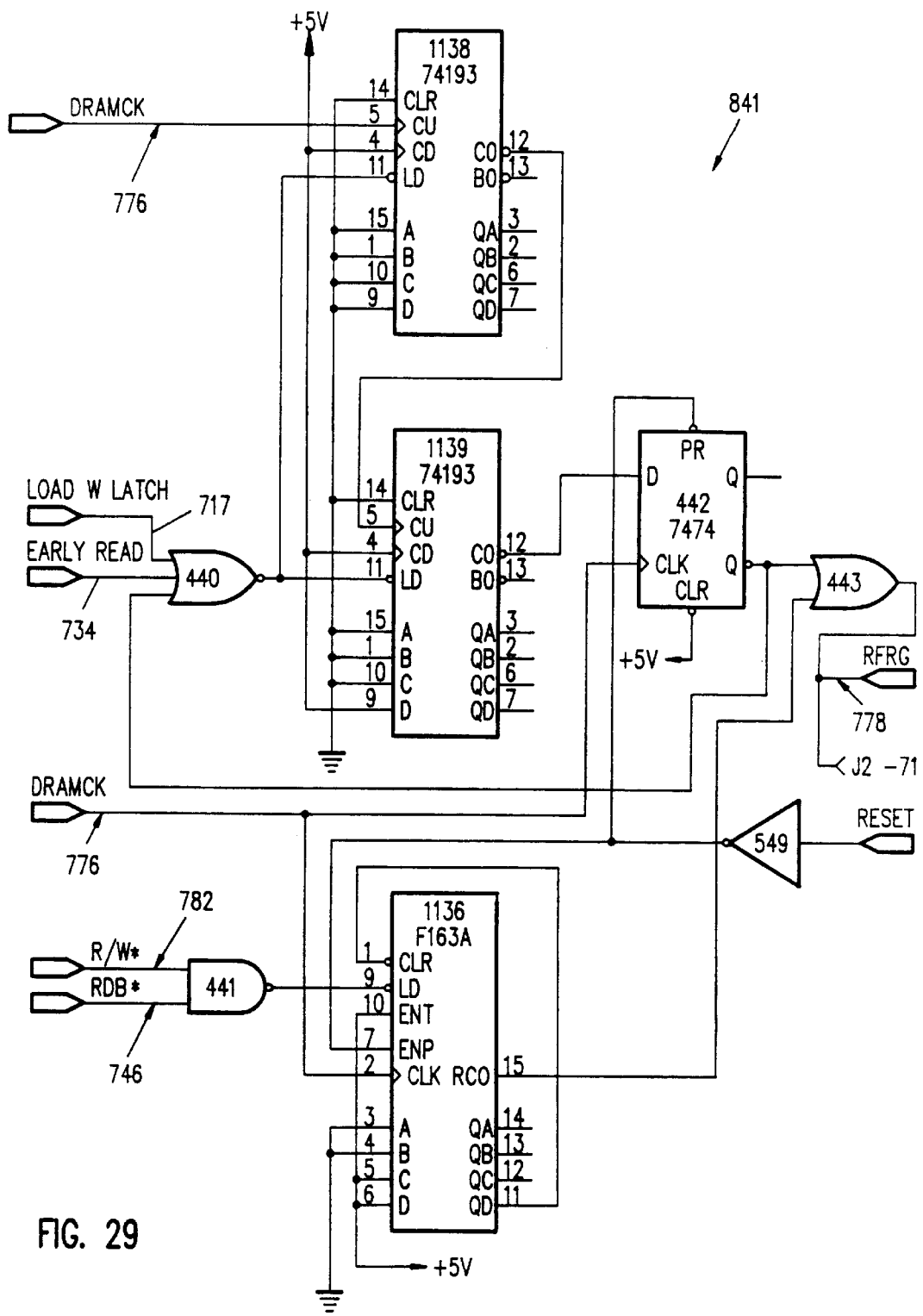
FIG. 29 is a schematic diagram of RFRQ circuit 841 in the disk emulator.

After the initialization of the circuits described above, the high signal on read zero line 724, which was initiated by the index pulse from 8051 microprocessor 1063 (FIG. 21), is generated by monostable 1069 (FIG. 23) and is passed through OR gate 426 in read counter circuit 810 (FIG. 18) to early read line 734. Early read line 734 supplies the high signal to the second input terminal of NOR gate 440 in RFRQ circuit 741 (FIG. 29). Load write latch line 717 from the write control circuit 806 (FIG. 15) supplies a low signal to a first input terminal of NOR gate 440 (FIG. 29) and the line connected to the output terminal Q of flip-flop 442 also provides a low signal to the third input terminal of NOR gate 440. The low output signal from NOR gate 440 loads counters 1138, 1139 such that they count 128 clock pulses on DRAM clock line 776.

After the high signal on early read line 734 loads counters 1138, 1139, counter 1138 counts each clock pulse on DRAM clock line 776 and after each fifteen clock pulses, counter 1138 rolls over and enables counter 1139 for one clock pulse. Accordingly, after 128 clock pulses on DRAM clock line 776, counter 1139 generates a low signal on its output terminal $\overline{CO}$, and this low signal is supplied to the input terminal D of D-type flip-flop 442. The next clock pulse on DRAM clock line 776 loads the low signal on input terminal D into flip-flop 442 and flip-flop 472 generates a high signal on output terminal $\overline{Q}$. This high signal is passed through OR gate 443 to the RFRQ output line 778 and to RFRQ input terminal of the 8207 DRAM controllers over line J2-71. The high signal from output terminal $\overline{Q}$ of flip-flop 442 is also passed back to the third input terminal of NOR gate 440 which generates a low signal and consequently reloads counters 1138, 1139 and starts the cycle over again.

Accordingly, after the index pulse, RFRQ circuit 841 (FIG. 29) generates after every 128 clock pulses a refresh signal to the 8207 DRAM controllers which causes the controllers to refresh DRAM array 822. This is necessitated by the volatile memory used as the storage media in the disk emulator. However, the RFRQ circuit assures that a refresh request does not conflict with a read or write sequence by reloading the counters at the start of each read or write sequence.

Retrieval of the Initial Address Field

Prior to 128 clock pulses on DRAM clock line 776, read counter circuit 810 (FIG. 18), and latch clock/error detection circuit 805 (FIG. 31) generate a sequence of signals, shown in FIGS. 30a through 30k, which load the zeroth word of the zeroth sector of the track specified by the SMD controller into latch circuit 803 (FIG. 11). Note that in FIGS. 30a through 30k, the horizontal axis is not drawn to scale, but the same scale is used in each of FIGS. 30a through 30k.

Specifically, the high signal on read zero line 724 (FIG. 30a) passes through OR gate 426 in read counter circuit 810 (FIG. 18) to terminal B1 of a first retriggerable monostable multivibrator in integrated circuit 1144. Since terminal A1 of the first retriggerable monostable multivibrator is tied to ground, the first multivibrator in integrated circuit 1144 generates a positive going pulse having approximately a 1200 nanosecond pulse width to input terminal A2 of a second retriggerable monostable multivibrator in integrated circuit 1144. Since terminal B2 of the second retriggerable monostable multivibrator in integrated circuit 1144 is tied to the positive supply voltage, the second multivibrator generates a positive going pulse having approximately a 190 nanosecond pulse width on the falling edge of the pulse from the first muitivibrator in integrated circuit 1144. The pulse from the second multivibrator is applied to read line 733 (FIG. 30b) which is connected to output terminal Q2 of the second multivibrator in integrated circuit 1144.

The positive pulse on read line 733 passes through OR gate 516 in latch clock/error detection circuit 805 (FIG. 31) and clocks flip-flop 517. Also, the positive signal on read line 733 is changed to a low signal by inverter 577. The low output signal from inverter 577, which is applied to terminal $\overline{CLR}$ of D type flip-flop 539, clears flip-flop 539. Hence, flip-flop 539 generates a low signal on output terminal Q which is applied to a second input terminal of AND gate 541 and a first input terminal of NOR gate 542. Since flip-flop 539 is clocked by the signal on RFRQ line and the signal on this line is held low during the time interval of a read or write in the disk emulator, as described more completely below, the signal from flip-flop 539 does not change during the read cycle. Therefore, AND gate 541 generates a low signal to a first input terminal of OR gate 541 and the output signal of NOR gate 542 to a second input terminal of OR gate 541 is determined by the signal on parity check line 784 during the read cycle. The signal on parity check line 784 is described in the description of the error correction process below.

Prior to the positive pulse on line 733 clocking flip-flop 517, the signal on read B complement line 746, which is connected to output terminal Q of flip-flop 517, was initialized to a high level and the signal on read B line 745, which is coupled to output terminal Q of flip-flop 517 through inverter 518, was initialized to a low level as shown in FIG. 30c and FIG. 30d, respectively. Since the signal on writing line 709, which is connected to input terminal D of flip-flop 517 (FIG. 31), is low, as previously described, the clocking of flip-flop 517 by the pulse on read line 733 drives the signal on read B line 745 high, as shown in FIG. 30d, and the signal on read B complement line 746 low, as shown in FIG. 30c.

The low signal on read B complement line 746 is applied to input terminal $\overline{RDB}$ of the 8207 DRAM controller in FIG. 25 and as a result the 8207 DRAM controller initiates a read memory request for the zeroth word of the zeroth sector of the track specified by the SMD disk controller because, as previously described, the disk emulator has addressed the zero word of the.zeroth sector in response to signals supplied by the SMD controller. As described previously, the zeroth word of the sector is the address field for the sector. The 8207 DRAM controller provides the address field for the zeroth sector on 66-bit parallel bus 700 and the stored parity bit-for that address field on line D(0) from DRAM array 822 which is the 67th bit in the parallel bus.

Since the signal on writing line 709 is low, multiplexer 1125 (FIG. 13) connects read B complement line 746 to data enable line 751, positive power supply voltage to shift register output control line 740, clock zero line 728 to shift register clock line 739, and read B line 745 to latch output enable line 742. The positive power supply voltage on, shift register output control line 740 disables the parallel output terminal in each register of shift register 802 during the read operation of the disk emulator.

The high signal on latch output enable line 742 from read B line 745 tri-states the output terminal of each register in latch circuit 803 (FIG. 11), and the low signal on data enable line 751 from read B complement line 746 tri-states the input terminals to the DRAM integrated circuits in DRAM array 822. Accordingly, when the 8207 DRAM controller loads the addressed word onto the 66-bit parallel bus, the word is available to parity circuit 804 (FIG. 12) and to the input terminals of latch circuit 803 (FIG. 11).

Since parity circuit 804 (FIG. 12) is connected to 66-bit parallel bus 700, i.e. lines D(66)–D(59) of parallel bus 700 are connected to the first eight input terminals A–H respectively of integrated circuit 1094; lines D(58)–D(51) are connected to the first eight input terminals A–H of the second integrated circuit 1095; the integrated circuits 1096–1101 are similarly connected to parallel bus 700; the integrated circuit 1102 has the lines D(1), D(2) connected to its input terminals A, B respectively; and the input terminal or terminals on the integrated circuits 1094–1102 which are not utilized are connected to ground, when the address field is loaded onto bus 700 parity circuit 804 generates a new parity bit for the word as it is retrieved from DRAM array 822 since the odd output terminal from each of integrated circuits 1094–1101 is connected to an input terminal of integrated circuit 1103, and the even output terminal of integrated circuit 1103 is connected to the first input terminal of exclusive OR gate 302 (FIG. 11). Accordingly, integrated circuit 1103 provides the new parity bit corresponding to the word on bus 700 to the first input terminal of exclusive OR gate 302. The stored parity bit is provided over line D(0), the 67th line in the parallel bus, to the second input gate of exclusive OR gate 302.

For this example, assume that no error occurred in the address field and accordingly the parity bits on the input terminals of exclusive OR gate 302 (FIG. 11) are the same. Thus, the output signal from exclusive OR gate 302 on parity check line 784 is a logical zero. Accordingly, the input signal to NOR gate 542 in latch clock/error detection circuit 805 (FIG. 31) remains unchanged and the signal on error complement line 783 to the 8207 DRAM controller does not change. Therefore, the 8207 DRAM controller performs a normal read/write cycle. The operation of the disk emulator when a read error is detected is described later.

The low signal on read B complement line 746 also drives the output signal from NAND gate 441 in RFRQ circuit 741 (FIG. 29), high. The high signal from NAND gate 441 removes the load signal to counter 1136. Thus, counter 1136 starts to count and after four clock pulses on DRAM clock line 776, counter 1136 rolls over and generates a high signal which passes through OR gate 443 to RFRQ output line 778. However, in a normal read, as described below, the signal on read B complement line 746 goes high prior to four clock pulses on DRAM clock line 776 and the high signal on read B complement line 746 holds counter 1136 in the load state. Thus, the roll-over of counter 1136 is utilized only to remove a stuck read command.

In the normal read cycle, the 8207 DRAM controller completes the read and sets the signal on XACKB complement line 779 low (FIG. 30e). The low signal on XACKB complement line 779 drives the output signal of AND gate 533 (FIG. 31) low. The low output signal from AND gate 533 is a first input signal to NOR gate 530. The second input signal to NOR gate 530 is provided by DRAM clock complement line 777. Thus, NOR gate 530 generates a high output signal when the signal on DRAM clock complement line 777 goes low. The high output signal from NOR gate 530 drives the output signal of NOR gate 519 low. The low output signal from NOR gate 519 presets flip-flop 517. Thus, the output signal from flip-flop 517, as previously described, causes the signal on read B complement line 746 to go high (FIG. 30c) and the signal on read B line 745 to go low (FIG. 30d). The low signal on read B line 745 to the latch output enable line 742 (FIG. 30j) through multiplexer 1125 (FIG. 13) enables the parallel output terminals in latch circuit 803 (FIG. 11).

The low output signal from AND gate 533 (FIG. 31) in response to the low signal on XACKB complement line 779 from 8207 DRAM controller also drives the low output signal of NAND gate 529 high. The high signal from NAND gate 529 passes through OR gate 527 to the latch clock line 743. The high signal on latch clock line 743 (FIG. 30g) captures the address field on 66-bit parallel bus 700 in the latches of integrated circuits 1112–1120 (FIG. 11), because each of the lines D(59)–D(66) of parallel bus 700 is connected to an input terminal D and an output terminal Q of one stage of the eight bit register comprising 1112, each of the lines D(51)–D(58) of parallel bus 700 is connected to an input terminal D and an output terminal Q of one of stage of the eight bit registers comprising IC 1113 and the lines D(3)–D(50) of bus 700 are connected to the integrated circuits 1114–1119 in a similar manner and the lines D(1)–D(2) are each connected to a stage of the eight bit register comprising integrated circuit 1120. The stored parity bit on line D(0) is captured in a latch of integrated circuit 1120 (FIG. 11).

Thus, the 8051 microprocessor 1063 (FIG. 21) upon receipt of the seek signal from the SMD disk controller, has entered the rapid sector cycle mode and issued an index pulse. The index pulse and the sector address data from 8051 microprocessor 1063 effectively address the zeroth word in the zeroth sector for the track specified by the SMD controller, and reset and load the counters and latches in various circuits of the disk emulator. Subsequently, a series of signals are generated which result in loading the address field and the stored parity bit for the zeroth sector of the track specified by the SMD disk controller into latch circuit 803. While the resetting, addressing and loading operations were described sequentially, in real time, they occur simultaneously and accordingly, unlike a conventional hard disk drive, the disk emulator issues the index pulse immediately after receiving the seek command from the SMD controller and is waiting for the next command from the SMD controller when a hard disk drive would still be searching for the track requested by the SMD controller.

Reading the Address Field

The SMD controller asserts the read gate after receiving the index pulse. The SMD controller asserts the read gate by providing a differential signal on bit-1 lines J5-5, J5-35 (FIG. 6) from the SMD control cable that is enabled by a differential signal on tag-3 lines J5-33, J5-3 (FIG. 5) from the SMD control cable. Receiver 462 (FIG. 6), converts the differential signal on lines J5-5, J5-35 to a high signal on bit-1 line 703 and similarly receiver 459 in FIG. 5 generates a low signal on the tag-3 complement line 702 from the differential signal on lines JS-3, J5-33.

In read/write gate circuit 812 (FIG. 33), the high signal on bit-1 line 703 is inverted by inverter 437 and the low output signal from inverter 437 is applied to a first input terminal of NOR gate 438. The low signal on tag-3 complement line 702 is applied to the second input terminal of NOR gate 438 and NOR gate 438 generates a high signal on read gate line 706. The high signal from NOR gate 438 also drives read/write gate line 705 through OR gate 439.

The signal on bit-0 line 701, in read/write gate circuit 812, is low when the read gate is asserted. Thus, the low signal on bit-0 line 701 is changed to a high signal by inverter 435 and applied to a first input terminal of NOR gate 436. The low signal on tag-3 complement line 702 is applied to the second input terminal of NOR gate 436 and so the output signal from NOR gate 436 on write gate line 704 is low.

The low signal on write gate line 704 is applied through OR gate 585 to input terminal J of the J-K flip-flop 584 in writing flag circuit 811 (FIG. 24), because the signal on SCSI read/write enable line 707, which is the second input signal to OR gate 585, is always low during normal operation of the disk emulator. Hence, on the next clock pulse on clock one line 708 to J-K flip-flop 584, the output signal from terminal $\overline{Q}$ of flip-flop 584 drives the signal on writing output line 709 from writing flag circuit 811 low, while the output signal from terminal $\overline{Q}$ of flip-flop 584 drives the signal on writing complement line 710 high.

The high signal on writing complement line 710 is converted to a low signal by NOR gate 400 in write control circuit 806 (FIG. 15) and this low signal is applied to terminal $\overline{CLR}$ CLR of J-K flip-flop 432. Hence, a low signal level is generated on output terminal Q of J-K flip-flop 432. This low output signal from J-K flip-flop 432 is a first input signal to NOR gate 402. The output signal from OR gate 403 is the second input signal to NOR gate 403. OR gate 403 has a first input signal from terminal QD of counters 1028 and a second input signal from terminal QA of counter 1027. The output signals from counters 1027, 1028 were set to a low level by the index signal on sector/index line 712 which cleared both counters. Thus, the output signal from OR gate 403 is low and so both input signals to NOR gate 402 are low. The resulting high output signal from NOR gate 402 drives the output signal from NOR gate 407 low which in turn holds counters 1027, 1028 in the clear mode. Hence, the high signal on writing complement line 710 to write control circuit 806 effectively inhibits the operation of write control circuit 806 (FIG. 15).

The low signal on writing line 709 to the inverter of the terminal $\overline{A/B}$ of multiplexer 1125 in FIG. 13 selects the signals on input terminal A1–A4 of multiplexer 1125, which are read control signals for shift register 802 and latch circuit 803, as described previously. The generation and sequence of these signals are described below.

The low signal on writing line 709 is applied to a first input terminal of OR gate 415 in read counter circuit 810 (FIG. 18). Since the second input terminal to OR gate 415 is connected to sector/index line 712, the output signal from OR gate 415 is low. This output signal is applied to a first input terminal of NOR gate 417 and accordingly the signal on the second input terminal of NOR gate 417 determines the level of the output signal from NOR gate 417.

Hence, read counters 1022, 1023 (FIG. 18) are not held off by the low signal on writing line 709. However, counters 1022, 1023 are still inhibited. Initially, the signal on sector full complement line 758 from output terminal $\overline{Q}$ of the J-K flip-flop 498 in memory word counter 807 (FIG. 19) to a first input terminal of NAND gate 409 (FIG. 18) is high because, as previously described, the index pulse cleared flip-flop 498. The signal on read counter enable word 2–63 line 719 to a second input terminal of NAND gate 409 (FIG. 18) is low because read counter enable word 2–63 line 719 is connected to output terminal QD of counter 1012 (FIG. 16) and the signal on sector/index complement line 711, in response to the index pulse from microprocessor 1063, loaded a low signal on output terminal QD of counter 1012. Accordingly, NAND gate 409 generates a high output signal which drives a first input terminal of NAND gate 410 (FIG. 18) high. The high signal from ripple carry output terminal $\overline{RCO}$ of counter 1012 (FIG. 16) drives the second input terminal of NAND gate 410 and the high signal from ripple carry output terminal $\overline{RCO}$ of counter 1014 (FIG. 16) drives the third input terminal of NAND gate 410. Thus, NAND gate 410 generates a low output signal which in turn drives the output signal from NAND gate 411 high.

The high output signal from NAND gate 411 is applied to the input terminal D of D-type flip-flop 418. Consequently, a clock signal on clock zero line 728 to clock terminal CLK of flip-flop 418 generates a low signal on the output terminal $\overline{Q}$ of flip-flop 418. This low signal is inverted by NOR gate 416 because the second input signal, i.e. the output signal of OR gate 421, described below, to NOR gate 416 is also low. The high output signal from NOR gate 416 is applied to an input terminal of NOR gate 417, which in turn generates a low signal that holds counter 1022, 1023 in the clear mode. Hence, although the writing signal does not inhibit counters 1022, 1023, the high signal to the input terminal D of flip-flop 418 inhibits the counters and this signal does not change until one of the gap counters rolls over.

Since counters 1022, 1023 (FIG. 18) are in the clear mode, the signal on output terminal QA of counter 1022 and the signal on output terminal QD of counter 1023 are both low. The low signal from the output terminal QA of counter 1022 is a first output signal to OR gate 421 and the low signal from terminal QD of counter 1023 is a second input signal to OR gate 421. Thus, OR gate 421 generates a low output signal which is passed to both input terminal J and input terminal $\overline{K}$ of J-K flip-flop 424 which is also clocked by clock zero. The low output signal from OR gate 421 also holds the D-type flip-flop 425 in the clear mode. On the next clock pulse on clock zero line 728, J-K flip-flop 424 419 which also has a low signal on the first input terminal from output terminal Q of flip-flop 418. Thus, NOR gate 419 generates a high signal on input terminal J of the J-K flip-flop 422. The low signal on output terminal QA of the counter 1022 is inverted by inverter 427 and the resulting high signal is passed through OR gate 420 to input terminal $\overline{K}$ of J-K flip-flop 422. Accordingly, J-K flip-flop 422, on the rising edge of the clock pulse on clock zero line 728, generates a high signal on output terminal Q to output zero line 729 and a low signal on output terminal $\overline{Q}$ to output zero complement line 730.

Until one of the input signals to NAND gates 409 or 410 change and the resulting change in the output signal of NAND gate 411 is clocked through flip-flop 418, the signal on output zero complement line 730 from output terminal $\overline{Q}$ of J-K flip-flop 422 (FIG. 18) provides a low signal to a first input terminal of AND gate 593, shown in FIG. 10. Accordingly, the output signal from AND gate 593, which drives read data line 755, is low independent of the signal on serial data output line 738 from shift register 802 to the second input terminal of AND gate 593.

The low signal on read data line 775 is converted by the differential current mode driver 476, shown in FIG. 7, to a differential signal on the lines J4-3, J4-16 to the SMD disk controller. The low signal provided by driver 476 (FIG. 7) to the SMD disk controller in response to the low output signal from AND gate 593 represents the information in the sector prior to the address field.

This demonstrates another advantage of the disk emulator. Since the disk emulator has neither a rotating storage media nor mechanical read/write heads, the nonsector-specific information is not required for operation of the disk emulator. Accordingly, the nonsector-specific information is not stored in DRAM array 822, but rather recreated as a string of zeroes when the SMD disk controller reads from the disk emulator. This results in a more efficient utilization of the storage media in the disk emulator than is achievable in a conventional hard disk drive.

Figure 31A:
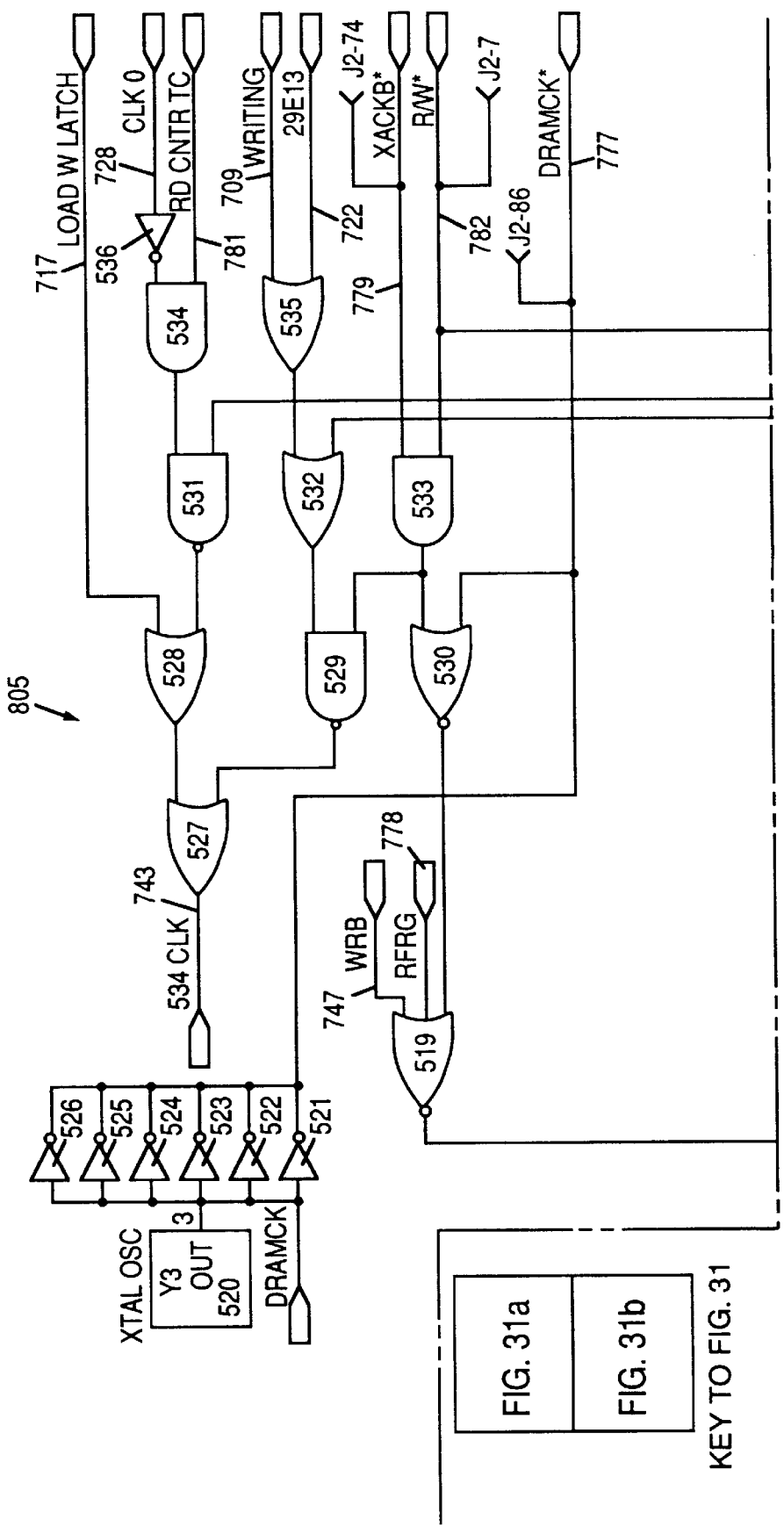
FIG. 31 is a schematic diagram of latch clock/error detection circuit 805 in the disk emulator.
Figure 31B:
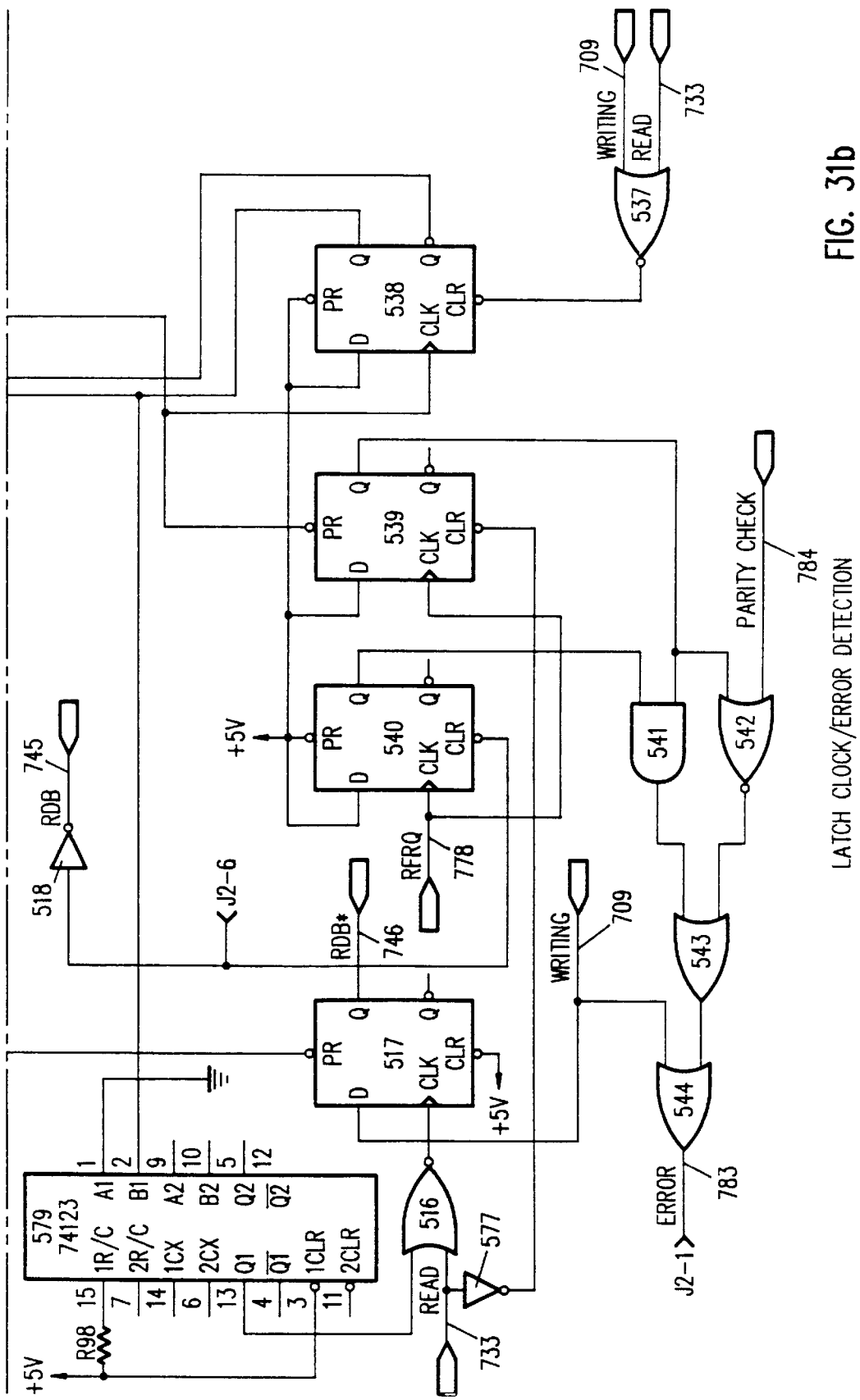
Figure 42:
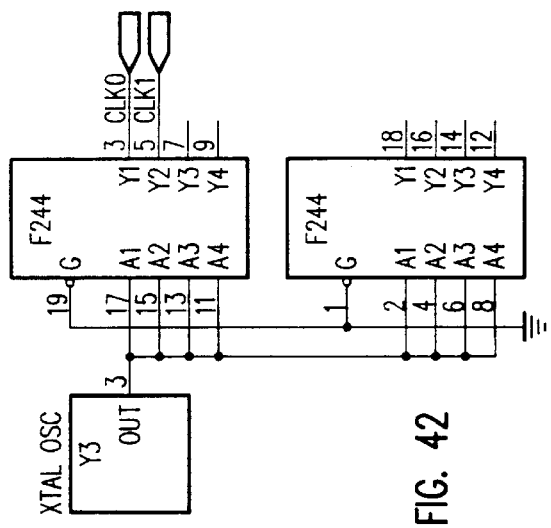
FIG. 42 is a schematic diagram of the clock zero and the clock one circuit in the disk emulator.

When the end of the first gap in the sector prior to the address field is reached, first gap counter 808 (FIG. 16) comprised of counters 1013, 1014 rolls over and the signal on first gap counter carry line 722 to NAND gate 410 in read counter circuit 810 (FIG. 18), and to a second input terminal of OR gate 535 in latch clock/error detection circuit 805 FIG. 31) goes low as shown in FIG. 30f. Since the signal on writing line 709, which is connected to the first input terminal of OR gate 535, is also low, OR gate 535 (FIG. 31) generates a low signal which is applied to the second input terminal of OR gate 532.

The earlier high signal, which was generated in response to the index pulse, on read line 733 (FIG. 30b) was inverted by NOR gate 537 (FIG. 31), and the low output signal from NOR gate 507 cleared flip-flop 538. Accordingly, the signal on output terminal Q, which is provided to the first input terminal of OR gate 532, is low. Hence, both input signals to OR gate 532 are low, and OR gate 532 generates a low output signal that is applied to the second input terminal of NAND gate 529. (Note if an error had been detected in retrieving the address field from the DRAM array, the error correction process, described later, clocks flip-flop 538 so that the output signal from flip-flop 538 to OR gate 532 is high, and for the read with error case the output signal from OR gate 532 remains high.)

In response to the low signal from OR gate 532 (FIG. 31) NAND gate 529 generates a high output signal. The high output signal from NAND gate 529 passes through OR gate 527 onto latch clock line 743. See FIG. 30g. Since the latches originally inverted the address field and since the input terminal of each latch is tied to the output terminal of the latch, the signal on latch clock line 743 inverts the address field to its correct form. Thus, the address field in latch circuit 803 is ready for transferring to the SMD disk controller.

When the counter 1014 (FIG. 16) carries, the low signal on first gap counter carry line 722 also drives the output signal from NAND gate 410 (FIG. 18) high which in turn drives the output signal from NAND gate 411 low as shown in FIG. 34a. The response of read counter circuit 810 (FIG. 18) to the rollover, i.e. carry, of counter 1014 is illustrated in FIG. 34a through FIG. 34aa. In FIG. 34a through FIG. 34aa, the numbers on the right hand side of the figure represent the components in read counter circuit 810 in FIG. 18 with the same number, and "IN1" is the first input terminal of the component, "IN2" is the second input terminal of the component, and "OUT" is the output terminal of the component. The number in parentheses represents another terminal having the same signal level as the given terminal.

The first clock pulse on clock zero line 728 to D-type flip-flop 418 after counter 1014 (FIG. 16) rolls over latches the low output signal from the NAND gate 411 (FIG. 18) and generates a high signal on output terminal $\overline{Q}$ of flip-flop 418 (FIG. 34b). This high signal is changed to a low signal by NOR gate 419, (FIGS. 34r, 34s and 34t) and the low signal is applied to input terminal J of flip-flop 422 (FIG. 34u). However, the signal to terminal K of flip-flop 422 remains high, (FIG. 34v) and therefore the output signals from flip-flop 422 remain unchanged (FIG. 34w) on the next clock pulse to flip-flop 422.

The high signal on terminal $\overline{Q}$ of flip-flop 418 is inverted by NOR gate 416 (FIGS. 34c, 34d and 34e) and the resulting low signal from NOR gate 416 is inverted by NOR gate 417 (FIG. 34f) because, as previously described, the other input signal to NOR gate 417 is also low. The high output signal from NOR gate 417 removes the clear signal to counters 1022, 1023 (FIG. 18). Thus, the first clock pulse after the carry signal from the first gap counter 808 (FIG. 16) enables read counters 1022, 1023 (FIG. 18);

The second clock pulse on clock zero line 728 after counter 1014 (FIG. 16) rolls over drives the signal on output terminal QA of counter 1022 high (FIG. 18). The high signal from terminal QA passes through OR gate 421 (FIG. 34i), to input terminals J, K of flip-flop 424 (FIG. 34p) and removes the clear signal to flip-flop 425 (FIG. 34y). The high signal from terminal QA of counter 1022 is also applied to the input terminal of inverter 427 which in turn generates a low signal which is applied to a second input terminal of OR gate 420 (FIG. 34k). The first input terminal of OR gate 420 (FIG. 34j) receives a low signal from the output terminal QD of counter 1023. Accordingly, OR gate 420 generates a low signal (FIG. 34m) that is applied to terminal LD of counters 1022, 1023, to input terminal K of J-K flip-flop 422 (FIG. 34v) and to the input terminal of inverter 582.

Inverter 582 generates a high signal on the first input terminal of AND gate 423. The high signal on SCSI halt complement line 727 is connected to the second input terminal of AND gate 423 and so AND gate 423 generates a high output signal (FIG. 34n), on S1 line 731. The high signal on S1 line 731 is applied to the terminal S1 of integrated circuits 1104–1111, 1121 in shift register 802 (FIG. 10). Since both the terminal S0 and the terminal Si are high, on the third clock pulse after the first gap counter rolls over, the signal on the parallel input terminal of each register comprising shift register 802 (FIG. 10) from the line of parallel 66-bit bus 700 is loaded into the register because lines D(59)–D(66) of bus 700 are connected to the parallel input/output terminals A–H respectively of the integrated circuit 1104, the lines D(51)–D(50) of bus 700 are connected to the terminals A–H respectively of the integrated circuit 1105, and the remaining lines D(1)–D(50) of bus 700 are connected to the integrated circuits 1106–1111, 1121 in a similar fashion. Hence, on the third clock pulse after the first gap counter rolls over each register in 66-bit shift register 802 is loaded simultaneously with one bit of the 66-bit word on parallel bus 700 from latch circuit 803, and the fourth clock pulse starts to shift the address field through the serial path of shift register 802 to AND gate 593.

Specifically, on the fourth clock pulse on shift register clock line 739, the bit in register B of IC 1121 (FIG. 10) is shifted onto serial data output line 738 and the bit in register A of IC 1121 is shifted into register B of IC 1121. The bit in register H of IC 1111 is shifted into register A of IC 1121 over the line connecting terminal QH of IC 1111 to terminal SR of IC 1121 and each additional bit in IC 1111 is shifted one bit internally within IC 1111. The bit in register H of IC 1110 is shifted in register A of IC 1111 over the line connecting terminal QH of IC 1110 to terminal SR of IC 1111 and each bit is shifted one bit internally in IC 1110. IC 1109 through IC 1104 are similarly interconnected and so the bits in IC 1109 through IC 1104 also are shifted one register by the fourth clock pulse on line 739.

Recall that, as shown in FIG. 34, the second clock pulse, which generated the high signal on S1 line 731, also generated a low signal on terminal K of J-K flip-flop 422 (FIG. 34v) and a high signal on terminal J of J-K flip-flop 422 (FIG. 34u). Thus, on the third clock pulse on clock zero line 728, J-K flip-flop 422 toggles (FIG. 34w) and generates a high signal on output zero complement line 730. Thus, when the first bit of the address field is input to a first input terminal of AND gate 593, the high signal on the output zero complement line 730 is present on the second input terminal of AND gate 593, and the signal corresponding to the first bit of the address field is the output signal of AND gate 593 on read data line 775 to the differential current mode driver 476, in FIG. 7, which drives the SMD data lines J4-3, J4-16.

Also, on the third clock pulse after first gap counter 808 rolls over, the low signal on each input terminal A, B, C, D of counter 1022 (FIG. 18), the low signal on input terminals A, B of counter 1023 (FIG. 18), and the low signal on input terminals C, D of counter 1023 are loaded into counters 1022, 1023 because the signal on terminal $\overline{LD}$ of counters 1022, 1023 is low. The third clock pulse also shifts the high signal on the input terminal D (FIG. 34x) of flip-flop 425 to its output terminal Q (FIG. 34z). The high signal from output terminal Q of flip-flop 425 is applied to a first input terminal of OR gate 426 which in turn generates a high signal on early read line 734 and on input terminal B1 of the first monostable multivibrator in integrated circuit 1144. The high signal from OR gate 426 generates a sequence of signals from multivibrator integrated circuit 1144 identical to those described previously for the high signal on read zero line 724.

However, prior to the generation of the read pulse on read line 733 by the second monostable multivibrator in integrated circuit 1144 (FIG. 18), which starts the second read from DRAM array 822, the address to the DRAM array is incremented because when the signal on the output terminal Q of flip-flop 425 goes high (FIG. 34z) the signal from output terminal $\overline{Q}$ of flip-flop 425 (FIG. 18) drives the signal on read word counter line 732 low. The low signal on read word counter line 732 drives the signal on the counter clock line 780 from NAND gate (FIG. 3) 406 high.

The fourth clock pulse on clock zero line 728 after the rollover of first gap counter 808 loads the high signal on counter clock line 780 into in D-type flip-flop 488 (FIG. 19) and the signal on counter clock line 780 goes to a low level because the signal on output terminal Q of flip-flop 425 (FIG. 18) goes high. The resulting high signal on output terminal Q of flip-flop 488 (FIG. 19) energizes counter 1055. The fifth clock pulse after rollover of first gap counter 808 increments counter 1055 and loads the low signal from counter clock line 780 into flip-flop 488, which in turn removes the high signal on terminal ENP of counter 1055. The high signal on the output terminal QA of counter 1055 after the fifth clock pulse drives the signal on line J2-32 to the terminal BS0 of the 8207 DRAM controller high. This increments the address for DRAM array 822 from the zeroth word in the sector to the first word in the sector.

Also, the high signal on output terminal QA of counter 1055 drives the output signal from inverter 505 low which in turn drives the output signal from NOR gate 506 high because the signal from output terminal QB of counter 1055 (FIG. 19) to the second input terminal of NOR gate 506 is still low. Since the output signals from NOR gates 508 and 507 remain unchanged from the levels previously described, the high output signal from NOR gate 506 causes the output signal from NAND gate 510 to switch from high to low. The low output signal from NAND gate 510 changes the output signal from OR gate 515 to a low level. The low signal from OR gate 515 on address one detection complement line 755 enables data sync comparator 1122 (FIG. 13).

The high signal from terminal QA of counter 1055 (FIG. 19) also drives the output signal from NOR gate 509 low which in turn drives the output signal from NAND gate 511 high. The high output signal from NAND gate 511 changes the output signal from OR gate 514 to a high signal and the input signal to the first input terminal of NAND gate 512 to a high signal. The high signal from OR gate 514 (FIG. 19) on address zero detection complement line 754 disables address sync comparator 1123 (FIG. 13). The high signal on word address 2–63 complement line 756 is not changed as a result of the high signal on terminal QA of counter 1055 because NAND gate 512 still has a high input signal and a low input signal and hence generates a high output signal.

When the read signal is generated by the second multivibrator of integrated circuit 1144, memory word counter circuit 807 has generated a signal which causes the 8207 DRAM controller to address the first word in the sector and also has enabled the data sync comparator. As described previously, the read pulse causes the word addressed by the 8207 DRAM controller to be loaded into latch circuit 803. As shown in FIG. 35, the sequence of signal is identical to the sequence in FIG. 30 through the time of the first signal on latch clock line 743. Consequently, the first word in the sector is stored in latch circuit 803 (FIG. 11) ready to be inverted and then loaded into shift register 802 (FIG. 10) before the zeroth word is completely shifted out of shift register 802 (FIG. 10).

Returning to the second clock pulse after the rollover of first gap counter 808, the signal from the output terminal $\overline{Q}$ of flip-flop 418 in FIG. 18 to NOR gates 416, 419 goes low, as shown in FIG. 34b. However, the high signal on output terminal QD of the counter 1023 passes through OR gate 421 (FIGS. 34h, 34i) to NOR gate 416 (FIG. 34d) which in turn generates a low output signal (FIG. 34e). The low output signal from NOR gate 416 drives the output signal from NOR gate 417 high (FIG. 34f). The high signal from NOR gate 417 to the terminal $\overline{CLR}$ of the counter 1022 holds off the clear function until counter 1023 rolls over. This permits the 8 byte address word to be shifted serially out of the shift register 802 because, as described below, two clock pulses after the counters 1022, 1023 roll over, the signal on the output zero complement line 730 goes low which drives the output signal from the disk emulator low, as described previously.

Counter 1023 in read counter circuit 810 (FIG. 18) rolls over when two bits of the address field are still in shift register 802, because, as previously described, after counters 1022, 1023 are loaded they count 64 clock pulses and roll over, and counter 1022 started to count when the first bit was transferred out of shift register 802. As counter 1023 rolls over a high signal is generated on read counter TC line 781 (FIG. 35j). The high signal on read counter TC line 781 is passed to a first input terminal of AND gate 534 in latch clock/error detection circuit 805 (FIG. 31). Clock zero line 728 is coupled to the second input terminal of AND gate 534 through an inverter 536. Since the signal on read counter TC line 781 goes high when the clock zero pulse goes low, both input signals to AND gate 534 are high-and the high output signal from AND gate 543 is applied to the first input terminal of AND gate 531. The second input terminal of AND gate 531 is connected to terminal Q of flip-flop 538. The high signal on read line 733, which initiated the reading of the first word in the sector, was also applied to NOR gate 537 and NOR gate 537 generated a low signal that cleared flip-flop 538. Thus, the signal on the second input terminal of AND gate 531 is also high and AND gate 531 generates a high output signal which passes through OR gates 528, 527 to latch clock line 743 (FIG. 35e). Recall, the latches in the latch circuit 803 (FIG. 11) latch inverted data but the input terminal of each latch is connected to its output terminal. Accordingly, this high signal on the latch clock line 743 to latch circuit 803 (FIG. 11) simply inverts the data in each latch and therefore provides the first word of the sector in latch circuit 803 so that it is ready to be loaded into shift register 802 (FIG. 10).

When counters 1022, 1023 in FIG. 18 roll over, the signal to the first input terminal of OR gate 421 from terminal QA of counter 1022 is low and the signal to the second input terminal of OR gate 421 from terminal QD of counter 1023 is also low. Thus, OR gate 421 generates a low output signal that is inverted by NOR gate 416. The high output signal from NOR gate 416 is inverted by NOR gate 417 and the low signal from NOR gate 417 clears counters 1022, 1023. Also, the low output signal from OR gate 421 clears flip-flop 425 and is applied to the input terminals J, K of J-K flip-flop 424. The low output signal from terminal QA of counter 1022 drives the output signal of inverter 427 high, and the high signal from inverter 427 passes through OR gate 420 to input terminal $\overline{K}$ of J-K flip-flop 422.

The first clock pulse on clock zero line 728 after counters 1022, 1023 (FIG. 18) roll over drives-the signal on terminal Q of J-K flip-flop 424 low and thus, both input signals to NOR gate 419 are low and consequently NOR gate 419 generates a high signal to input terminal J of J-K flip-flop 422. Since the signal on terminal K of flip-flop 422 is high, the second clock pulse on clock zero line 728 after counters 1022, 1023 roll over drives the output signal on output zero complement line 730 low which in turn drives the output signal on the data output line from AND gate 593 low.

Since the counters 1022, 1023 count sixty-four clock pulses and two additional clock pulses were required to disable the disk emulator output, the full 66 bit address field was shifted out of shift register 802 and now the disk emulator system is generating zeros to simulate the gap between the address field and the data field.

Thus, the SMD controller issued a seek command and the head and track information and in response the disk emulator virtually instantaneously translated the head and track information into higher order addresses for the DRAM array and issued a seek end signal to the SMD controller indicating the track specified was located. The index pulse initialized the disk emulator and loaded the address field for the track specified into latch circuit 803.

Upon receiving the index signal, the SMD disk controller asserted the read gate, and in response the disk emulator supplied the SMD controller with a string of zero bits for the gap in the sector prior to the address field. When the precise number of bits in the gap was generated, the rollover of the first gap counter 808 loaded the address field for the zeroth sector of the specified track into shift register 802 and the address field was serially supplied to the SMD disk controller.

While the address field was being serially supplied to the SMD disk controller, the disk emulator loaded the first word of the zeroth sector of the track specified by the SMD disk controller into latch circuit 803. When the address field was shifted out of shift register 802, the disk emulator again supplied a series of zero bits to the SMD disk controller to represent the gap between the address field and the start of the data field. Accordingly, to this time the disk emulator has performed the same function as a hard disk drive, except the seek time has been significantly enhanced.

Disk Controller Response to Address Field

After the SMD disk controller receives the address field for the zero sector in the track specified by the controller, the SMD disk controller always deasserts the read gate at the write splice field of the sector which is immediately after the address field. Next, the SMD disk controller initiates one of three actions;

1. If this is the sector to read, the SMD controller reasserts read gate.
2. If this is the sector to write, the SMD controller asserts write gate.
3. If this is not the sector of interest, neither gate is asserted by the SMD disk controller.

Actions 1 or 2 occur a predetermined time after the sector/index signal is issued to the SMD controller by the disk emulator. The 8051 microprocessor 1063, in FIG. 21, polls the terminal P37 to which read/write gate line 705 is attached and determines if either read gate or write gate has been asserted by the SMD disk controller and consequently read/write gate circuit 812, shown in FIG. 33, has generated a high signal on read/write gate line 705, as described previously.

The predetermined time is defined by counters 1015, 1016 (FIG. 17) and 8051 microprocessor 1063 (FIG. 21). Counter 1015 generates a high signal on line 850, which is connected to output terminal QC of counter 1015, for every eight clock pulses counted, in a manner similar to that described previously for byte clock counter 1016, but counter 1015 is enabled to count only every sixteenth clock pulse to counters 1015, 1016 because the enable terminal C of counter 1015 is connected to the ripple carry output terminal $\overline{RCO}$ of counter 1016. Thus, counter 1015 generates a clock pulse on line 850 every 16 bytes where one bit is a clock pulse on clock zero line 728.

The high signal on line 850 is applied to the input pin P35 of microprocessor 1063 (FIG. 21). The predetermined time is defined by the pulse width of the signal on line 850. Microprocessor 1063 monitors the signal on pin P35 and the end of the predetermined time is when the high signal on pin P35 goes low. As an example, a predetermined time of ten microseconds is used, but the actual time depends upon the clock frequency of the SMD disk controller to which the signal on clock zero line 728 corresponds and the response characteristics of 8051 microprocessor 1063.

Continuation of Rapid Sector Cycle

If the signal on the terminal P37 of the 8051 microprocessor 1063 does not go high within the predetermined time, e.g. 10 microseconds, microprocessor 1063 continues by incrementing the sector address by one bit on output terminals P00–P04 and issuing a sector pulse on output terminal P05. The program used in microprocessor 1063 to implement the functions described herein is given in Microfiche Appendix A and incorporated herein by reference. An Avocet Cross-Assembler, AVDM-51, was used to configure the program for use in microprocessor 1063 using procedures known to those skilled in the art. The sector/index circuit 817 in FIG. 23 receives the sector pulse from microprocessor 1063 on sector line 713, and generates a high signal on sector/index line 712, read zero line 724, and a low signal on sector/index complement line 711. The signals generated by sector/index circuit 817 in response to a sector pulse from microprocessor 1063 are identical to the signals generated by sector/index circuit 817 in response to an index pulse from microprocessor 1063.

Accordingly, the sequence of signals, described above for the response of the disk emulator to the index signal, is identically repeated by the disk emulator in response to the sector pulse. The signals on sector/index line 712 and sector/index complement line 714 reset the same counters and flip-flops as described above and load the same counters. First gap counter 808 (FIG. 16) rolls over and the address field for the first sector in the track specified by the SMD disk controller is loaded into shift register 802 and subsequently provided to the SMD disk controller while the first word for the first sector is loaded into latch circuit 803.

If the SMD disk controller does not assert the read gate or write gate after receiving the address field for the first sector of the track specified by the SMD disk controller, the 8051 microprocessor 1063 issues another sector pulse and the address field for the second sector of the track is provided to the SMD disk controller. Thus, the address headers are read by the SMD disk controller at predetermined intervals until the desired sector is found. If the desired sector is the last one on the track, i.e. the thirty-second sector, three hundred twenty microseconds (10 microseconds×32) are required to locate the sector when the predetermined interval is taken as 10 microseconds. A conventional hard disk typically may require up to 16 milliseconds to locate.the correct sector after the track is located. Hence, the disk emulator reduces the average rotational latency by a factor of 500 in this example.

This represents a significant increase in performance over a conventional hard disk and the rotational latency of the disk emulator is no longer the limiting factor in the response of the disk system. Now, the performance of the SMD disk controller and the disk emulator is bounded by the response time of the SMD disk controller. Accordingly, to further improve the latency requires a change in the SMD convention. This increase in performance over prior art SMD compatible hard disks is achieved by using a volatile memory and circuitry to provide contiguous binary addresses based upon the information provided by the SMD disk controller rather than by enhancing the speed of the hard disk, the density of the hard disk or the method of storage of data on the hard disk, which are--the methods suggested by the prior art.

Reading the Data Field

When the address field provided to the SMD controller corresponds to the sector sought by the controller, the controller asserts the read gate if the central processing unit driving the SMD disk controller has requested the data stored in that sector. When the read gate is asserted read/write gate circuit 812 (FIG. 33) provides a high signal on read/write gate line 705 to terminal P37 of microprocessor 1063 (FIG. 21) and when the microprocessor polls terminal P37 and detects the high signal it immediately leaves the rapid sector cycle mode of its operation. Since the read gate has been reasserted, the status of the disk emulator is identical to that described above when the disk emulator provided the address field for the zeroth word after the index pulse. Accordingly, first gap counter 808 has rolled over, the address field for the sector has been provided to the SMD disk controller and the first word of the sector is in latch circuit 803 (FIG. 11) ready to be loaded into shift register 802 (FIG. 10), and now a series of zeros are being provided by J-K flip-flop 422 on output zero complement line 730 to AND gate 593 (FIG. 10). These zeros represent the second gap between the address field and the first word in the data field.

During this period, since a sector/index pulse is not issued, there is no initialization of the circuits in the disk emulator and memory word counter circuit 807 (FIG. 19) and latch clock/error detection circuit 805 (FIG. 31) remain in the configuration created in supplying the address field to the SMD disk controller, as previously described. Accordingly, the state of the circuits in the disk emulator does not change until counter 1012 in second gap counter 809 (FIG. 16) rolls over.

When second gap counter 809 (FIG. 16) has counted the number of bytes from the index pulse to the start of the data field, counter 1012 generates a low signal on output terminal $\overline{RCO}$ which drives the signal on second gap counter carry line 721 to the second input terminal of NAND gate 410 (FIG. 18) low. Hence, when counter 1012 rolls over, the output signal from NAND gate 410 (FIG. 18) switches from a high output signal to a low output signal. This is similar to the sequence of signals which occurred when first gap counter 808 rolled over. Accordingly, the timing diagram shown in FIG. 36 is similar to that in FIG. 34 since read counter circuit 810 cannot differentiate between a signal generated by the-rollover of first gap counter 808 and a signal generated by the rollover of second gap counter 809.

However, the rollover signal from the first gap counter was used to clock latch circuit 803 (FIG. 11), as shown in FIGS. 30f, 30g, and as described previously. Now the input signal to NAND gate 410 (FIG. 18) from the rollover of second gap counter 809 (FIG. 16) is not provided to latch circuit 803 (FIG. 11) because, as described previously, while the address field was shifted out of shift register 802, the disk emulator latched and inverted the first word in the data field in latch circuit 803 and so the first word is ready to be loaded into shift register 802 when second gap counter 809 rollovers. Accordingly, a clock pulse to latch circuit 803 is not required.

Thus, two clock pulses after the rollover of counter 1012 in second gap counter 809, the first word in the sector is loaded from latch circuit 803 into shift register 802 and then serially supplied to the SMD disk controller on subsequent clock pulses, as described previously for the zeroth word of the sector, and the second word in the sector is loaded into latch circuit 803 and inverted by the means previously described, while the first word of the sector is being serially shifted out of shift register 802.

Thus, at this point in the read from the disk emulator, the disk emulator has provided the complete sector prior to data field to the SMD disk controller even though the sector-specific address field was the only portion of the sector stored by the disk emulator. The string of zeros generated by the disk emulator to represent the first gap and the second gap are accepted as valid data by the SMD disk controller and since the disk emulator has no need for the nonsector-specific data, the generation of the zeroes has no affect on the ability of the disk emulator to-interface with the SMD disk controller. Hence, the use of the volatile memory not only increases the speed of the disk emulator but also makes it possible to eliminate both the mechanical mechanisms used in a conventional hard disk and the storage of the nonsector-specific information.

After the disk emulator has provided the first word in the data field to the SMD disk controller, the disk emulator must continue to sequentially provide word two through word sixty-three of the data field to the SMD disk controller. Accordingly, the sequence of signals in the read counter circuit 810 continues as shown in FIG. 36. As the first word in the sector is shifted out of shift register 802 (FIG. 10), read counter circuit 810 (FIG. 18) is not inhibited by the rollover of counter 1023 as it was when the zeroth word was shifted out of shift register 802 because the input signal (FIG. 36a) to flip-flop 418 does not go high on the first clock pulse after second gap counter 809 (FIG. 16) rolls over as the signal to flip-flop 418 did when the first gap counter rolled over (FIG. 34a).

When the signal on the terminal $\overline{RCO}$ of counter 1012 in second gap counter 809 (FIG. 16) returns to a high level, the signal on terminal QD of counter 1012 goes high and this high signal is applied to terminal $\overline{G}$ of counter 1011. The high signal on terminal $\overline{G}$ of counter 1011 inhibits second gap counter 809. In addition, the high signal from output terminal QD of counter 1012 is applied to the first input terminal of the NAND gate 409 in read counter circuit 810 (FIG. 18). Since the second terminal of NAND gate 409 is connected to sector full complement line 758 which carries a high signal, as previously described, the output signal from NAND gate 409 switches from a high signal to a low signal. Accordingly, when the high signal on second read counter carry line 721 to the second input terminal of NAND gate 410 switches to a low signal, the output signals from NAND gates 410 and 411 are held constant by the low output signal from NAND gate 409 and a low signal is maintained at input terminal D of flip-flop 418. Accordingly, the signal at the output terminal $\overline{Q}$ of flip-flop 418 remains high as shown in FIG. 36a.

While this high input signal to flip-flop 418, (FIG. 36a) creates a different timing diagram than that shown in FIG. 30 for the response of read counter circuit 810 after the rollover of first gap counter 808. The difference is significant only when counter 1023 rolls over. The difference does not affect the initial response of read counter circuit 810.

When counters 1022, 1023 in read counter circuit 810 (FIG. 18) roll over and the signal on terminal QA of counter 1022 and the signal on terminal QD of counter 1023 go low, the counters are not inhibited as they were when the address field was read. Rather, the sequence of signals shown in the timing diagram of FIG. 36a through FIG. 36aa occur after the rollover of counters 1022, 1023. In fact, the sequence of signals after the rollover of counters 1022, 1023 in FIG. 36a through 36aa is repeated for the second through the sixty-third word of the sector.

The first clock pulse on clock zero line 728 after counter 1023 rolls over does not change the high signal on output terminal $\overline{Q}$ of flip-flop 418 (FIG. 36b) because, as described above, the signal on input terminal D of flip-flop 418 (FIG. 36a) remains low. Accordingly, the low signal applied to input terminal J of flip-flop 422 (FIG. 36u) remains unchanged because, as described above, the high signal from output terminal $\overline{Q}$ of flip-flop 418 is coupled to input terminal J of flip-flop 422 through NOR gate 419. Also, the high signal on terminal $\overline{Q}$ of flip-flop 418 is inverted by NOR gate 416 and the resulting low signal from NOR gate 416 is inverted by NOR gate 417. Hence, the high output signal from NOR gate 417 continues to enable counters 1022, 1023, and the first clock pulse on clock zero line 728 after counter 1023 rolls over drives the signal on output terminal QA of counter 1022 high (FIG. 36g). The high signal from terminal QA passes-through OR gate 421 (FIG. 36i) to input terminals J, $\overline{K}$ of flip-flop 424 (FIG. 36p) and removes the clear signal to flip-flop 425 (FIG. 36y). The high signal from terminal QA of counter 1022 is also applied to the input terminal of inverter 427, which in turn generates a low signal. The low output signal from inverter 427 is applied to a second input terminal of OR gate 420 (FIG. 36k). The first input terminal of OR gate 420 receives a low signal from output terminal QD of counter 1023. Accordingly, OR gate 420 generates a low output signal (FIG. 36m) that is applied to terminal $\overline{LD}$ of counters 1022, 1023, to input terminal K of J-K flip-flop 422, and to the input terminal of inverter 582.

Inverter 582 generates a high signal on the first input terminal of AND gate 423. The high signal on SCSI halt complement line 727 is connected to the second input terminal of AND gate 423 and so AND gate 423 generates a high signal, (FIG. 36n) on S1 line 731. The high signal on S1 line 731 is applied to the S terminal of integrated circuits 1104–1111, 1121 (FIG. 10) and since the signals on both terminal S0 and terminal S1 are high, on the second clock pulse after counter 1023 (FIG. 18) rolls over the second word, which is on parallel 66-bit bus 700 from latch circuit 803, is loaded into shift register 802 as the last bit of the first word is shifted out of shift register 802.

Recall that, as shown in FIG. 36v, the first clock pulse, which generated the high signal on Si line 731, also generated a low signal on terminal $\overline{K}$ of the J-K flip-flop 422 and the low signal on terminal J of J-K flip-flop 422 remained unchanged, as shown in FIG. 36u. Thus, on the second clock pulse on clock zero line 728 the output signals of J-K flip-flop 422 remain unchanged, as shown in FIG. 36w, for output terminal $\overline{Q}$.

Also, on the second clock pulse after counter 1023 rolls over, the low signal on each input terminal A, B, C, D of the counter 1022, the low signal on input terminals A, B of counter 1023, and the high signal on input terminals C, D of counter 1023 are loaded into the counters 1022, 1023 because the signal on terminal LD of counters 1022, 1023 is low. The second clock pulse also shifts the high signal on input terminal D of the flip-flop 425 to its output terminal Q (FIG. 36z). The high signal from output terminal Q of flip-flop 425 is applied to a first input terminal of OR gate 426 which in turn generates a high signal on early read line 734 and on input terminal B6 of a first monostable multivibrator in integrated circuit 1144. The high signal from OR gate 426 generates an identical sequence of actions to those described previously.

However, prior to the generation of the read pulse on the read line 733 by a second monostable multivibrator in integrated circuit 1144 which starts the third read from the DRAM array, the address to the DRAM array is incremented, as previously described, by the signal on read word counter line 732.

Hence, each word is read after the high signal from flip-flop 425 in read counter circuit 810 (FIG. 18) increments word counter circuit 807 by one word. When the last word in the sector is loaded into latch circuit 803 (FIG. 11), counter 1054 in memory word counter circuit 807 (FIG. 19) generates a high signal on output terminal RCO in response to the high signal on counter clock line 780. Hence, both input signals, the signal from terminal RCO of counter 1054 and the signal from terminal Q of flip-flop 488, to AND gate 496 are high and J-K flip-flop 496 generates a high signal on sector full line 757 and a low signal on sector full complement line 758.

NAND gate 409 in read counter circuit 810 in FIG. 18 has both input signals low so that the output signal of NAND gate 409 goes high, which results in a high signal on input terminal D of flip-flop 418, as previously described. Consequently, when counters 1022, 1023 in read counter circuit 810 roll over after the last word in the sector, counters 1022, 1023 are inhibited just as they were at the end of the address field previously described.

After the sixty-third word of the sector is shifted out of the disk emulator, the read operation is completed. If the SMD disk controller wants to read another sector from the disk emulator, the controller issues another seek or read gate signal and the prior process is repeated. Hence, the novel disk emulator of this invention appears to the SMD disk controller as a hard disk drive with substantially improved performance. The seek time and the rotational latency are significantly enhanced and the utilization of the DRAM array is more efficient than the utilization of the disk space in a hard disk drive.

Writing to the Data Field

When the central processor wants to store data in the disk emulator, the SMD disk controller initially proceeds as previously described. That is, the SMD disk controller issues a seek command and supplies the head and track information to the disk emulator. The disk emulator issues an index pulse and the SMD disk controller asserts the read gate. The disk emulator proceeds in the rapid sector cycle mode, previously described, to supply address fields for each sector in the specified track until the correct location in the track is found. Then, after the correct location is found, the SMD controller asserts the write gate. Again, the disk emulator eliminates the seek time and substantially reduces the rotational latency so that the disk emulator is ready to receive data from the SMD controller much faster than a conventional hard disk drive.

When the SMD disk controller asserts the write gate, the disk emulator is in a configuration identical to that described previously in the read cycle after the desired sector was identified and the read gate reasserted. The memory word counter circuit 807 (FIG. 19) is incremented to address the first word in the sector. The signal on the address zero detection complement line 754 from memory word counter circuit 807 disables address sync comparator 1122 (FIG. 14) and the signal on address one detection complement line 755 from memory word counter circuit 807 enables data sync comparator 1123 (FIG. 14). The second gap counter 809 (FIG. 16) is counting the bytes prior to the data field in the sector and read counter circuit 810 is generating zeros on output zero complement line 730.

In the SMD interface, the write gate is asserted by a differential signal on bit-0 line that is enabled by a differential signal on tag-3 line of the SMD control cable. The differential current mode receiver 461, in FIG. 5, is coupled to the differential bit-0 line J5-4, J5-34 from the SMD controller through a resistor network. Receiver 461 drives bit-0 line 701. Similarly, tag-3 complement line 702 is coupled to SMD controller lines J5-3, J5-33 through receiver 459 and resistor network shown in FIG. 5.

In read/write gate circuit 812 (FIG. 33), the high signal on bit-0 line 701 is inverted by inverter 435 and the low output signal from inverter 435 is applied to a first input terminal of NOR gate 436. The low signal on tag-3 complement line 702 is applied to the second input terminal of NOR gate 436, so that NOR gate 436 generates a high signal on write gate line 704 and the high signal from NOR gate 436 drives the signal on read/write gate line 705 high.

The signal on bit-1 line 703, in read/write gate circuit 812 (FIG. 33), is low when the write gate is asserted. Thus, the low signal on bit-1 line 703 is changed to a high signal by inverter 437 and applied to a first input terminal of NOR gate 438. The low signal on tag-3 complement line 702 is applied to the second input terminal of NOR gate 438 and so the output signal from NOR gate 438 on read gate line 706 is low.

The high signal on write gate line 704 is applied through OR gate 585 to input terminal J of J-K flip-flop 584 in writing flag circuit 811 (FIG. 24). Hence, on the next clock pulse on clock one line 708 to J-K flip-flop 584, the signal on writing output line 709 from writing flag circuit 811 goes high, while the signal on the writing complement line 710 goes low, because the signal on the SCSI read/write enable line 707 is always low during normal operation of the disk emulator.

The low signal on writing complement line 710 is converted to a high signal by NOR gate 400 in write control circuit 806 (FIG. 15) and this high signal is applied to terminal $\overline{\text{CLR}}$ of J-K flip-flop 427. The high signal removes the clear from J-K flip-flop 427, and J-K flip-flop 427 is ready to respond to the signals on its input terminals.

The high signal on writing line 709 from writing flag circuit 811 (FIG. 24) is applied to select terminal $\overline{\text{A/B}}$ of multiplexer 1125 in FIG. 13. Hence, as previously described, the signal on write clock line 750 is applied over shift register clock line 739 to the clock terminal CLK of the integrated circuits 1104–1111, 1121 comprising the shift register 802 (FIG. 10); the signal on write B complement line 748 is applied over latch output enable line 742 to output enable terminal $\overline{\text{OE}}$ of each of the integrated circuits 1112–1120 in latch circuit 803 (FIG. 11); the positive power supply voltage is applied to data enable line 751; and the signal on write B line 747 is applied to shift register output control line 740.

As previously described, writing line 709 also supplies the signal to one of the input terminals of OR gate 415 in read counter circuit 810 in FIG. 18. Thus, the high signal on writing line 709 passes through OR gate 415 to the second input terminal of NOR gate 417. NOR gate 417 generates a low signal that holds counters 1022, 1023 in read counter circuit 810 in the clear mode. Consequently, when second gap counter 809 rolls over as described previously in the read from the disk emulator, read counter 810 remains disabled.

In latch clock/error detection circuit 805 (FIG. 31), the high signal on writing line 709 is applied to a first input terminal of OR gate 535, a second input terminal of NOR gate 537, a first input terminal of OR gate 544 and to input terminal D of D-type flip-flop 517. The high signal generated by OR gate 535 in response to the high signal on writing line 709 is passed through OR gate 532 to a first input terminal of NAND gate 529. Accordingly, the output signal from NAND gate 529 is determined by the output signal from AND gate 533 which is applied to a second input terminal of NAND gate 529. The output signal from AND gate 533 is determined by the signal on the XACKB complement line 779 from the 8207 DRAM controller and read/write complement line 782 from the 8207 DRAM controller.

The NOR gate 537 (FIG. 31) inverts the high signal on writing line 709 and the low output signal from NOR gate 537 holds flip-flop 538 in the clear mode. Hence, a low signal is applied to the second input terminal of OR gate 532, which is connected to output terminal Q of flip-flop 538 and a high signal is applied to the second input terminal of AND gate 531 which is connected to output terminal $\overline{\text{Q}}$ of flip-flop 538. The high signal generated on error complement line 783 by OR gate 544 in response to the high signal on writing line 709 disables the error detection function of the 8207 DRAM controller.

After asserting the write gate, the SMD disk controller supplies the data to be written to the disk emulator on the SMD data cable. Lines J4-8, J4-20 from the SMD data cable supply a differential signal to receiver 547, as shown in FIG. 4, and receiver 547 generates the complement of the data signal on write data complement line 735.

In input control circuit 801 (FIG. 9 and FIG. 10), the signal on the SMD/SCSI complement line 725 to the first input terminal of NAND gate 446 is high and the signal on write gate line 704 to the second input terminal of NAND gate 446 is high also, because the SMD controller asserted the write gate. The low output signal generated by NAND gate 446 in response to the high input signals is applied to a first input terminal of NOR gate 445 and the signal on write data complement line 735 is applied to the second input terminal of NOR gate 445. Accordingly, the complement of the data signal on line 735 is inverted by NOR gate 445 and passed through OR gate 444 to input terminal SR of the integrated circuit 1104 (FIG. 10). With each clock pulse on write clock line 750 one bit of the data is shifted through the serial data path of 66-bit shift register 802 comprised of integrated circuits 1104–1111, 1121 in FIG. 10, as described previously when data was shifted out of the shift register 802 during the read operation.

Digital comparator 1122 in comparator circuit 815 (FIG. 13) compares the signals on input terminals P0–P7 with the signals that have been preset on eight position DIP switch 291. Comparator 1122 is located on 66-bit bus 700 such that when the data sync pattern is detected, the first 66-bit word of the data field is in shift register 802 after two additional clock pulses on write clock line 750. When comparator 1122 detects the data sync pattern, the signal on data sync detection complement line 753, which is connected to the inverter on the terminal P=Q of comparator 1122, goes low. This low signal is applied to the second input terminal of NAND gate 401 in write control circuit 806 (FIG. 15) over data sync detection complement line 753. The signal on address sync detection complement line 752 to the first input terminal of NAND gate 401 is high, as is the signal on word address 2–63 complement line 756 to the third input terminal of NAND gate 401. Accordingly, NAND gate 401 generates a high signal that is applied to input terminal J of J-K flip-flop 432. FIG. 37a through FIG. 37w illustrate the response of write control circuit 806 (FIG. 15) to the low signal on data sync detection complement line 753.

Since the initialization of the write control circuit produced a high signal on input terminal $\overline{K}$ of J-K flip-flop 432 (FIG. 37f) the first clock pulse on write clock line 750 after the detection of the data sync pattern moves one more bit of data into shift register 802 and loads the high signal on input terminal J into J-K flip-flop 432 (FIG. 37e) which drives the signal level on the output terminal Q of flip-flop 432 high (FIG. 37g). The high signal from the output terminal Q of J-K flip-flop 432 drives the output signal of NOR gate 402 low (FIG. 37j) which in turn drives the output signal of NOR gate 407 high (FIG. 37m) because the second input signal to NOR gate 407 from sector/index line 712 is low. The high signal from NOR gate 407 removes the clear signal from counters 1027, 1028. Also, after the first clock pulse, the data sync pattern is no longer on the input terminals of comparator 1122 and thus the signal on data sync detection complement line 753 goes high (FIG. 37b) which in turn drives the output signal of NAND gate 401 low (FIG. 37d).

The second clock pulse on write clock line 750 after detection of the data sync pattern fills the 66-bit shift register 802 and generates a high signal on output terminal QA of counter 1027. This high signal is inverted by inverter 431 to a low signal that is applied to a second input terminal of OR gate 408 (FIG. 37s). The signal on the first input terminal of OR gate 408 from the output terminal QD of counter 1028 is low (FIG. 37r) and thus the output signal from OR gate 408 goes low (FIG. 37t). The low signal from OR gate 408 is applied to input terminal $\overline{LD}$ of counters 1027, 1028 so that on the third clock pulse on write clock line 750 after detection of the data sync pattern the counters 1027, 1028 are loaded with the signal on their respective input terminals. The low output signal from OR gate 408 is also applied to input terminal $\overline{K}$ of J-K flip-flop 432 (FIG. 37f) and through the integrator comprised of resistor R100 and capacitor C330 to the input terminal of Schmitt trigger inverter 429. The high output signal from inverter 429 is applied to input terminal B1 of retriggerable monostable multivibrator 1143. Since input terminal A1 of multivibrator 1143 is grounded, monostable multivibrator 1143 generates a positive pulse on load write latch line 717 (FIG. 37u). Inverter 430 inverts the pulse from multivibrator 1143 and the output signal from inverter 430 is applied to write line 716 (FIG. 37v).

The high signal on load write latch line 717 passes through OR gates 461, 464 in latch clock/error detection circuit 805 (FIG. 31) to latch clock line 743. Consequently, the second clock pulse on write clock line 750 after detection of the data sync pattern by comparator 1122 clocks the latches in latch circuit 803 (FIG. 11) and captures the word of data which is on 66-bit parallel bus 700 from shift register 802 (FIG. 10) in latch circuit 803. Hence, the disk emulator, which operates at 25 Megahertz or higher, has stored the first word in the data field so that it can be written to memory while the next word is being loaded into shift register 802. This permits operation at the high speed as well as writing to DRAM array 822 in a reasonable time frame. Also, this demonstrates how the sector-specific data field is detected and processed. Since the SMD disk emulator now passes the remainder of the data field to the disk emulator, the disk emulator must continue to generate a clock signal to latch circuit 803 on every 66th write clock pulse and write each word to DRAM array 822-before the next word is captured in latch circuit 803.

The high signal on load write latch line 717 is also applied to the first input terminal of NOR gate 440 in RFRQ circuit 841, shown in FIG. 29. The high signal on load write latch line 717 drives the output signal from the NOR gate 440 low and, as previously described, the low signal from NOR gate 440 loads counters 1138 and 1139. The response of counters 1138, 1139 in RFRQ circuit 841 is now identical to that described when the high signal on early read line 724 drove the output signal from NOR gate 440 low.

The third clock pulse on write clock line 750 after detection of the data sync pattern loads counters 1027, 1028 (FIG. 15) so that the signal on output terminal QA of counter 1027 goes low which in turn drives the output signal from inverter 431 to the second input terminal of OR gate 408 high (FIG. 37s). The signal from output terminal QD of counter 1028 also goes high and this high signal is supplied to the first input terminal of OR gate 408 (FIG. 37r). Accordingly, the output signal from OR gate 408 (FIG. 37t) remains high until one clock pulse after counter 1028 rolls over. The high signal generated on output terminal QD of counter 1028 by the third clock pulse is also applied to OR gate 403 (FIG. 37n) and the high output signal from OR gate 403 (FIG. 37q) is applied to the first input terminal of NOR gate 402 (FIG. 37h). The third clock pulse to J-K flip-flop 432 drives the signal on output terminal Q low (FIG. 37g) because the signal on the input terminals J, $\overline{K}$ are both low (FIG. 37e and FIG. 37f). Accordingly, since NOR gate 402 has a high input signal (FIG. 37h) and a low input signal (FIG. 37i) the output signal from NOR gate 402 remains low (FIG. 37j). This low output signal maintains the output signal from NOR gate 407 at a high level (FIG. 37m) which inhibits the clear function for counters 1027, 1028.

The high output signal from OR gate 403 is also applied to the input terminal of OR gate 514 and OR gate 515 in memory word counter circuit (FIG. 19) 807 by write counter zero state complement line 718. The high signal on write counter zero state complement line 718 causes OR gate 514 to maintain a high signal on address zero detection complement line 754 and causes OR gate 515 to maintain a high signal on address one detection complement line 755. Hence, comparator circuit 815 (FIG. 14) is inhibited.

As counters 1027, 1028 (FIG. 15) count the clock pulses on write clock line 750, counter 1028 generates a high signal on output terminal OB. However, prior to this time, the disk emulator must write the word stored in latch circuit 803 to DRAM array 822, because, as described below, the high signal on output terminal QB of counter 1028 causes memory word counter circuit 807 (FIG. 19) to increment the word address for DRAM array 822 by one. The write to DRAM array 822 is initiated when the load write latch signal on line 717 goes low because at this time the signal on write line 716 goes high and the high signal on write line 716 initiates the write sequence.

The duration of the high signal on load write latch line 717, approximately 500 nanoseconds, is determined by the resistor R101 and the capacitor C331, which are connected to input terminals of multivibrator 1143 as shown in FIG. 15. When the signal on the load write latch line 717 goes to zero, the signal on write line 716 goes high. FIGS. 38a through FIGS. 38j illustrate the sequence of signals that write the word from latch circuit 803 to DRAM array 822. In FIG. 38, the names and associated numbers on the right hand side of the figure each represent the lines in the disk emulator with the same number. The horizontal axis is not to scale, but each figure has the same scale.

The transition from a low signal to a high signal on write line 716 clocks D-type flip-flop 553 in write B circuit 814 (FIG. 39). Accordingly, the low signal on input terminal D of flip-flop 553 is provided to output terminal Q of flip-flop 553. The low signal on output terminal Q drives the signal on write B complement line 748 low (FIG. 38c). The low signal on output terminal Q of flip-flop D is also applied to the input terminal of inverter 553 and the resulting high output signal from inverter 553 drives the signal on write B line 747 high (FIG. 38d).

The high signal on write B line 747 tristates the output terminals of the registers in the shift register 802 (FIG. 38h) and the low signal on the write B complement line 748 is passed through multiplexer 1125 (FIG. 13) to the latch output enable line 742 and the latch output terminals are enabled so that the 66-bit word in latch circuit 803 is on the parallel bus 700 (FIG. 38i).

The low signal on write B complement line 748 is applied to input terminal $\overline{\text{WRB}}$ of the 8207 DRAM controller. In response to the low signal on the input terminal $\overline{\text{WRB}}$, the 8207 DRAM controller generates a low signal on read/write complement line 782 (FIG. 38f). The low signal on read/write complement line 782 drives the output signal from AND gate 533 in latch clock/error detection circuit 805 (FIG. 31) low. The low output signal from AND gate 533 drives the output signal from NAND gate 529 high and the high output signal from NAND gate 529 passes through OR gate 527 to latch clock line 743 (FIG. 38g). Since the output terminals in latch circuit 803 are enabled, the high signal on latch clock line 743 captures the inverted signals on the output terminals from the latches in circuit 803 on the input terminals in the latches in circuit 803. Consequently, the 66-bit word stored in latch circuit 803 is inverted so that the word is now ready to be written to DRAM array 822. The 8207 DRAM controller subsequently stores the word in the location specified by the address signals from ROM translation circuit 819 and memory word counter circuit 807, as previously described.

After the word is written to the specified location in DRAM array 822, the 8207 DRAM controller drives the signal on XACKB complement line 779 low. The low signal on XACKB complement line 779 is a first input signal to NOR gate 550 in write B circuit 814 (FIG. 39). The second input signal to NOR gate 550 is on DRAM clock complement line 777. Accordingly, NOR gate 550 generates a high output signal when the signal on DRAM clock complement line 777 goes low. The high output signal from NOR gate 550 drives the output signal from NOR gate 551 low which presets the flip-flop 552 and therefore drives the signal on write B complement line 748 high (FIG. 38c) because write B complement line 748 is connected to output terminal Q of flip-flop 552. The high output signal from terminal Q of flip-flop 552 is also an input signal to inverter 553, which in turn generates a low output signal on write B line 747 (FIG. 38d).

When the 8207 DRAM controller drives the signal on the XACKB complement line 779 low (FIG. 38e), the signal on read/write complement line 782 to AND gate 533 (FIG. 31) was already low (FIG. 38f) and so the output signal from AND gate 533 in latch clock error detection circuit 805 (FIG. 31) remains unchanged by the low signal on XACKB complement line 779. Consequently, a clock pulse is not generated on latch clock line 743 by the low signal on XACKB complement line 779. After the low signal on XACKB complement line 779 returns to a high level (FIG. 38e) the signal on read/write complement line 782 also returns to a high level (FIG. 38f) and this completes the write to DRAM array 822.

Recall this response of the disk emulator to the load write latch signal and the write signal was generated by the second clock pulse on write clock line 750 after detection of the data sync pattern. As counter 1027, 1028 (FIG. 15) count the clock pulses on write clock line 750 and generate a high signal on output terminal QB of counter 1028, referred to previously, the high signal on output terminal QB of counter 1028 drives the output signal from NAND gate 404 to input terminal D of flip-flop 428 low, because the signals on the two other input terminals of NAND gate 404 were set high when counter 1028 was loaded. On the next clock pulse on write clock line 750, the low signal on input terminal D of flip-flop 428 is loaded into flip-flop 428 and applied to output terminal Q which drives write counter line 715. The low signal on write counter line 715 is inverted by NAND gate 406 (FIG. 3). The high signal generated on counter clock line 780 by.NAND gate 406 increments counters 1054, 1055 in memory word counter circuit 807, as previously described.

Since this is the second word counted, the output signal on terminal QA of counter 1055 in memory word counter circuit 807 (FIG. 19) is low, the output signal on terminal QB of counter 1055 is high, and the output signals on the terminals QC and QD of counter 1055 and the terminals QA and QB of counter 1054 are all low. Accordingly, the next word in the sector of the track specified by the SMD controller is addressed on lines J2-30, J2-94, J2-32, J2-96, J2-31, and J2-95 to the 8207 DRAM controller which are coupled to terminals QA through QD of counter 1055 and terminals QA, QB of counter 1054, respectively.

Also, the low signal from output terminal QA of counter 1055 is also applied to a first input terminal of NOR gate 509 and to an input terminal of inverter 505 which in turn generates a high signal on the first input terminal of NOR gate 506. Thus, NOR gate 506, which also receives the high signal from terminal QB of counter 1055, generates a low signal which is applied to a first input terminal of NAND gate 51. The high signal from terminal QB of counter 1055 is also applied to the second input terminal of NOR gate 509 and the low signal generated by NOR gate 509 is applied to the third input terminal of NAND gate 511. Similarly, the low signals from output terminals QA, QB of counter 1054 are supplied to the first and second input terminals of NOR gate 508 respectively. The resulting high signal generated by NOR gate 508 is provided to the second input terminal of NAND gate 511 and to the third input terminal of NAND gate 510. The first input terminal of NAND gate 511 and the second input terminal of NAND gate 510 each receive the high output signal from NOR gate 507 that is generated in response to the low signals from terminals QC, QD of counter 1055 which are applied to the first and second input terminals of NOR gate 507 respectively.

Therefore, NAND gate 510, which receives the high output signals from NOR gate 507 and NOR gate 508 and the low output signal from NOR gate 506, provides a high output signal to a first input terminal of OR gate 515, which in turn generates a high signal on address one detection complement line 755. The high output signal from NAND gate 510 is also passed through OR gate 513 to the first input-terminal of NAND gate 512. The high output signal from NAND gate 511, which is generated by the high input signals from NOR gates 507, 508 and the low input signal from NOR gate 509 is passed to a first input terminal of OR gate 514. The high output signal from NAND gate 511 is also applied to the second input terminal of NAND gate 512. Since the signals on both input terminals of NAND gate 512 are high, NAND gate 512 generates a low signal on word address 2–63 complement line 756.

The low signal on word address 2–63 complement line 756 drives the output signal from NAND gate 401 in write control circuit 806 (FIG. 15) high. Accordingly, the signals on both input terminals J, K̄ of flip-flop 432, in write control circuit 806 (FIG. 15) are high and on the next clock pulse on write clock line 750 the signal on output terminal Q of flip-flop 432 goes high. As previously described, this high signal inhibits the clear function on counters 1027, 1028. Thus, when counters 1027, 1028 roll over after counting 64 1 bits of the second word, the counters do not clear when the signal on output terminal QD of counter 1028 goes low. Rather, the first clock pulse on write clock line after counter 1028 rolls over drives the output signal on terminal QA of counter 1027 high and the output signal on terminal QD of counter 1028 remains low. Also, one additional bit of data is shifted into shift register 802. The high signal from terminal QA of counter 1027 and the low signal from counter 1028 produces a second high signal on load write latch line 717, as previously described, and the second high signal on load write latch line 717 generates a clock pulse on latch clock line 743 which captures the sixty-six bit word in shift register 802 in latch circuit 803. Since one bit of the word was shifted into shift register 802 by the clock pulse which loaded counters 1027, 1028 after the previous load write latch signal, an additional 64 bits of the word were shifted into shift register 802 by the clock-pulses which caused counter 1028 to roll over, and one additional bit was shifted into shift register 802 as the second load write latch signal was generated, the clock pulse on latch clock line 743 is generated at precisely the-instant another full sixty-six bit word is in shift register 802. The counters 1027 and 1028 are again loaded after the generation of the second load write latch signal and the memory word counter circuit 807 is incremented as described above. Hence, as each 66-bit word fills shift register 802 and counter 1028 rolls over, one clock pulse later the load write latch signal on line 717 is generated and the process repeats itself.

This process continues until counter 1054 in memory word counter circuit 807 (FIG. 19) generates a carry pulse signal to AND gate 496 which in turn generates a high signal on input terminal J of the flip-flop 499, as previously described. On the next clock pulse on clock zero line 728 the signal on sector full line 757, which is connected to output terminal Q of flip-flop 498, goes high. The high signal on sector full line 757 drives the output signal from NOR gate 400 in write control circuit 806 (FIG. 15) low. The low output signal from NOR gate 400 clears flip-flop 432. The resulting low signal on output terminal Q of flip-flop 432 is supplied to the first input terminal of NOR gate 402 as previously described. Thus, when counter 1028 rolls over, the output signal of NOR gate 402 goes low and counters 1027, 1028 are in the clear mode, as previously described. Thus, the disk emulator reads the data field of the sector provided by the SMD disk controller and then inhibits write control circuit 806. Hence, the disk emulator functions in the write operation as a hard disk drive with substantially improved performance.

Following this mode of operation, the SMD disk controller may write any number of sectors to the disk emulator. The comparator circuit 815 detects the sector specific data and only sector specific data is written to the DRAM array. This minimizes the amount of DRAM required and gives a better utilization of the storage medium than the prior art hard disk drives. Also, as described, the disk emulator significantly improves the seek time and the rotational latency and operates at 25 MHz or higher so that the speed with which data is written to the disk-emulator is governed by the speed of the SMD disk controller, rather than the disk emulator. This dependence of performance on the SMD disk controller completely reverses the dependence found in the prior art, where the performance of the hard disk drive was the limiting factor.

Read with Error

In the immediately preceding description of the read operation from the disk emulator, the error correction capability of the disk emulator was not discussed. It was assumed that no hard errors, as defined previously, occurred while the data was stored in the DRAM array. In the normal read, the cycle was: 1) read the word from DRAM array 822 and store it in latch circuit 803; 2) invert the word in latch circuit 803; and 3) write the word from latch circuit 803 to shift register 802. This was a READ/INVERT/WRITE cycle.

The extra invert cycle may seem extraneous from the normal read cycle with no errors, but examination of the read cycle with an error demonstrates the benefits of the inverting latches in latch circuit 803.

The read from memory with an error requires the Read/Invert/Write/Read/Invert/Write cycle previously illustrated in Table I. This cycle must be accomplished within the time required for the previous 66 bit word to be shifted through shift register 802. The error correction sequence requires the most time to accomplish, and, as such, is the limiting factor for serial data transfer to the SMD disk controller. Since the data is read and immediately inverted in conjunction with the latching operation, significant time is saved. This allows the six step error correction operation to fit within the 66-bit time at a clock rate of up to 50 MHz.

A read with error cycle begins, as previously described, with the read request to 8207 DRAM controller, i.e., applying a low signal on terminal $\overline{RDB}$ of the 8207 controller. FIGS. 40a through 40j illustrate the sequence of signals for a read with error. In FIG. 40a through 40i the names and associated numbers on the left hand side of the figure each represent the lines in the disk emulator with the same number. FIG. 40j is the response of-terminal Q1 in multivibrator 1131 (FIG. 31). In FIG. 40, the horizontal axis is not to scale, but each figure has the same scale.

Upon receipt of the low signal on terminal $\overline{RDB}$, the 8207 DRAM controller performs the memory fetch, and loads a 66-bit word on 66-bit parallel bus 700 and a stored parity bit for the 66-bit word appears on line D(0) as previously described. Parity circuit 804 (FIG. 12) generates a new parity bit on parity bit line 744 for the retrieved word on 66-bit parallel bus 700. Recall that during this operation the parallel output terminals in shift register 802 (FIG. 10) are tri-state.

The new parity bit on parity bit line 744 is applied to the first input terminal of Exclusive OR gate 302 (FIG. 11). The stored parity bit on line D(0) is applied to the second input terminal of Exclusive OR gate 302. If the output signal from OR gate 302 is zero, then no error occurred and the read cycle progresses as previously described. However, since for illustrative purposes an error is assumed, the new parity bit is different from the stored parity bit and the output signal from Exclusive OR gate 302 on parity check line 784 is high.

The high signal on parity check line 784 is applied to a first input terminal of NOR gate 542 in the latch clock/error detection circuit 805 (FIG. 31). The signal on the second input terminal of NOR gate 542 and the signal on the first input terminal of AND gate 541 are both low because the signal on read line 733, which initiated the read cycle, drove the output signal of inverter 577 low and the low output signal from inverter 577 cleared flip-flop 539. Similarly, the low signal on read B complement line 746 (FIG. 40b) cleared flip-flop 540 and the resulting low signal on the output terminal Q of flip-flop 540 is applied to the second input terminal of AND gate 541. Accordingly, NOR gate 542 generates a low signal which is applied to the first input terminal of OR gate 543 and AND gate 541 also generates a low signal which is applied to the second input terminal of OR gate 543. The low output signal generated by OR gate 543 is passed through OR gate 544 to error complement line 783 because the signal on writing line 709 to the other input terminal of OR gate 544 is also low. The low signal on error complement line 783 is applied to the error pin of the 8207 DRAM controller.

When the signal on the error pin of the 8207 DRAM controller is low, the controller modifies the read cycle from that previously described. Instead of generating the low signal on XACKB complement line 779 as in the error free read, the 8207 controller generates a low signal on the read/write complement line 782 (FIG. 40*f*) which is connected to terminal R/$\overline{\text{W}}$ of the controller. This indicates that the read cycle has been altered to become a Read-Modify-Write cycle.

The low signal on read/write complement line 782 drives the output signal from AND gate 533 in latch clock/error detection circuit 805 (FIG. 31) low and the response of NAND gate 529 to the low output signal from AND gate 533 is identical to that in the error free read. Consequently, the change in the signal on the read/write complement line 782 causes latch clock/error detection circuit 803 (FIG. 40*e*) to latch the word on parallel bus 700. Since latch circuit 803 inverts the word when it latches, latch circuit 803 provides an inverted word on the parallel bus 700 to DRAM array 822. The 8207 DRAM controller then writes the inverted word back to the same location in DRAM array 822 from which the word was retrieved.

The low output signal from AND gate 533 is also applied to a first input terminal of NOR gate 530. The input signal on the second input terminal of NOR gate 530 is the complement of the DRAM clock signal on DRAM clock complement line 777. The signal on read/write complement line 782, which drives the output signal of AND gate 533, and the signal on DRAM clock complement 777 are timed such that both are low on the input terminals of NOR gate 530 so that NOR gate 530 generates a high output signal. The high output signal from NOR gate 530 drives the output signal of NOR gate 519 low. As previously described, the low output signal from NOR gate 519 sets flip-flop 517 and consequently a high signal is generated on read B complement line 746 (FIG. 40*b*) and a low signal on read B line 745 (FIG. 40*c*).

The signal generated by 8207 DRAM controller on read/write complement line 782 (FIG. 40*f*) also clocks the error flag register, flip-flop 538. Accordingly, since the signal on input terminal D of the flip-flop 538 was high, the signal on output terminal Q of flip-flop 538 goes high and the signal on output terminal $\overline{\text{Q}}$ of flip-flop 538 goes low. The high signal from output terminal Q of flip-flop 538 is applied to one of the input terminals of OR gate 532. This is necessary because the error correction scheme leaves the corrected word ready to be loaded into shift register 802, but in a read without error for the zeroth word of a sector the signal on line 722 is used to drive the output signal of OR gate 532 high which subsequently generates a clock pulse on latch clock line 743. However, since the clock pulse on line 743 is not needed in a read with error, the high signal provided by flip-flop 538 to OR gate 532 causes the OR gate 532 to generate a high output signal at all times until another read signal on read line 733 to NOR gate 537 causes NOR gate 537 to clear flip-flop 538. The low signal on the output terminal $\overline{\text{Q}}$ of flip-flop 538 similarly drives the output signal of AND gate 531 low so that when the read counters roll over and generate a high signal on read counter TC line 781, the high signal on line 781 does not generate a clock pulse on latch clock line 743.

Finally, the signal generated by the 8207 DRAM controller on read/write complement line 782 after the detection of the parity error sets flip-flop 539 so that the signal on output terminal Q of flip-flop 539 is high. The high signal from output terminal Q of flip-flop 539 drives the output signal of NOR gate 542 low. The high signal from output terminal Q of flip-flop 539 is also applied to the second input terminal of AND gate 541. The signal on the first input terminal of AND gate 541 from the output terminal Q of-flip-flop 540 is low because just prior to the low signal on read/write complement lines 782 (FIG. 40*f*) the signal on read B complement line 746 (FIG. 40*b*) was low and this low signal held the flip-flop 540 in the clear mode.

Accordingly, with a high input signal and a low input signal, AND gate 541 generates a low output signal. Hence, OR gate 543 has two low input signals and accordingly generates a low output signal which passes through OR gate 544 to error complement line 783. The low signal on error complement line 783 forces the error pin of the 8207 DRAM controller active so that a guaranteed error will occur when the 8207 DRAM controller performs the second read cycle.

The high signal from output terminal Q of flip-flop 538 which was generated by the clocking of flip-flop 538 by the signal on read/write complement line 782 which was generated by the 8207 DRAM controller after the detection of the parity error triggers monostable multivibrator 1134 because input terminal A1 of multivibrator 1134 is grounded. The high output signal from multivibrator 1134, (FIG. 40*j*) is passed through OR gate 516 to the terminal CLK of the flip-flop 517.

Accordingly, when multivibrator 1134 triggers flip-flop 517 is clocked and, as described previously, the signal on read B complement line 746 (FIG. 40*b*) goes low and the signal on read B line 745 (FIG. 40*c*) goes high. The low signal on read B complement line 746 is applied to input terminal $\overline{\text{RDB}}$ of the 8207 DRAM controller and accordingly the 8207 DRAM controller initiates a second read cycle with an error because of the low signal on error complement line 783, as previously described.

This cycle is identical to the first cycle except now the low signal on the read/write complement line 782 (FIG. 40*f*) does not change the output signal from flip-flop 538 and consequently multivibrator 1131 is not retriggered. Accordingly, this second cycle simply reads and inverts the data from the DRAM array which was written there by the first cycle of the error correction process. As explained previously with respect to Table I, the second Read/Invert/Write cycle leaves the error corrected word in latch circuit 803. This word is subsequently loaded into the shift registers and the SMD controller sees correct data and is unaware that any memory failure has occurred.

This error correction process is completed while the previous word is being shifted out of shift register 802 and the use of the inverting latches in latch circuit 803 and the unique Read/Invert/Write/Read/Invert/Write process eliminates any potential problem with single bit failures in the DRAM array.

The disk emulator of this invention significantly improves both the seek time and the rotational latency. Also, the data storage medium in the disk emulator is used more efficiently than the data storage medium in a conventional hard disk. Finally, since the disk emulator has no mechanical or moving parts and since the novel error correction process corrects hard memory failures, the reliability of the disk emulator should be significantly better than the reliability of prior art hard disks. While one embodiment of this invention have been disclosed, it should be understood that the present disclosure merely exemplifies the principles of the invention and is not intended to limit the invention to embodiments illustrated. From the present disclosure, other embodiments and advantages of the invention will be apparent to one skilled in the art.

We claim:

1. A disk storage subsystem for storing data supplied by mass storage interface circuitry and retrieving data needed by said interface circuitry, wherein said interface circuitry specifies a storage location by address information, said disk storage subsystem comprising:

a volatile storage medium;

a parallel path;

a nonvolatile media;

a control circuit comprising a first port, a second port, a first line carrying signals and a second line carrying signals, wherein said first port is operatively coupled to said nonvolatile media, said second port is operatively coupled to said parallel path, said first line is operatively coupled to said volatile storage medium thereby to carry control signals between said control-circuit and said volatile storage medium and said second line is operatively couplable to said interface circuitry;

wherein said parallel path is also operatively coupled to said volatile storage medium;

wherein in a first mode of operation, in response to a first signal on said second line from said interface circuitry, said control circuit stores data over said parallel path received from said interface circuitry at a location in said volatile storage medium corresponding to said address information;

in a second mode of operation, in response to a second signal on said second line from said interface circuitry, said control circuit retrieves data over said parallel path from a location in said volatile storage medium corresponding to said address information and provides said retrieved data to said interface circuitry; and further wherein said control circuit can store parallel data received on said parallel path into said nonvolatile media and supply parallel data from said nonvolatile media on said parallel path, wherein said disk storage subsystem is addressable by said interface circuitry in a format readable by a disk drive.

2. The disk storage subsystem of claim 1, wherein said control circuit copies data stored in said volatile storage medium into said nonvolatile media.

3. The disk storage subsystem of claim 2, further comprising a battery coupled to said disk storage subsystem, said battery powering said disk storage subsystem upon a failure of line power, and wherein said control circuit does said copying when said storage subsystem is being powered by said battery.

4. The disk storage subsystem of claim 2, wherein said control circuit copies data from said nonvolatile media into said volatile storage medium on receipt of line power after said disk storage system is powered by said battery.

5. The disk storage subsystem of claim 1, wherein said volatile storage media comprises a DRAM array.

6. The disk storage subsystem of claim 1, wherein said parallel path comprises a SCSI data path.

7. The disk storage subsystem of claim 1, wherein said nonvolatile media comprises a SCSI hard disk.

8. The disk storage subsystem of claim 1, wherein said control circuit comprises a third port operatively couplable to said interface circuitry.

* * * * *